(12) United States Patent
He

(10) Patent No.: US 11,096,514 B2
(45) Date of Patent: *Aug. 24, 2021

(54) SCALABLE AUTOMATED KITCHEN SYSTEM

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 911 days.

This patent is subject to a terminal disclaimer.

(21) Appl. No.: 15/798,357

(22) Filed: Oct. 30, 2017

(65) Prior Publication Data

US 2018/0132649 A1 May 17, 2018

Related U.S. Application Data

(60) Provisional application No. 62/422,022, filed on Nov. 14, 2016, provisional application No. 62/466,294, filed on Mar. 2, 2017, provisional application No. 62/480,334, filed on Mar. 31, 2017.

(51) Int. Cl.
| | |
|---|---|
| *A47J 27/00* | (2006.01) |
| *A47J 36/00* | (2006.01) |
| *A47J 27/12* | (2006.01) |
| *A47J 36/02* | (2006.01) |
| *B65B 43/16* | (2006.01) |
| *B65B 21/00* | (2006.01) |

(52) U.S. Cl.
CPC ............... *A47J 27/12* (2013.01); *A47J 36/00* (2013.01); *A47J 36/02* (2013.01); *B65B 43/16* (2013.01); *B65B 21/00* (2013.01)

(58) Field of Classification Search
CPC . A47J 27/12; A47J 36/00; A47J 36/02; B65B 21/00; B65B 35/00; B65B 43/16; G05B 2219/39

USPC ........ 99/339, 325–337, 357, 360, 361, 484, 99/443 C, 443 R; 700/245, 213–244, 700/231–244; 901/2, 30, 31, 27, 41; 414/796.9, 788.5, 528, 768–770, 283, 414/359–361; 705/15; 221/210

See application file for complete search history.

(56) References Cited

U.S. PATENT DOCUMENTS

| | | | | |
|---|---|---|---|---|
| 4,229,136 A | * | 10/1980 | Panissidi | B25J 19/0012 414/673 |
| 5,029,520 A | * | 7/1991 | Okada | G07F 17/0078 99/357 |
| 2015/0013550 A1 | * | 1/2015 | Lin | A47J 37/04 99/404 |
| 2016/0059412 A1 | * | 3/2016 | Oleynik | B62D 57/032 700/257 |

(Continued)

*Primary Examiner* — Reginald Alexander

(57) ABSTRACT

The present application discloses an automated kitchen system comprising: a plurality of ingredient containers and caps; a storage apparatus; a first transfer apparatus configured to move capped containers in the storage apparatus to a location at a cap opening apparatus as to remove the cap from the ingredient container; a cyclic transfer apparatus; a second transfer apparatus configured to move an uncapped ingredient container to the cyclic transfer apparatus. The automated kitchen system further comprises one or more cooking systems, where each cooking system comprises: a cooking apparatus comprising a cooking container and a stirring mechanism; an unloading apparatus to unload food ingredients; a transfer apparatus to move an ingredient container from the cyclic transfer apparatus to a position at the unloading mechanism.

30 Claims, 127 Drawing Sheets

(56) References Cited

U.S. PATENT DOCUMENTS

| | | | |
|---|---|---|---|
| 2016/0324359 A1* | 11/2016 | Aboujassoum | A23L 5/15 |
| 2018/0206673 A1* | 7/2018 | He | A47J 36/321 |
| 2019/0038071 A1* | 2/2019 | He | A47J 44/00 |
| 2019/0069722 A1* | 3/2019 | He | A47J 36/00 |

* cited by examiner

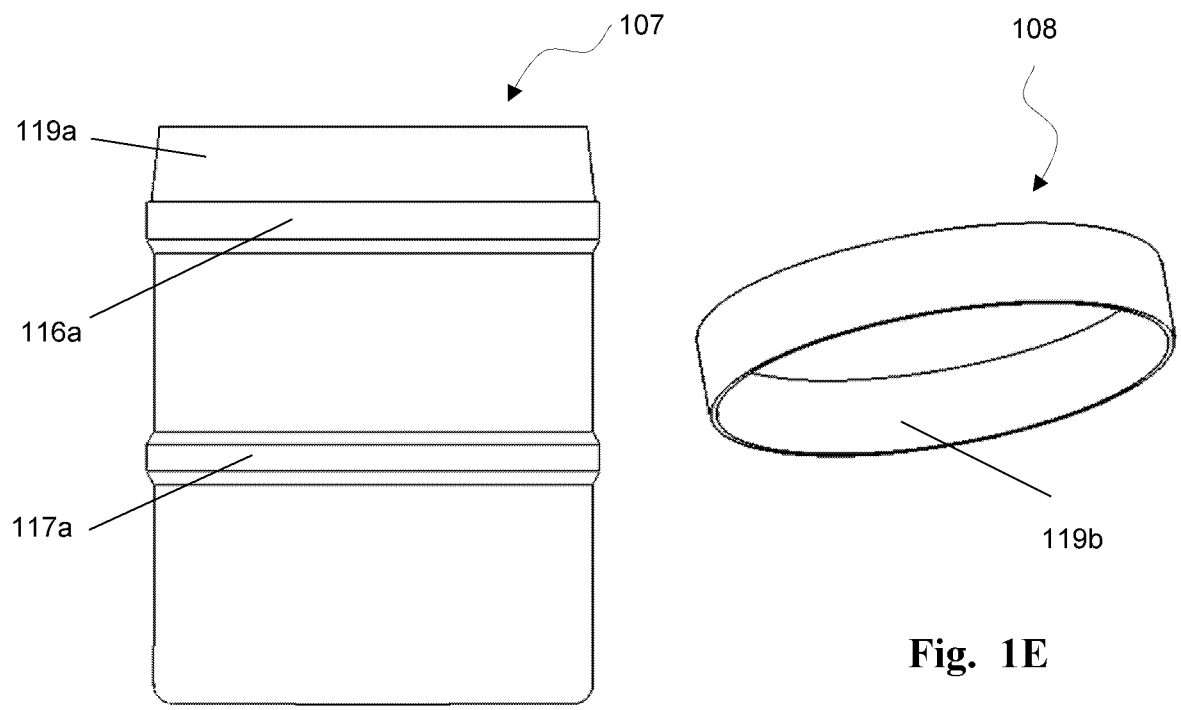
Fig. 1D
Fig. 1E
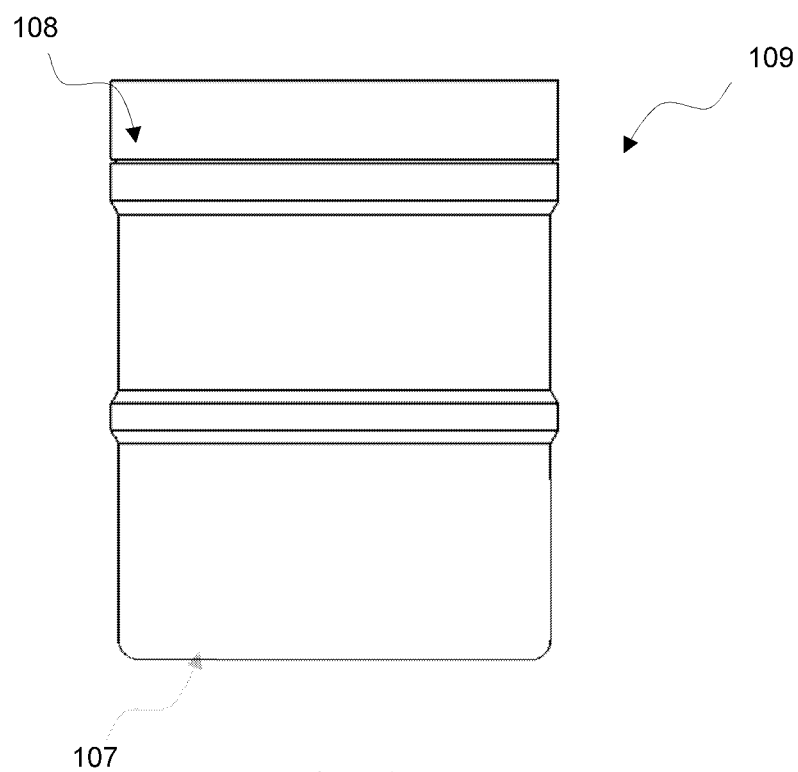
Fig. 1F

SCALABLE AUTOMATED KITCHEN SYSTEM

This application claims the benefit of U.S. Provisional Application Ser. No. 62/422,022 filed Nov. 14, 2016, Ser. No. 62/466,294 filed Mar. 2, 2017 and Ser. No. 62/480,334 filed Mar. 31, 2017, the disclosures of which are hereby incorporated herein by reference in their entireties.

CROSS-REFERENCE TO RELATED APPLICATIONS

U.S. Patent Application

Ser. No. 13/607,712; Filed Sep. 8, 2012; Inventor: Zhengxu He
Ser. No. 13/770,081; Filed Feb. 19, 2013; Inventor: Zhengxu He
Ser. No. 13/892,254, Filed May 11, 2013; Inventor: Zhengxu He
Ser. No. 14/918,608, Filed Oct. 31, 2015; Inventor: Zhengxu He
Ser. No. 15/157,319, Filed May 17, 2016; Inventor: Zhengxu He U.S. Provisional Patent Applications Ser. No. 62/422,022; Filed Nov. 14, 2016, Inventor: Zhengxu He
Ser. No. 62/466,294; Filed Mar. 2, 2017, Inventor: Zhengxu He
Ser. No. 62/480,334; Filed Mar. 31, 2017, Inventor: Zhengxu He

BACKGROUND OF THE INVENTION

The present application relates to techniques and methods for storage, transportation and dispensing of food ingredients into a cooking container of a cooking apparatus, and related techniques and methods in an automated kitchen.

In the cooking of a dish by an automated cooking apparatus in a kitchen, a certain number of food ingredients need to be dispensed into a cooking container. The preparation or preliminary processing of food ingredients, especially in the case of chained restaurants, may be done at a processing location which may be different from the kitchen. The food ingredients are then transported to and stored at a storage in the kitchen, and at time of cooking, be transferred out from the storage and dispensed into a cooking container.

Traditionally, food ingredients are packaged into plastic bags or other containers. They are easily transported to a storage (often a refrigerator) in a kitchen. Afterwards, these are partially or entirely handled by humans.

Due to cost savings or improvement in food safety, it is desirable to automate the process of transfer and dispensing of the food ingredients from storage to a cooking container.

BRIEF SUMMARY OF THE INVENTION

In the cooking of a food, one or more food ingredients need to be dispensed into a cooking container. Depending on recipe, the timing of dispensing may be different for different food ingredients. The food ingredients are often prepared or processed at a processing location and then transported to a storage (often refrigerated) in a kitchen, and then transferred out of storage and dispensed into a cooking container during cooking. Applying the system and method disclosed in the present patent application, the transfer and dispensing of the food ingredients from the storage to the cooking container are fully automated.

A kitchen system may comprise one or more of the following: a plurality of ingredient containers each configured to contain food ingredients, wherein an ingredient container may be capped by a cap after the ingredient container is loaded with food ingredients; transport boxes configured to contain capped ingredient containers; a transport apparatus configured to move the transport boxes; a storage apparatus comprising a plurality of compartments each configured to store one or more capped ingredient containers; a cap opening apparatus comprising one or more locations each configured to position an ingredient container, and a cap opening apparatus configured to remove the cap of an ingredient container; a first transfer apparatus configured to move an ingredient container from a storage apparatus to the cap opening location of a cap opening apparatus; a cyclic transport apparatus comprising a cycle of container holders each configured to position an ingredient container, and a motion mechanism configured to cyclically move the cycle of container holders; a second transfer apparatus configured to move an ingredient container from the cap opening location of a cap opening apparatus to the position on a container holder of a cyclic transport apparatus.

The kitchen system may comprise one or more cooking systems each comprising one or more of the following: a cooking apparatus comprising a cooking container configured to contain food or food ingredients, and a stirring mechanism configured to produce a motion in the cooking container as to stir, mix or distribute the food or food ingredients contained in the cooking container during a cooking process; an unloading apparatus configured to unload the food ingredients from an ingredient container which is located at an "unloading position" into the cooking container; etc.

The implementations of our kitchen system may include one or more of the following. A plurality of containers may be packaged in a transport box and be transported to a location of the kitchen system. A transport apparatus may move a transport box to a location next to a storage apparatus in the kitchen. A storage apparatus may comprise a grid of storage compartments, wherein each compartment may store a plurality of containers. A transfer apparatus may comprise a gripping mechanism and a motion mechanism configured to move a rigid component of the gripping mechanism, wherein the gripping mechanism may comprise a gripper (e.g., sucker gripper, vacuum gripper, pneumatic gripper, mechanical gripper, magnetic gripper, etc.) configured to grab and hold a container. A cap opening apparatus may remove the cap of a capped ingredient container. An unloading apparatus may dispense the food ingredients in an ingredient container into a cooking container, by grabbing and hold an ingredient container and then by turning over the ingredient container. An emptied container may be transferred away to get cleaned and re-used. A transfer apparatus may comprise a grabbing mechanism configured to grab and hold a container wherein the grabbing mechanism comprises a support component, and a motion mechanism configured to move the support component of the grabbing mechanism. A transfer apparatus may also comprise a robotic arm. A motion mechanism of a cyclic transport apparatus may be configured to move a cycle of container holders intermittently and cyclically, e.g., in an intermittent rotation around a vertical axis. A transfer apparatus may comprise a motion mechanism which may move a sequence of container holders intermittently and linearly.

A cyclic transport apparatus may comprise a chain, and a plurality of pairs of sprockets configured to be engaged with the chain, a cycle of container holders attached to or otherwise connected to the chain, and a mechanized mechanism configured to move the chain, wherein the sprockets may be configured to have vertical rotational axes. A cyclic transport apparatus may comprise: a plurality of container holders; a pair of chains; and a plurality of pairs of sprockets; wherein each container holder is attached or otherwise connected to one or two long pins which are inserted into the pair of chains; wherein one of the pair of chains is configured to be positioned horizontally above the other; wherein each pair of sprockets are configured to have a same vertical rotational axis; wherein each sprocket is engaged with one of the chains. The pair of chains may be moved synchronously, the movement driven by a same motor. The pair of chains may be of the same length. Each pair of sprockets may be of the same radius and may be fixedly connected to a same shaft or pin wherein the axis of the shaft or pin coincides with the rotational axis of the sprockets.

A transfer apparatus may move a container between two fixed locations. A transfer apparatus may comprise a mini train configured to move on track, or more generally a mini vehicle; wherein the mini train or mini vehicle is configured to carry one or more container holders.

In another general aspect, the present invention relates to an algorithm which may control the apparatus in a kitchen system.

These and other aspects, their implementations and other features are described in detail in the drawings, the description, and the claims.

BRIEF DESCRIPTION OF THE SEVERAL VIEWS OF THE DRAWINGS

FIG. 1D shows a side view of an ingredient container. FIG. 1E shows an aerial view of a cap. FIG. 1F shows a side view of a capped ingredient container.

DETAILED DESCRIPTION OF THE INVENTION

For the present patent application, a shaft always comprises an axis. A shaft can have different shapes at different sections. A sectional shape of a shaft can be round, oval, or rectangular, or of other shape. A bearing, except linear motion bearing, comprises an inner ring and an outer ring, among other parts. One or more bearings are said to connect a shaft and a bearing housing, if the inner rings of the bearings are mounted on the shaft and the outer rings of the bearings are mounted in the bearing housing, so that the shaft is constrained to rotate relative to the bearing housing around the axis of the shaft. Such connection of a shaft and a bearing housing by one or more bearings, should also include accessories; but for simplicity, we may or may not mention the accessories, and we may not show the accessories in drawings. It should be noted that there are many ways of installing one or two bearings connecting a shaft and a bearing housing. For example, the inner ring(s) of the bearing(s) may be fixedly connected to (and concentric with) the shaft via accessories, and the outer ring(s) of the bearing(s) may be fixedly connected to the bearing housing via accessories. A bearing may be a ball or roller bearing, or a plain bearing, or of other type. In some applications, two bearings of the same or different types are configured to connect a shaft and a bearing housing.

For the present patent application, a rotational movement refers to a rotational movement around an axis.

For the present patent application, a motor comprises a powered mechanism configured to produce a relative motion between two members. A motor may be of different type depending on power source, e.g., electric, hydraulic, pneumatic, etc. A computer may be configured to control a motor, e.g. to control the timing, direction and speed of the motion.

In many applications, a motor comprises a base component (e.g., a frame) which is a stationary member of the motor, and a shaft which is a moving member of the motor, so that the powered mechanism of the motor is configured to produce a rotation of the shaft relative to the base component around the axis of the shaft. However, it is not a requirement that a motor must comprise a shaft.

Figure 1A:
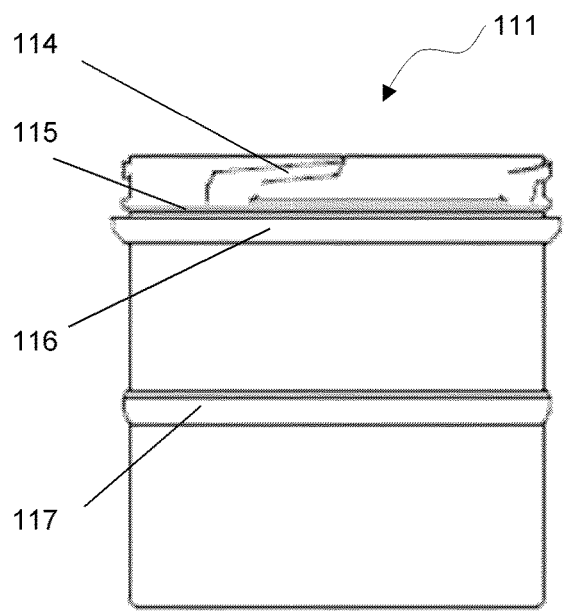
FIG. 1A shows a side view of an ingredient container.

In some embodiments, referring to FIG. 1A, an ingredient container 111 comprises some external screw threads 114, ring shaped stiffeners 117 and 116, and a ring-shaped seal 115. The seal 115 may be made of an elastic material, such as rubber or silica gel. The interior surface of the ingredient container is comprised of a cylindrical surface and a flat bottom surface; and the axis of the cylindrical surface is referred to as the axis of the ingredient container 111. The ingredient container 111 is configured to store food ingredients in the interior.

It should be noted that an ingredient container 111 may have the shape of a screw jar.

Figure 1B:
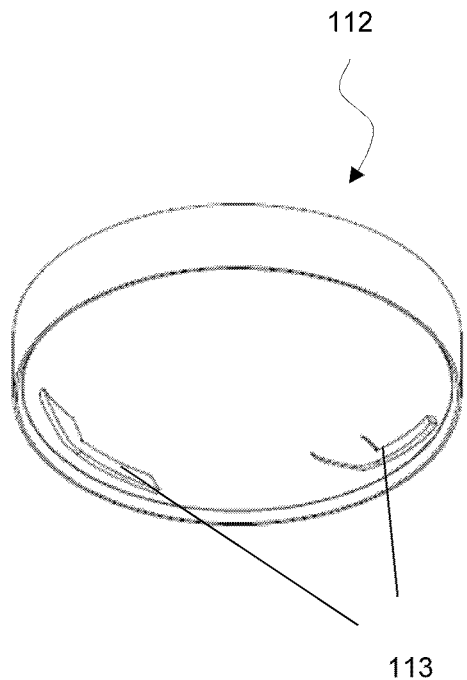
FIG. 1B shows an aerial view of a cap.

In some embodiments, referring to FIG. 1B, a cap 112 comprises some internal screw threads 113 which are configured to be hooked with the external screw threads 114 of the ingredient container 111, so that the cap 112 may be closed on the ingredient container.

Figure 1C:
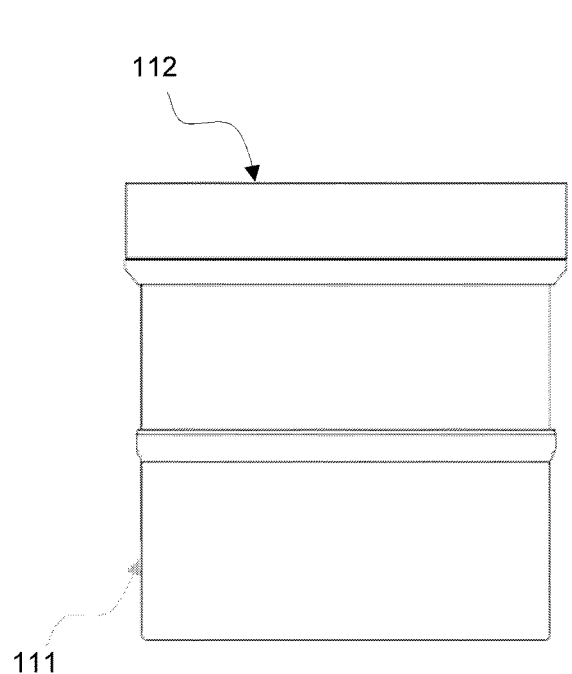
FIG. 1C shows a side view of a capped ingredient container.

In some embodiments, referring to FIG. 1C, a capped ingredient container 110 comprises an ingredient container 111 and a cap 112, wherein the cap 112 is configured to cap the ingredient container 111. The interior surface of the cap 112 is configured to touch and press on the seal 115, as to block air flow between the interior of the ingredient container and the outside. The axis of the ingredient container 111 is also referred to as the axis of the capped ingredient container 110.

It should be noted that the exterior surface of the cap 112 comprises a part of a cylindrical surface; where the axis of the cylindrical surface is called the axis of the cap 112. It should also be noted that the exterior surface of the ingredient container 111 also comprises parts of cylindrical surface, where the axis of the cylindrical surface coincides with the axis of the ingredient container 111. In the capped ingredient container 110, the axis of the cap 112 is configured to coincide with the axis of the ingredient container 111. The cap 112 can be opened from the capped ingredient container 110 in FIG. 1C by rotating the cap in a certain direction around the axis of the cap while keeping the ingredient container 111 fixed.

In some embodiments, referring to FIG. 1D, an ingredient container 107 comprises ring shaped stiffeners 116a and 117a. The exterior surface of the ingredient container 107 comprises a partial conical surface 119a, some partial cylindrical surfaces, etc. The interior surface of the ingredient container 107 is comprised of a partial cylindrical surface and a flat bottom surface; and the axis of the said cylindrical surface is referred to as the axis of the ingredient container 107. The aperture of the partial conical surface 119a is configured to be relatively small, between 0 and 12 degrees. The ingredient container 107 is configured to store food ingredients in its interior.

In some embodiments, referring to FIG. 1E, a cap 108 comprises an internal surface 119b, which is configured to be a partial conical surface, similar as the partial conical surface 119a of the ingredient container 107. The exterior surface of the cap 108 is configured to be a part of a cylindrical surface, and the axis of the cylindrical surface is referred to as the axis of the cap 108.

In some embodiments, referring to FIG. 1F, a capped ingredient container 109 comprises an ingredient container 107 and a cap 108 which is configured to cap the ingredient container 107 when the surface 119b of the cap 108 touches and presses on the surface 119a of the ingredient container 107. The axis of the cap 108 is configured to coincide with the axis of the ingredient container 107. The partial conical surface 119b is configured to touch the partial conical surface 119a so that the air flow between the interior of the ingredient container 107 and the outside is restricted. The aperture of the partial conical surface 119b is configured to be the same or nearly the same as the aperture of the partial conical surface 119a. (The aperture of a part of a conical surface refers to the aperture of the conical surface.) The axis of the ingredient container 107 is also referred to as the axis of the capped ingredient container 109. Due to the pressure of the surface 119b on the surface 119a in the capped container 109, the cap 108 caps on the ingredient container 107 tightly, and a proper force is needed to remove the cap 108 from the ingredient container 107 of the capped container 109.

The interior surfaces of the ingredient containers discussed above may be textured or rugged. The ingredient containers may be made from metal, plastics (e.g., PC, PP, Teflon, etc.), or other solid material. The interior surfaces of the ingredient container may be coated with polytetrafluoroethylene or other non-stick coating.

The ingredient container 107 is configured to be rotationally invariant around the axis of the ingredient container 107, if ignoring possible textures or ruggedness of its surfaces. The cap 108 on the capped ingredient container 109 is also configured to be rotationally invariant around the axis of the capped ingredient container 109, if ignoring possible textures or ruggedness of its surfaces.

At times, an ingredient container may be referred to as a container; and a capped ingredient container may be referred to as a capped container. An ingredient container without a cap may also be referred to as uncapped ingredient container, or uncapped container.

Figure 2:
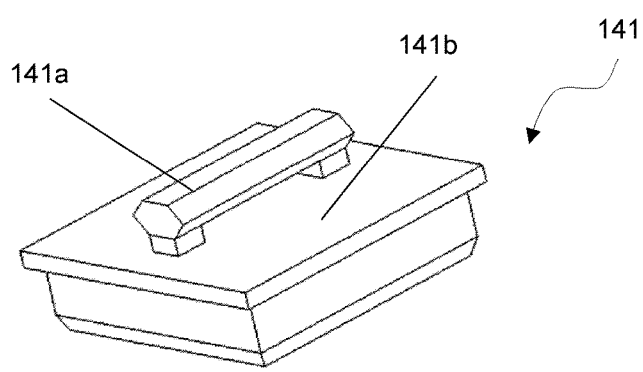
FIG. 2 shows an aerial view of an insulation cover.

In some embodiments, referring to FIG. 2, an insulation cover 141 comprises a handle 141a and a lid 141b which are joined together. It should be noted that the lid 141b may comprise heat insulation material, and/or materials such as plastics, metals, etc.

In some embodiments, referring to FIGS. 3A-3D, a storage apparatus 192 comprises a storage box 211 comprising a plurality of storage compartments arranged in a square or rectangular grid, wherein the interior of each storage compartment is configured to store a plurality of capped containers 110, where the capped containers are stacked vertically inside the storage compartment. The interior of each storage compartment has a square shape if viewed from above. In fact, the interior of each storage compartment has the shape of a square cylinder. The storage apparatus 192 also comprises a plurality of insulation covers 141 each of which is configured to cover or seal the opening of a storage compartment in the storage box 211. Each insulation cover 141 is configured to help limit heat flow between the interior of the corresponding storage compartment and the outside.

Figure 3A:
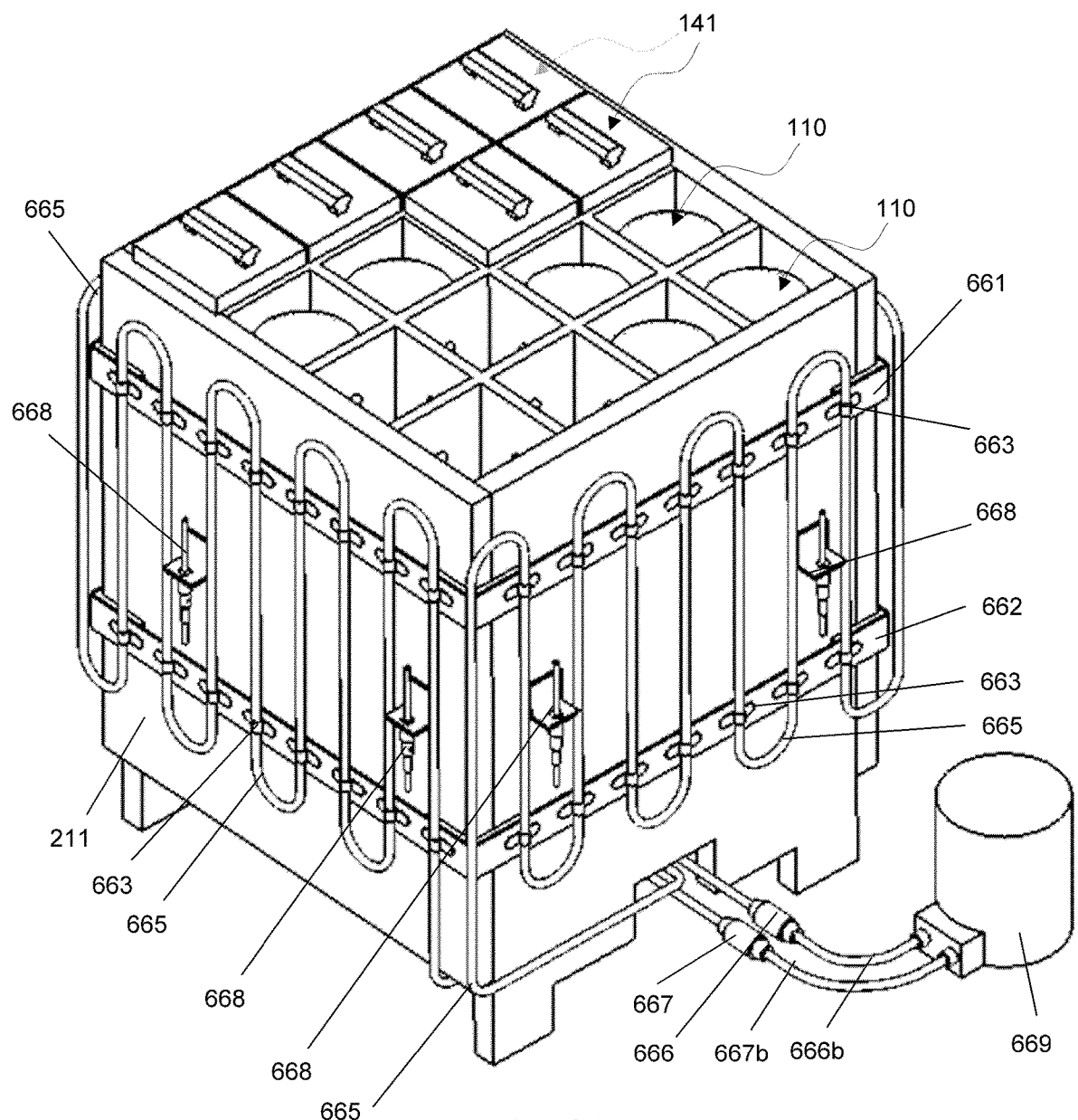
FIGS. 3A-3B show aerial views of parts of a storage apparatus.
Figure 3B:
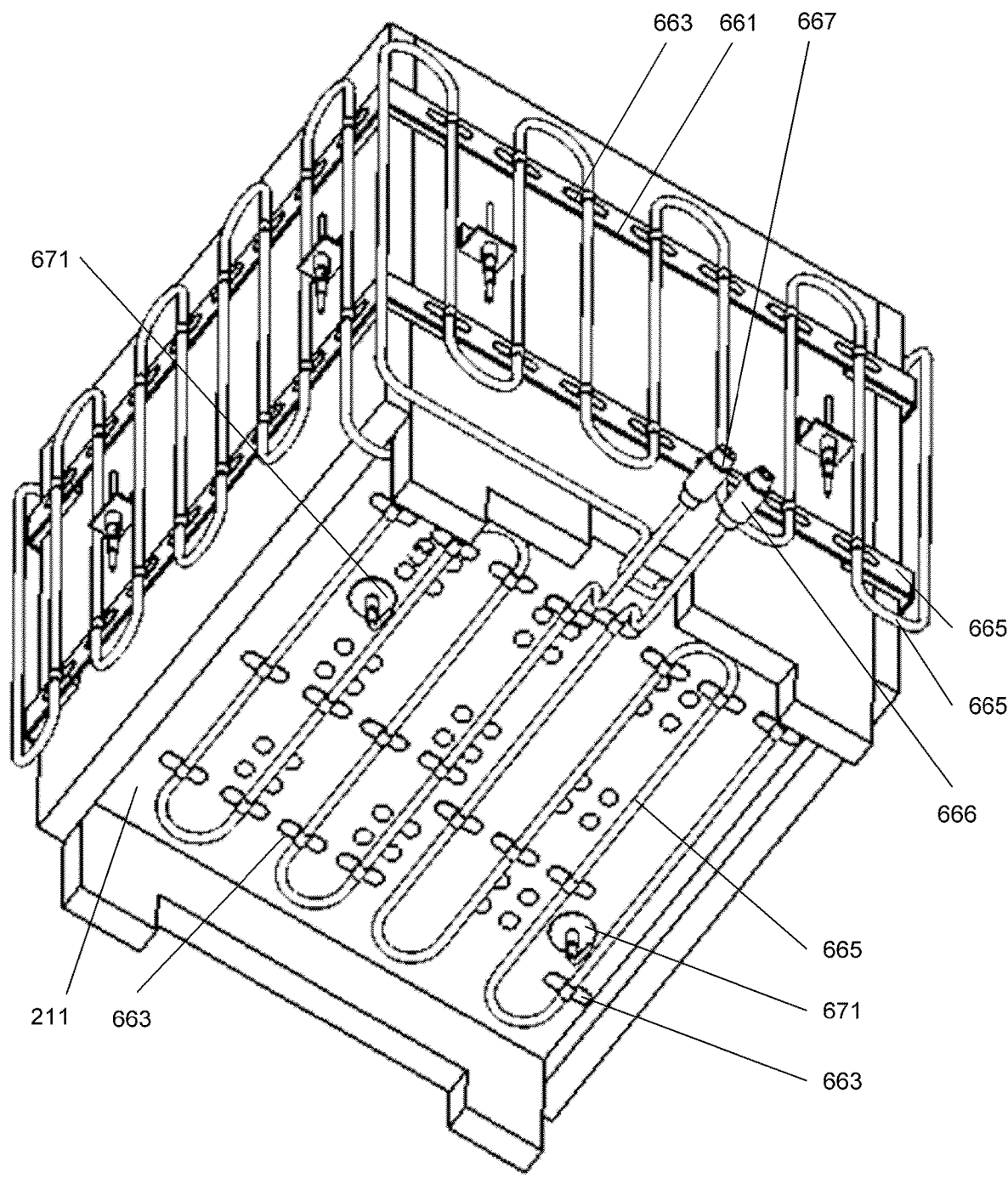
Figure 3C:
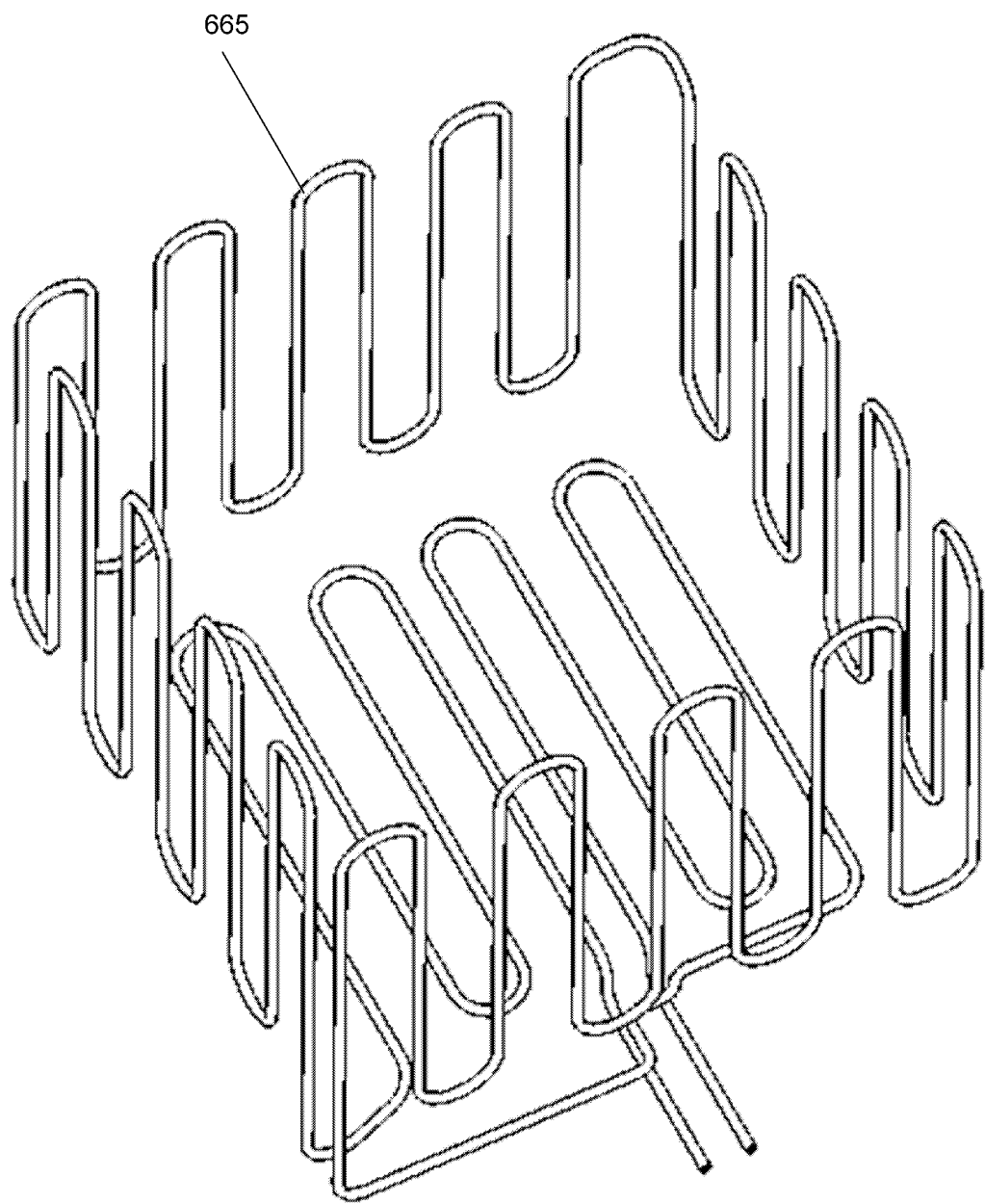
FIG. 3C shows an aerial view of a coil pipe.

The storage apparatus 192 also comprises a refrigeration apparatus comprising: a coil pipe 665; belts 661 and 662 which may be made of metals; a plurality of accessories 663; pipe connectors 666 and 667; and a sub-mechanism 669 (see FIG. 3A-3B). The belts 661 and 662 are configured to be attached to the exterior surface of the storage box 211. The coil pipe 665 is configured to be fixedly connected to the belts 661 and 662, and to the bottom surface of the storage box 211 by the accessories 663. The sub-mechanism 669 comprises a pair of pipes 666b and 667b, i.e. one outlet and one inlet. The pipe connector 666 is configured to connect one of the ends of the coil pipe 665 to the pipe 666b; and the pipe connector 667 is configured to connect the other end of the coil pipe 665 to the pipe 667b. The sub-mechanism 669 may pump in refrigerating fluid into the coil pipe 665 through the pipe connector 666 and the pipe 666b and pump out the refrigerating fluid from the coil pipe 665 through the pipe connector 667 and pipe 667b. The refrigerating fluid is configured to flow in the cyclic and airtight system to refrigerate the areas around the storage box 211. The sub-mechanism 669 is configured to cool the fluid as the fluid flows into the sub-mechanism 669. The sub-mechanism 669 may be water cooled or air cooled. The sub-mechanism 669 may comprise a compressor, a pipe, a motor, a cooling panel or cooling plate, a fan, etc., as in a home or commercial refrigerator. The said refrigeration apparatus of the storage apparatus 192 also comprises a plurality of temperature sensors 668 and 671 which are fixedly attached to the exterior surface or respectively the bottom surface of the storage box 221 to detect the temperature at a plurality of locations of the storage apparatus 192.

Figure 3D:
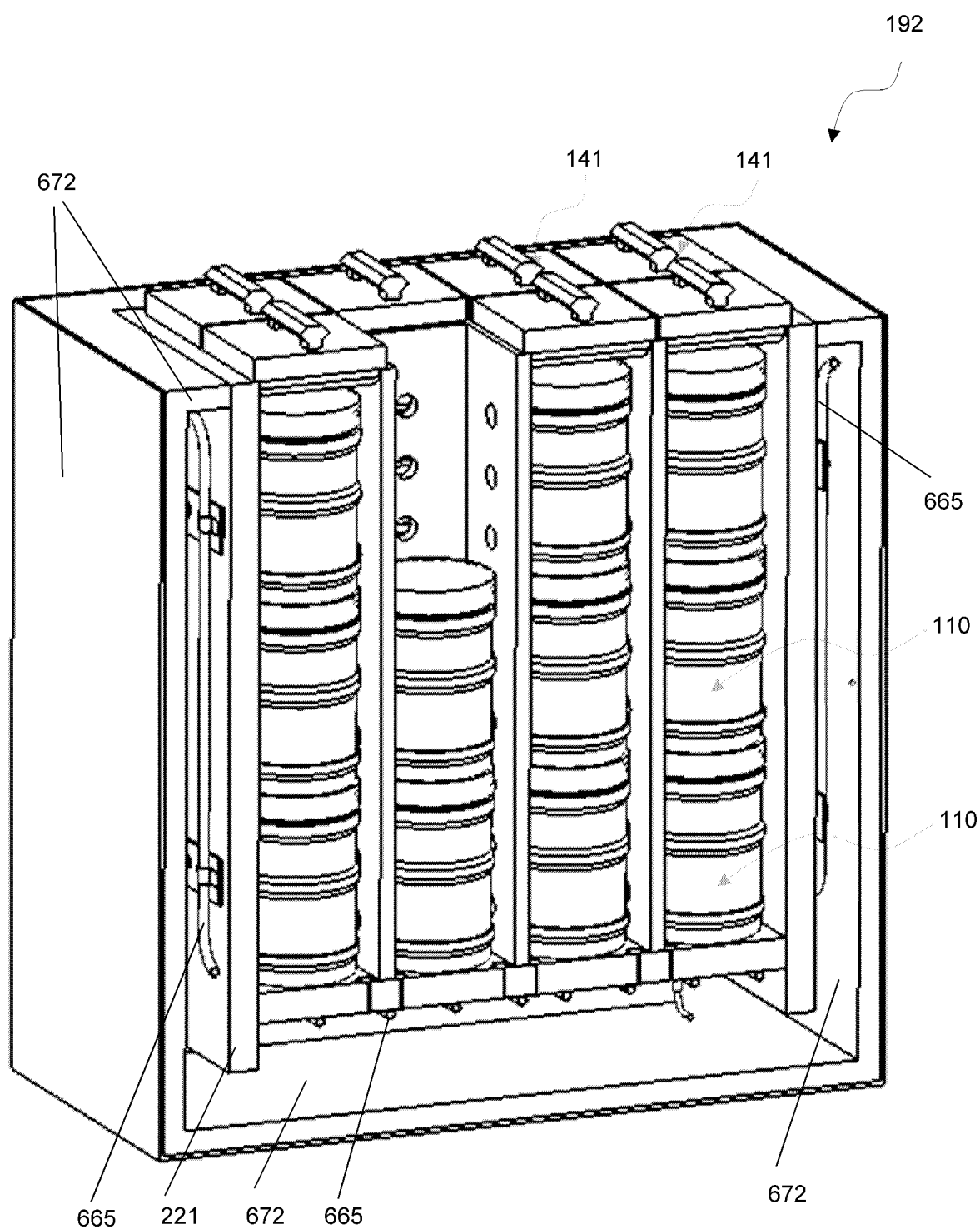
FIG. 3D shows a cut view of the storage apparatus.

The storage apparatus 192 also comprises a heat insulation member 672 configured to help limit heat flow between the storage box 211 and the outside (see FIG. 3D). The heat insulation member 672 is also in the shape of a box.

It should be noted that the coil pipe 665, the temperature sensors 668 and 671, and the storage box 211 are all positioned on the same side of the insulation member 672.

It should be noted that the storage box 211 may be made from metal such as aluminum or steel, or plastic, or other durable material.

It also should be noted that a micro-computer may be configured to be connected to the temperature sensors 668 and 671 of the storage apparatus 192 as to monitor the temperature at their locations in the storage apparatus 192. The computer may be configured to control the sub-mechanism 669 as to keep the temperature in a certain range, as to keep the food ingredients contained in the capped ingredient containers stored in the storage apparatus 192 fresh.

Figure 4A:
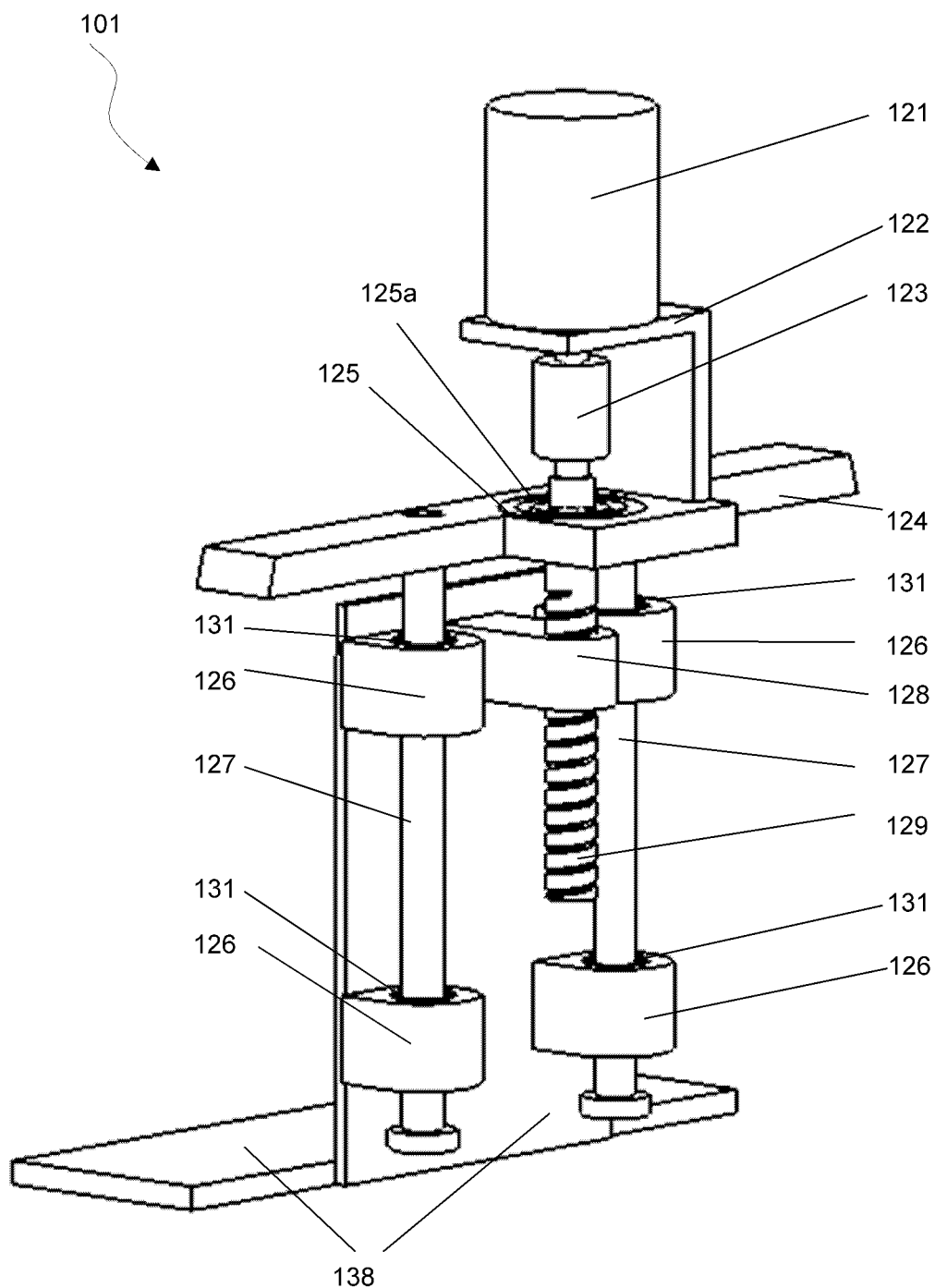
FIG. 4A shows an aerial view of a lifting sub-mechanism.

In some embodiments, referring to FIG. 4A, a lifting sub-mechanism 101 comprises a pair of parallel shafts 127, two pairs of linear motion bearings 131, two pairs of bearing housings 126, and a rigid component 138 which is rigidly connected to the two pair of bearing housings 126. The axes of the shafts 127 are configured to be vertical. The upper ends of the shafts 127 are configured to be rigidly connected to the support component 124. Each linear motion bearing 131 is configured to connect a shaft 127 and a bearing housing 126, so that the bearing housing 126 is constrained to move linearly relative to the corresponding shaft 127. Each shaft 127 is connected to a pair of bearing housings 126 by a pair of linear motion bearings 131. The lifting sub-mechanism 101 further comprises a screw shaft 129, a screw nut 128, a support component 124, and a bearing housing 125 which is rigidly connected to the support component 124. The screw nut 128 is configured to be rigidly connected to the rigid component 138. A bearing 125a is configured to connect the bearing housing 125 with a part of the screw shaft 129, so that the screw shaft 129 is constrained to rotate relative to the bearing housing 125. The screw shaft is configured to be positioned vertically. The screw shaft 129 is engaged with the screw nut 128 so that a rotation of the screw shaft 129 induces a translation of the screw nut 128. A motor 121, comprising a shaft and a base component, is configured to drive the rotation of the screw shaft 129 relative to the support component 124, where the connector 122 is configured to fixedly connect the base component of the motor 121 to the support component 124, wherein the shaft of the motor 121 is configured to be connected to the screw shaft 129 by a coupling 123. When the motor 121 drives the rotation of the screw shaft 129, the screw nut 128 and hence the rigid component 138 may be moved vertically.

It should be noted the motion of the bearing housings 126 relative to the shafts 127 may be limited on both ends by some known techniques.

It should be noted that the linear motion bearings 131 in the lifting sub-mechanism 101 may be substituted by sleeve bearings, made by metals such as copper or steel. The sleeve bearings may be of cylindrical shape. In other applications, the sleeve bearings may be flanged sleeve bearings.

Figure 4B:
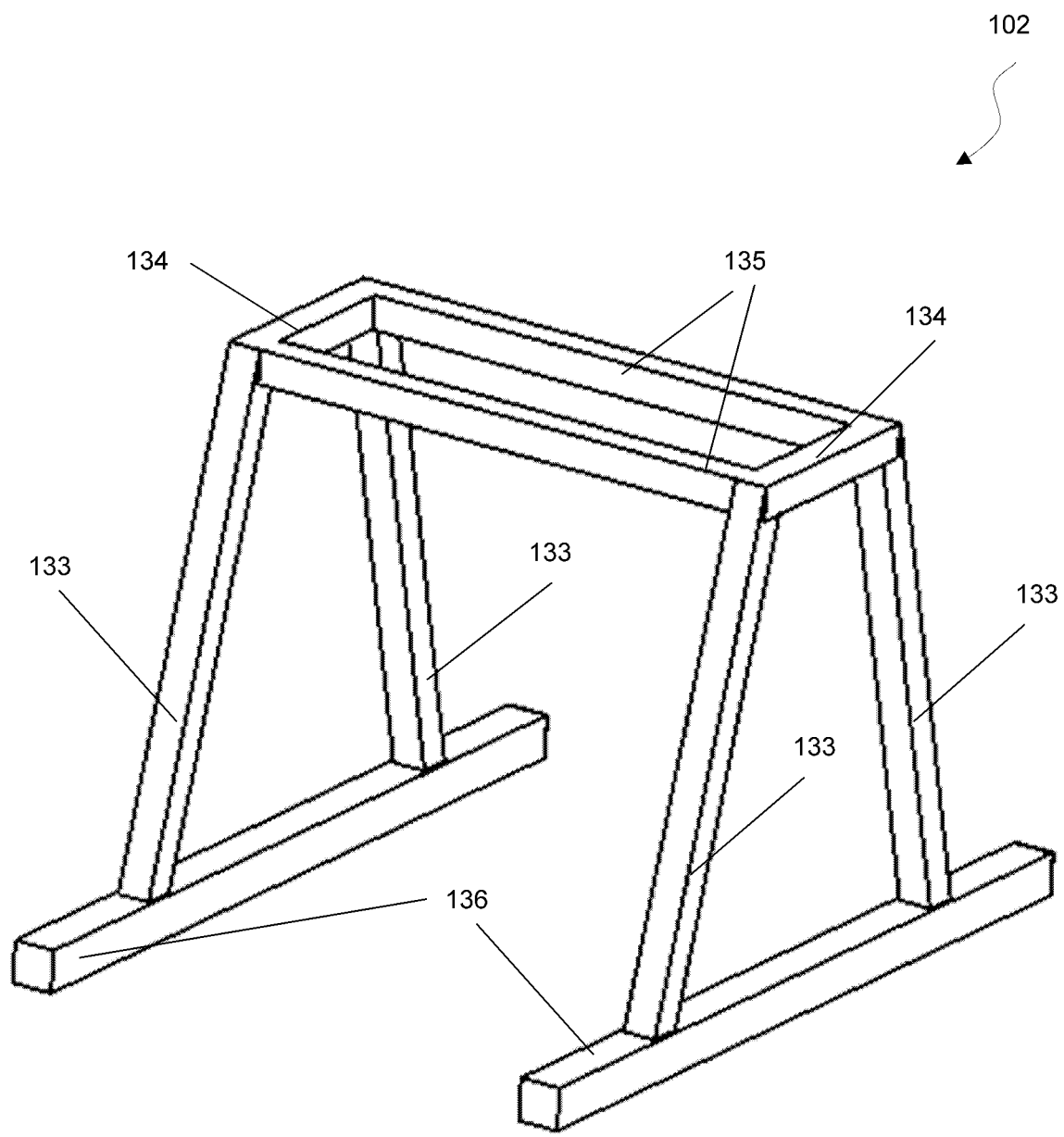
FIG. 4B shows an aerial view of a support frame of a mini vehicle.

In some embodiments, referring to FIG. 4B, a support frame 102 comprises beams (e.g., square steel or rectangular tubes) 133, 134, 135 and 136, all of which are welded together.

Figure 4C:
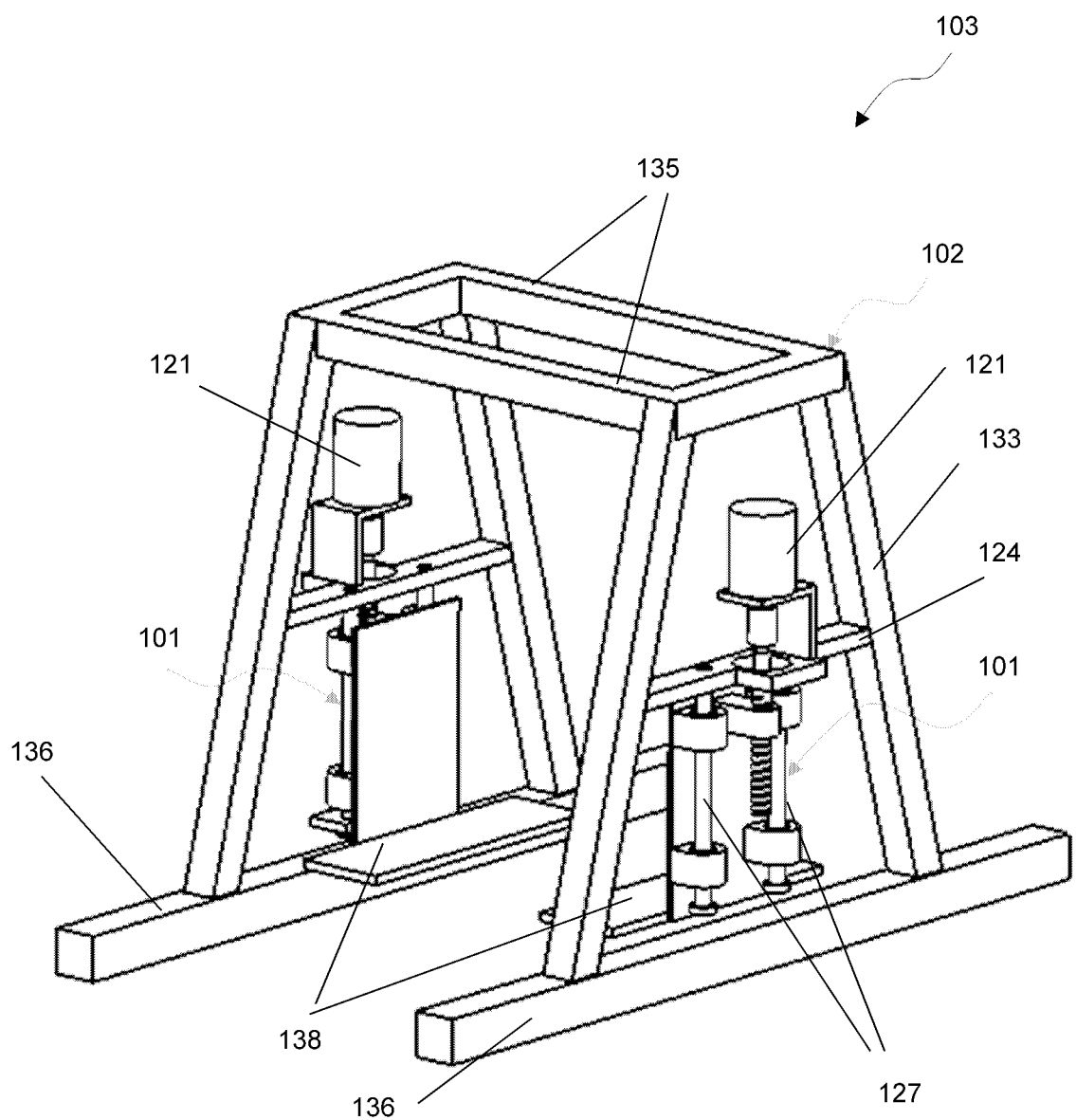
FIG. 4C shows an aerial view of a pair of lifting mechanism.

In some embodiments, referring to FIG. 4C, a lifting mechanism 103 comprises a pair of lifting sub-mechanisms 101 and a support frame 102; wherein the support components 124 of the lifting sub-mechanisms 101 are configured to be rigidly connected to the beams 133 in the support frame 102. The lower ends of the vertical shafts 127 in the lifting sub-mechanisms 101 are configured to be rigidly connected to the beams 136 in the support frame 102. The lifting sub-mechanisms 101 are positioned facing each other, and at the same height; and the rigid components 138 in the pair of lifting sub-mechanisms 101 are positioned facing each other. The motors 121 are configured to produce a synchronous motion in the rigid components 138, so that the rigid components 138 may stay at the same height at all time.

It should be noted that the lifting mechanism 103 comprises a linear motion mechanism comprising: the support frame 102, two rigid components 138, two support components 124, eight bearing housings 126, four shafts 127, eight linear motion bearings 131, and their mutual connections, if any. The rigid components 138 may move linearly (in vertical direction) relative to the support component 124 in the linear motion mechanism. The linear motion is driven by a pair of driving mechanisms, each comprising the screw shaft 129, screw nut 126, ball bearing 125a, bearing housing 125, motor 121 and coupling 123. The motor 121 may further be controlled by a computer. Sensors may be installed to monitor the position of the rigid components 138 relative to the support frame 102.

It should be noted that the support frame 102 may be substituted by other type of support component.

Figure 5A:
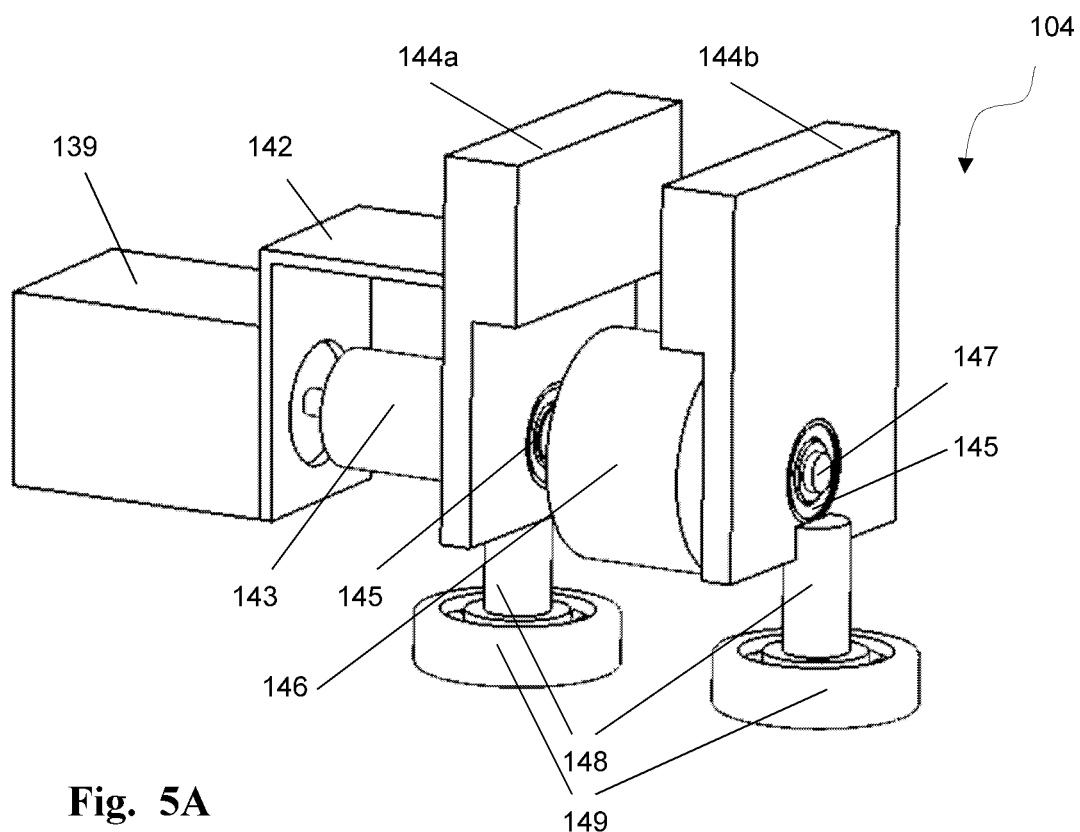
FIG. 5A shows an aerial view of a driving wheel mechanism.

In some embodiments, referring to FIG. 5A, a driving wheel mechanism 104 comprises a wheel 146 which is rigidly connected to a shaft 147, and rigid components 144a and 144b wherein each rigid component 144a or 144b comprises a bearing housing. Two bearings 145 are configured to connect the shaft 147 with bearing housings in the rigid components 144a and 144b respectively, so that the shaft 147 is constrained to rotate relative to the bearing housings in the rigid components 144a and 144b. The driving wheel mechanism 104 further comprises a motor 139 comprising a shaft, which is connected to the shaft 147 by a coupling 143, wherein the motor 139 also comprises a base component which is configured to be fixedly connected to the rigid component 144a by a connector 142. Thus, the motor 139 may drive a rotation of the shaft 147, hence that of the wheel 146. The driving wheel mechanism 104 further comprises a pair of shafts 148 and a pair of wheels 149, wherein each wheel 149 is rotatable relative to the corresponding shaft 148.

Figure 5B:
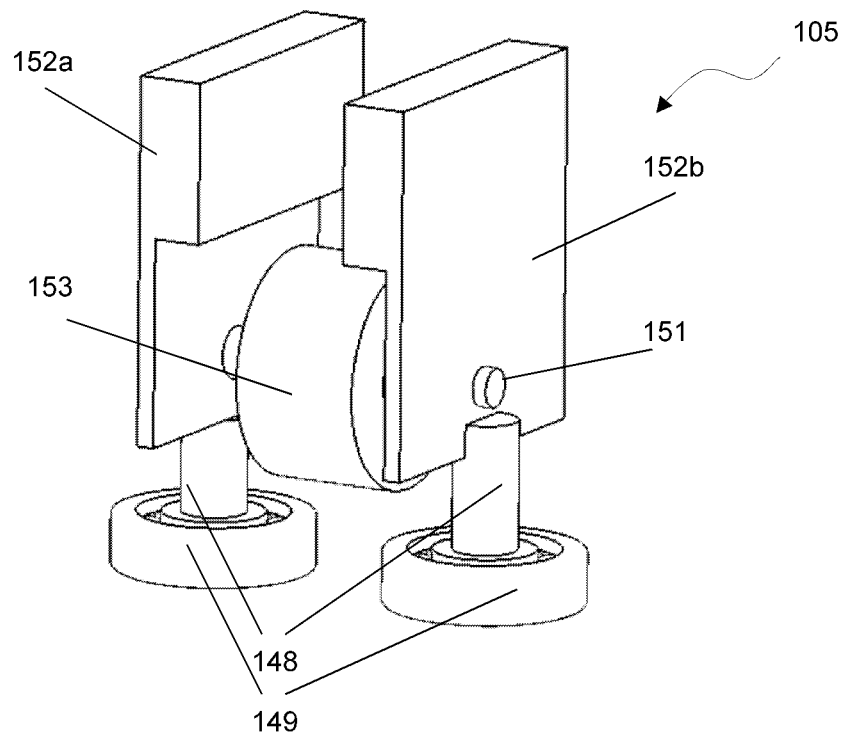
FIG. 5B shows an aerial view of a wheel mechanism.

In some embodiments, referring to FIG. 5B, a wheel mechanism 105 comprises a wheel 153, a shaft 151, and a pair of rigid component 152a and 152b, wherein the wheel 153 is rotatable relative to the shaft 151, and the shaft 151 is rigidly connected to the rigid components 152a and 152b. The wheel mechanism 105 further comprises a pair of shafts 148 and corresponding wheels 149, wherein each wheel 149 is rotatable relative to the corresponding shaft 148. One of the shafts 148 is rigidly connected to the rigid component 152a; the other one of the shafts 148 is rigidly connected to the rigid component 152b.

Figure 5C:
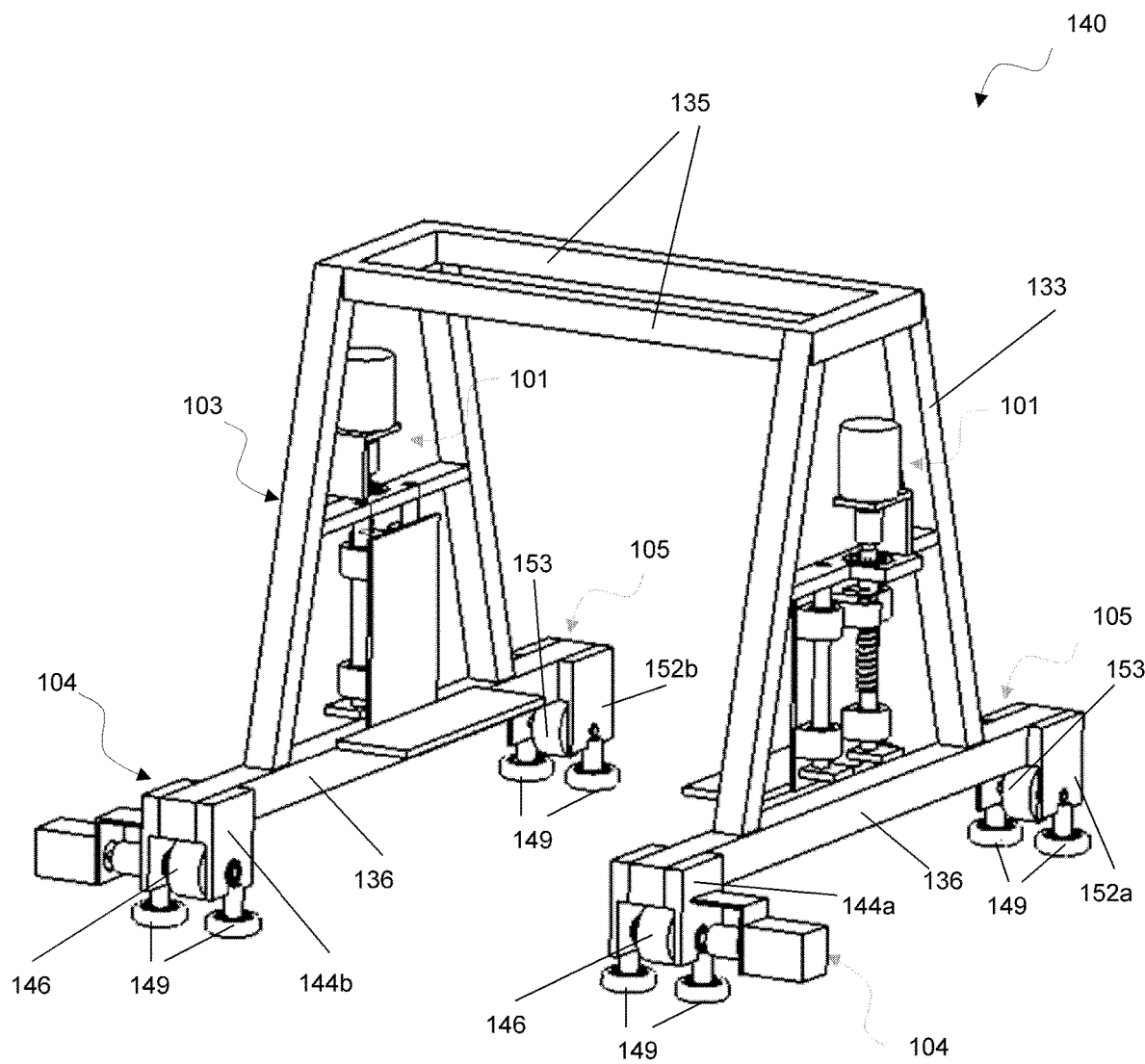
FIG. 5C shows an aerial view of a mini vehicle comprising a driving wheel mechanism and a wheel mechanism.

In some embodiments, referring to FIG. 5C, a mini vehicle 140 comprises a lifting mechanism 103, two driving wheel mechanisms 104, and two wheel mechanisms 105. The rigid components 144a and 144b of the driving wheel mechanisms 104 are rigidly connected to the beams 136 of the lifting mechanism 103. The rigid components 152a and 152b of the wheel mechanisms 105 are rigidly connected to the beams 136 of the lifting mechanism 103. The axes of the wheels 146 and 153 in the mechanisms 104 and 105 are configured to be horizontal; and the axes of the wheels 149 in the mechanisms 104 and 105 are configured to be vertical.

Figure 6A:
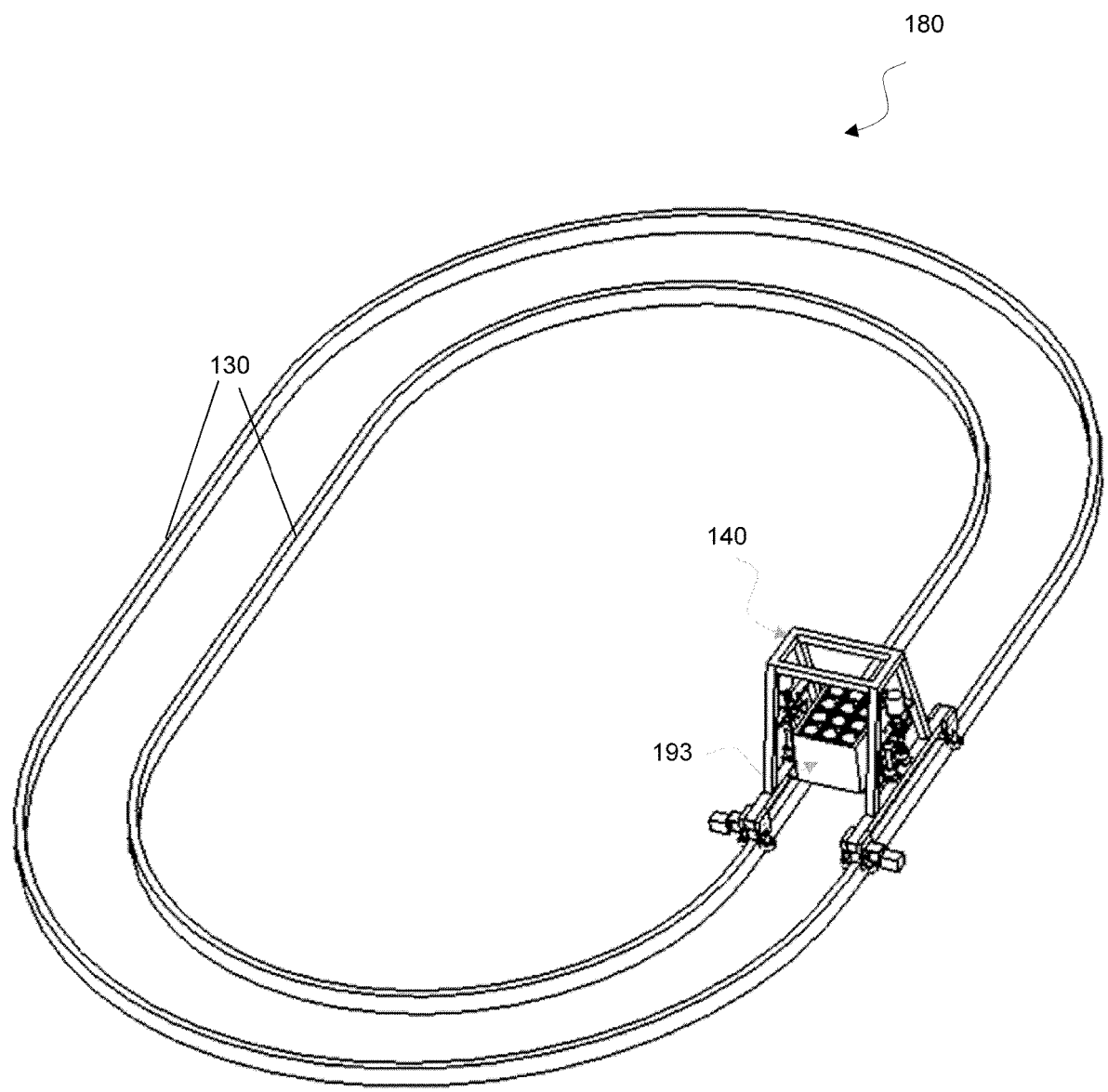
FIG. 6A shows an aerial view of a transportation apparatus comprising a mini vehicle and a track.
Figure 6B:
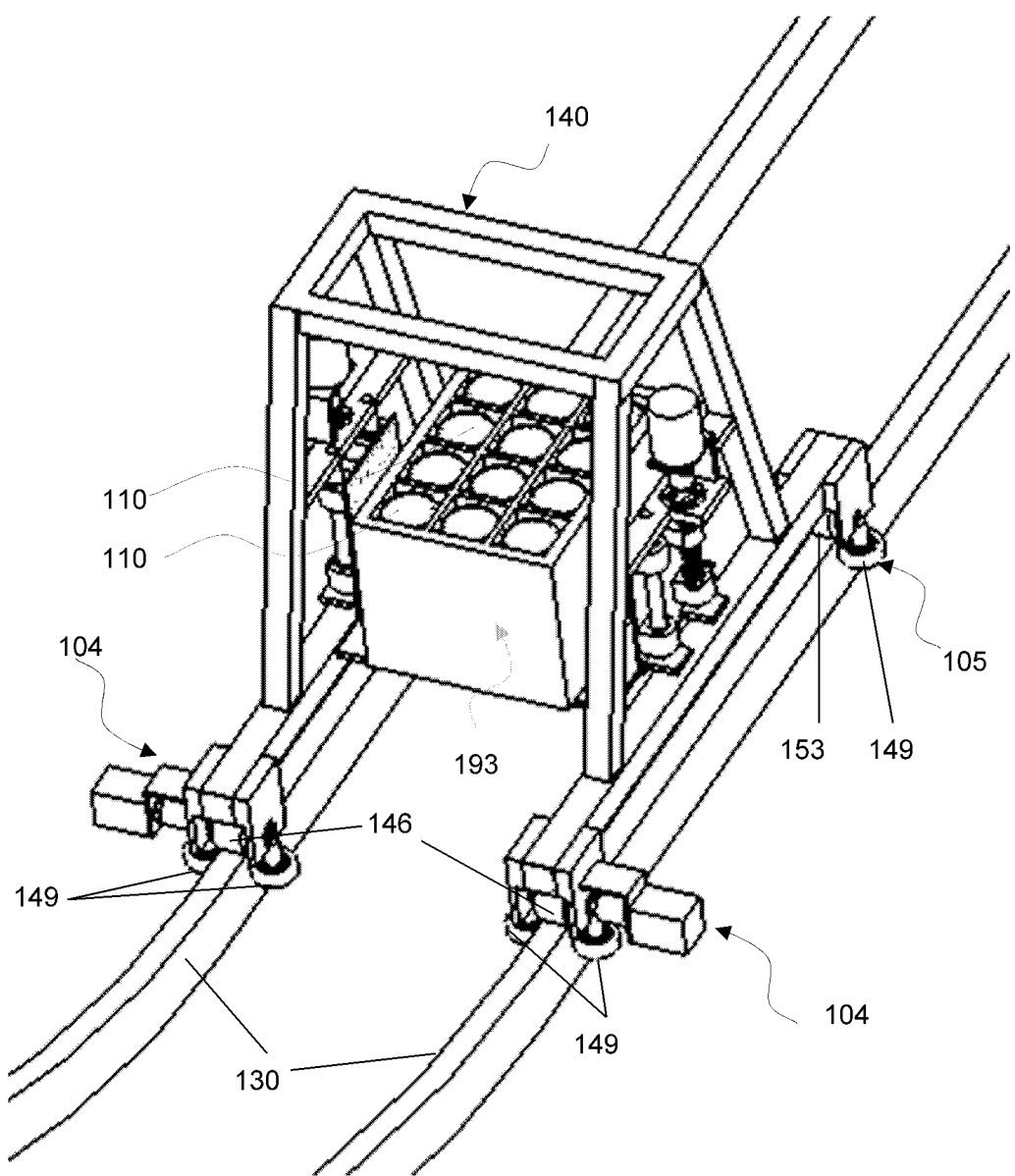
FIG. 6B shows an aerial view of parts of the transportation apparatus.

In some embodiments, referring to FIGS. 6A-6B, a transportation apparatus 180 comprises a pair of tracks 130, and one or more mini vehicles 140. Each mini vehicles 140 is configured to be constrained to move along the pair of tracks 130. The wheels 146 and 153 in each mini vehicle 140 are configured to touch the top surfaces of the tracks 130; and the wheels 149 are configured to be limited by the side surfaces of the tracks 130. The pair of motors 139 in the driving wheel mechanisms 104 of each mini vehicle may drive the rotations of the wheels 146 as explained previously (also see FIG. 5A), and the rotations of the wheels 146 may produce a motion of the mini vehicle along the tracks 130.

Each mini vehicle 140 can carry a transport box 193, by placing the transfer box 193 on the rigid components 138; wherein the transport box 193 comprises a square or rectangular grid of square compartments, each configured to contain a plurality of capped containers 110, whether empty or containing food ingredients (see FIG. 6B). The motors 121 in the lifting mechanism 103 in the mini vehicle 140 may drive a synchronous vertical motion in the rigid components 138, and thus move the box 193 vertically. When the transport box 193 is moved vertically up to a high enough position, the mini vehicle 140 may move along the track, and thus move the transport box 193 together. When the transport box 193 is moved vertically down, it may be placed on a platform (not shown in figures), and the rigid components 138 may be further moved downward as to be physically away from the transport box 193 placed on the platform, and the mini vehicle 140 may move without moving the transport box 193. Thus, the mini vehicle 140 may move to a different location to move another transport box.

It should be noted that a transport box 193 in the previous paragraph may be somewhat similar as a storage box 211 except that a transfer box can be smaller in size and in weight. A storage box is usually stationary, while a transfer box is moved to transfer capped containers. A transport box may be made by metal, plastic, and/or other materials.

It should be noted that the tracks 130 may or may not be closed loops.

It should also be noted the mini vehicle 140 may transport a transport box 193 from one location to another location.

Figure 7A:
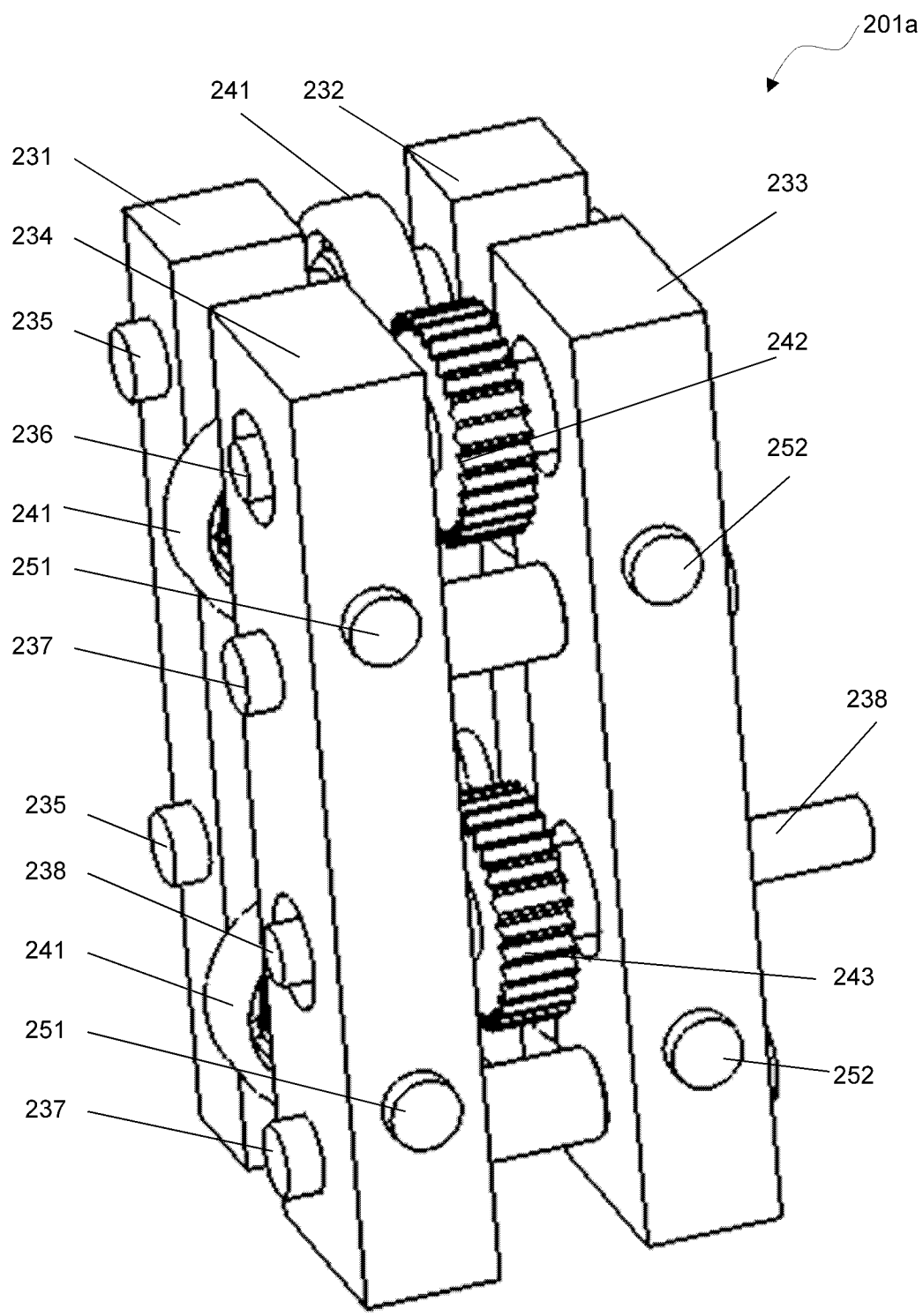
FIG. 7A shows an aerial view of a sliding sub-mechanism.

In some embodiments, referring to FIG. 7A, a sliding sub-mechanism 201a comprises: rigid components 231, 232, 233, 234; a shaft 236; a shaft 238; two shafts 251; two shafts 252; two shafts 235; two shafts 237; a gear 242; a gear 243; and six wheels 241. The shafts 251 are configured to be rigidly connected to the rigid components 231 and 234. The shafts 252 are configured to be rigidly connected to the rigid components 232 and 233. The shafts 235 are configured to be rigidly connected to the rigid components 231 and 232. The shafts 237 are configured to be rigidly connected to the rigid components 233 and 234. The shaft 236 is configured to be rotatable relative to the rigid components 233 and 234 around the axis of the shaft 236; and the shaft 238 is configured to be rotatable relative to the rigid components 233 and 234 around the axis of the shaft 238. The gear 242 is fixedly mounted on the shaft 236 so that the axis of the gear 242 is the same as the axis of the shaft 236; and the gear 243 is fixedly mounted on the shaft 238 so that the axis of the gear 243 is the same as the axis of the shaft 238. Precisely one wheel 241 is configured to be rotatable relative to each of the shafts 235, 251 and 252, wherein the axis of the wheel 241 is the same as the axis of the respective shaft. The axes of the shafts 235, 236, 237 and 238 are parallel to each other; and the axes of the shafts 251 and 252 are parallel to each other. The axes of the shafts 235 are perpendicular to the axes of the shafts 251.

Figure 7B:
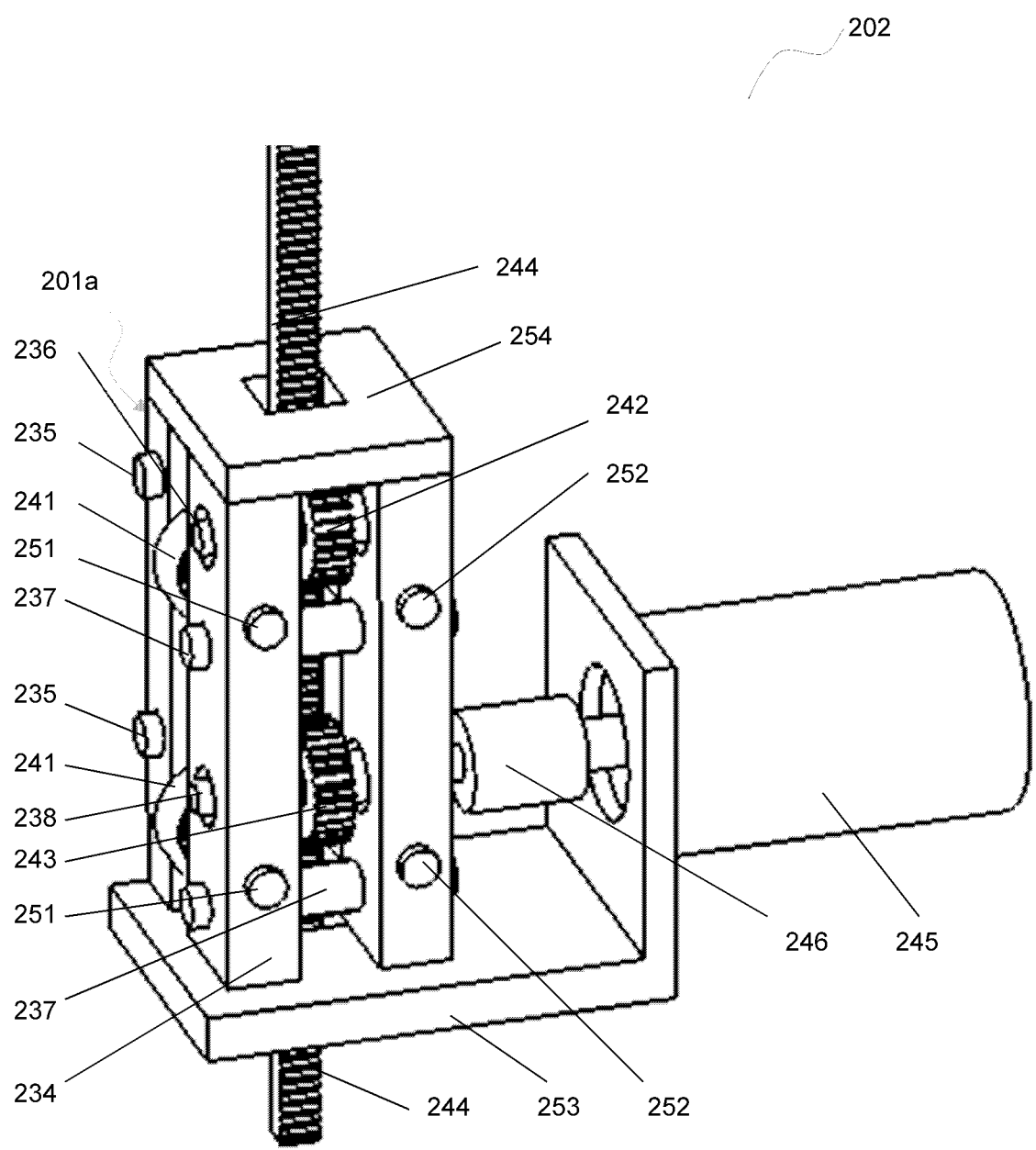
FIGS. 7B-7C show aerial views of parts of a vertical motion mechanism.
Figure 7C:
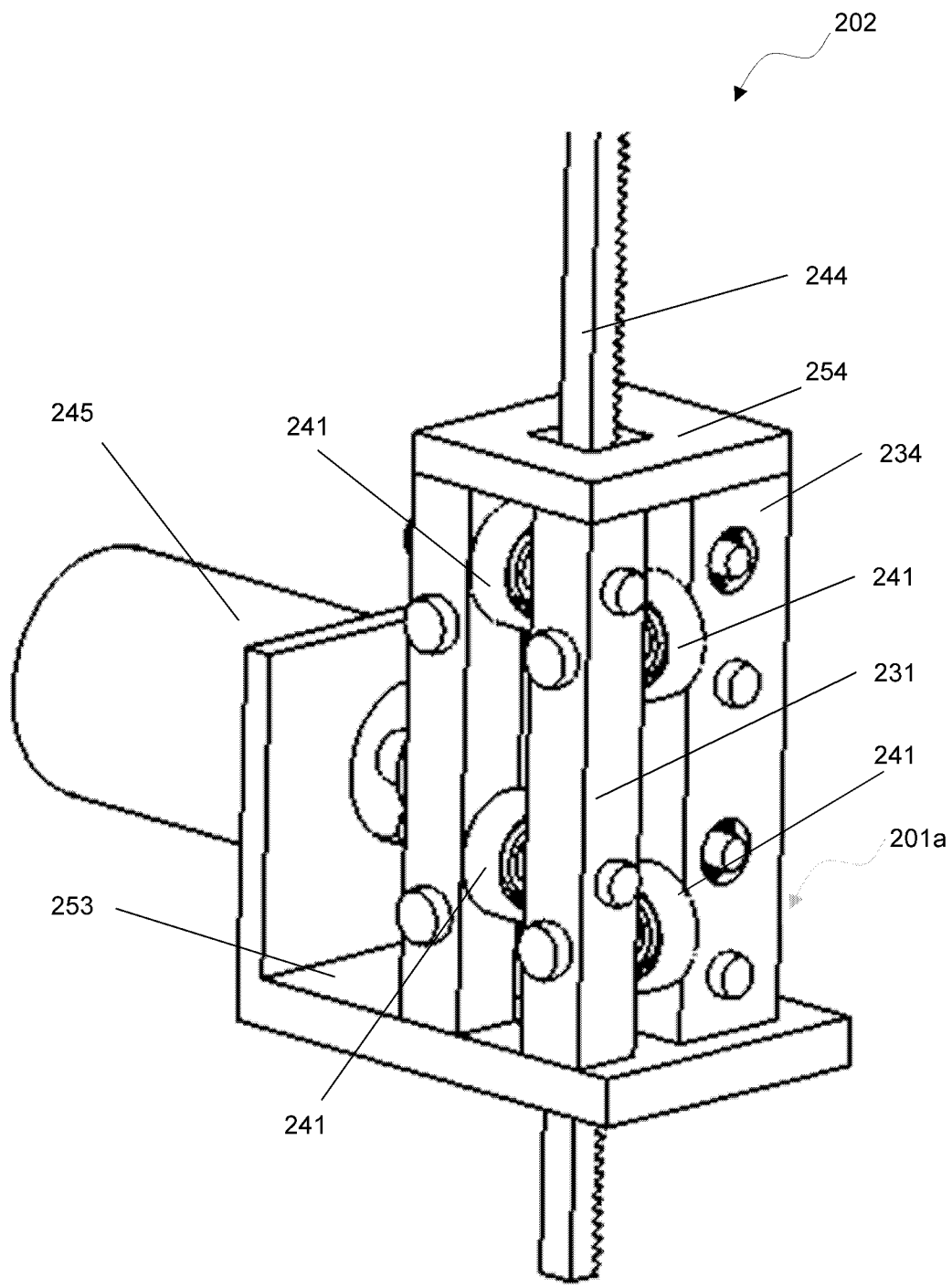

In some embodiments, referring to FIGS. 7B-7C, a vertical motion mechanism 202 comprises a rack 244, a sliding sub-mechanism 201a, a support component 253, a rigid component 254, a motor 245 comprising a shaft and a base component, and a coupling 246. The support component 253 and the rigid component 254 are configured to be rigidly connected to the rigid components 231, 232, 233, 234 of the sliding sub-mechanism 201a. The base component of the motor 245 is fixedly connected to the support component 253. The shaft of the motor 245 is connected to the shaft 238 by the coupling 246. As the motor 245 rotates the shaft 238, the gear 243 is rotated. The rack 244 comprises three flat surfaces on 3 sides, and teeth on the $4^{th}$ side, wherein the 3 flat surfaces comprise two parallel surfaces and a flat surface which is perpendicular to the two parallel surfaces. Exactly two of the six wheels 241 are configured to touch each of the three flat surfaces of the rack 244. The gears 242 and 243 are configured to be engaged with the rack 244 so that the rotation of the gears 242 and 243 induces a linear translation of the rack 244. The rack 244 is configured to be positioned vertically, so the linear translation of the rack 244 is a vertical linear motion. When the motor 245 rotates, the gear 243 is rotated as explained above, and then the rack 244 may be moved linearly relative to the support component 253, along the direction which is parallel to the rack 244.

The support component 253 may be referred to as the support component of the vertical motion mechanism 202. The rack 244 may move linearly in the vertical direction relative to the support component 253.

It should be noted that in the vertical motion mechanism 202, a bearing may be used to connect the rigid component 233 or 234 with the shaft 236 so that the shaft 236 may rotate relative to the rigid component 233 or 234 without much friction. Similarly, a bearing may be used to connect the rigid component 233 or 234 with the shaft 238.

Figure 7D:
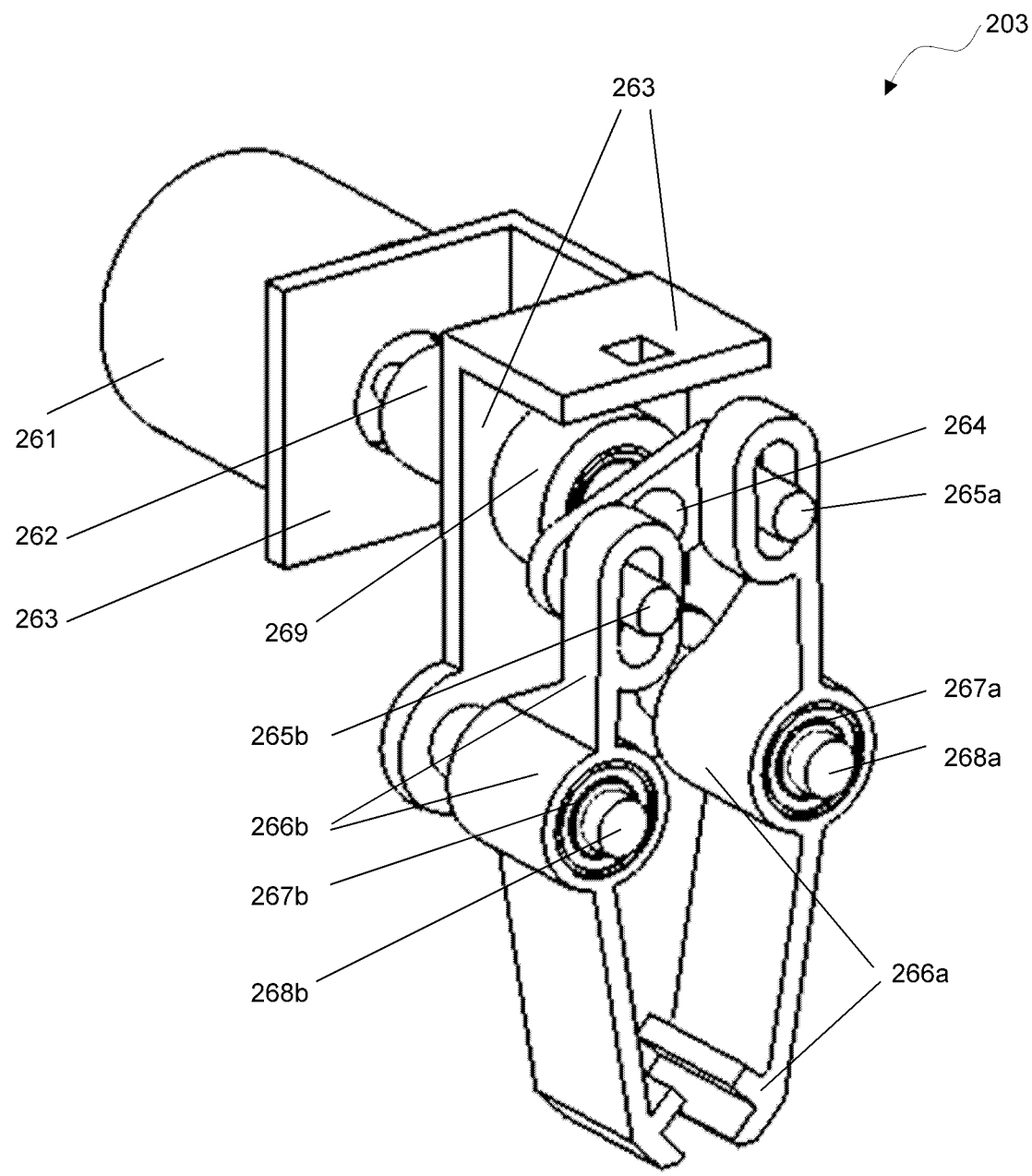
FIGS. 7D-7E show aerial views of a cover gripping mechanism
Figure 7E:
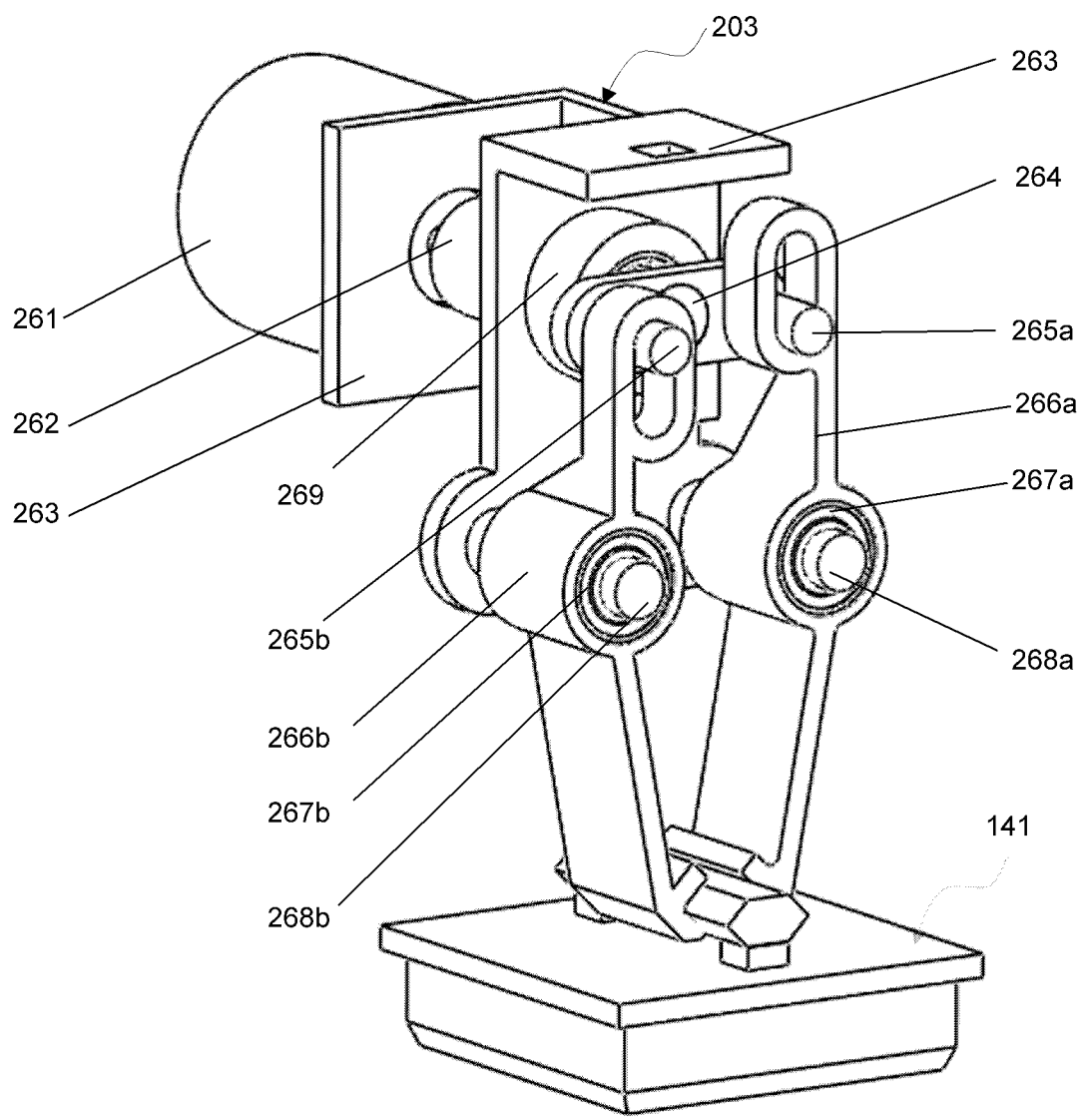

In some embodiments, referring to FIGS. 7D-7E, a cover gripping mechanism 203 comprises a support component 263, a pair of rotatable components 266a and 266b, a pair of shafts 268a and 268b, and another pair of shafts 265a and 265b. Each of the rotatable components 266a and 266b comprises a bearing housing in the middle, and a curved hole and a V-shaped gripper at the ends, as shown in FIGS. 7D-7E. A pair of bearings 267a and accessories are configured to connect the shaft 268a and the bearing housing of the rotatable component 266a, so that the rotatable component 266a is constrained to rotate relative to the shaft 268a around the axis of the shaft 268a. A pair of bearings 267b and accessories are configured to connect the shaft 268b and the bearing housing of the rotatable component 266b, so that the rotatable component 266b is constrained to rotate relative to the shaft 268b around the axis of the shaft 268b. The shafts 268a and 268b are rigidly connected to the support component 263. The cover gripping mechanism 203 further comprises a shaft 264, a motor 261 comprising a shaft and a base component, a coupling 262 and a bearing housing 269. The shafts 265a and 265b are configured to be rigidly connected to the shaft 264 via a rigid connector; and the axes of the shafts 265a, 265b, 264 are mutually parallel. The bearing housing 269 is rigidly connected to the support component 263. The shaft 264 and the bearing housing 269 are configured to be connected by a pair of bearings and accessories, so that the shaft 264 is constrained to rotate relative to the bearing housing 269, around the axis of the shaft 264. The base component of the motor 261 is configured to be fixedly connected to the support component 263. The shaft of the motor 261 is connected to the shaft 264 by the coupling 262, so that the motor 261 may rotate the shaft 264 around the axis of the shaft 264. The curved hole in the rotatable component 266a is configured to constrain the shaft 265a, so that a movement of (the axis of) the shaft 265a may induce a rotation in the rotatable component 266a around the axis of the shaft 268a. Similarly, the curved hole in the rotatable component 266b is configured to constrain the shaft 265b, so that a movement of (the axis of) the shaft 265b may induce a rotation in the rotatable component 266b around the axis of the shaft 268b. The axes of the shafts 268a, 268b, 264, 265a, 265b are configured to be mutually parallel. The motor 261 may drive the rotation of the shaft 264 and hence the motion of the shafts 265a and 265b, and hence the rotation of the rotatable components 266a and 266b. Thus, the grippers of the rotatable components 266a and 266b may be closed or opened, as to grip or release the handle 141a of an insulation cover 141 (see FIG. 7E).

Figure 7F:
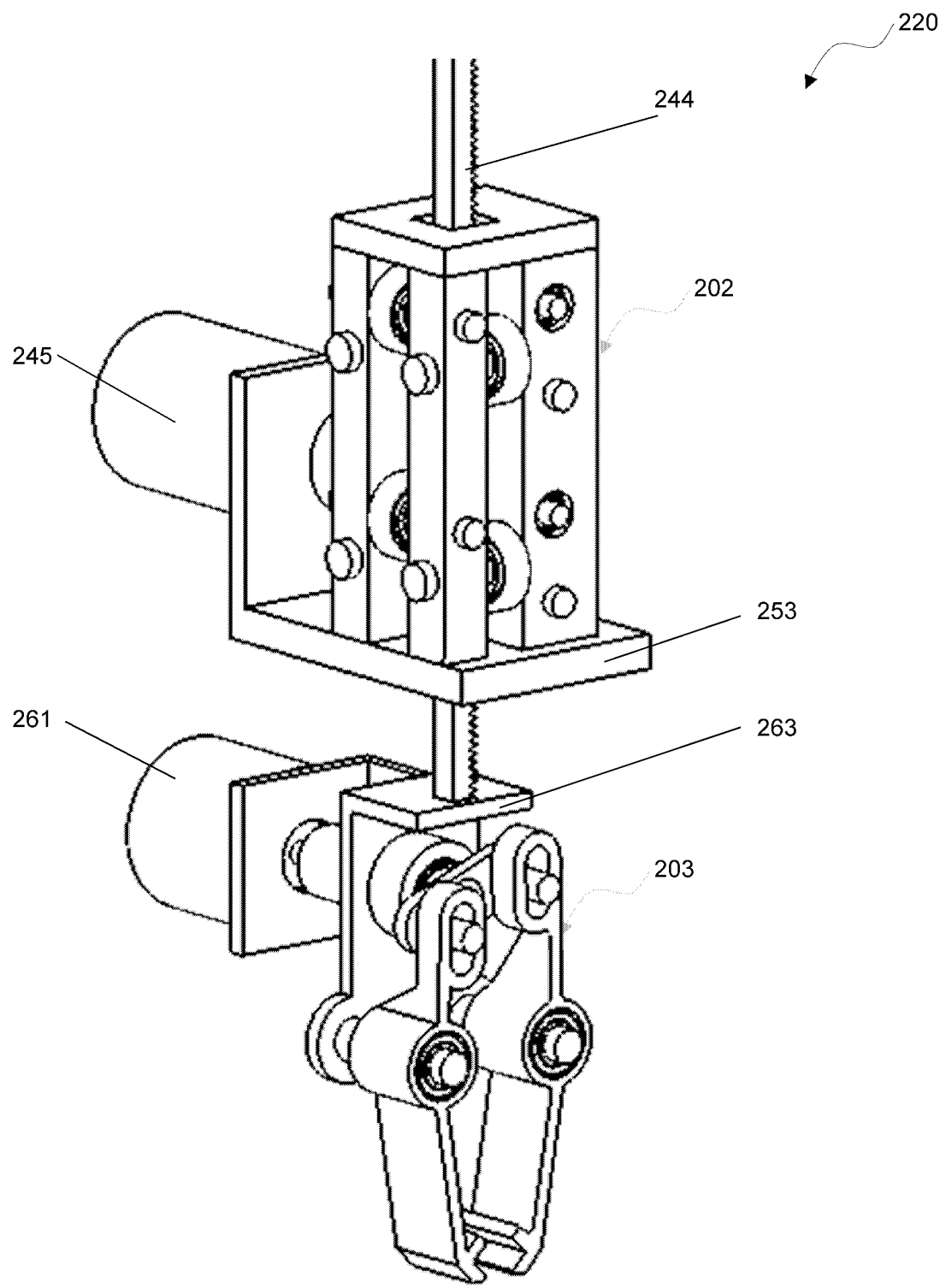
FIG. 7F shows an aerial view of a cover lifting mechanism.

In some embodiments, referring to FIG. 7F, a cover lifting mechanism 220 comprises a vertical motion mechanism 202 and a cover gripping mechanism 203, wherein the lower end of the rack 244 of the vertical motion mechanism 202 is rigidly connected to the support component 263 of the cover gripping mechanism 203. The axes of the shafts 268a, 268b, 264, 265a, 265b are configured to be horizontal. As explained before, the rack 244 is configured to be positioned vertically. Thus, the cover gripping mechanism 203 moves up and down along the vertical direction, when the rack 224 is moved up or down, relative to the support component 253 of the vertical motion mechanism 202. The support component 253 of the vertical motion mechanism 202 may be referred to as the support component of the cover lifting mechanism 220

It should be noted that the cover lifting mechanism 220 may be used to grip an insulation cover 141, and then lift it up. It can also move down and then release the insulation cover 141 as to cover a storage box 211 like in FIG. 3B.

Figure 8A:
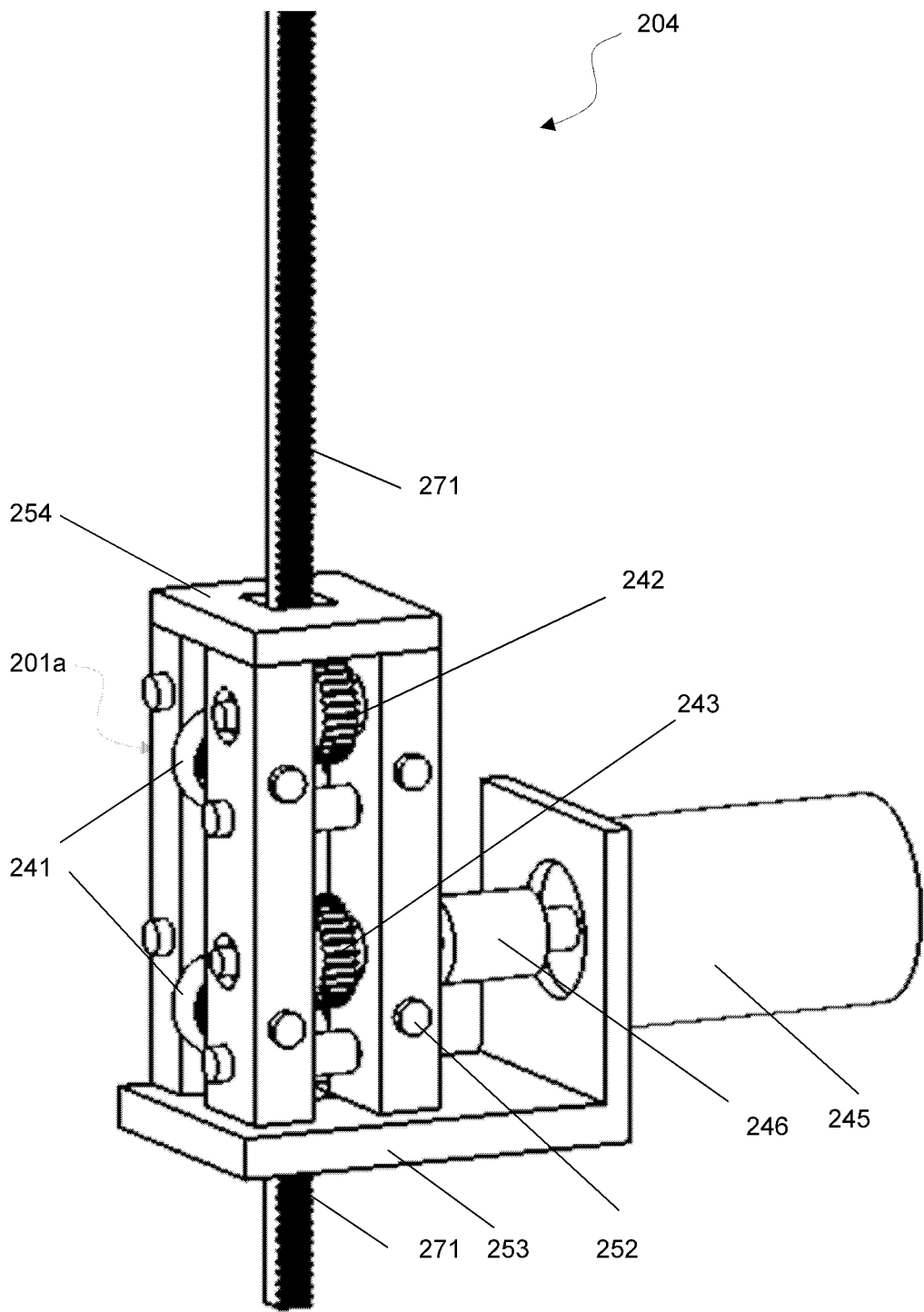
FIG. 8A shows an aerial view of a vertical motion mechanism.

In some embodiments, referring to FIG. 8A, a vertical motion mechanism 204 is constructed the same way as the vertical motion mechanism 202 except that the rack 244 is substituted by a rack 271 which has identical size as the rack 244 except that it is longer than the rack 244. Indeed, the vertical motion mechanism 204 comprises a rack 271, a sliding sub-mechanism 201a, a support component 253, a rigid component 254, a motor 245 comprising a shaft and a base component, a coupling 246, and their mutual connections (as in the vertical motion mechanism 202), if any. The gears 242 and 243 are configured to be engaged with (the teeth of) the rack 271. Exactly two of the six wheels 241 are configured to touch each of the three flat surfaces of the rack 271. The support component 253 may be referred to as the support component of the vertical motion mechanism 204. When the motor 245 rotates, the rack 271 is moved linearly in the vertical direction, relative to the support component 253.

It should be noted that the range of motion of the rack 244 in the vertical motion mechanism 202 may be limited by means of physical barriers. Same applies to the range of motion of the rack 271 in the vertical motion mechanism 204.

Figure 8B:
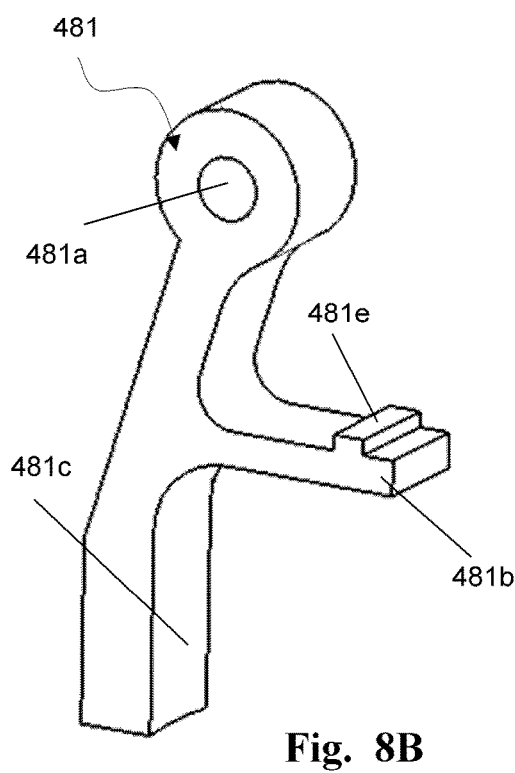
FIG. 8B shows an aerial view of a gripping device.

In some embodiments, referring to FIG. 8B, a gripping device 481 comprises a sleeve 481a, a gripper 481c, a sub-component 481b of rectangular shape, and a stopper 481e in the shape of a bump. The gripping device 481 may optionally be configured to be an elastic part, in a single piece, made of spring steel or other metal, or made of other material with some degree of elasticity. Optionally, a rubber (or silica gel, or other similar elastic material) may be attached to the surface of the gripper 481d (not shown in Figures). In particular, the gripping device 481 is physically connected as a whole.

Figure 8C:
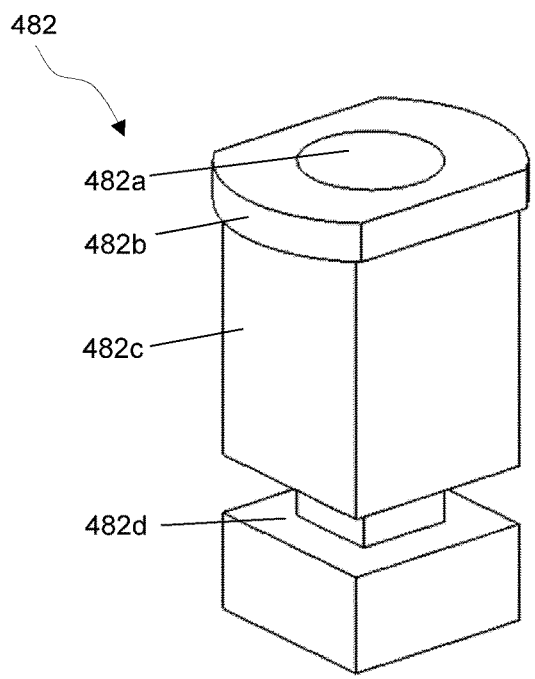
FIGS. 8C-8D show aerial views of parts of a gripping mechanism.

In some embodiments, referring to FIG. 8C, a sliding component 482 comprises a cylindrical hole 482a with a vertical axis, a part 482c in the shape of a square cylinder, a flange 482b, a groove 482e comprising a top flat surface and a lower flat surface. The sliding component 482 is configured to be a rigid component.

Figure 8D:
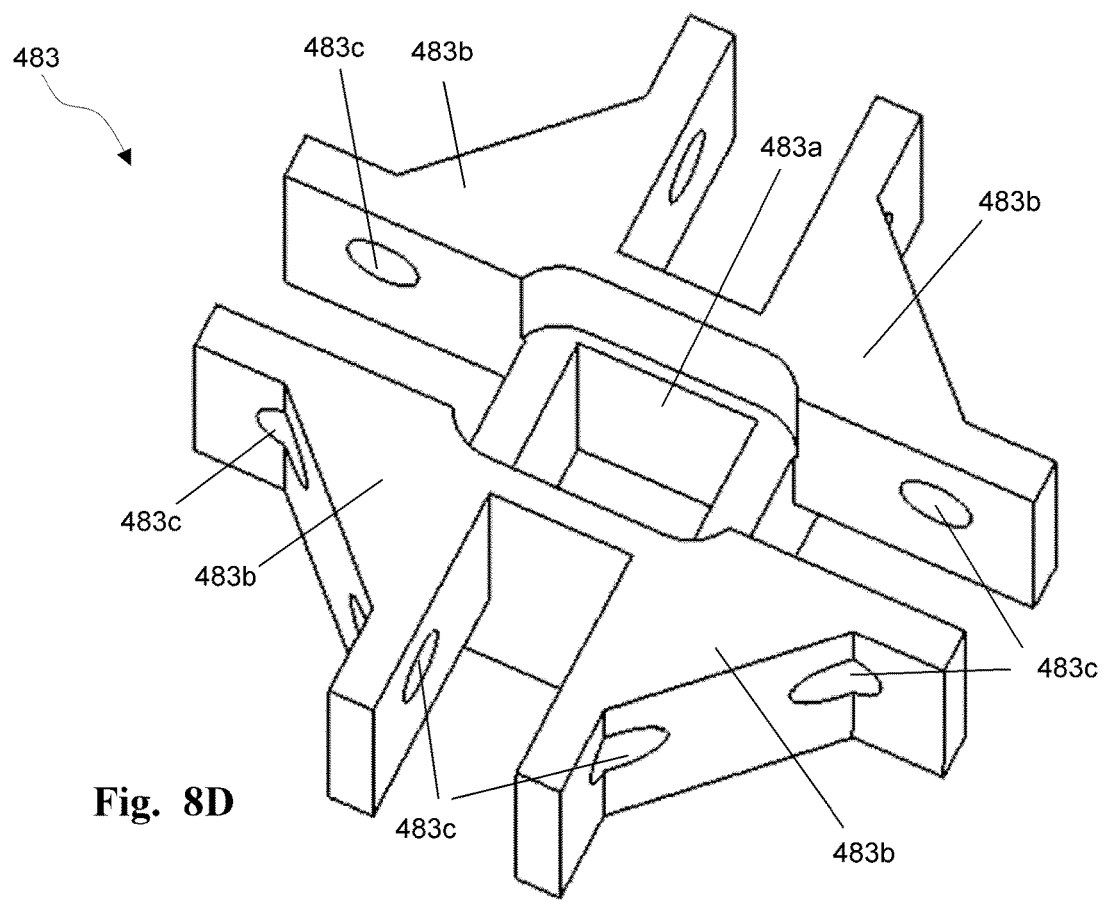

In some embodiments, referring to FIG. 8D, a rigid component 483 comprises a hole 483a of squared (or rectangular) shape with a vertical axis at the center of the hole, and four pairs of round holes 483c wherein each pair of round holes comprise a same horizontal axis, wherein the axes of the four pairs of cylindrical holes 483c are configured to be cyclically symmetric under the rotation of 90 degrees around the central axis of the squared hole 483a. In particular, the axes of the four pairs of round holes form a square pattern on a horizontal plane.

Figure 8E:
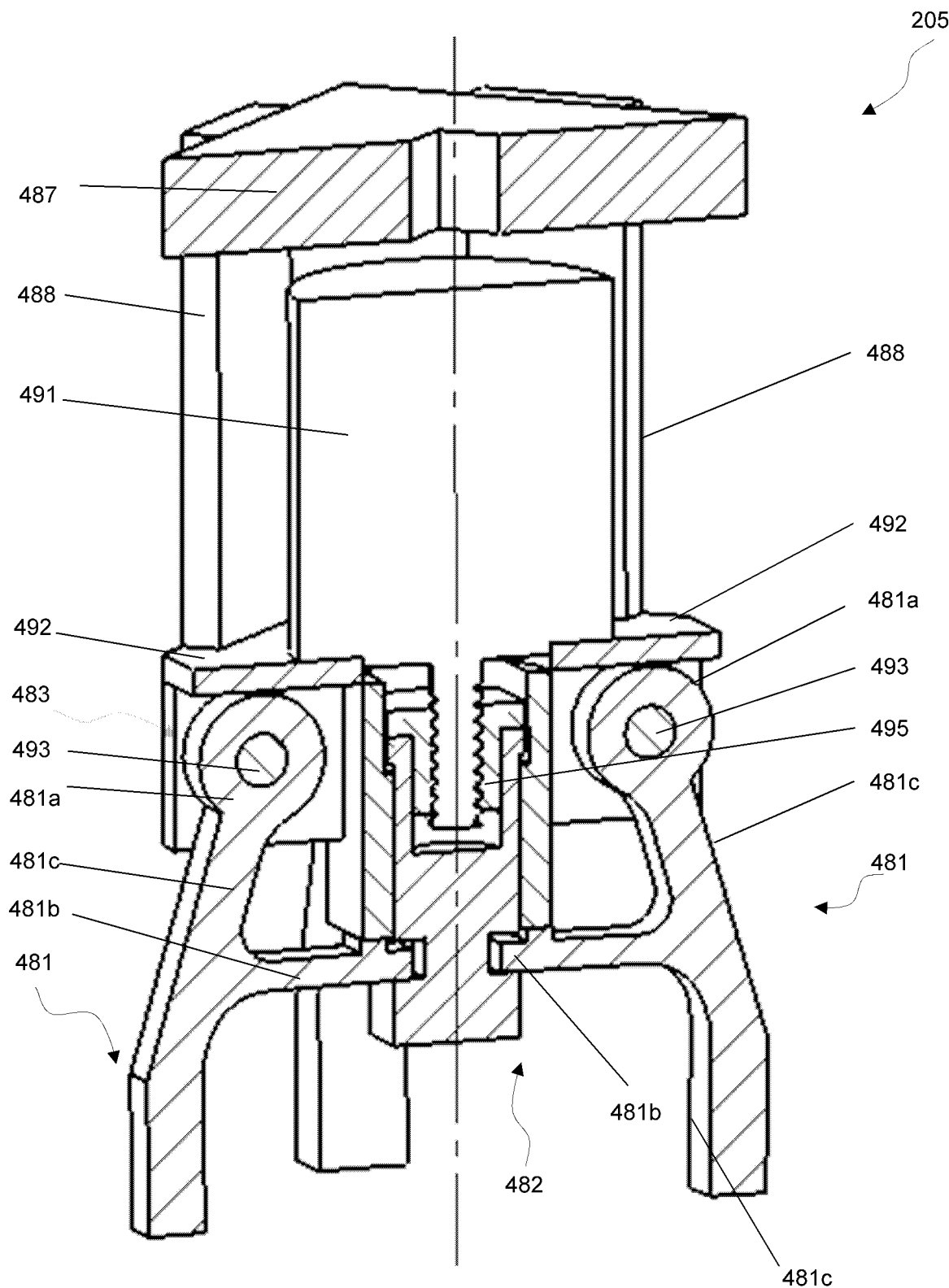
FIG. 8E shows a cut view of the gripping mechanism.
Figure 8F:
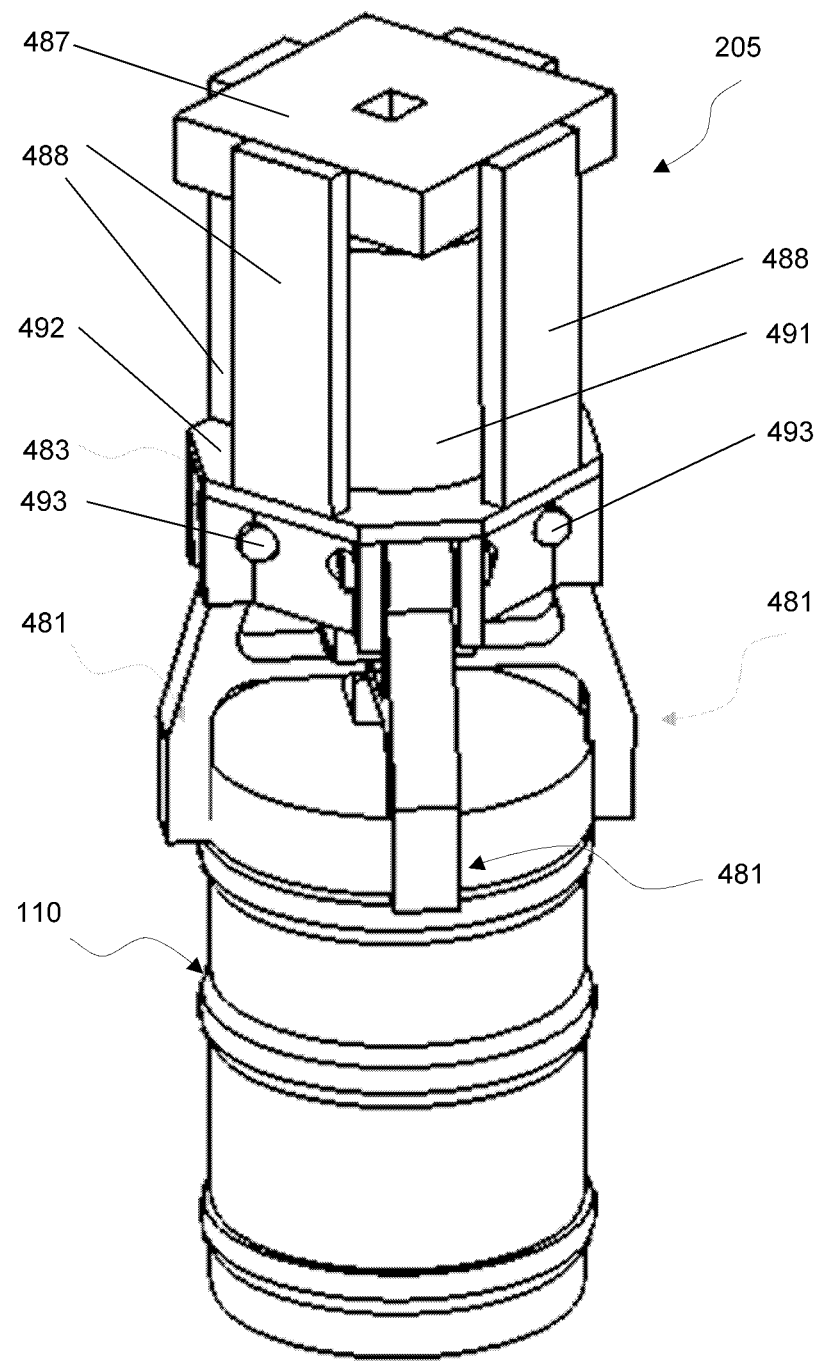
FIG. 8F shows an aerial view of the gripping mechanism

In some embodiments, referring to FIGS. 8E-8F, a gripping mechanism 205 comprises a rigid component 483, four gipping devices 481 and four shafts 493. Each shaft 493 is configured to be inserted into a corresponding pair of cylindrical holes 483c of the rigid component 483. The shafts 493 are fixedly connected to the rigid component 483. The sleeve 481a of each gripping devices 481 is engaged with a corresponding shaft 493, so that the gripping devices 481 is constrained to rotate relative to the rigid component 483 around the axis of the corresponding shaft 493. The four gripping devices 481 and the four shafts 493 are configured to be cyclically symmetric under the rotation of 90 degrees around the central axis of the squared hole 483a of the rigid component 483. Thus, the axes of any two shafts 493 are either parallel to each other, or perpendicular to each other. The gripping mechanism 205 also comprises a sliding component 482, and a nut 495 comprising a flange, wherein the nut 495 is configured to be placed inside the cylindrical hole 482a and the flange of the nut 495 is rigidly connected to the flange 482b of the sliding component 482 (e.g., by bolting). The axis of the squared hole 483a of the rigid component 483 may be referred to as the central axis of the gripping mechanism 205. The part 482c of the sliding component 482 is configured to be engaged with the squared hole 483a of the rigid component 483, so that the sliding component 482 is constrained to slide relative to the rigid component 483 along the central axis of the squared hole. (The part 482c is inserted in the squared hole 483a, wherein the size of a section of the part 482c, which is a square shape, is configured to be the same as the size of the squared hole 483a.) As the nut 495 is rigidly connected to the sliding component 482, the nut 495 is constrained to slide vertically relative to the rigid component 483. As it shows in FIG. 8E, a tip of the part 481b of each gripping device 481 is inserted into the groove 482e, although there may be a very small space between the tip of the part 481b and the upper and lower flat surfaces of the groove 482e. When the sliding component 482 slides up (or down), the lower flat surface (or respectively top flat surface) of the groove 482e may be engaged with the tip of the part 481b of each gripping device 481, as to induce a rotational movement (around the corresponding shaft 493) in combination with elastic deformation, in the gripping device 481. The gripper 481c of each gripping device 481 is thus moved towards to (or respectively, away from) the center axis of the squared hole 483a, when the sliding component 482 moves vertically up (or respectively down). When the grippers 481c are moved towards to (or away from) the center axis of the squared hole 483a, the grippers 481c are configured to grip (or release) the cap of a capped container 110 or 109 (see FIG. 8F).

The gripping mechanism 205 further comprises a connector 492 and a motor 491 comprising a base component and a screw shaft. The base component of the motor 491 is configured to fixedly connected to the connector 492 and the connector 492 is configured to be rigidly connected to the rigid component 483 (see FIG. 8E). The screw shaft of the motor 491 is engaged with the nut 495, so that the nut 495 is moved up or down in response to the clockwise or counter-clockwise rotation of the screw shaft of the motor 491. Hence, the sliding component 482 may be moved up or down with the nut 495. As a result, the clockwise or counter-clockwise rotation of the screw shaft of the motor 491 induces a motion in the gripping devices 481, as to grip or release a capped container 110 or 109. When the gripping devices 481 are moved to the positions to grip a capped container tightly, the stoppers 481*e* of the four gripping devices 481 are configured to touch the bottom of the rigid component 483 so that the rotation of the gripping devices 481 may be stopped, and the grippers 481*c* of the gripping devices 481 may not press on the gripped container with excessive forces. The gripping mechanism 205 also comprises a support component 487 comprising a rectangular hole at or near the axis of the squared hole 483*a* of the rigid component 483. The support component 492 is configured to rigidly connected to the support component 487 by four connecting plates 488 (see FIG. 8F).

Figure 8G:
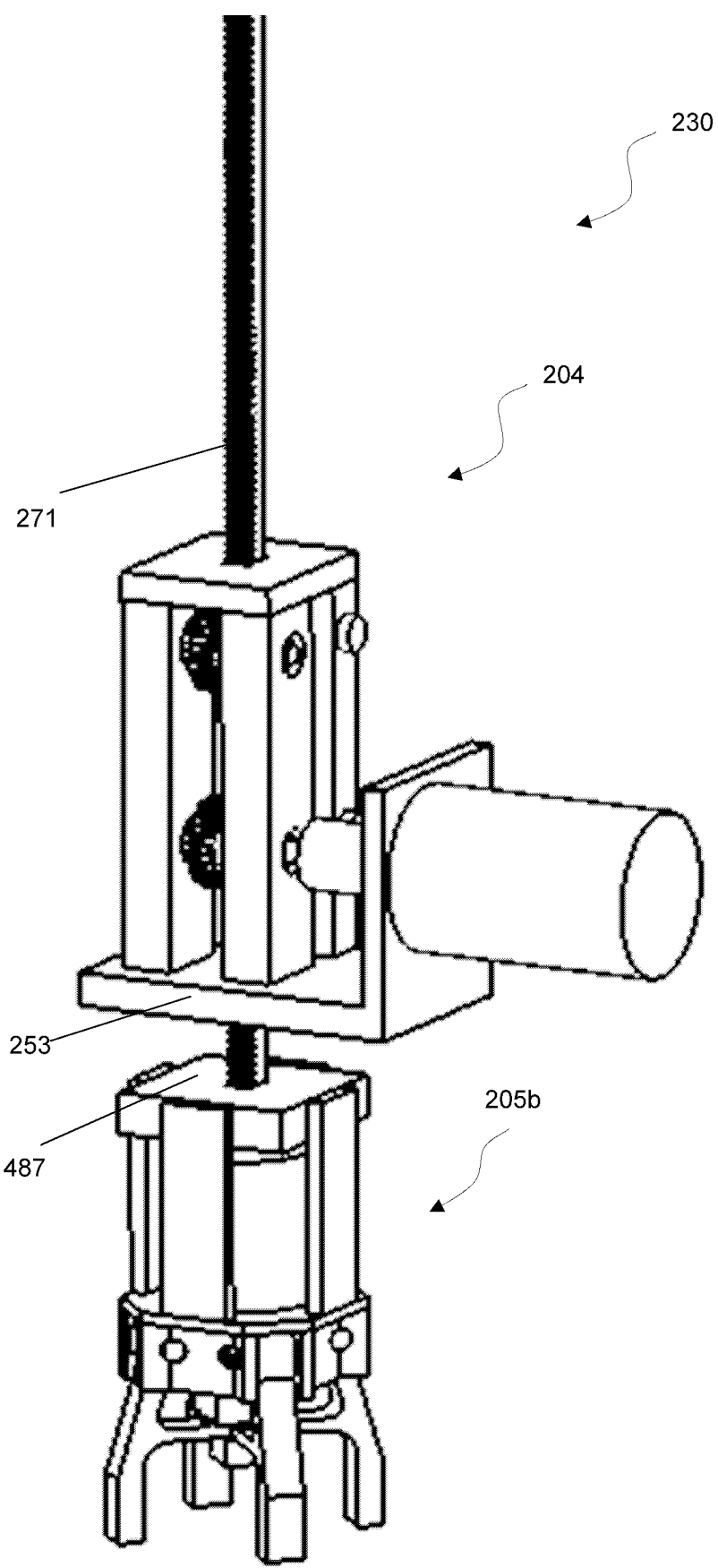
FIG. 8G shows an aerial view of a vertical transfer mechanism comprising the vertical motion mechanism and the gripping mechanism.

In some embodiments, referring to FIG. 8G, a vertical transfer mechanism 230 comprises a vertical motion mechanism 204, a gripping mechanism 205, wherein the support component 487 of the gripping mechanism 205 is fixedly or rigidly connected with the bottom part of the rack 271 of the vertical motion mechanism 204 (see FIG. 8F). As explained, the rack 271 is configured to be positioned vertically. The support component 487 of the gripping mechanism 205 may be moved up and down with the rack 271, relative to the support component 253 of the vertical motion mechanism 204. The gripping mechanism 205 may grip the cap 112 of a capped container 110, and then the capped container 110 may move vertically up or down with the support component 487 of the gripping mechanism 205, when the rack 271 is moved up or down relative to the support component 253, as driven by the motor 245 in the vertical motion mechanism 204 (see FIG. 8G). The support component 253 may be referred to as the support component of the vertical transfer mechanism 230.

Figure 9A:
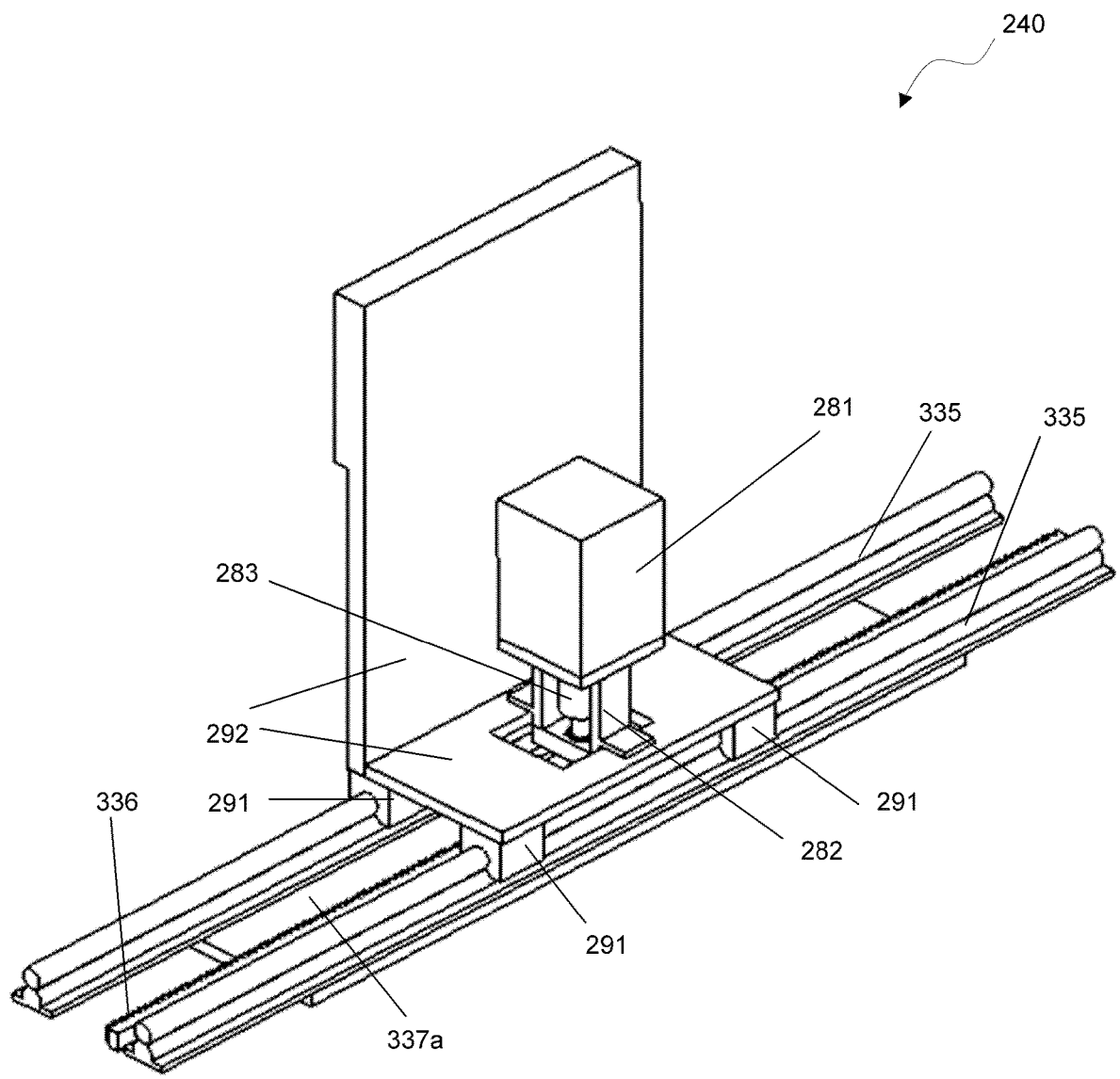
FIG. 9A shows an aerial view of a horizontal motion mechanism.
Figure 9B:
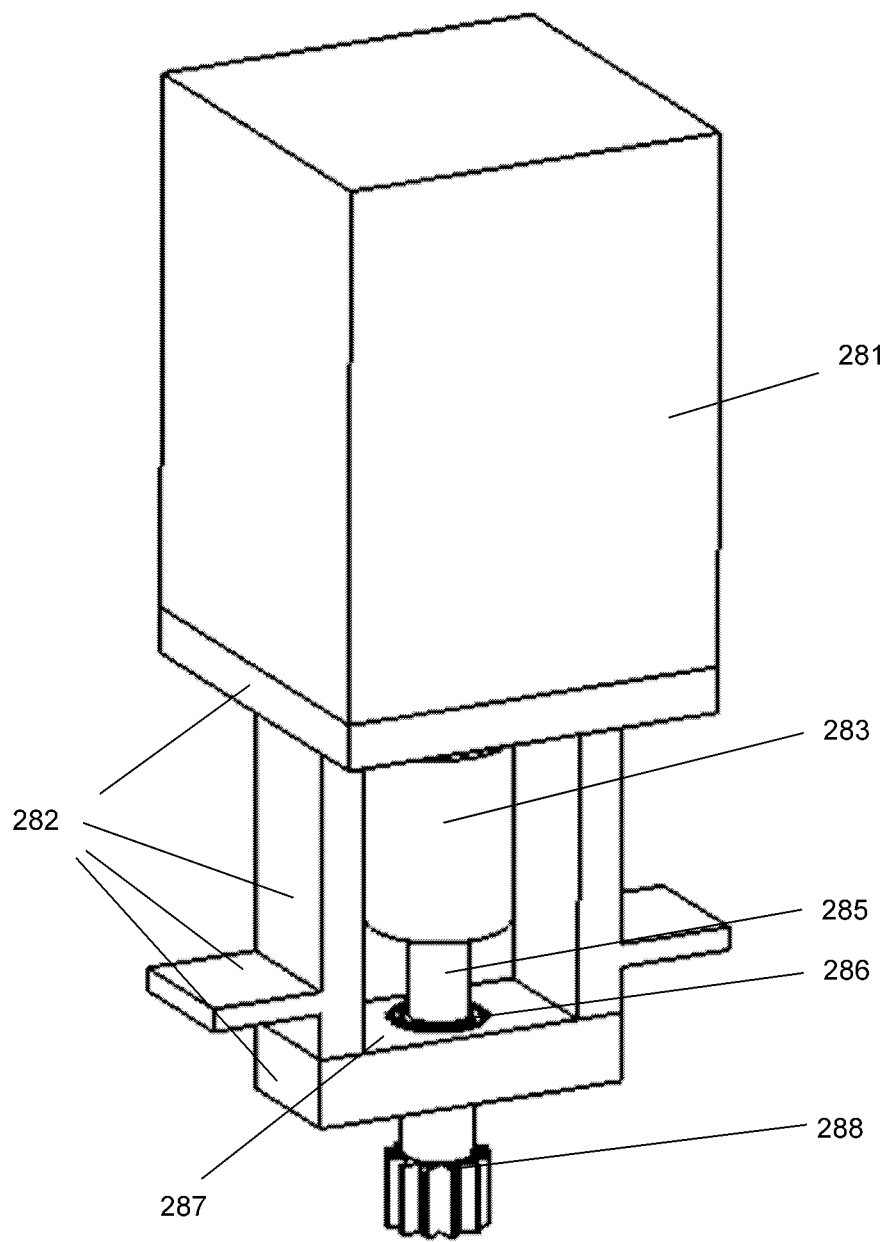
FIG. 9B shows an aerial view of parts of the horizontal motion mechanism.

In some embodiments, referring to FIGS. 9A-9B, a horizontal motion mechanism 240 comprises: a L-shaped rigid component 292; four linear motion bearings 291 which are mounted on the lower side of the horizontal plate of the rigid component 292; a support component 337*a* in the shape of a plate; a rack 336 and a pair of parallel linear rails 335. The linear rails 335 are fixedly mounted on the support component 337*a*, and they are configured to be positioned at the same height. The rack 336 is also fixedly mounted on the support component 337*a*. The rack 336 is parallel to the pair of linear rails 335. Exactly two linear motion bearings 291 are configured to be engaged with each linear rail 335, so that the rigid component 292 is constrained to move linearly along the linear rails 335. The horizontal motion mechanism 240 further comprises a rigid component 282 which is rigidly connected to the rigid component 292, where the rigid component 282 comprises a bearing housing 287 as a sub-component (see FIG. 9B). The horizontal motion mechanism 240 also comprises a shaft 285, a gear 288, a motor 281 comprising a shaft and a base component, and a coupling 283. The gear 288 is rigidly connected to and concentric with the shaft 285. The axes of the gear 288 and of the shaft 285 are configured to be vertical. A pair of bearings (and accessories) are configured to connect the shaft 285 and the bearing housing 287, so that the shaft 285 is constrained to rotate relative to the bearing housing 287 around the axis of the shaft 285. The base of the motor 281 is fixedly connected to the rigid component 282. The shaft of the motor 281 is connected to the shaft 285 by the coupling 283, so that the motor 281 may drive rotation of the shaft 285, hence that of the gear 288, relative to the rigid component 282. The gear 288 is engaged with the rack 336. When the motor 281 drives the rotation of the gear 288, the rigid component 292 moves linearly along the linear rails 335.

It should be noted that the shaft 285 and the gear 288 may optionally be made as a single part.

It also should be noted that stoppers may be installed at both ends of one or two linear rails 335, so that the linear motion of the rigid component 292 has a limited range.

Figure 10:
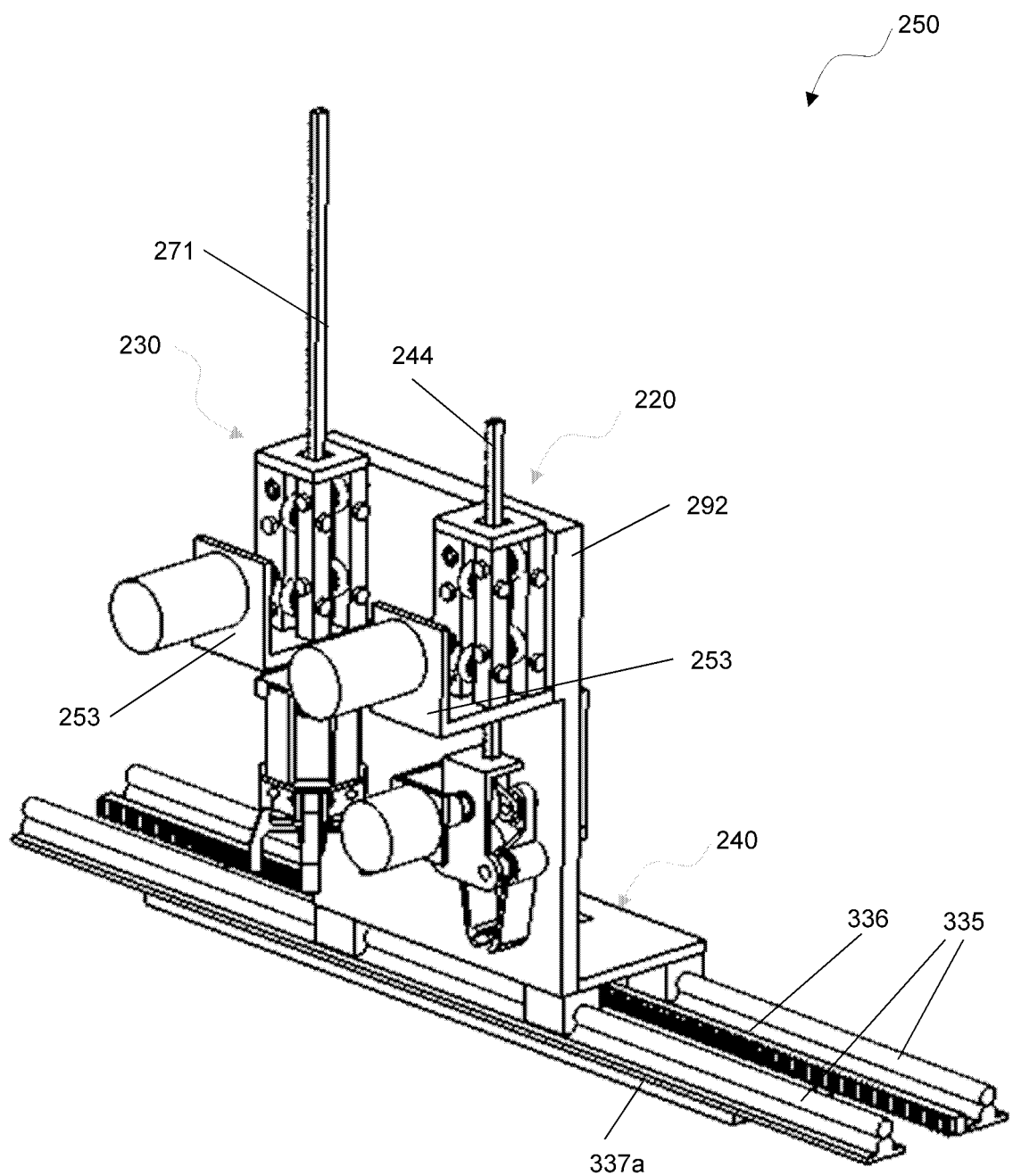
FIG. 10 shows an aerial view of a transfer sub-mechanism comprising a cover lifting mechanism, a vertical transfer mechanism and a horizontal motion mechanism.

In some embodiments, referring to FIG. 10, a transfer sub-mechanism 250 comprises a horizontal motion mechanism 240, a cover lifting mechanism 220, and a vertical transfer mechanism 230. The support component 253 of the cover lifting mechanism 220 is configured to be rigidly connected to the rigid component 292 of the horizontal motion mechanism 240. Similarly, the support component 253 of the vertical transfer mechanism 230 is configured to be rigidly connected to the rigid component 292 of the horizontal motion mechanism 240. As explained before, the rigid component 292 may move linearly along the linear rails 335; and thus, the support component 253 of the vertical transfer mechanism 230 and the support component 253 of the cover lifting mechanism 220 may both move linearly along the linear rails 335, together with the rigid component 292.

Figures 11A, 11B:
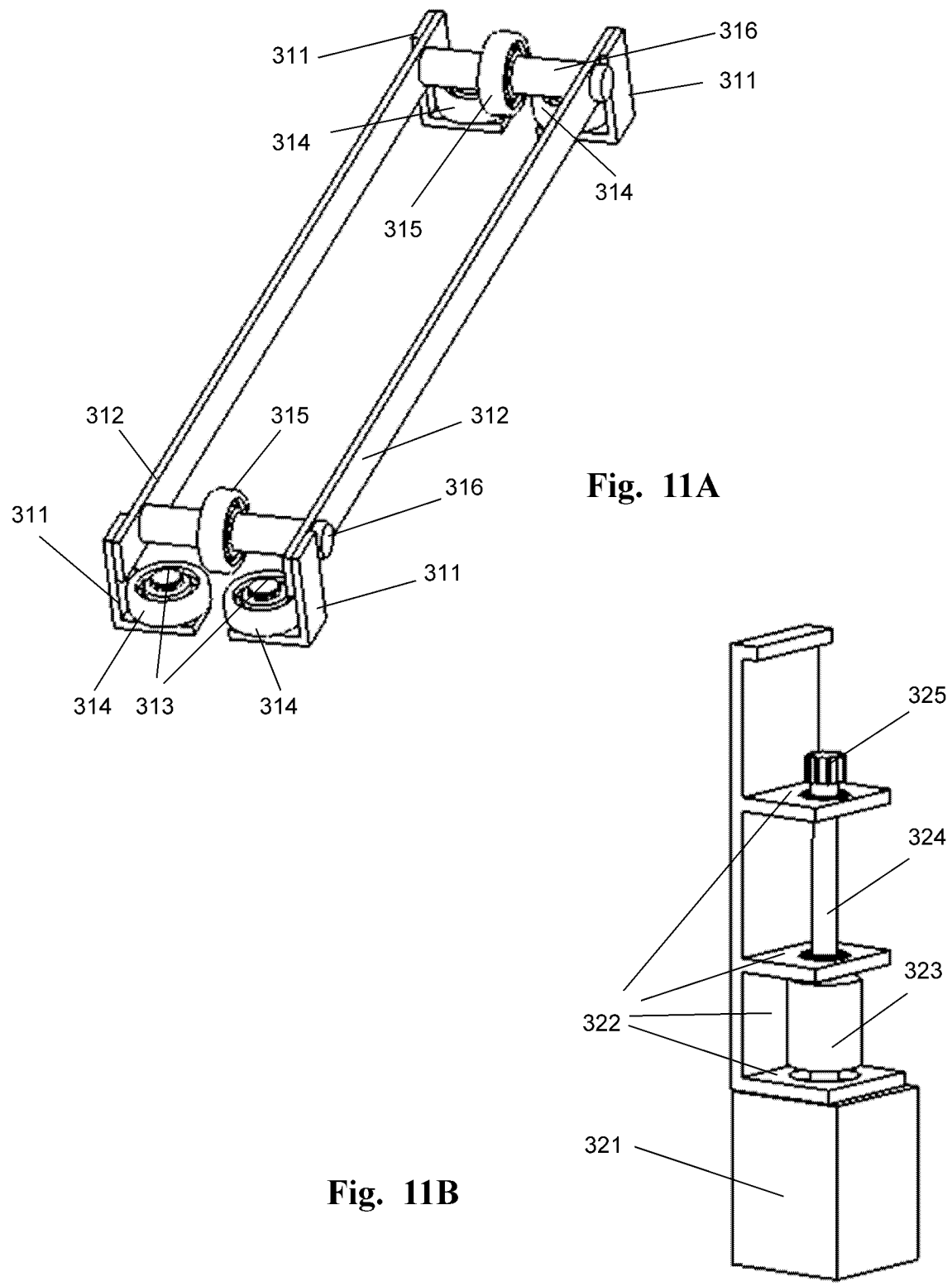
FIGS. 11A-11B show aerial views of parts of a sliding device.
Figure 11C:
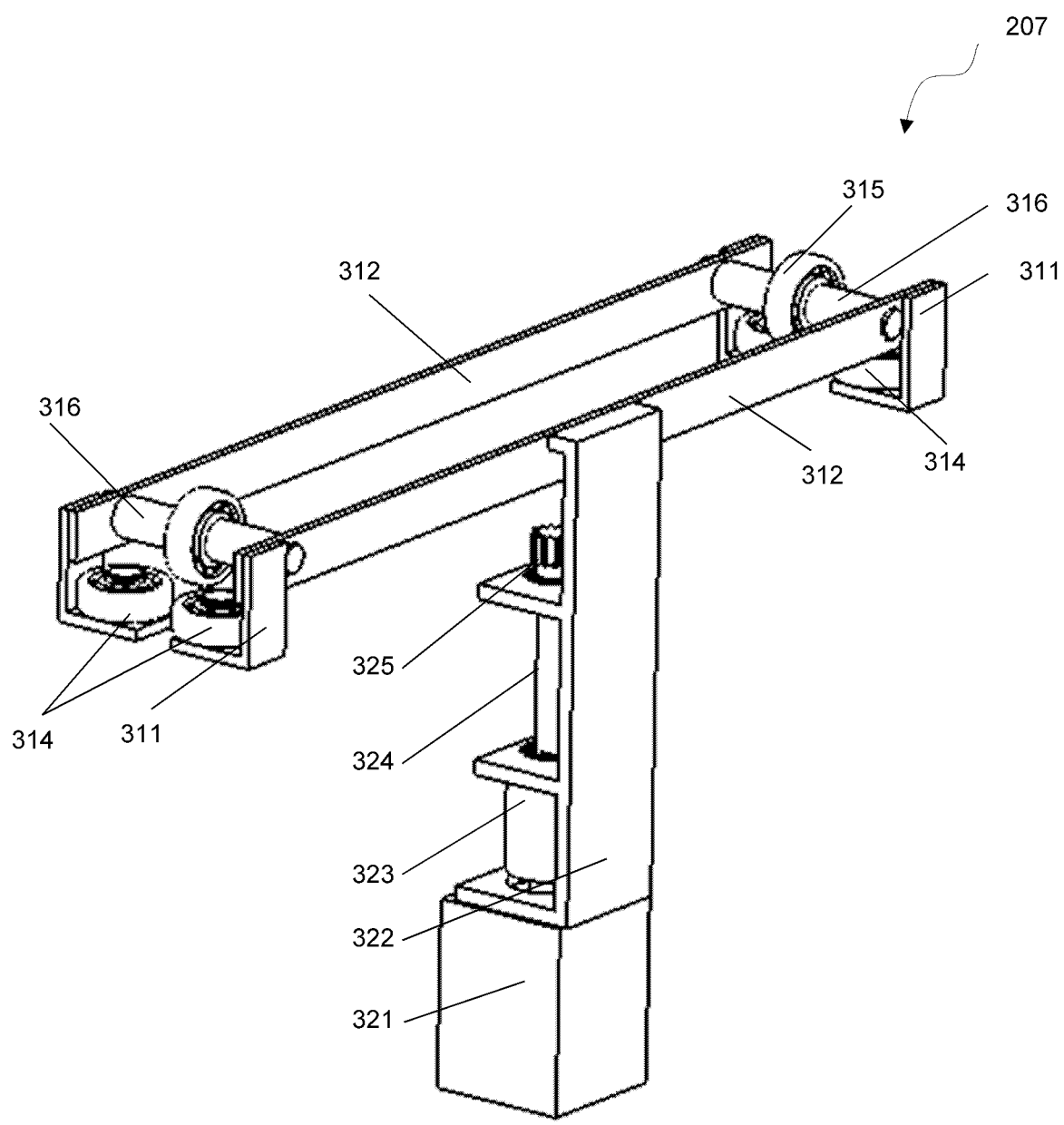
FIG. 11C shows an aerial view of the sliding device.

In some embodiments, referring to FIGS. 11A-11C, a sliding device 207 comprises a pair of support beams 312, a pair of wheels 315 and a pair of corresponding shafts 316. Each shaft 316 is rigidly connected to the two support beams 312. Each wheel 315 is mounted on a corresponding shaft 316, such that the wheel 315 is constrained to rotate relative to the shaft around the axis of the wheel 315. The axes of the wheels 315 are configured to be horizontal and mutually parallel. The sliding device 207 also comprises four wheels 314 and four corresponding shafts 313, wherein each wheel 314 is mounted on the corresponding shaft 313 so that the wheel 314 is constrained to rotate relative to the shaft 313 around the axis of the wheel 314. Each shaft 313 is rigidly connected to a support beam 312 by a connector 311 (see FIG. 11A). The axes of the four wheels 314 are configured to be vertical; and these four axes may optionally form a rectangular pattern. The sliding device 207 also comprises a gear 325, a shaft 324, a rigid component 322, a motor 321 comprising a shaft and a base component, and a coupling 323 (see FIG. 11B). The rigid component 322 comprises a pair of bearing housings (with a same axis). A bearing is configured to connect each bearing housing of the rigid component 322 and the shaft 324, so that the shaft 324 is constrained to rotate relative to the rigid component 322 around the axis of the shaft 324. The shaft 324 is rigidly connected to and concentric with the gear 325. The base of the motor 321 is mounted on the rigid component 322. The shaft of the motor 321 is fixedly connected to the shaft 324 via the coupling 323, so that the motor 321 may drive the rotations of the shaft 324 and the gear 325 relative to the rigid component 322. The rigid component 322 is rigidly connected to one of the support beams 312 (see FIGS. 11C). The axis of the gear 325 is configured to be vertical.

It should be noted that the shaft 324 and the gear 325 may be made as a single part.

Figure 11D:
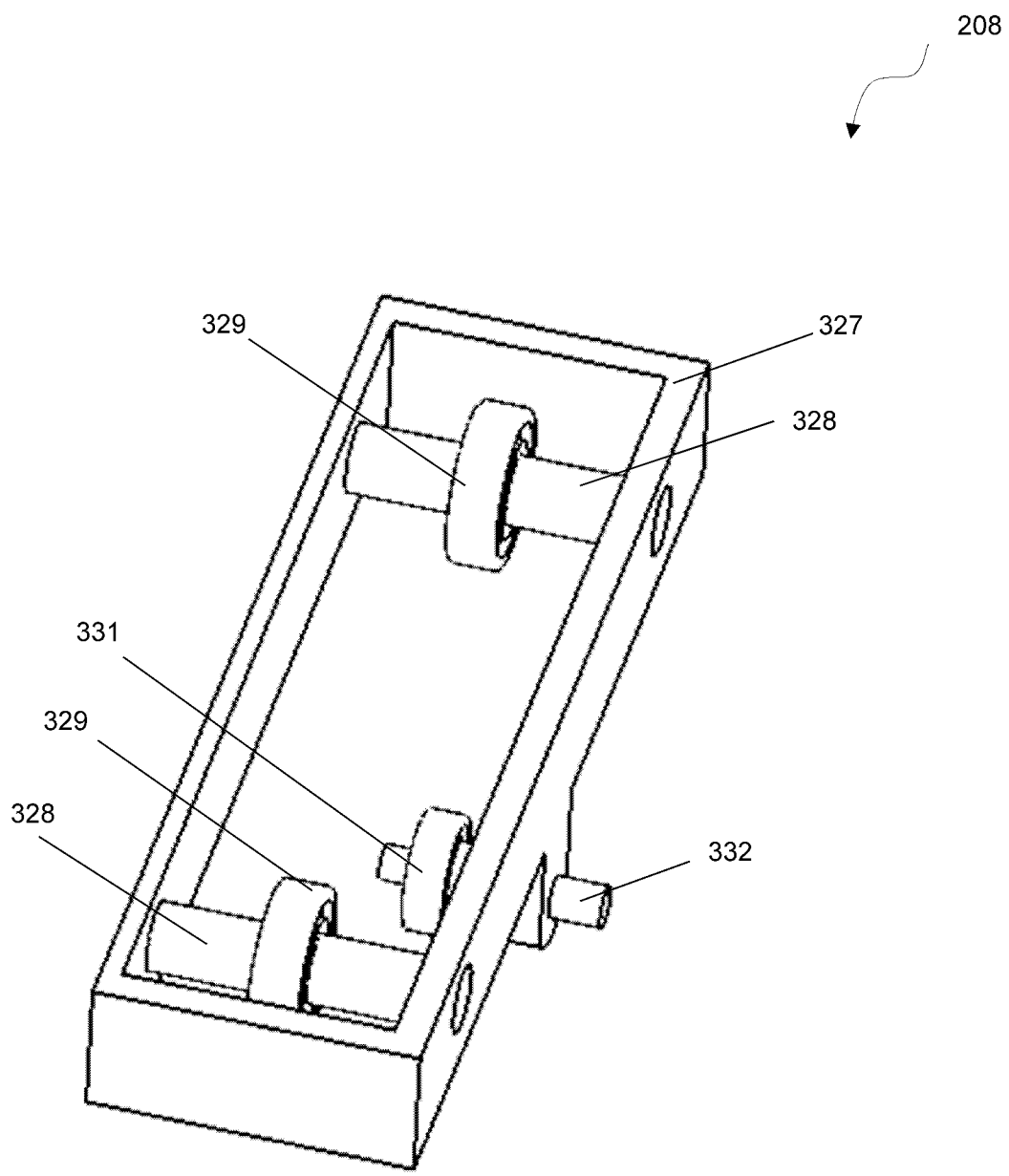
FIG. 11D shows an aerial view of another sliding device.

In some embodiments, referring to FIG. 11D, a sliding device 208 comprises a support frame 327 (in the shape of a square frame), a pair of wheels 329 and corresponding shafts 328. Both shafts 328 are rigidly connected to the support frame 327. Each wheel 329 is mounted on the corresponding shaft 328 such that the wheel 329 is constrained to rotate relative to the shaft 328 around the axis of the wheel 329. The sliding device 208 also comprises a wheel 331 and a shaft 332. The shaft 332 is rigidly connected to the support frame 327. The wheel 331 is mounted on the shaft 332 such that the wheel 331 is constrained to rotate relative to the shaft 332 around the axis of the wheel 331. The axes of the wheels 329 and 331 are configured to be parallel to each other.

It should be noted that the support frame 327 may be substituted by other types of support component.

Figure 11E:
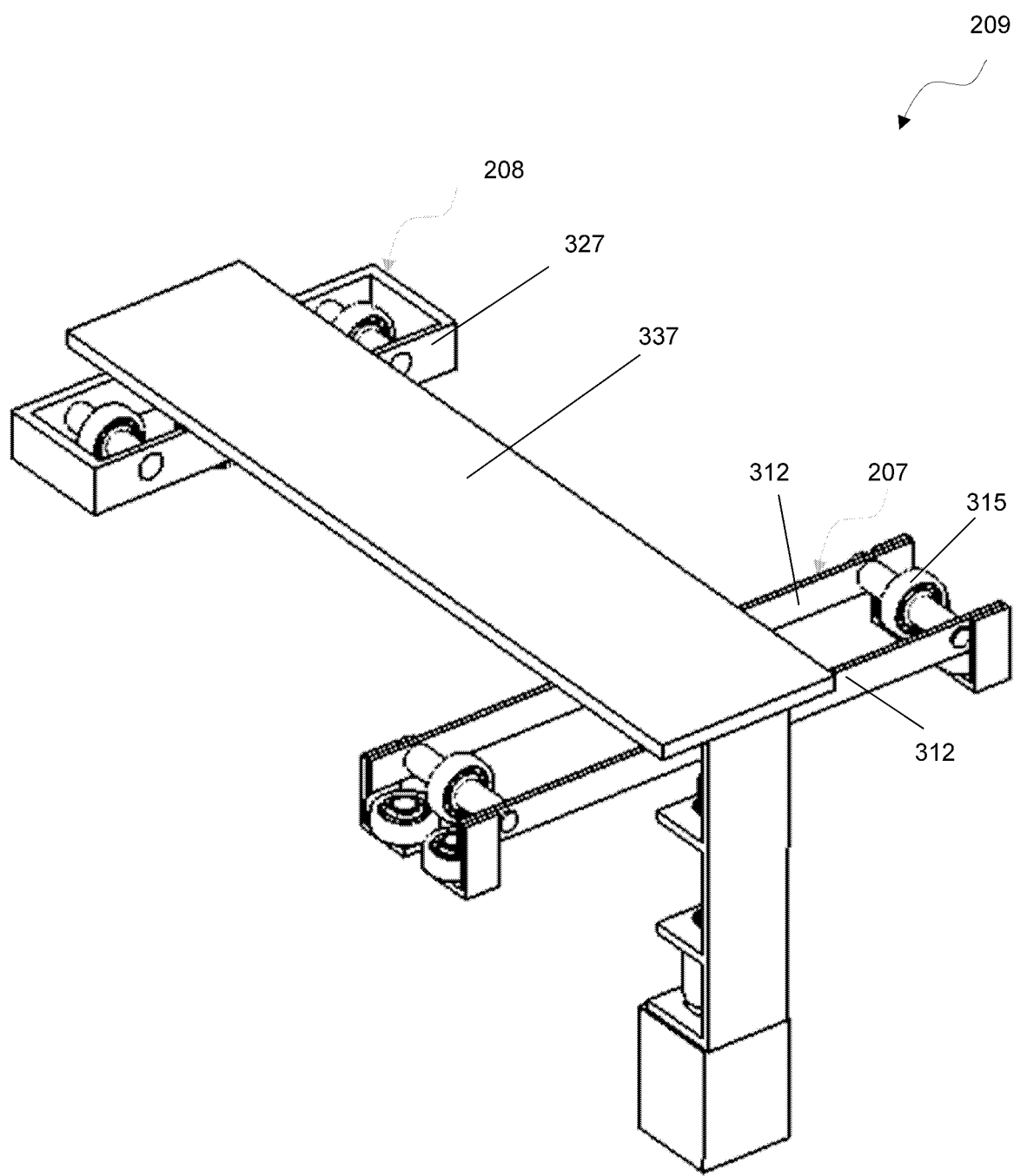
FIG. 11E shows an aerial view of a horizontal sliding sub-mechanism comprising both sliding devices.

In some embodiments, referring to FIG. 11E, a horizontal sliding sub-mechanism 209 comprises a support component 337, a sliding device 207 and a sliding device 208. The support beams 312 of the sliding device 207 are rigidly connected to the support component 337. Similarly, the support frame 327 of the sliding device 208 is rigidly connected to the support component 337. The axes of the wheels 329 in the sliding device 208 and the axes of the wheels 315 in the sliding device 207 are configured to be parallel to each other (and thus horizontal).

It should be noted that each of the wheels 315, 314, 329 and 331 may comprise a ball bearing.

Figure 11F:
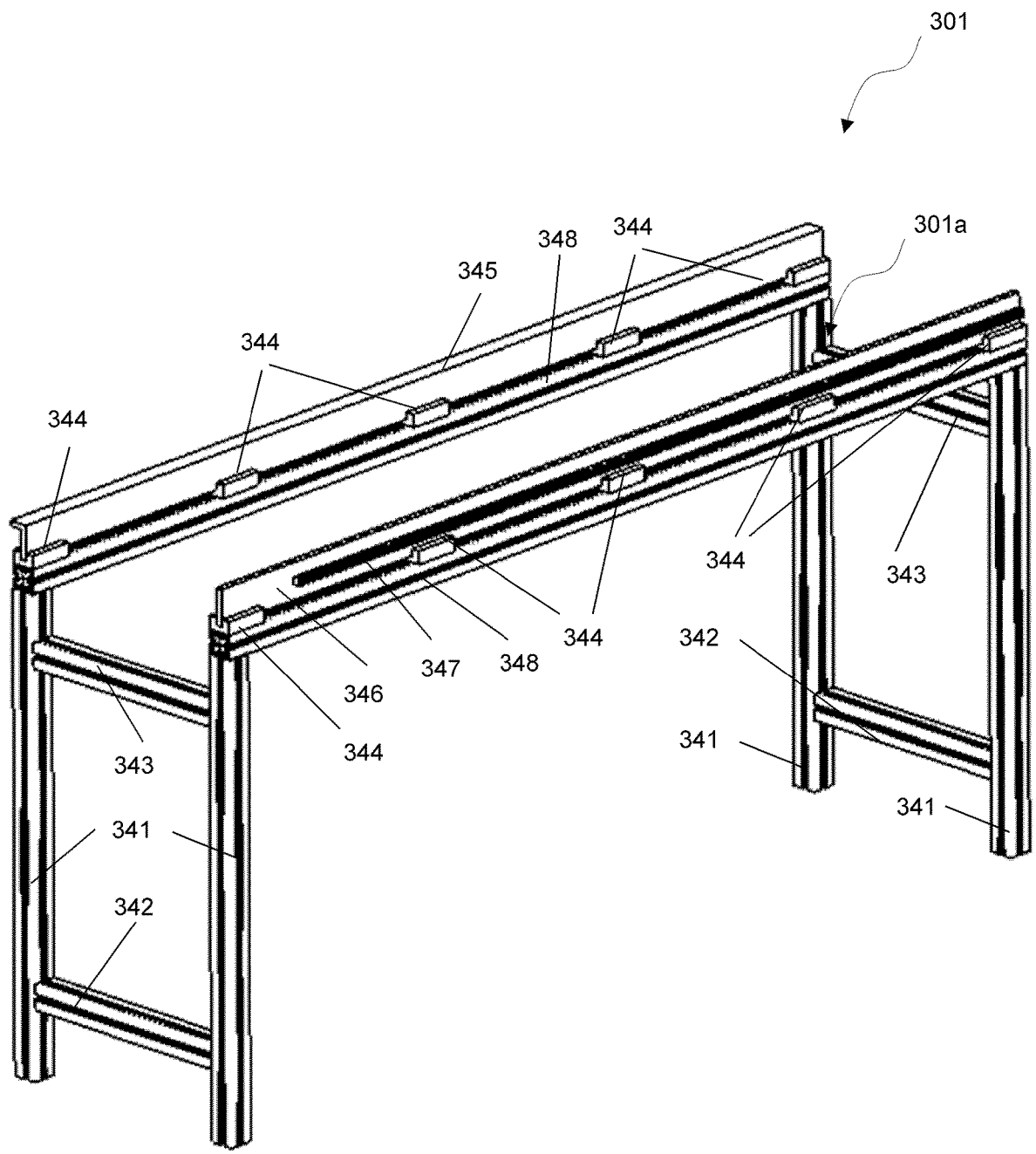
FIG. 11F shows an aerial view of a rail mechanism.

In some embodiments, referring to FIG. 11F, a rail mechanism 301 comprises: two parallel linear rails 345 and 346; a rack 347; and a support frame 301a comprising aluminum profiles 348, 341, 342 and 343, and connecting accessories. (The connecting accessories are not shown in figure.) The linear rail 345 has a L-shaped section; and the linear rail 346 has an I-shaped (i.e., rectangular) section (see FIG. 11F). The two linear rails 345 and 346 are respectively rigidly connected to the two parallel aluminum profiles 348, by some connectors 344. The rack 347 is rigidly connected to the linear rail 346. The rack 347, linear rails 345 and 346, the aluminum profiles 348 are configured to be parallel to a same horizontal direction. The rail 345 comprises a top surface which lies on a horizontal plane. The rail 346 comprises a top surface which lies on a horizontal plane, and a pair of side surfaces which lie in a pair of parallel vertical planes.

Figure 11G:
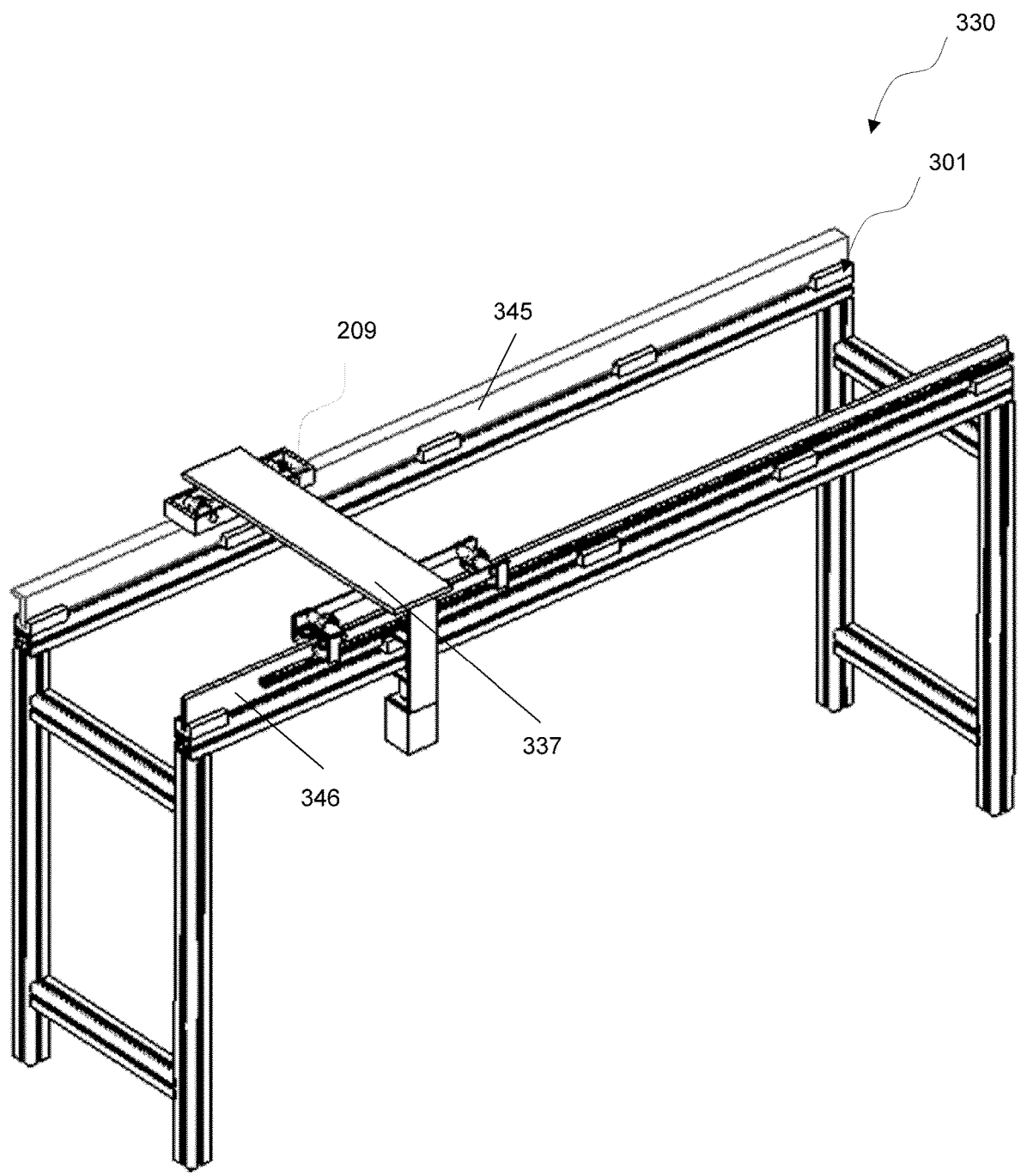
FIG. 11G shows an aerial view of a horizontal motion mechanism which comprises the horizontal sliding sub-mechanism and the rail mechanism.
Figure 11H:
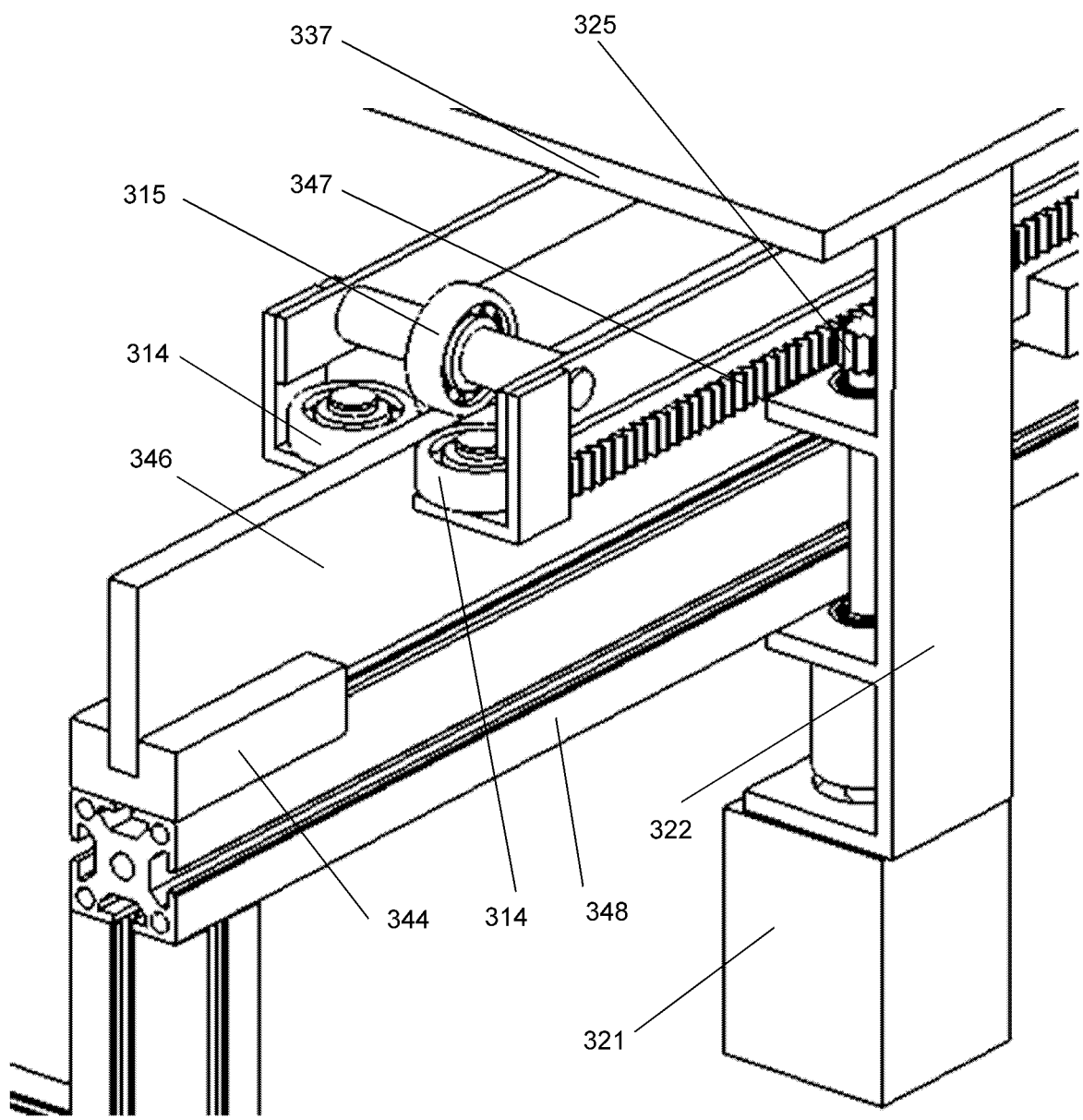
FIGS. 11H-11I show aerial views of parts of the horizontal motion mechanism.
Figure 11I:
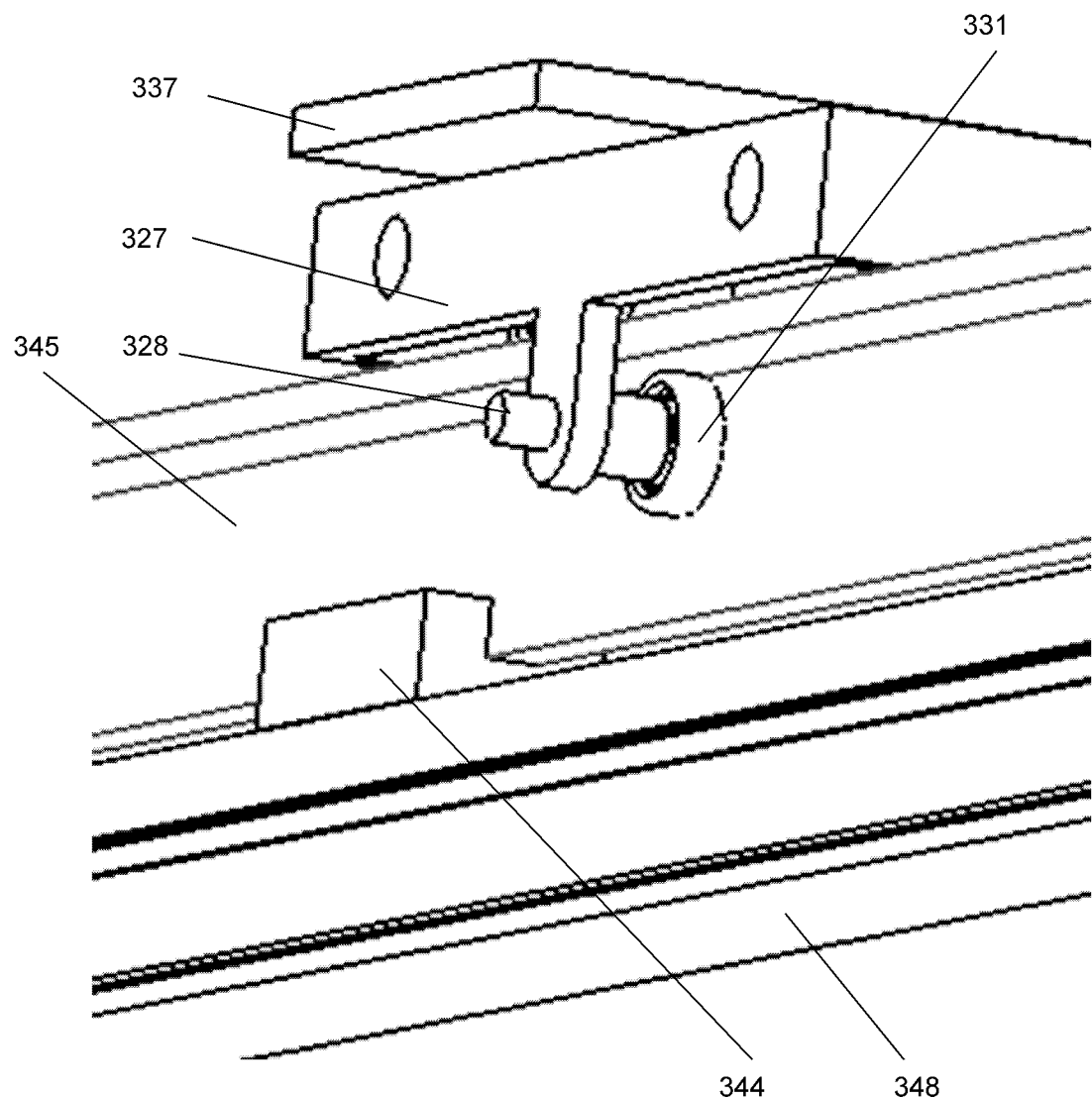

In some embodiments, referring to FIG. 11G-11I, a horizontal motion mechanism 330 comprises a horizontal sliding sub-mechanism 209 and a rail mechanism 301. The wheels 315 of the sliding device 207 of horizontal sliding sub-mechanism 209 are configured to roll on the top surface of the linear rail 346; and the wheels 314 of the device 207 are configured to roll on the side surfaces of the linear rail 346 (see FIG. 11H). The wheels 329 of the sliding device 208 of the horizontal sliding sub-mechanism 209 are configured to roll on the top surface of the linear rail 345; and the wheel 331 of the sliding device 208 is configured to roll on a bottom surface of the linear rail 345 (see FIG. 11I). The support component 337 of the horizontal sliding sub-mechanism 209 is constrained to move linearly along linear rails 345 and 346 of the rail mechanism 301; and the range of the linear motion may be limited by some stoppers. The gear 325 in the horizontal sliding sub-mechanism 209 is configured to be engaged with the rack 347 (see FIG. 11H). When the motor 321 drives the rotation of the gear 325, the horizontal sliding sub-mechanism 209 moves linearly along the linear rails 345 and 346.

Figure 12:
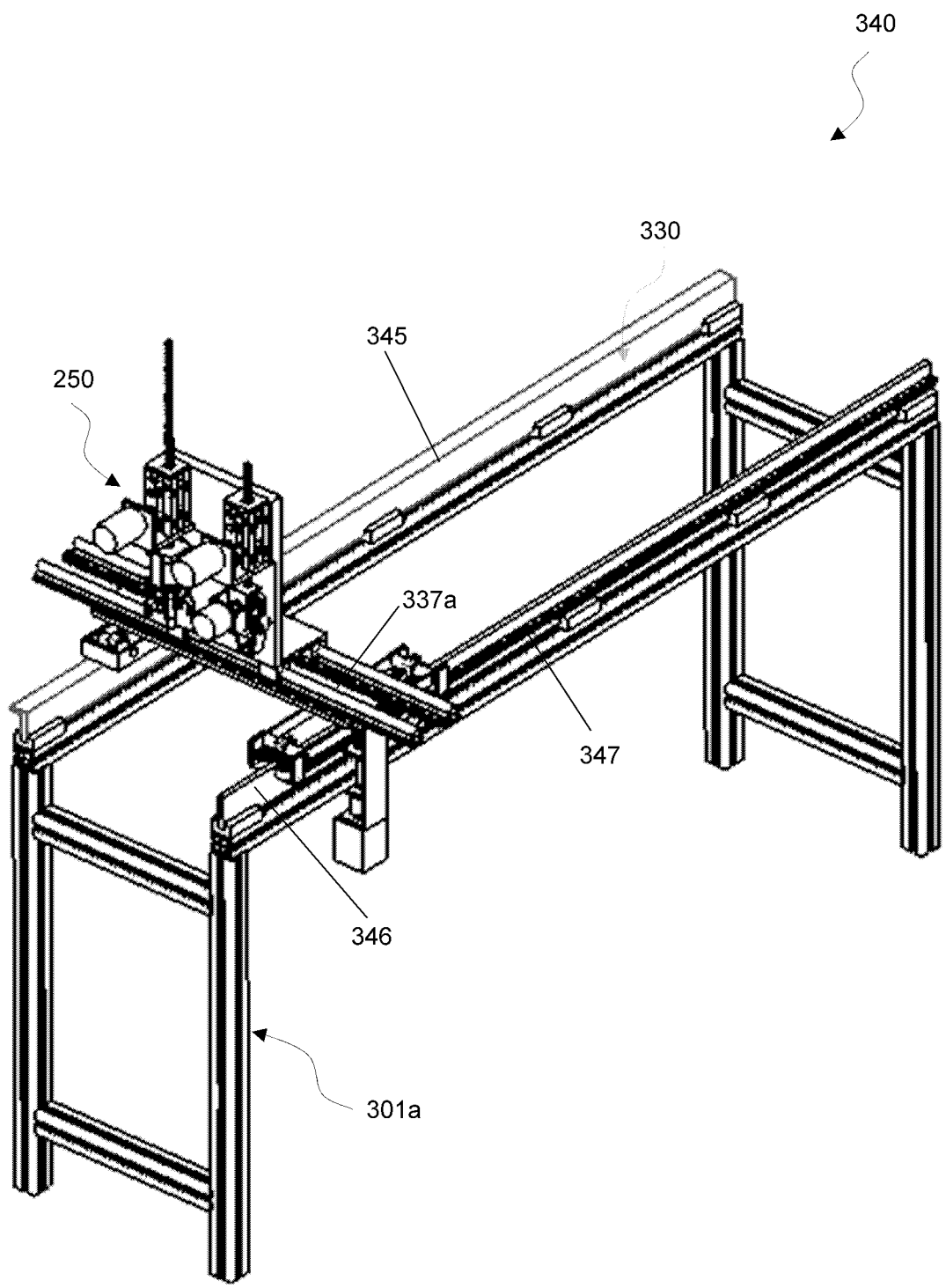
FIG. 12 shows an aerial view of a transfer mechanism.

In some embodiments, referring to FIG. 12, a transfer apparatus 340 comprises a transfer sub-mechanism 250 and a horizontal motion mechanism 330. The support component 337a of the transfer sub-mechanism 250 is rigidly connected to the support component 337 of the horizontal motion mechanism 330, so that the transfer sub-mechanism 250 is constrained to slide linearly along the linear rails 345 and 346 by the rotation of the motor 321 of the horizontal motion mechanism 330. The linear rails 345 and 346 of the horizontal motion mechanism 330 are configured to be perpendicular to the linear rails 335 in transfer sub-mechanism 250. As explained, the linear rails 345, 346 and 335 are configured to be positioned horizontally.

It should be noted that the support component 337a of the transfer sub-mechanism 250 and the support component 337 of the horizontal motion mechanism may be combined into a single part.

The support component 487 of the gripping mechanism 205 will be referred to as a first support component of the transfer apparatus 340; the support component 253 (of the vertical motion mechanism 204) will be referred to as a second support component of the transfer apparatus 340; the support component 337a (of the horizontal motion mechanism 240) will be referred to as a third support component of the transfer apparatus 340; the support frame 301a comprising aluminum profiles 348, 341, 342 and 343, and connecting accessories (of the rail mechanism 301) will be referred to as a fourth support component of the transfer apparatus 340.

It should be noted that the transfer apparatus 340 comprises the following:

(1) the gripping mechanism 205, wherein the gripping mechanism 205 comprises the first support component 487, four symmetric gripping devices 481, and a motorized mechanism configured to move the four gripping devices relative to the first support component 487, as to grip or release a cap 112 of a capped container 110, wherein the motorized mechanism comprises the motor 491, the sliding component 482, the rigid component 483 and the screw nut 495, etc.;

(2) the cover gripping mechanism 203, wherein the cover gripping mechanism comprises the support component 263. The cover gripping mechanism 203 comprises a pair of V-shaped grippers, and a motorized mechanism configured to rotate the pair of grippers relative to the support component 263 around the axes of the shafts 268a and 268b, as to grip or release an insulation cover 141, wherein the motorized mechanism comprises the motor 261, the coupling 262, the shafts 265a, 265b, 264, 268a and 268b, bearings 267a, 267b, etc.;

(3) a first motion mechanism configured to move the support component 487 of the gripping mechanism 205, linearly in the vertical direction, relative to the second support component 253, wherein the first motion mechanism comprises the vertical motion mechanism 204, the rigid connection of the rack 271 of the vertical motion mechanism 204 to the support component 487 of the gripping mechanism 205;

(4) a second motion mechanism configured to move the second support component 253 linearly in a first horizontal direction, relative to the third support component 337a, wherein the second motion mechanism comprises the horizontal motion mechanism 240, the rigid connection of the rigid component 292 with the support component 253 of the vertical motion mechanism 204, wherein the first horizontal direction is the direction which is parallel to the linear rails 335 and 336 of the horizontal motion mechanism 240;

(5) a third motion mechanism configured to move the third support component 337a linearly in a second horizontal direction, relative to the fourth support component 301a, wherein the third motion mechanism comprises the horizontal motion mechanism 330, and the rigid connection of the component 337 with the third support component 337a, wherein the second horizontal direction is the direction which is parallel to the rails 345 and 346;

(6) a vertical motion mechanism configured to move the support component 263 of the cover gripping mechanism 203, linearly in the vertical direction, relative to the support component 253 of the cover lifting mechanism 220, wherein the vertical motion mechanism comprises the vertical motion mechanism 202, the rigid connection of the rigid component 292 with the support component 253 of the vertical motion mechanism 202, the rigid connection of the rack 244 in the vertical motion mechanism 202 with the support component 263 of the cover gripping mechanism 203. It should be noted that the said vertical motion mechanism moves the support component 263 relative to the support component 292, since the component 253 of the vertical motion mechanism 202 and the component 253 of the vertical motion mechanism 204 are both rigidly connected to the component 292.

It should be noted that the second support component 253 of the transfer apparatus 340 is moved horizontally by a composition of two linear motions, relative to the fourth support component. The directions of the two linear motions are perpendicular to each other. On the other hand, the support component 487 of the gripping mechanism 205 may be moved vertically relative to the second rigid component 253. Thus, the support component 487 of the gripping mechanism 205 may be moved by a composition of three linear motions relative to the fourth support component, wherein the directions of movement of the three linear motions are perpendicular to each other. Similarly, the support component 263 of the cover gripping mechanism 203 may be moved may be moved vertically relative to the second rigid component 292. Thus, the support component 263 of the cover gripping mechanism 203 may be moved by a composition of three linear motions relative to the fourth support component, wherein the directions of movement of the three linear motions are perpendicular to each other.

It should be noted that a computer may be used to control the above described mechanisms and apparatuses, especially the degrees of rotations or speeds of the motors 321, 281, 245 and of the motor 491 in the gripping mechanism 205 (or of the motor 261 of the cover gripping mechanism 203), so that the gripping mechanism 205 (or respectively, the cover gripping mechanism 203) can accurately grip a cap 112 (or respectively, an insulation cover 141).

Figure 13:
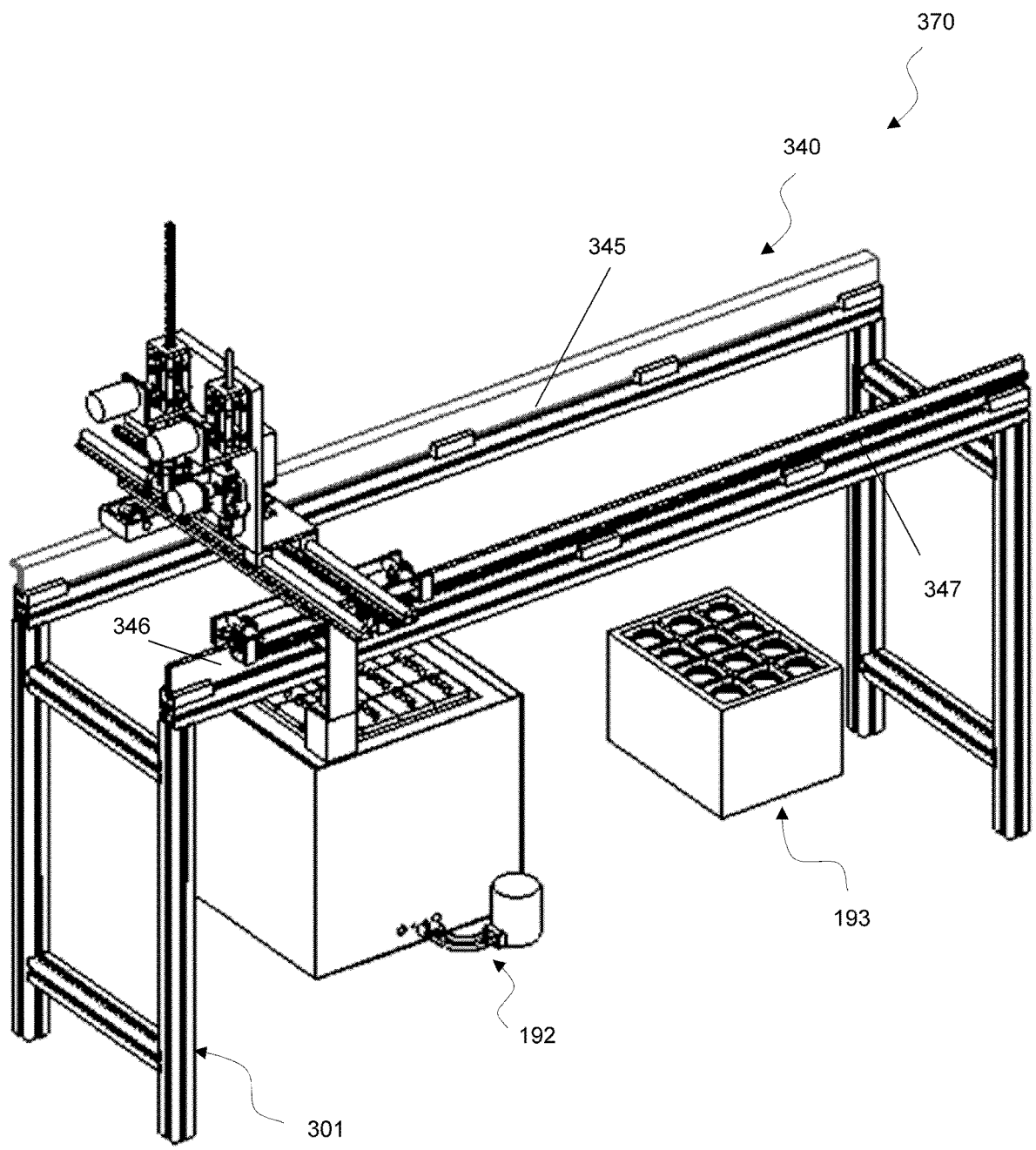
FIG. 13 shows an aerial view of a storage and transfer system.

In some embodiments, referring to FIG. 13, a storage and transfer system 370 comprises one or more storage apparatus 192, a transfer apparatus 340, and one or more transport boxes 193. The transport boxes 193 may be configured to hold capped containers 110; and the transport boxes may be moved by a vehicle, a mini vehicle, a forklift, and/or a human. A transport box 193 may be moved to a certain position next to the storage apparatus 192, so that the transfer apparatus 340 may transfer the capped containers 110 contained in the transport box 193 to the storage apparatus 192, as follows. At first step, the gripping mechanism 205 of the transfer apparatus 340 may be moved horizontally (by the composition of two horizontal motions) and then vertically down to a position as to grip a capped container in a transport box 193. Then, at step 2, the gripping mechanism 205, together with the gripped capped container, may be moved vertically up. At step 3, the cover gripping mechanism 203 of the transfer apparatus 340 may be moved horizontally (by the composition of two horizontal motions), and then vertically down, to a position as to grip an insulation cover 141 of a storage compartment of a storage apparatus 192, while the gripping mechanism 205 is moved together by the composition of two horizontal motions. At step 4, the cover gripping mechanism 203 may be moved vertically up, together with the gripped insulation cover 141. At step 5, the gripping mechanism 205 of the transfer apparatus 340 may be moved horizontally (by the composition of two horizontal motions), and then vertically down, to a position as to release the said capped container into the said storage compartment of the storage apparatus 192 (while the cover gripping mechanism 203 of the cover lifting mechanism 220 may also be moved horizontally together). The capped container is thus moved to the storage apparatus 192. At step 6, the gripping mechanism 205 is moved vertically up. At step 7, the cover gripping mechanism 203 may be moved horizontally (by the composition of two horizontal motions), and then vertically down, to a position as to release back the gripped insulation cover 141 on the said storage compartment of the storage apparatus 192. Thus, the transfer apparatus 340 has transferred a capped container from a transport box 193 to the said storage compartment of the storage apparatus 192. A computer may be used to direct, control, and to record the above described process.

In the storage and transfer system 370 as shown in FIG. 13, the transfer apparatus 340 can transfer some capped container contained in a specific compartment of the storage apparatus 192 to a location where the capped container may be removed of its cap, as follows. First step, the cover gripping mechanism 203 of the cover lifting mechanism 220 of the transfer apparatus 340 may be moved horizontally (by the composition of two horizontal motions, produced by the horizontal motion mechanisms) and then vertically down, to a position as to grip the insulation cover 141 which covers the specific compartment. Second step, the cover gripping mechanism 203, together with the gripped cover, are moved vertically up. Then the gripping mechanism 205 in the transfer apparatus 340 may be moved horizontally (by the composition of two horizontal motions) and then vertically down, to the inside of the compartment, and then may grip the highest positioned capped container therein. In other words, the gripping mechanism may grab and hold the said capped container. Third step, the gripping mechanism 205, together with the gripped capped container, are moved vertically up, to the outside of the storage compartment. Fourth step, the cover gripping mechanism 203 is moved horizontally (by the composition of two horizontal motions) and then vertically down, to the position as to release the said insulation cover as to cover the said compartment. Fifth step, the cover gripping mechanism 203 is moved vertically up. Sixth step, the gripping mechanism 205 and the gripped capped container may be moved horizontally (by the composition of two horizontal motions) and then vertically down, as to place the gripped capped container on the location where the capped container may be uncapped.

Figure 14A:
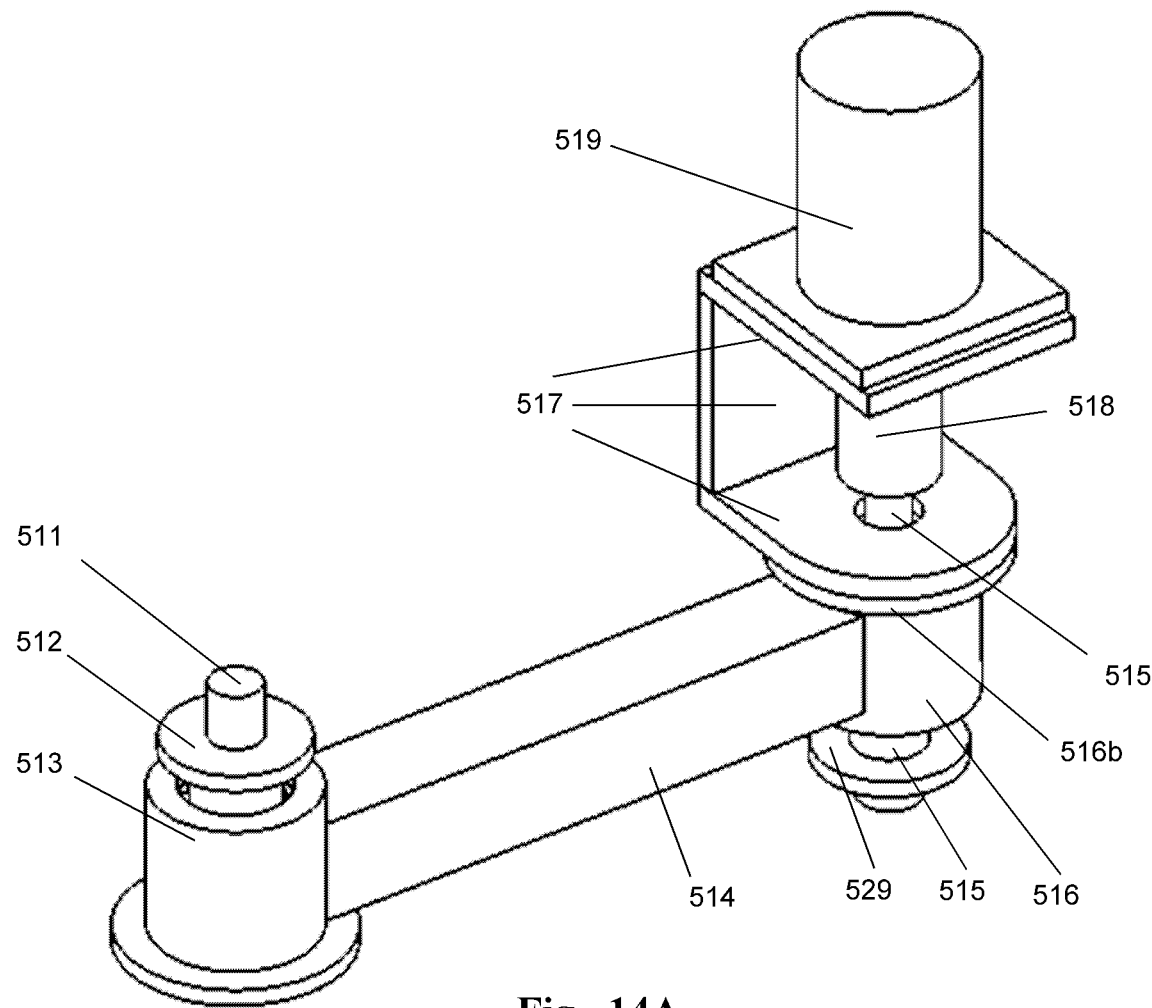
FIGS. 14A-14B show aerial views of parts of a motorized parallelogram mechanism.
Figure 14B:
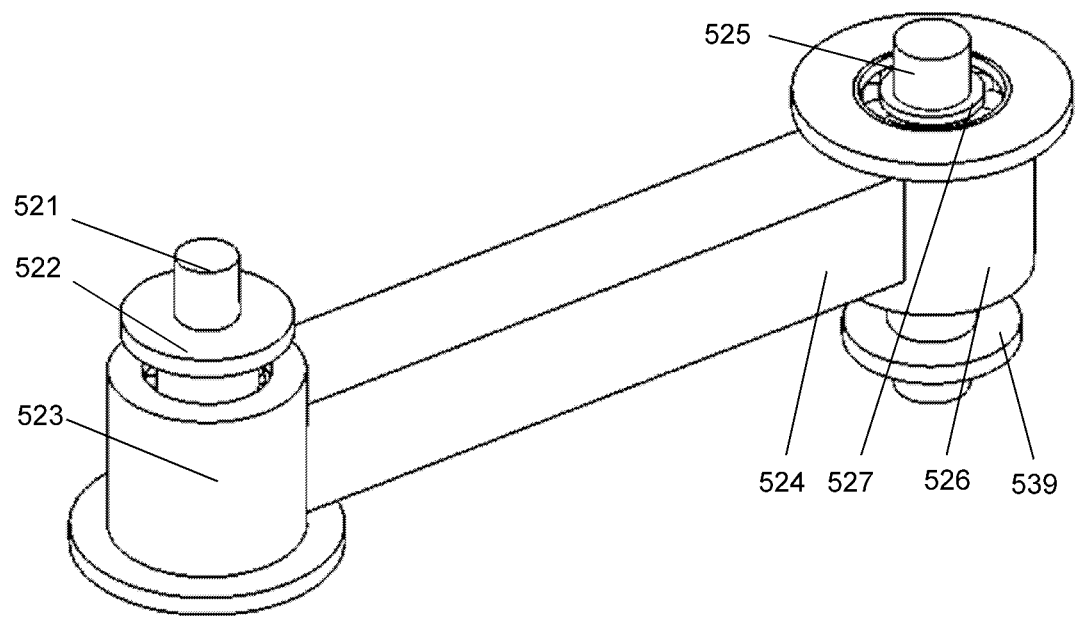
Figure 14C:
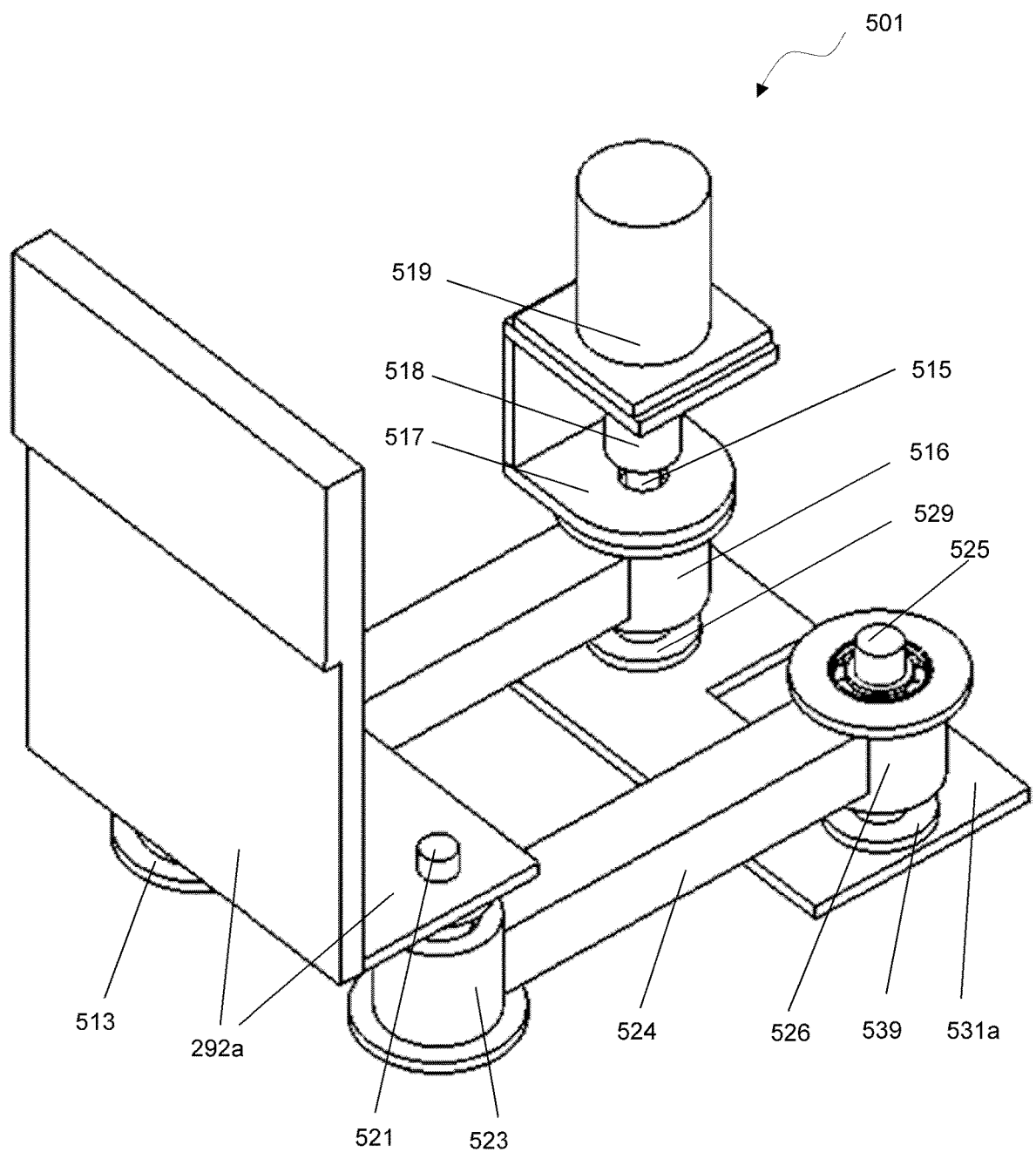
FIG. 14C shows an aerial view of the parallelogram mechanism.

In some embodiments, referring to FIGS. 14A-14C, a motorized parallelogram mechanism 501 comprises: bearing housings 513, 516, 523 and 526; shafts 511, 515, 521 and 525; a connector 514 configured to rigidly connect the bearing housings 513 and 516; a connector 524 configured to rigidly connect the bearing housings 523 and 526. The shaft 511 is rigidly connected to a flange 512. The shaft 515 is rigidly connected with a flange 529. The shaft 521 is rigidly connected to a flange 522. The shaft 525 is rigidly connected to a flange 539. The bearing housing 516 is rigidly connected to a flange 516b. A pair of bearings (hidden in figures) are configured to connect the shaft 511 and the bearing housing 513 so that the shaft 511 is constrained to rotate relative to the bearing housing 513 around the axis of the shaft 511 (see FIG. 14A). Similarly, another pair of bearings (hidden in figures) are configured to connect the shaft 515 and the bearing housing 516 so that the shaft 515 is constrained to rotate relative to the bearing housing 516 around the axis of the shaft 515. The motorized parallelogram mechanism 501 also comprises a motor 519 comprising a shaft and a base component, and a connecting component 517 configured to fixedly connect the base of the motor 519 to the flange 516b. The shaft of the motor 519 is configured to be connected to the shaft 515 by a coupling 518, so that the motor 519 may drive a rotation of the shaft 515 relative to the bearing housing 516, or equivalent relative to the connector 517. A pair of bearings (hidden in figures) are configured to connect the shaft 521 and the bearing housing 523 so that the shaft 521 is constrained to rotate relative to the bearing housing 523 around the axis of the shaft 521 (see FIG. 14B). Similarly, a pair of bearings 527 are configured to connect the shaft 525 and the bearing housing 526 so that the shaft 525 is constrained to rotate relative to the bearing housing 526 around the axis of the shaft 525, hence that the rotation of the connector 524 and the bearing housing 523 and the components attached on the bearing housing 523.

The motorized parallelogram mechanism 501 further comprises a support component 531a in the shape of a flat board, and a L-shaped rigid component 292a comprising a horizontal plate and an uneven vertical plate (see FIG. 14C). The flanges 529 and 539 are configured to be rigidly connected to the support component 531a. The flanges 512 and 522 are configured to be rigidly connected to the horizontal plate of the L-shaped rigid component 292a.

The axes of the shafts 511, 515, 521 and 525 are configured to be vertical. Moreover, the four axes are configured to form a parallelogram pattern: the distance between the axes of the shafts 515 and 525 and the distance between the axes of the shafts 511 and 521 are configured to be equal; the distance between the axes of the shafts 511 and 515 and the distance between the axes of the shafts 521 and 525 are configured to be equal. When the motor 519 rotates the shaft 515, the L-shaped rigid component 292a makes a circular movement without self-rotation relative to the support component 531a. In particular, the L-shaped rigid component 292a is moved in a planar motion; the direction of motion for each point of the L-shaped rigid component 292a, relative to the support component 531a is always horizontal; the trajectory of each point of the rigid component 292a in the planar motion is in a horizontal plane. In other words, the rigid component 292a makes a horizontal planar motion relative to the support component 531a.

It should be noted that the bearing housings 516 and 526 can be identical to each other and be positioned at a same height. The bearing housings 513 and 523 can be identical to each other and be positioned at a same height.

It should be noted the motorized parallelogram mechanism 501 comprises:

(1) a first link comprising the bearing housings 513 and 516, and their rigid connection 514;

(2) a second link comprising the shaft 511, the shaft 521, and their rigid connection (the L-shaped rigid component 292a);

(3) a third link comprising the bearing housings 523 and 526, and their rigid connections 524;

(4) a fourth link comprising the shaft 515, the shaft 525, and their rigid connection (the support component 531a);

(5) a first connection comprising the bearings (and accessories) configured to connect the shaft 511 of the second link and the bearing housing 513 of the first link, so that the first link is constrained to rotate relative to the second link around the axis of the shaft 511;

(6) a second connection comprising the bearings (and accessories), configured to connect the shaft 521 of the second link and the bearing housing 523 of the third link, so that the second link is constrained to rotate relative to the third link around the axis of the shaft 521;

(7) a third connection comprising the bearing 527 (and accessories) configured to connect the shaft 525 of the forth link and the bearing housing 526 of the third link, so that the fourth link is constrained to rotate relative to the third link around the axis of the shaft 525;

(8) a fourth connection comprising the bearings (and accessories) configured to connect the shaft 515 of the fourth link and the bearing housings 516 of the first link, so that the forth link is constrained to rotate relative to the first link around the axis of the shaft 515;

(9) the motorized mechanism configured to produce a rotation in the bearing housing 516 (of the first link) around the axis of the shaft 515 relative to the support component 531a (of the fourth link), the motorized mechanism comprising the motor 519, the fixed connection of the base component of the motor with the bearing housing 516, and the connection of the shaft of the motor 519 with the shaft 515.

It should be noted that the first connection discussed above connects the first link and the second link, so that the first link is constrained to rotate relative to the second link; the second connection connects the second link and the third link so that the second link is constrained to rotate relative to the third link; the third connection connects the third link and the fourth link, so that the third link is constrained to rotate relative to the fourth link; the fourth connection connects the fourth link and the first link, so that the first link is constrained to rotate relative to the fourth link; the motorized mechanism produces a motion of the first link relative to the fourth link.

It also should be noted that the angle of the rotation of the first link or third link relative to the fourth link is between 0 to 180 degrees, most often between 15 to 165 degrees.

Figure 15:
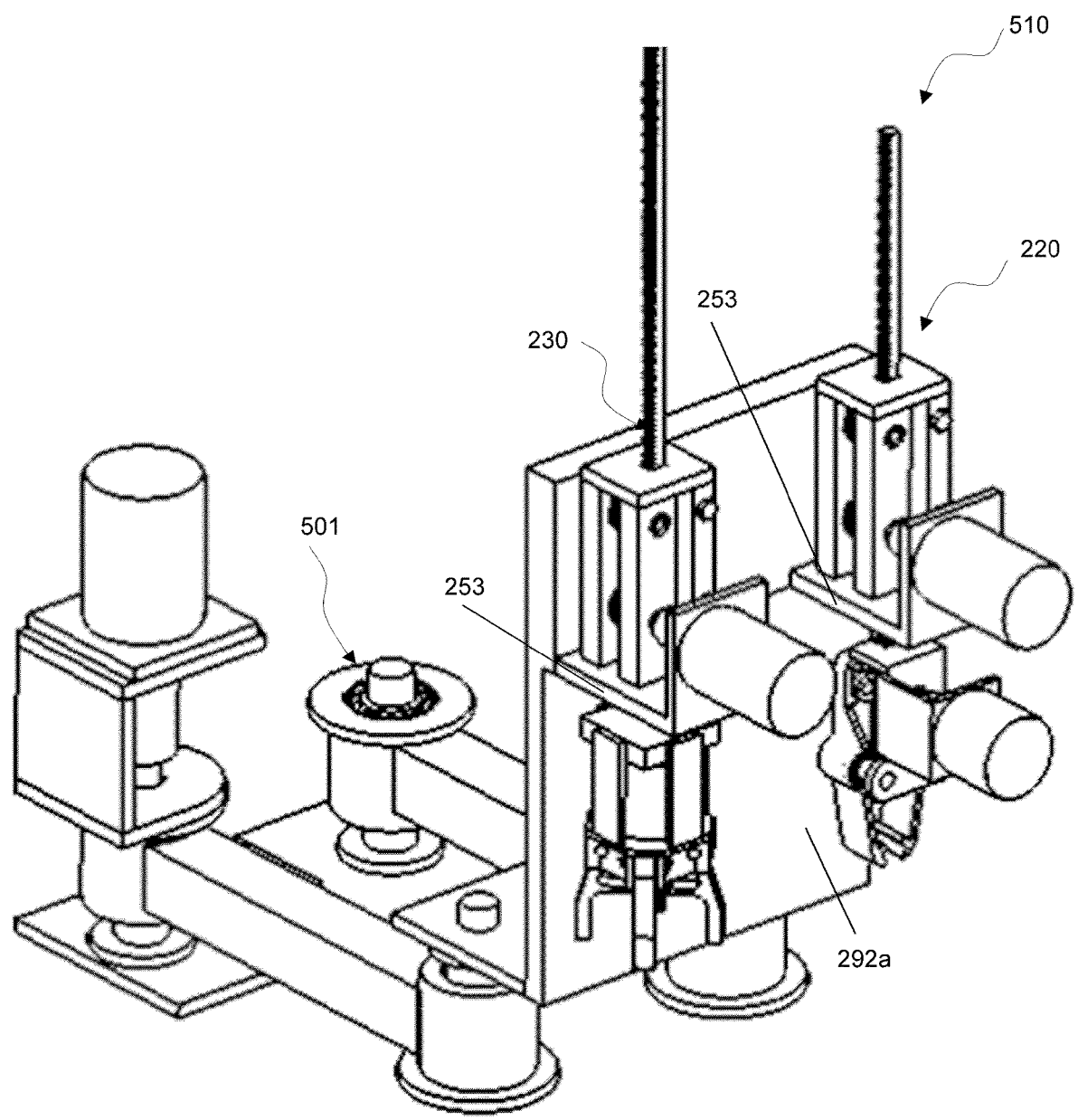
FIG. 15 shows a transfer sub-mechanism comprising a parallelogram mechanism, a cover lifting mechanism, a vertical transfer mechanism.

In some embodiments, referring to FIG. 15, a transfer sub-mechanism 510 comprises a motorized parallelogram mechanism 501, a cover lifting mechanism 220, and a vertical transfer mechanism 230. The support component 253 of the cover lifting mechanism 220 is configured to be rigidly connected to the rigid component 292a of the motorized parallelogram mechanism 501. Similarly, the support component 253 of the vertical transfer mechanism 230 is configured to be rigidly connected to the rigid component 292a of motorized parallelogram mechanism 501. As explained before, the rigid component 292a makes a horizontal planar motion relative to the support component 531a, so that the support component 253 of the vertical transfer mechanism 230 and the support component 253 of the cover lifting mechanism 220 also move in a horizontal planar motion relative to the support component 531a.

Figures 16A, 16B:
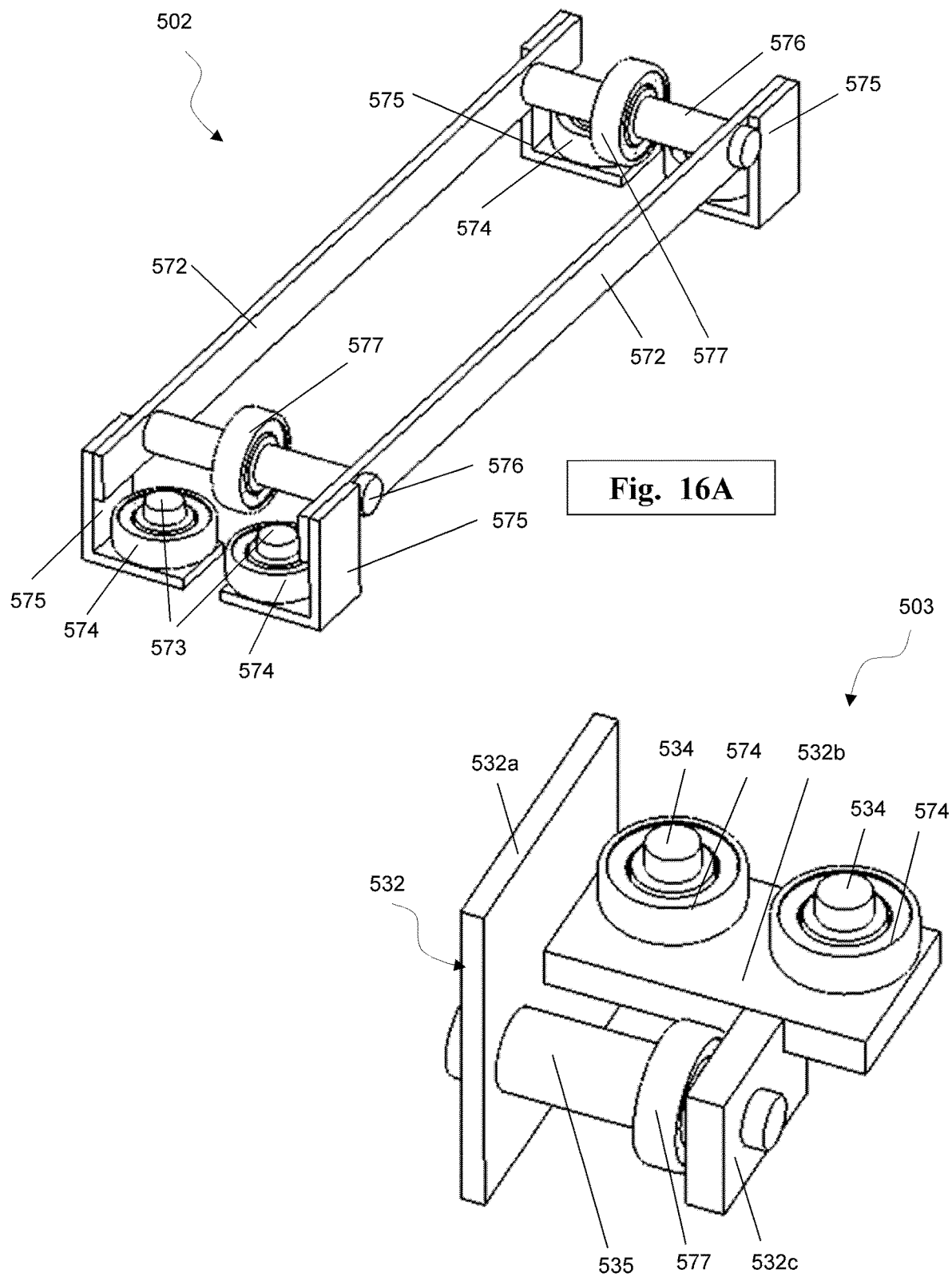
FIG. 16A shows an aerial view of a sliding device.
FIG. 16B shows an aerial view of another sliding device.

In some embodiments, referring to FIG. 16A, a sliding device 502 comprises a pair of support beams 572, a pair of wheels 577 and a pair of corresponding shafts 576. Each shaft 576 is rigidly connected to the two support beams 572. Each wheel 577 is mounted on a corresponding shaft 576, such that the wheel 577 is constrained to rotate relative to the shaft around the axis of the wheel 577. The axes of the wheels 577 are configured to be horizontal and mutually parallel. The sliding device 502 also comprises four wheels 574 and four corresponding shafts 573, wherein each wheel 574 is mounted on the corresponding shaft 573 so that the wheel 574 is constrained to rotate relative to the shaft 573 around the axis of the wheel 574. Each shaft 573 is rigidly connected to a support frame 572 by a connector 575. The axes of the four wheels 574 are configured to be vertical. The axes of the four wheels 574 are configured to form a rectangular pattern.

In some embodiments, referring to FIG. 16B, a sliding device 503 comprises: a rigid component 532 comprising vertical plates 532a and 532c and a horizontal plate 532b; a pair of wheels 574 and corresponding shafts 534; a wheel 577 and a corresponding shaft 535. Both shafts 534 are rigidly connected to the of the horizontal plate 532b of the rigid component 532. Each wheel 574 is mounted on the corresponding shaft 534 such that the wheel 574 is constrained to rotate relative to the shaft 534 around the axis of the wheel 574. The shaft 535 is rigidly connected with the vertical plates 532a and 532c. The wheel 577 is mounted on the corresponding shaft 535 such that the wheel 577 is constrained to rotate relative to the shaft 535 around the axis of the wheel 577. The axes of the shafts 534 are configured to be vertical, and the axis of the shaft 535 is configured to be horizontal.

Figure 16C:
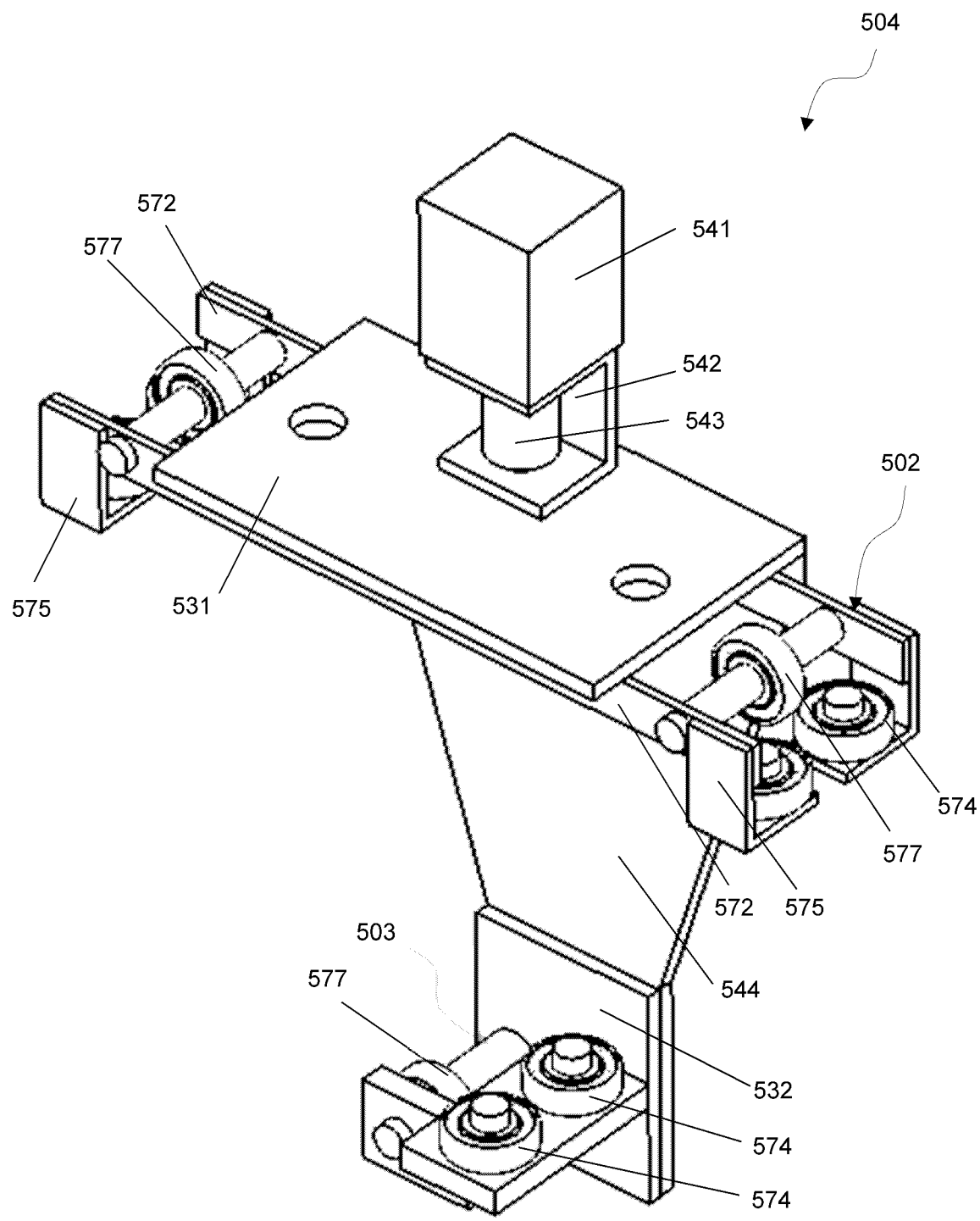
FIGS. 16C-16D show aerial views of a horizontal sliding sub-mechanism comprising both sliding devices.
Figure 16D:
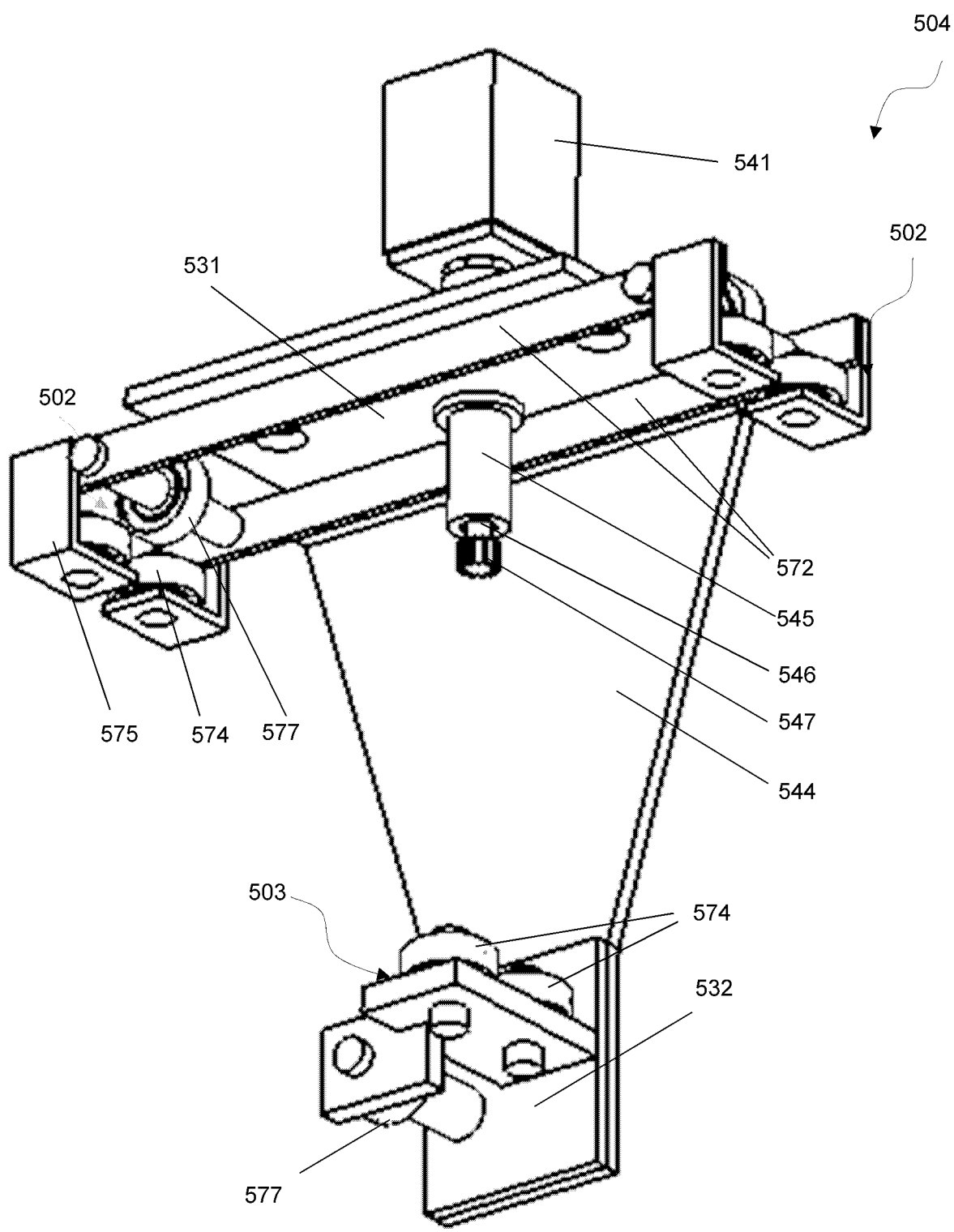

In some embodiments, referring to FIGS. 16C-16D, a horizontal sliding sub-mechanism 504 comprises a sliding device 502, a sliding device 503, a support component 531 in the shape of plate, a connector 544 comprising a vertical plate, a gear 547, a shaft 546 comprising a vertical axis, a bearing housing 545, a connector 542 and a motor 541 comprising a shaft and a base component. A pair of bearings (hidden in figures) are configured to connect the bearing housing 545 and the shaft 546, so that the shaft 546 is constrained to rotate relative to the bearing housing 545 around the axis of the shaft 546. The shaft 546 is rigidly connected to and concentric with the gear 547. The bearing housing 545 is rigidly connected to the support component 531. The support beams 572 of the sliding device 502 are configured to be rigidly connected to the support component 531. The connector 544 is configured to rigidly connect the support component 531 to the vertical plate 532a of the sliding device 503. The base of the motor 541 is fixedly connected to the support component 531 by the connector 542. The shaft of the motor 541 is connected to the shaft 546 via a coupling 543, so that the motor 541 may drive a rotation of the shaft 546 and the gear 547, relative to the support component 531.

Figure 16E:
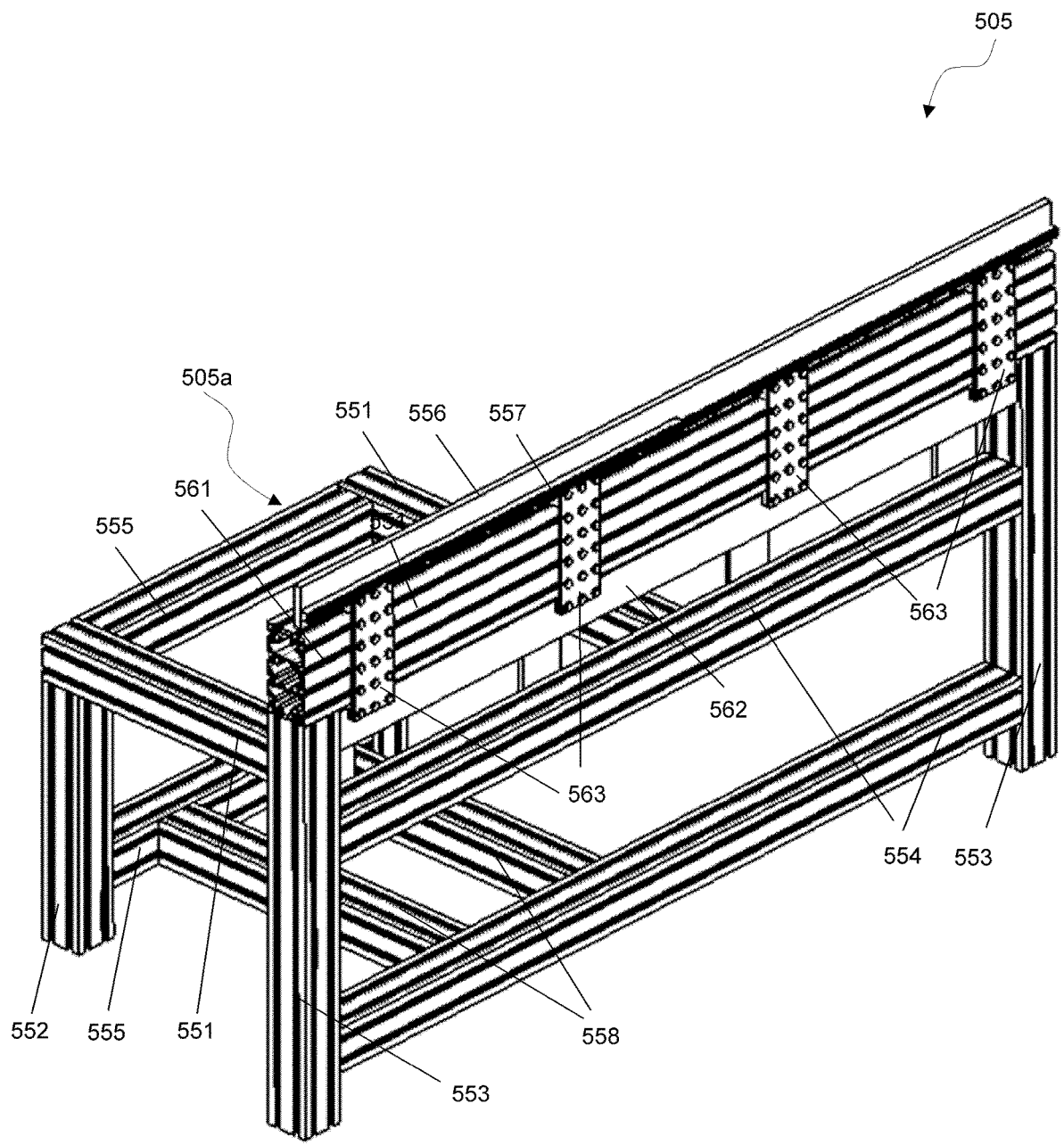
FIG. 16E shows an aerial view of a rail mechanism.

In some embodiments, referring to FIG. 16E, a rail mechanism 505 comprises: two parallel linear rails 556 and 562; a rack 567; some connecting plates 565 and 563; a plurality of connectors 564 and a support frame 505a comprising aluminum profiles 551, 552, 553, 554, 555, 558 and 561, and connecting accessories (the connecting accessories are not shown in figure but are standard). See FIG. 16F for another aerial view of the rail mechanism 505, although FIG. 16F also shows the horizontal sliding mechanism 504 in addition to the rail mechanism 505. The linear rail 556 or 562 comprises rectangular cross sections (also see FIG. 16G, although FIG. 16G also shows parts of the horizontal sliding mechanism 504). The linear rails 556 and 562 are both rigidly connected to the aluminum profile 561 by the connectors 564, wherein the connectors 564 are rigidly connected to the connecting plates 565 and 563, via a plurality of bolts and other connecting accessories. The connecting plates 565 are also configured to rigidly connect the aluminum profile 561 and one of the aluminum profiles 554, via some connecting accessories, as to reinforce the rigidity of the support frame 505a. The rack 557 is rigidly connected to the linear rail 556, by bolts or other types of accessories. The rack 557, linear rails 556 and 562 are configured to be parallel to a same horizontal direction; and each of the linear rails 556 and 562 comprises a top horizontal surface, a bottom horizontal surface, and two vertical side surfaces.

Figure 16F:
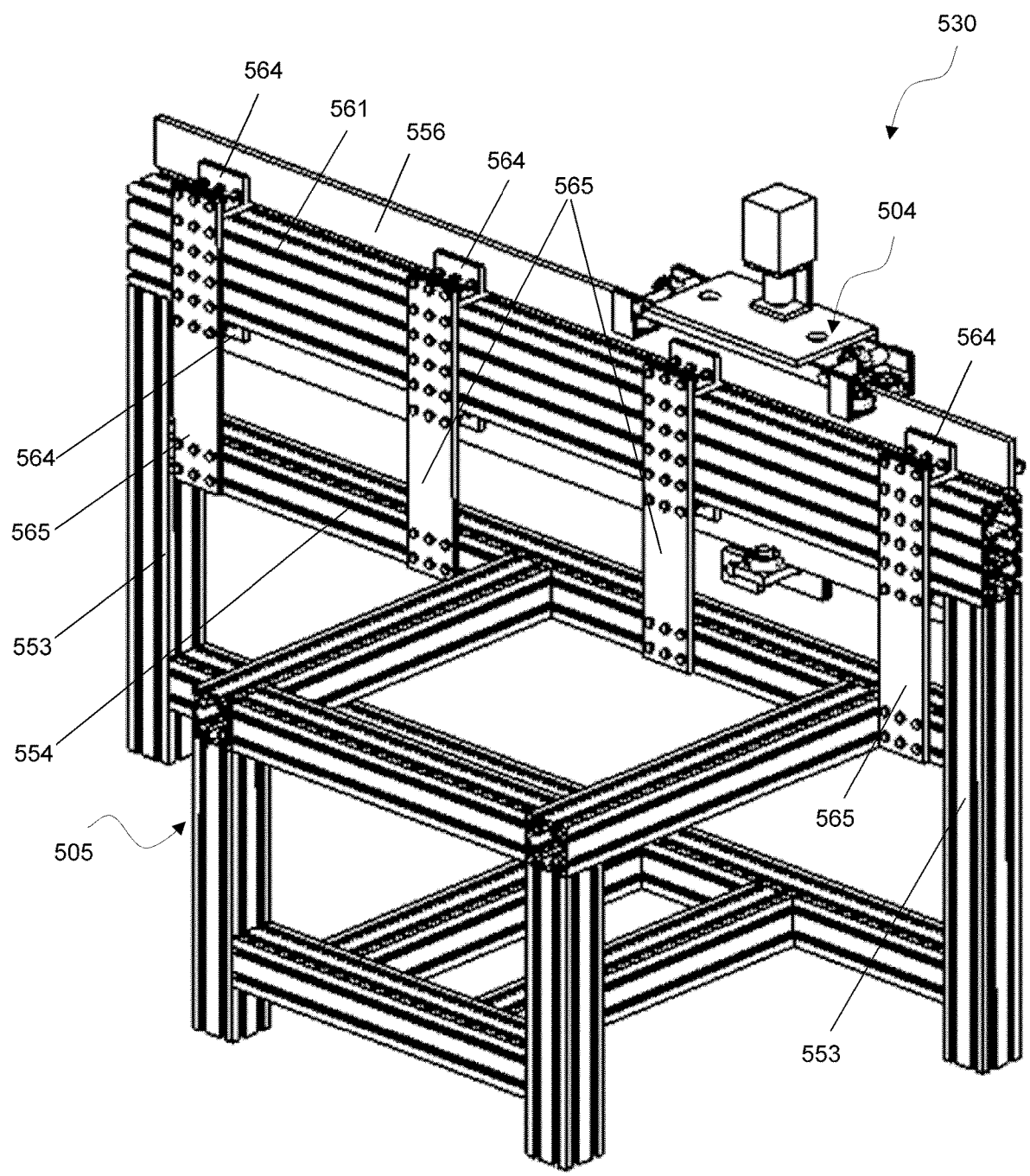
FIG. 16F shows an aerial view of a horizontal motion mechanism which comprises the horizontal sliding sub-mechanism and the rail mechanism.
Figure 16G:
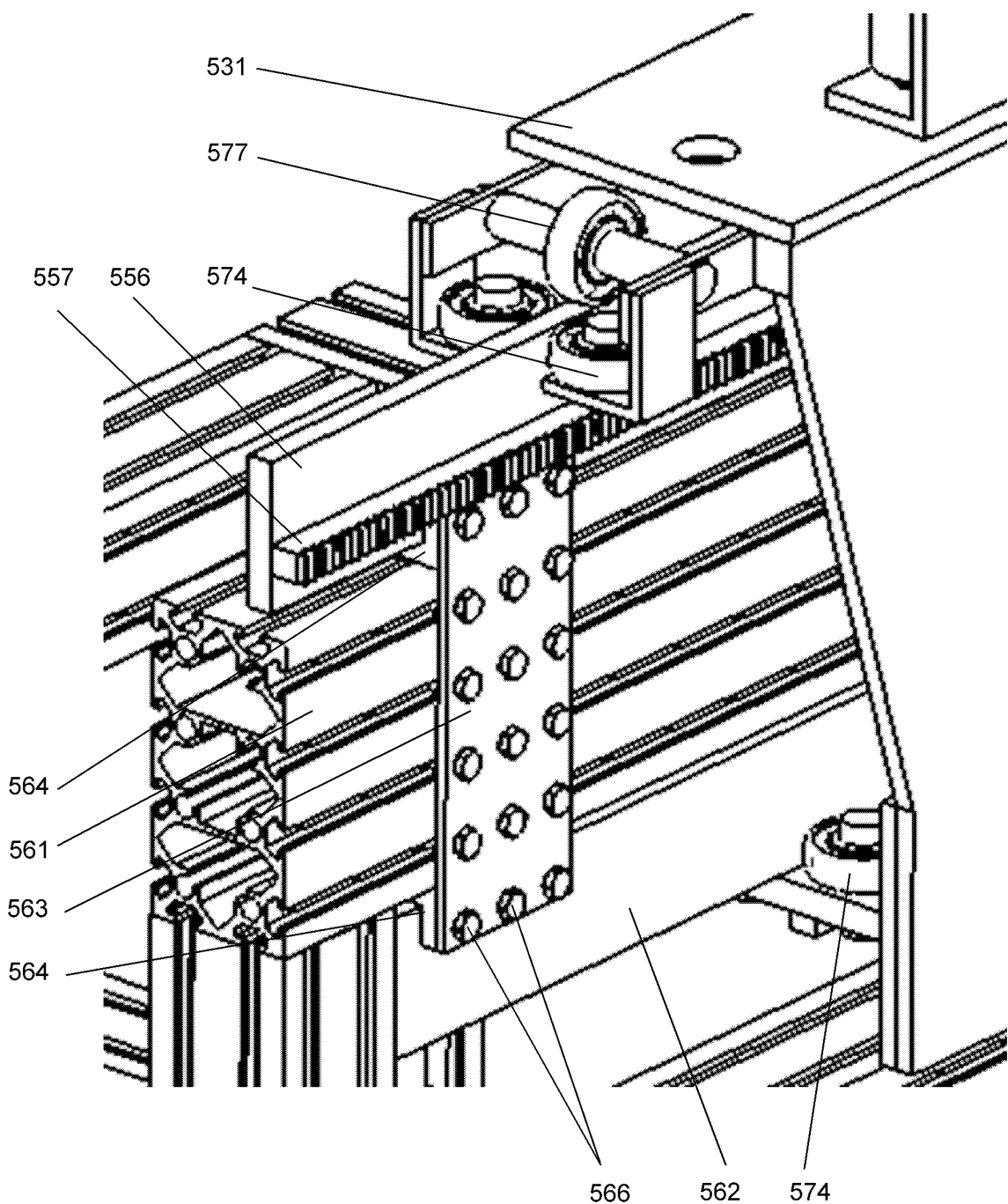
FIGS. 16G-16H show aerial views of parts of the horizontal motion mechanism.
Figure 16H:
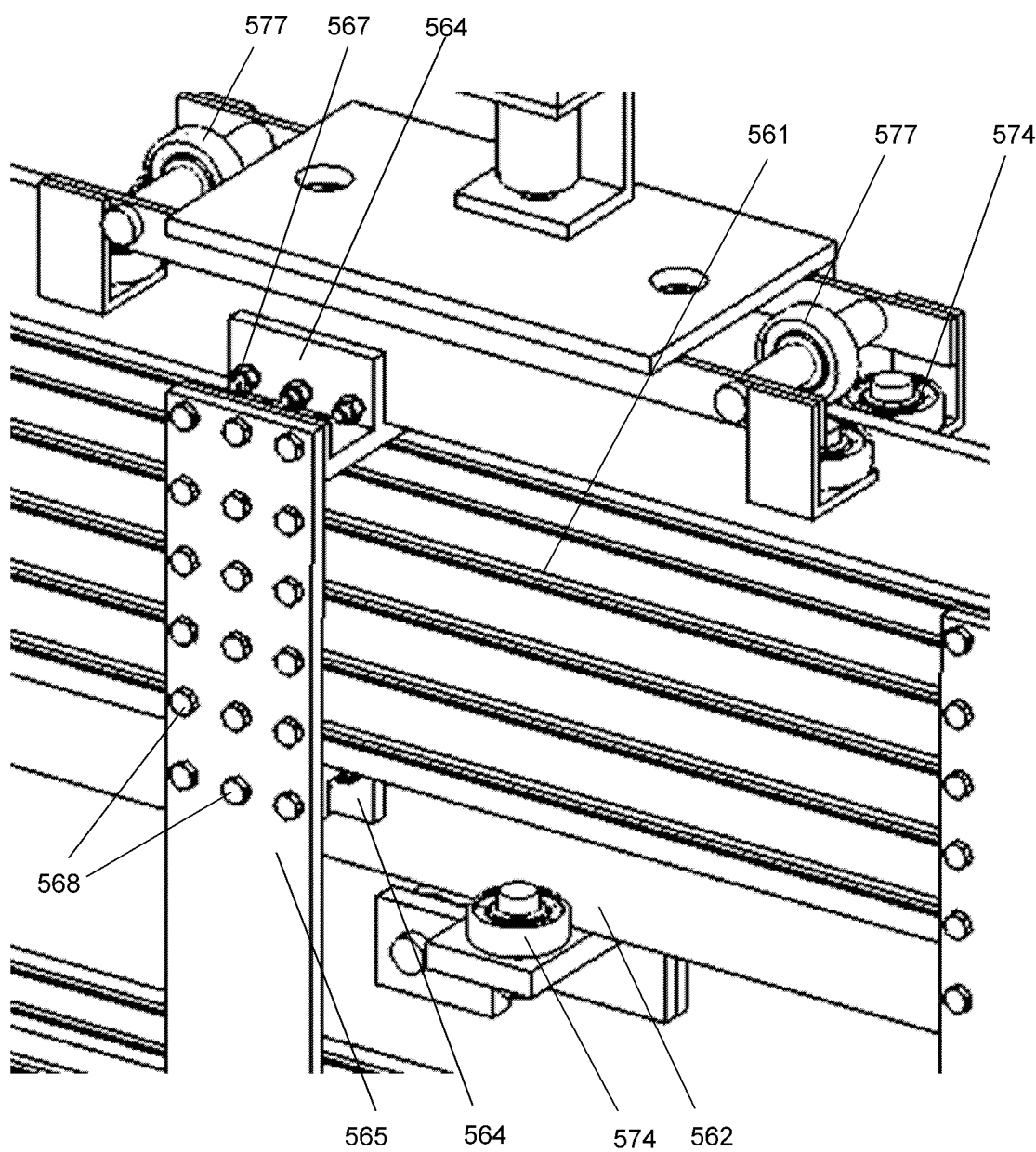

In some embodiments, referring to FIGS. 16F-16H, a horizontal motion mechanism 530 comprises a horizontal sliding sub-mechanism 504 and a rail mechanism 505. The wheels 577 of the sliding device 502 of the horizontal sliding sub-mechanism 504 are configured to roll on the top horizontal surface of the linear rail 556; and the wheels 574 of the sliding device 502 of the horizontal sliding sub-mechanism 504 are configured to roll on the side surfaces of the linear rail 556. (see FIGS. 16G-16H). The wheel 577 of the sliding device 503 of the horizontal sliding sub-mechanism 504 is configured to roll on the bottom horizontal surface of the linear rail 562; and the wheels 574 of the device 503 of the horizontal sliding sub-mechanism 504 are configured to roll on the side surfaces of the linear rail 562. The gear 547 of the horizontal sliding sub-mechanism 504 is engaged with the rack 557 of the rail mechanism 505. When the motor 541 of the horizontal motion mechanism 504 can drive the rotation of the gear 547, the support component 531 of the horizontal sliding sub-mechanism 504 can move linearly along the linear rails 556 and 562. The range of the linear motion may be limited by means of physical barriers.

Figure 17A:
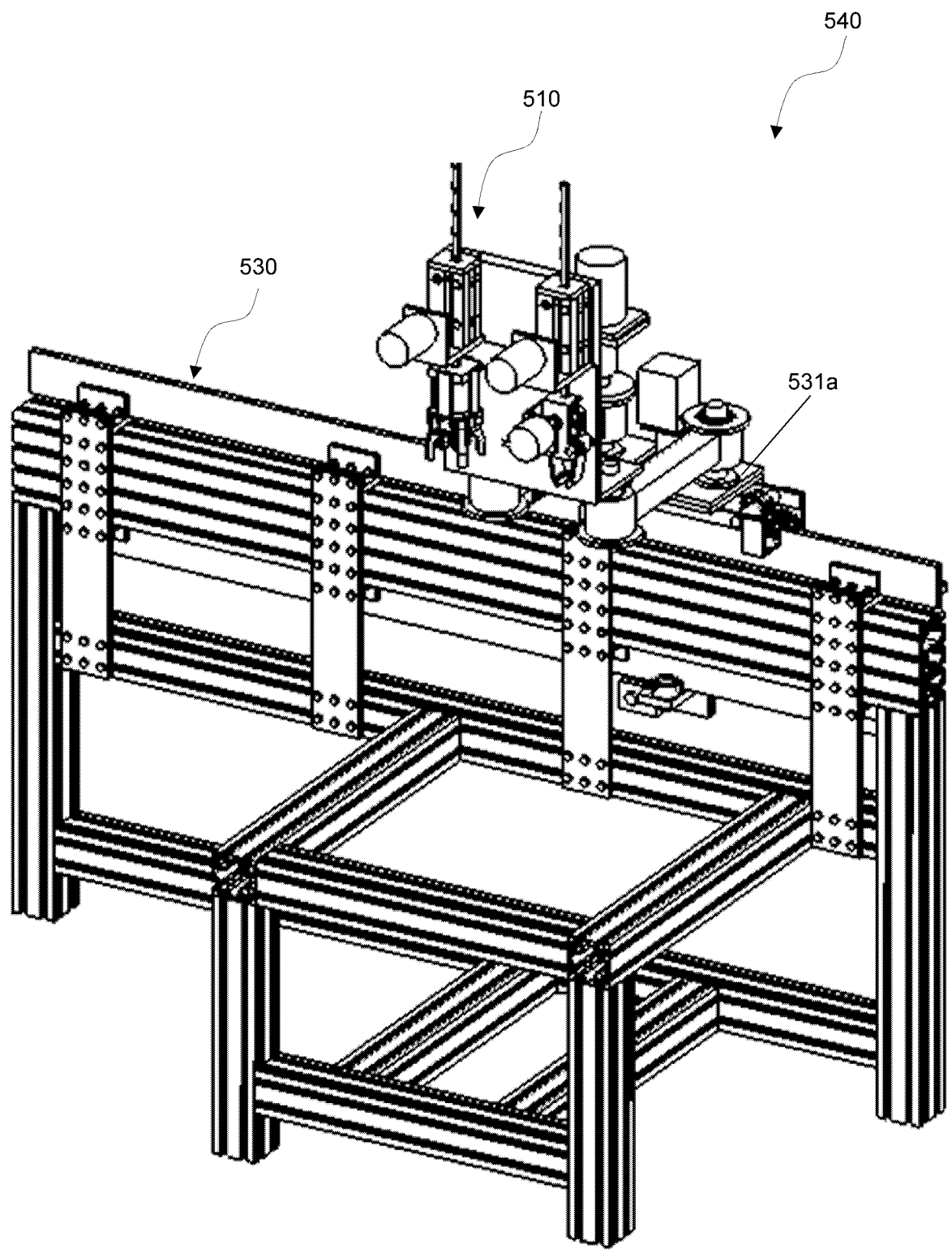
FIG. 17A shows an aerial view of a transfer mechanism.

In some embodiments, referring to FIG. 17A, a transfer apparatus 540 comprises a transfer sub-mechanism 510 and a horizontal motion mechanism 530. The support component 531a of the transfer sub-mechanism 510 is rigidly connected to the support component 531 of the horizontal motion mechanism 530, so that the support component 531 may slide linearly along the linear rails 556 and 562, as driven by the motor 541 of the horizontal motion mechanism 530.

It should be noted that the support component 531a and the support component 531 may be made as a single part.

The support component 487 will be referred to as a first support component of the transfer apparatus 540; the support component 253 of the vertical transfer mechanism 230 will be referred to as a second support component of the transfer apparatus 540; the support component 531a of the motorized parallelogram mechanism 501 will be referred to as a third support component of the transfer apparatus 540; the support frame 505a of the rail mechanism 505 will be referred to as a fourth support component of the transfer apparatus 540.

It should be noted that the transfer apparatus 540 comprises the following:

(1) the gripping mechanism 205, wherein the gripping mechanism 205 comprises the first support component 487, four symmetric gripping devices 481, and a motorized mechanism configured to move the four grippers relative to the support component 487, as to grip or release a cap 112 of a capped container 110; wherein the motorized mechanism comprises the motor 491, the sliding component 482, the rigid component 483 and the screw nut 495, etc.

(2) the cover gripping mechanism 203, wherein the cover gripping mechanism comprises the support component 263, a pair of V-shaped grippers, and a motorized mechanism configured to rotate the pair of grippers relative to the support component 263 around the axes of the shafts 268a and 268b, as to grip or release an insulation cover 141; wherein the motorized mechanism comprises the motor 261, the coupling 262, the shafts 265a, 265b, 264, 268a and 268b, bearings 267a, 267b, etc.;

(3) a first motion mechanism configured to move the support component 487 of the gripping mechanism 205, linearly in the vertical direction, relative to the second support component 253 (which is a member of the vertical motion mechanism 204), wherein the first motion mechanism comprises the vertical motion mechanism 204, the rigid connection of the rack 271 in the vertical motion mechanism 204 with the support component 487 of the gripping mechanism 205;

(4) a second motion mechanism configured to drive the second rigid component 253 in a horizontal planar motion, relative to the third support component 531a, wherein the second motion mechanism comprises the motorized parallelogram mechanism 501, and the rigid connection of the rigid component 292a with the second support component 253 (which is a member of the vertical motion mechanism 204).

(5) a third motion mechanism configured to move the third support component 531a linearly in a horizontal direction, relative to the fourth support component 505a, wherein the third motion mechanism comprises the horizontal motion mechanism 530 and the rigid connection of the rigid component 531 with the third support component 531a;

(6) a fourth motion mechanism configured to move the support component 263 of the cover gripping mechanism 203, linearly in the vertical direction, relative to the support component 253 of the vertical motion mechanism 202, wherein the fourth motion mechanism comprises the vertical motion mechanism 202, the rigid connection of the second rigid component 292a with the support component 253 of the vertical motion mechanism 202, and the rigid connection of the rack 244 in the vertical motion mechanism 202 with the support component 263 of the cover gripping mechanism 203. It should be noted that, in the transfer apparatus 540, the support component 253 of the mechanism 202 is rigidly connected with the rigid component 292a, which is a member of the mechanism 240. Thus, the fourth motion mechanism moves the support component 263 of the cover gripping mechanism 203 relative to the support component 292a.

It should be noted that the third support component 531a of the transfer apparatus 540 is configured to be moved in a horizontal translation relative to the fourth support component 505a, and the second support component 253 of the transfer apparatus 540 is configured to be moved in a horizontally planar motion, which is also a circular motion without self-rotation, relative to the third support component 531a. On the other hand, the support component 487 of the gripping mechanism 205 may be moved vertically relative to the second rigid component 253. Thus, the support component 487 of the gripping mechanism 205 may be moved by a composition of three motions relative to the fourth support component 505a. Similarly, the support component 263 of the cover gripping mechanism 203 may also be moved vertically relative to the second rigid component 251, and thus moved by a composition of three motions relative to the fourth support component 505a.

It should be noted that a computer may be used to control the above described mechanisms and apparatuses, especially the degrees of rotations or speeds of the motors 541, and of the motor 245 in the gripping mechanism 205 (or of the motor 245 of the cover gripping mechanism 203), so that the gripping mechanism 205 (or respectively, the cover gripping mechanism 203) can accurately grip a capped container 110 (or respectively, an insulation cover 141).

Figure 17B:
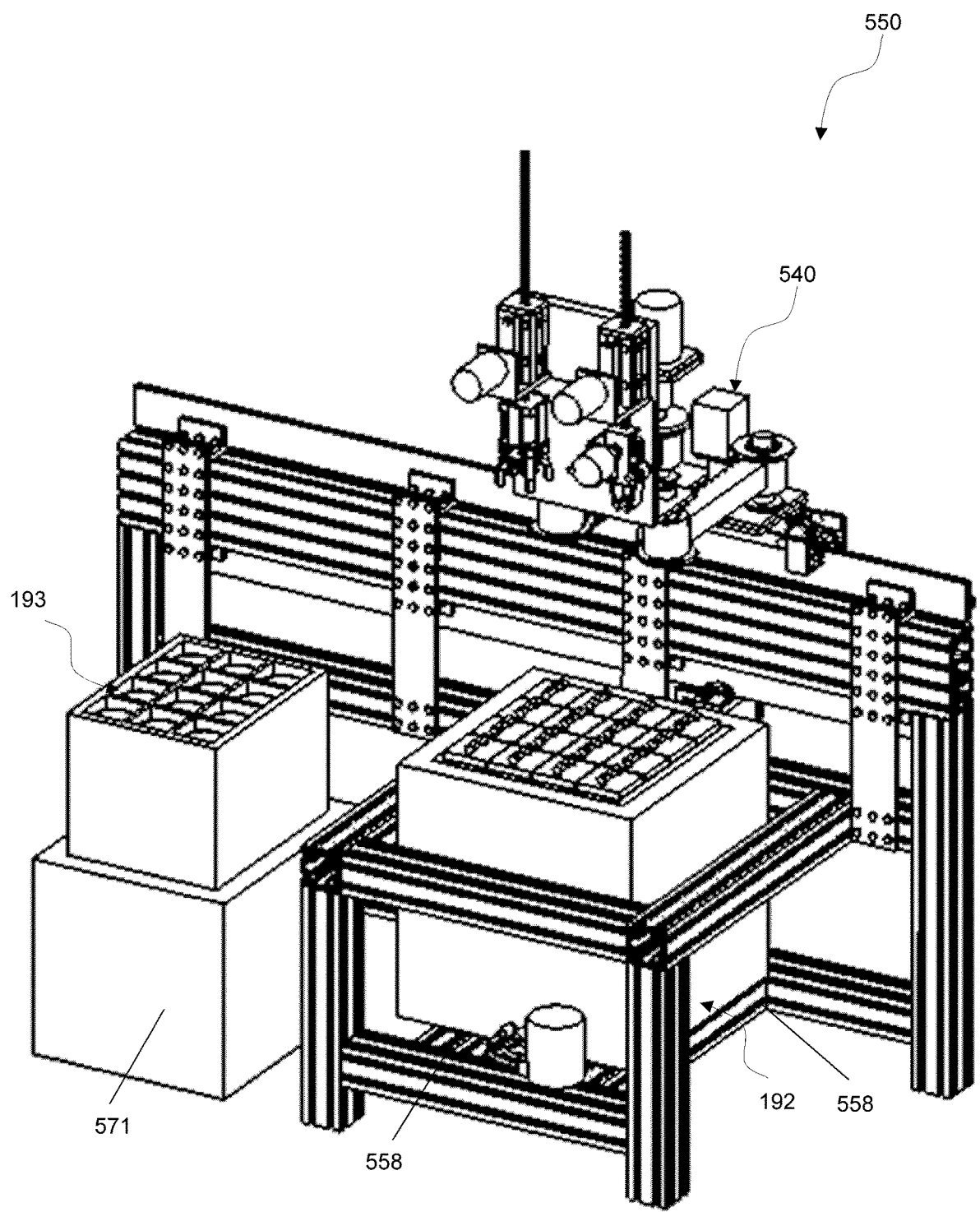
FIG. 17B shows an aerial view of a storage and transfer system.

In some embodiments, referring to FIG. 17B, a storage and transfer system 550 comprises a storage apparatus 192, a transfer apparatus 540, one or more transport boxes 193, and a holding platform 571. One transport box 193 may be placed on the holding platform 571.

The transfer apparatus 540 may transfer the capped containers 110 contained in the transport box 193, placed on the holding platform 571, to a storage compartment of the storage apparatus 192, as follows. At first step, the gripping mechanism 205 of the transfer apparatus 540 may be moved horizontally (by the composition of two planar motions), and then vertically down to a position as to grip a capped container in a transport box 193. Then, at step 2, the gripping mechanism 205, together with the gripped capped container, may be moved vertically up. At step 3, the cover gripping mechanism 203 may be moved horizontally (by the composition of two planar motions) and then vertically down, to a position as to grip an insulation cover 141 of the said storage compartment, while the gripping mechanism 205 may be moved horizontally together. At step 4, the cover gripping mechanism 203 may be moved vertically up, together with the gripped insulation cover 141. At step 5, the gripping mechanism 205 of the transfer apparatus 540 may be moved horizontally (by the composition of two planar motions) and then vertically down, to a position as to release the said capped container into the said storage compartment, while the cover gripping mechanism 203 may also be moved horizontally together. At step 6, the gripping mechanism 205 is moved vertically up. At step 7, the cover gripping mechanism 203 may be moved horizontally (by the composition of two horizontal motions-) and then vertically down, to a position as to release back the gripped insulation cover 141 on the said storage compartment. Thus, the transfer apparatus 540 has transferred a capped container from a transport box 193 to the storage compartment of the storage apparatus 192. A computer may be used to direct, control, and to record the above described process.

In the storage and transfer system 550 as shown in FIG. 17B, the transfer apparatus 540 can transfer a capped container contained in a specific compartment of the storage apparatus 192 to a specific location, as follows. First step, the cover gripping mechanism 203 of the cover lifting mechanism 220 of the transfer apparatus 540 may be moved horizontally (by the composition of two horizontal motions) and then vertically down, to a position as to grip the insulation cover 141 which covers the specific compartment. Second step, the cover gripping mechanism 203, together with the gripped cover, are moved vertically up. Then the gripping mechanism 205 in the transfer apparatus 540 may be moved horizontally (by the composition of two horizontal motions) and then vertically down, to the inside of the said compartment, and then grip and hold the highest positioned capped container therein. Third step, the gripping mechanism 205, together with the gripped capped container, are moved vertically up, to the outside of the storage compartment. Fourth step, the cover gripping mechanism 203 is moved horizontally (by the composition of two horizontal motions) and then vertically down, to the position as to release back the said insulation cover as to cover the compartment. Fifth step, the cover gripping mechanism 203 is moved vertically up. Sixth step, the gripping mechanism 205 and the gripped capped container may be moved horizontally (by the composition of two horizontal motions) and then vertically down, as to release the gripped capped container on the specific location. Seventh step, the cover gripping mechanism 205 is moved vertically up.

Figure 18A:
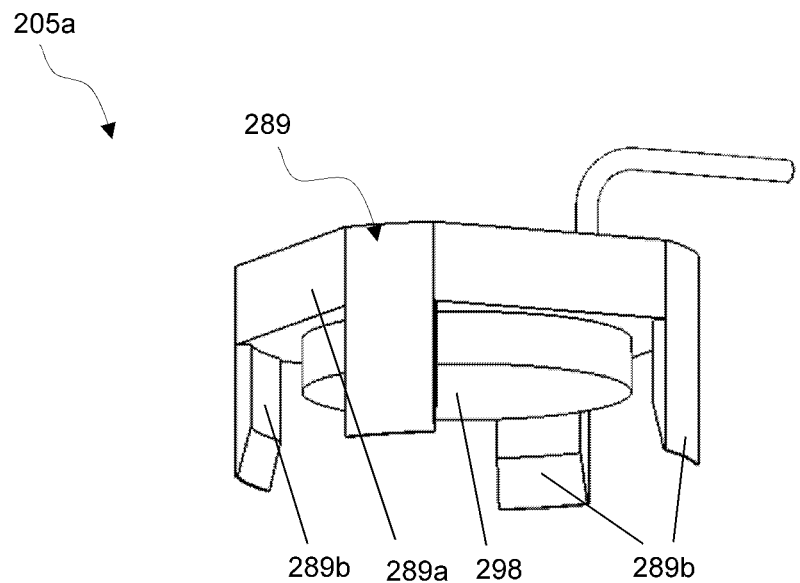
FIGS. 18A-18B show aerial views of a gripping mechanism.
Figure 18B:
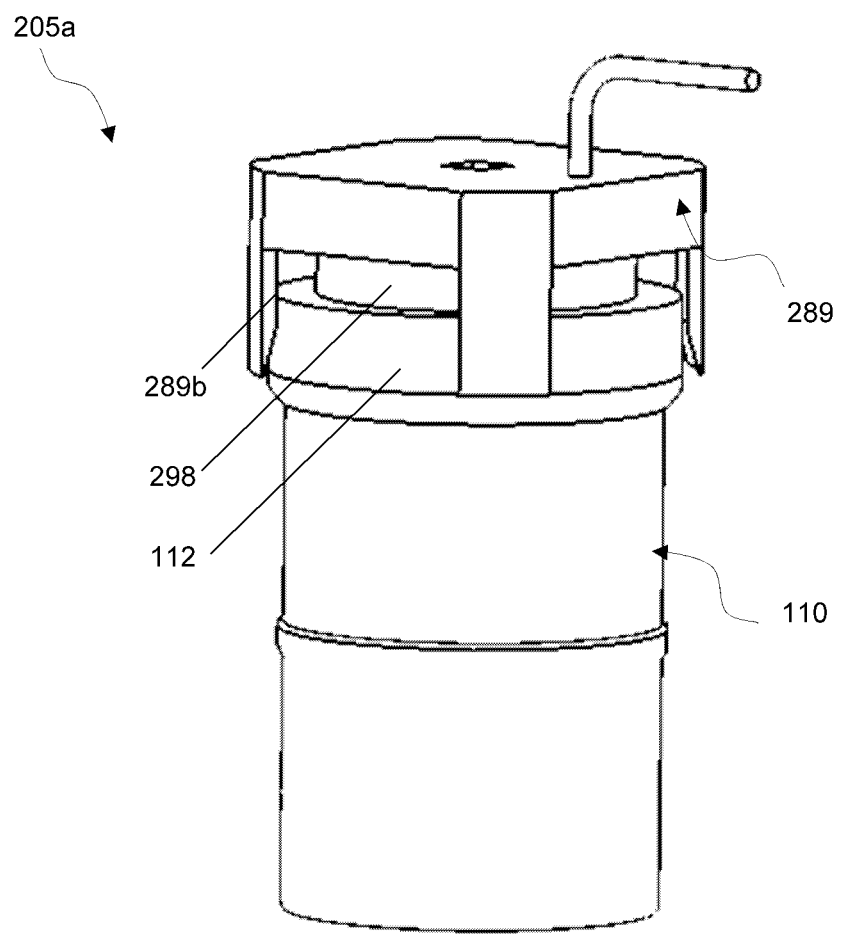

In some embodiments, referring to FIGS. 18A-8B, a gripping mechanism 205a comprises: a guiding device 289 comprising a connector 289a and four legs 289b which are all rigidly joined; and a gripper 298 configured to grab and hold the cap 112 of a capped ingredient container 110, by gripping a surface (at the top) of the cap 112. Parts of the surfaces of the four legs 289b are configured to form a part of a cone surface. The four legs 289b are configured to be cyclically symmetric under the rotation of 90 degrees around a vertical axis, to be referred to as the axis of the guiding device 289. The gripper 298 is configured to be mounted on the connector 289a of the guiding device 289. The four legs 289b of the guiding device 289 are configured to guide the axis of the cap 112 to coincide or nearly coincide with the axis of the guiding device 289 when the gripping device 205a is used to grip a cap 112. The connector 289a of guiding device 289 may be referred to as a support component of the gripping mechanism 205a. In particular, the connector 289a is a rigid component.

It should be noted that the gripper 298 in the gripping mechanism 205a may optionally be a vacuum chuck or a sucker gripper.

Figure 18C:
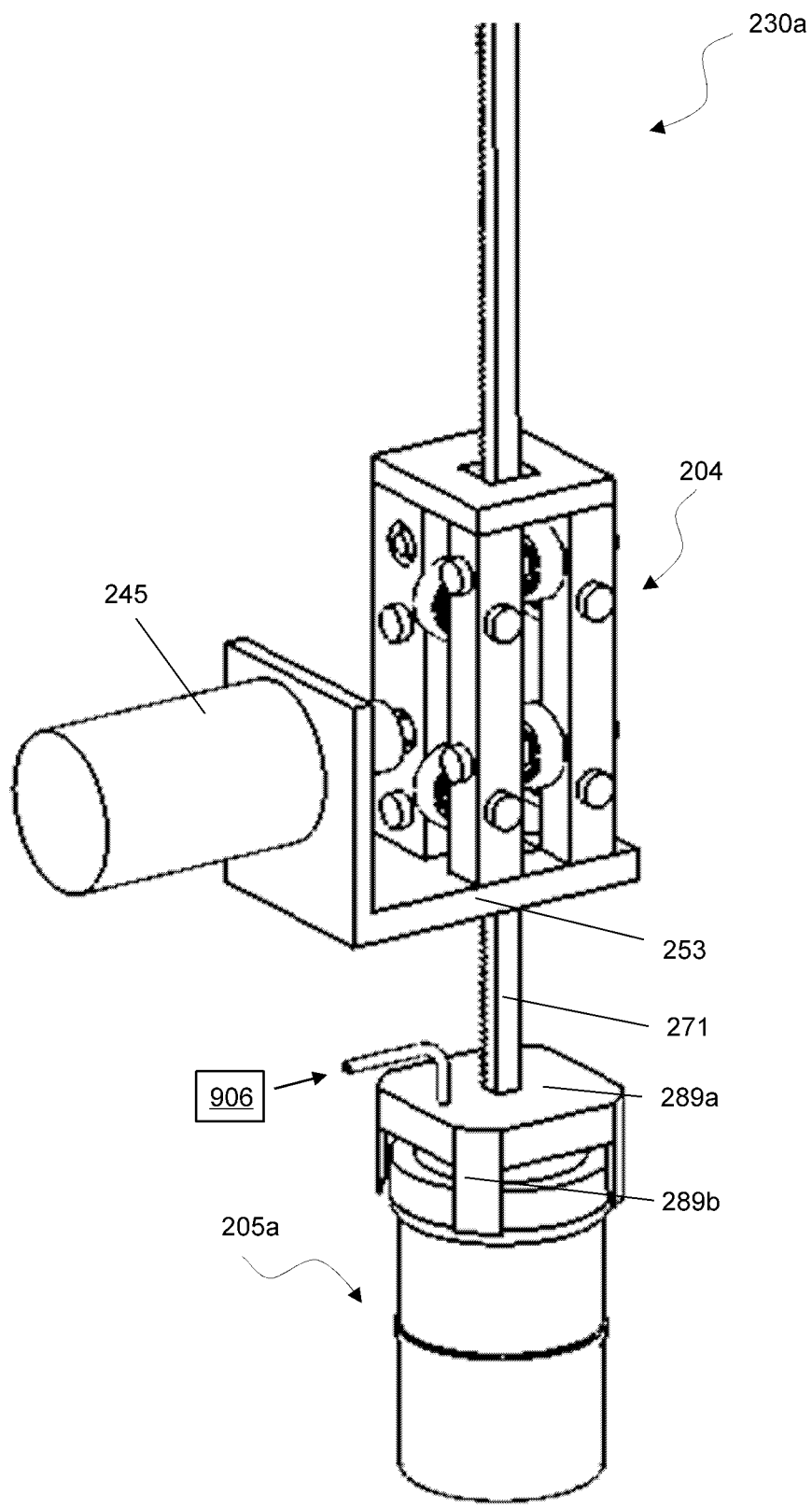
FIG. 18C shows an aerial view of a vertical transfer mechanism.

In some embodiments, referring to FIG. 18C, a vertical transfer mechanism 230a comprises a vertical motion mechanism 204, a gripping mechanism 205a, wherein the support component 289a of the gripping mechanism 205a is rigidly connected with the bottom part of the rack 271 of the vertical motion mechanism 204 (see FIG. 18C). As explained, the rack 271 is configured to be positioned vertically. The guiding device 289 of the gripping mechanism 205a may be moved up and down with the rack 271, relative to the support component 253 of the vertical motion mechanism 204. The gripping mechanism 205a may grip the cap 112 of a capped container 110, and then the capped container 110 may move vertically up or down with the gripping mechanism 205a, when the rack 271 is moved up or down relative to the support component 253, as driven by the motor 245 in the vertical motion mechanism 204. The support component 253 may be referred to as the support component of the vertical transfer mechanism 230a.

It should be noted that the vertical transfer mechanism 230 of the transfer apparatus 340 may be substituted by the vertical transfer mechanism 230a, wherein the support component 253 of the vertical transfer mechanism 230a is configured to be rigidly connected to the rigid component 292 of the horizontal motion mechanism 240.

It should be noted that the vertical transfer mechanism 230 of the transfer apparatus 540 may be substituted by the vertical transfer mechanism 230a, wherein the support component 253 of the vertical transfer mechanism 230a is configured to be rigidly connected to the rigid component 292a of the motorized parallelogram mechanism 501.

Figure 19A:
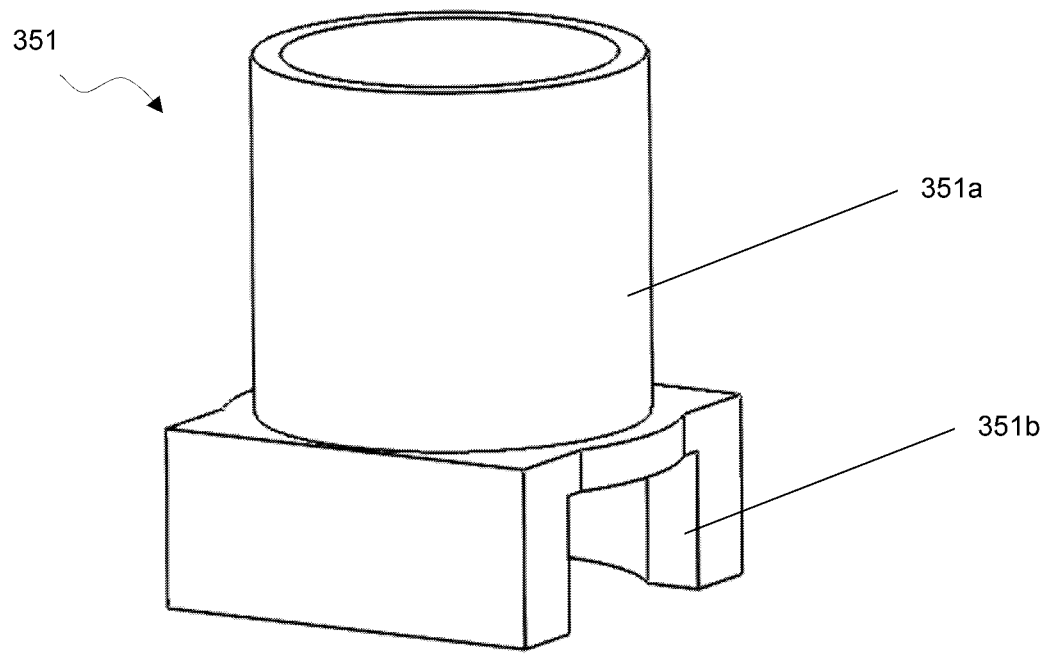
FIGS. 19A-19I show aerial views of parts of a cap opening sub-mechanism.
Figure 19B:
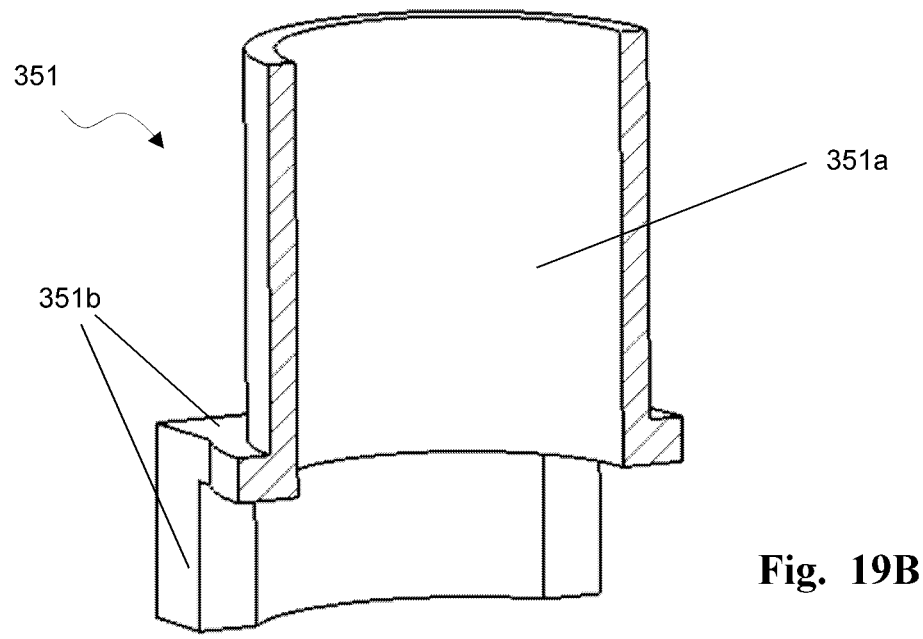
Figure 19C:
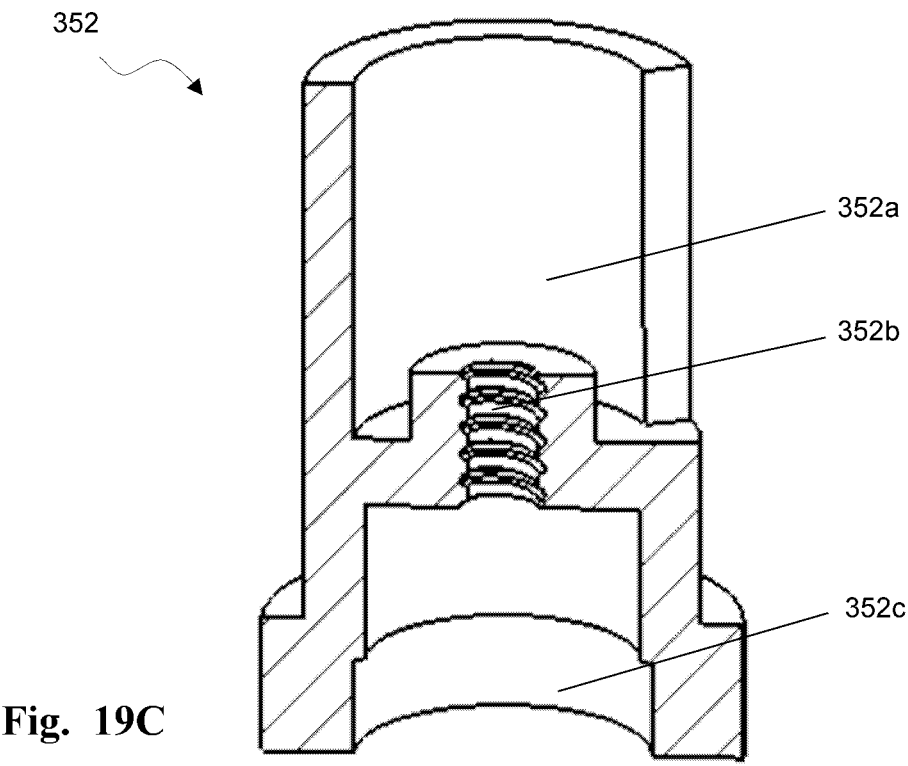
Figure 19D:
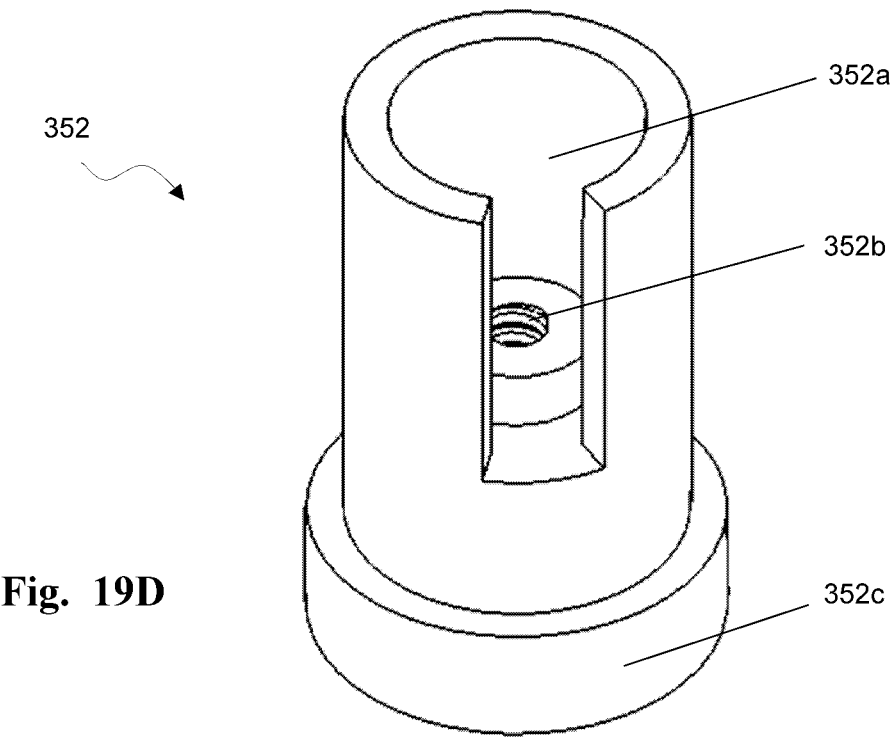
Figure 19E:
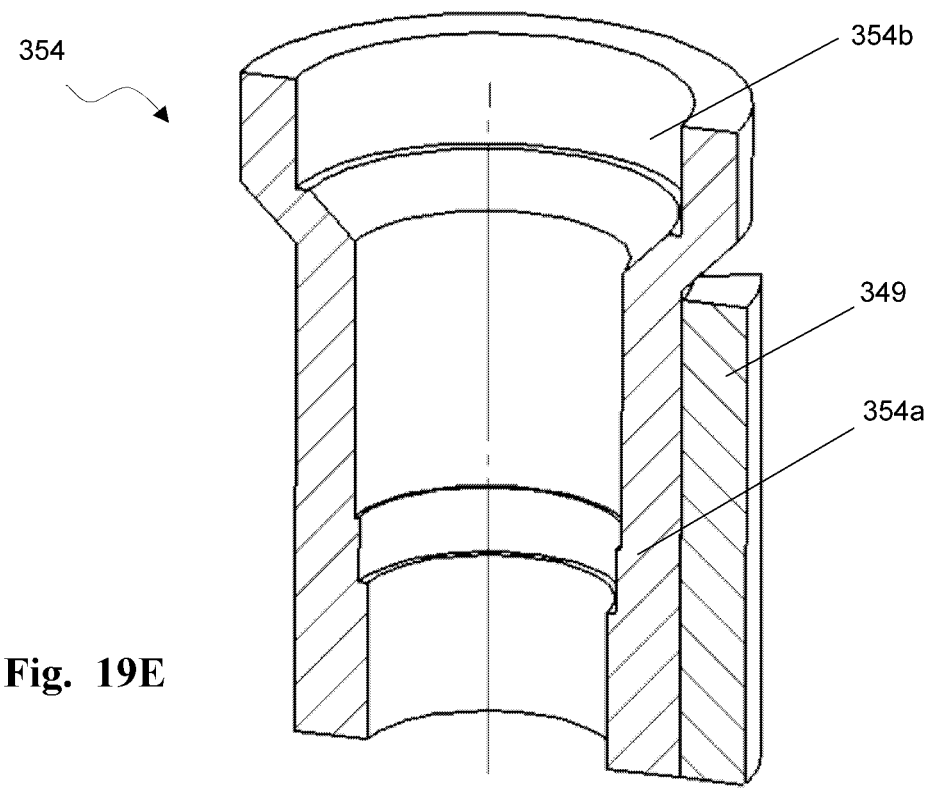
Figure 19F:
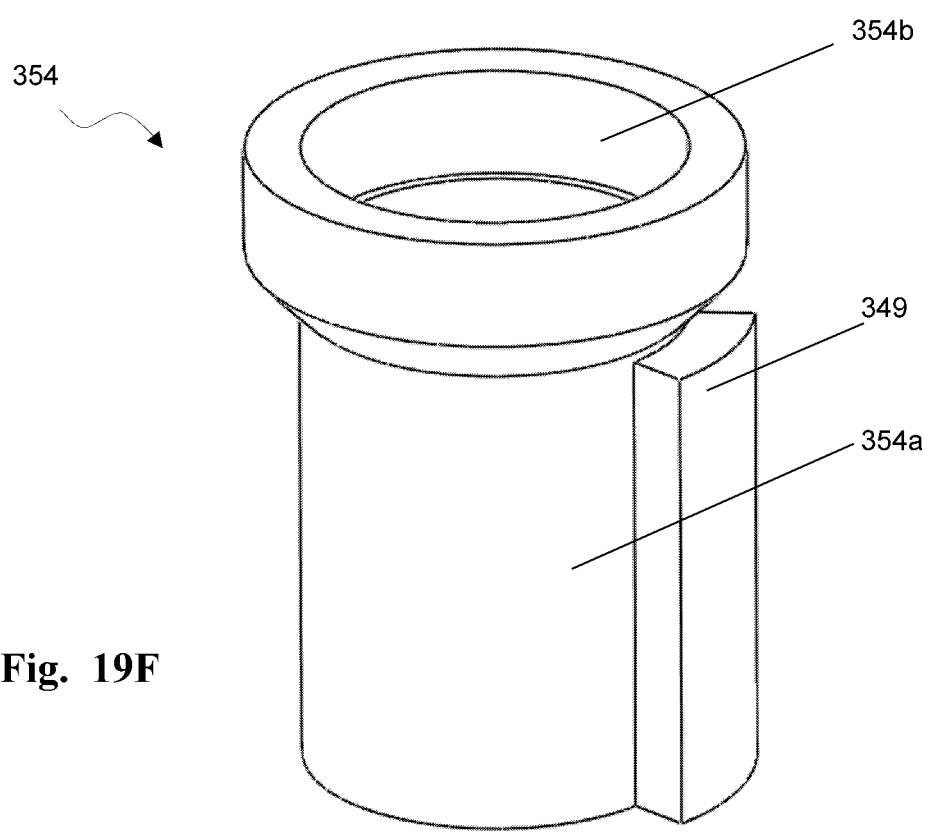
Figures 19G, 19H:
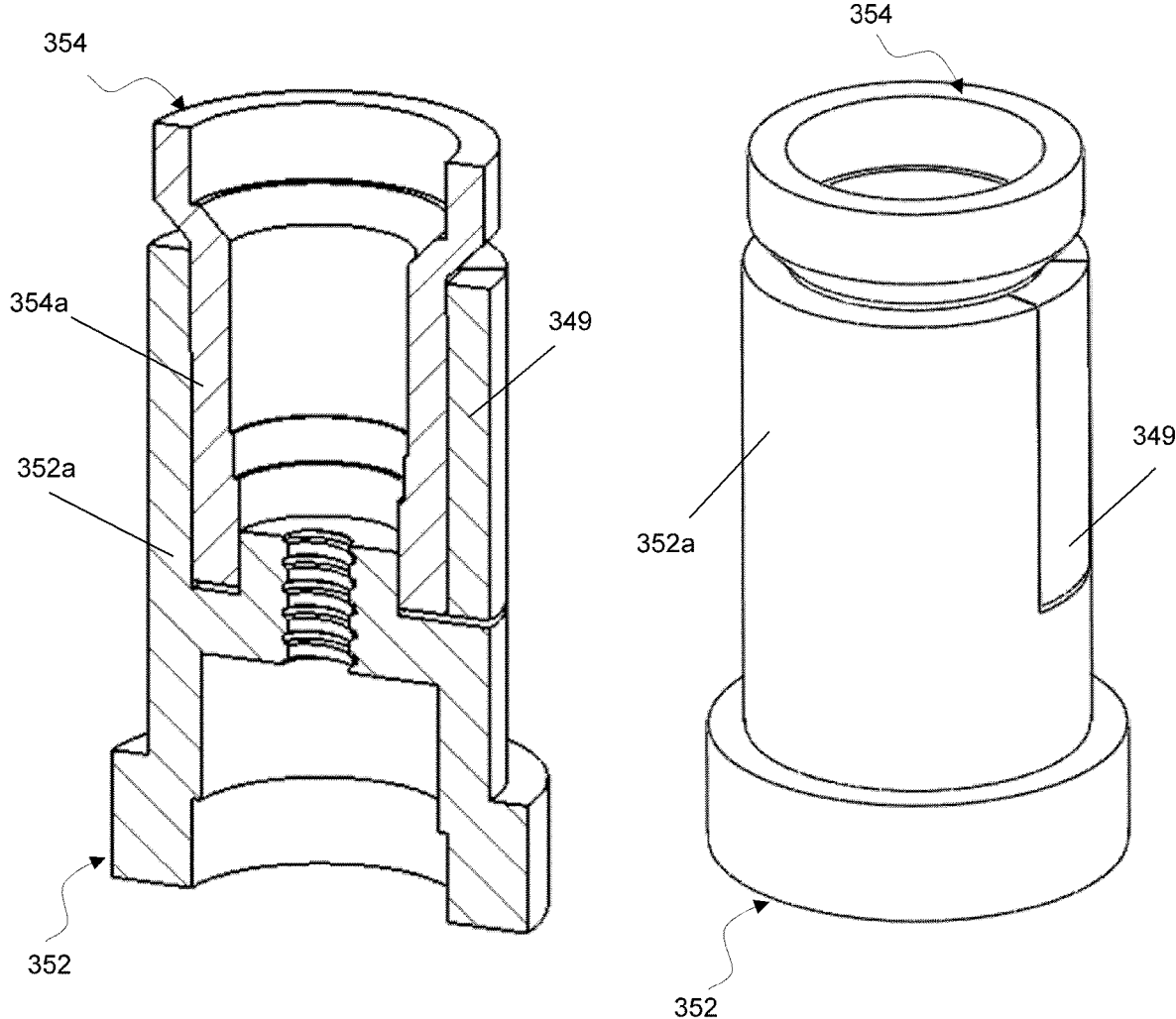
Figure 19I:
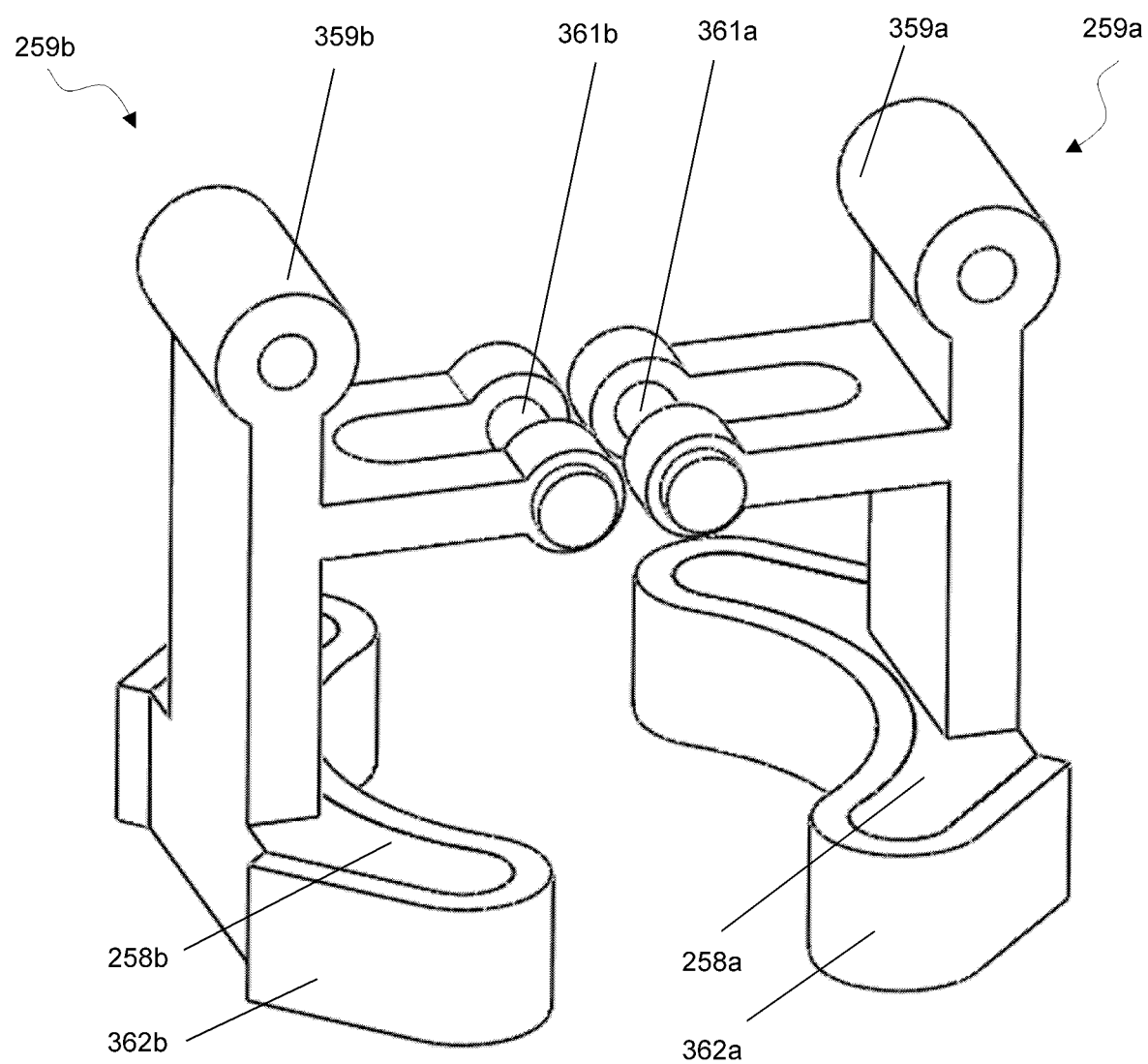

In some embodiments, referring to FIGS. 19A-20E, a cap opening sub-mechanism 302 comprises a rigid component 351 comprising a hollow shaft 351a and a connector 351b (see FIGS. 19A-19B). The cap opening sub-mechanism 302 also comprises a rigid component 352 comprising a cylindrical sleeve 352a with a slit removed, a screw nut 352b, and a bearing housing 352c (see FIGS. 19C-19D). The cap opening sub-mechanism 302 also comprises a rigid component 354 comprising a linear (hollow) shaft 354a and a bearing housing 354b, and a slab 349 of a cylindrical shell (see FIGS. 19E-19F). The shaft 354a and slab 349 are configured to be positioned inside the cylindrical sleeve 352a, so that the shaft 354a and slab 349 may slide linearly relative to the cylindrical sleeve 352a, along the direction of the axis of the cylindrical sleeve 352a (see FIGS. 19G-19H). The cap opening sub-mechanism 302 also comprises a pair of gripping devices 259a and 259b (see FIG. 19I). The gripping device 259a (or 259b) comprises a rigid component comprising a shaft 361a (or respectively, 361b), a sleeve 359a (or respectively, 359b) in the shape of a cylinder, and a gripper 258a (or respectively, 258b). A part of the surface of the gripper 258a (or 258b) is in the shape of a part of a cylindrical surface. The gripping device 259a (or 259b) also comprises a rubber (or silica gel, or other similar elastic material) 362a (or respectively, 362b) which is attached to the gripper 258a (or respectively, 258b).

Figure 20A:
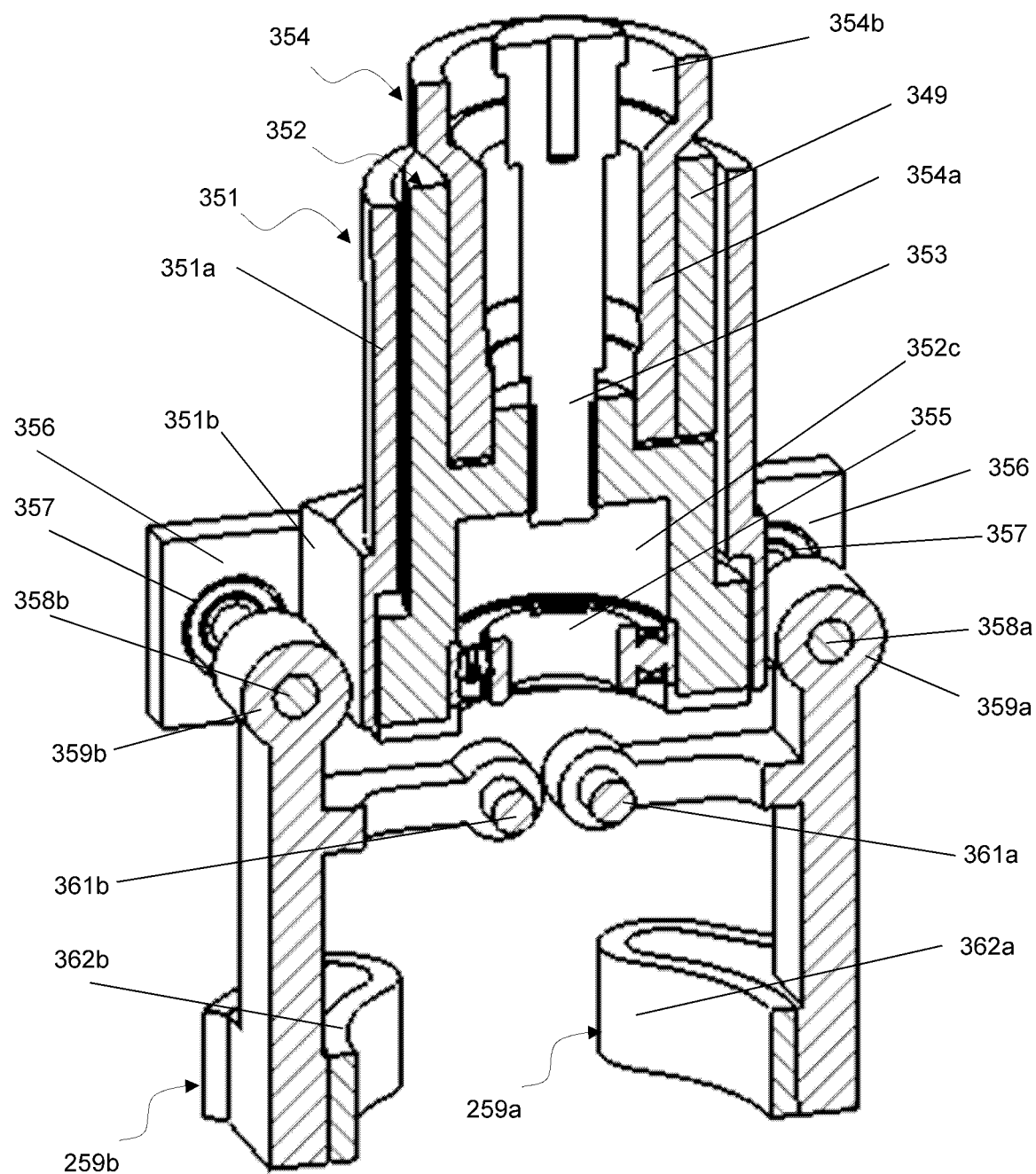
FIGS. 20A-20C show cut views of parts of a cap opening sub-mechanism.
Figure 20B:
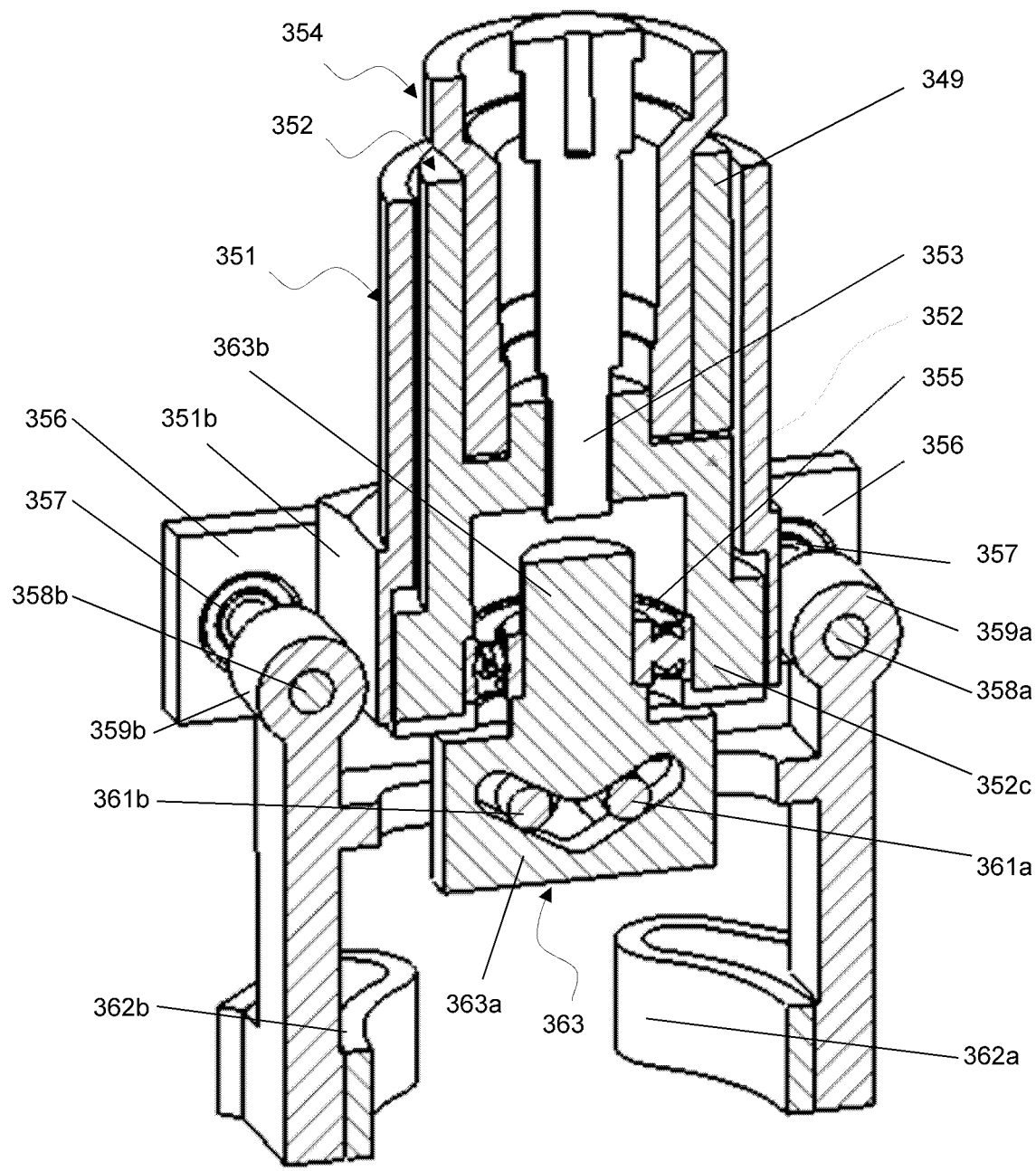

The cap opening sub-mechanism 302 also comprises shafts 358a and 358b, and a pair of rigid components 356 (see FIGS. 20A-20B). The shaft 358a is inserted into the sleeve 359a and is rigidly connected to the sleeve 359a. Similarly, the shaft 358b is inserted into the sleeve 359b, and is rigidly connected to the sleeve 359b. The pair of the rigid components 356 are rigidly connected to the connector 351b (of the rigid component 351). Each of the rigid components 356 comprises a first bearing housing and a second bearing housing (see FIG. 20A). A bearing 357 is configured to connect the shaft 358a and the first bearing housing of each rigid component 356, so that the shaft 358a is constrained to rotate relative to the rigid component 356 around the axis of the shaft 358a. Similarly, a bearing 357 is configured to connect the shaft 358b and the second bearing housing of each rigid component 356, so that the shaft 358b is constrained to rotate relative to the rigid component 356 around the axis of the shaft 358b (see FIGS. 20A-20D).

Figure 20C:
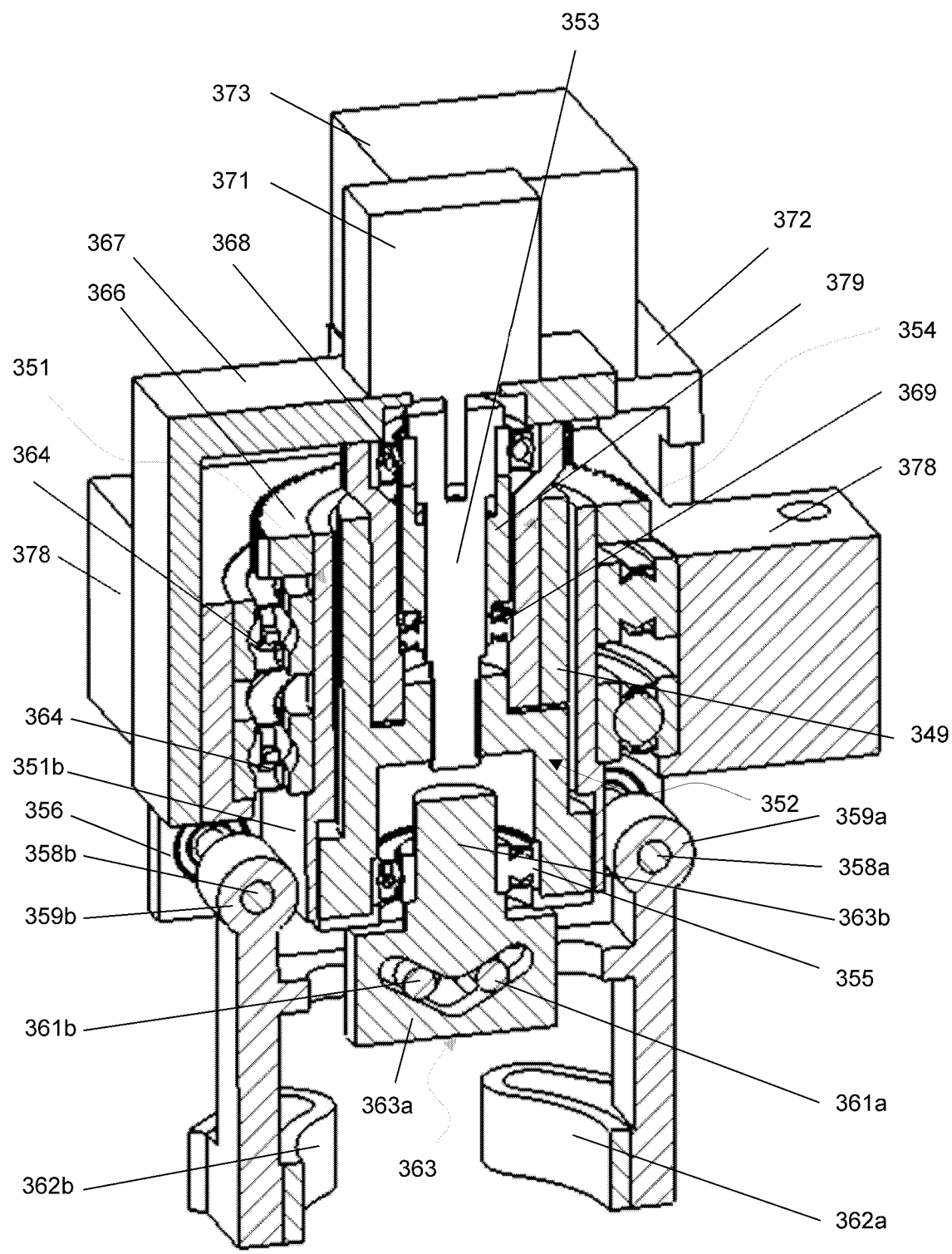

The cap opening sub-mechanism 302 also comprises a screw shaft 353, and a rigid component 363 comprising a shaft 363b and a plate 363a with a V-shaped hole (FIGS. 20B-20C). A bearing 355 is configured to connect the bearing housing 352c of the rigid component 352 and the shaft 363b of the rigid component 363, so that the rigid component 363 is constrained to rotate relative to the rigid component 352, around the axis of the shaft 363b. The screw shaft 353 is engaged with the screw nut 352b of the rigid component 352 so that a rotation of the screw shaft 353 induces a translation of the screw nut 352b and the rigid component 352 relative to the rigid component 354, and hence a movement of the rigid component 363 (see FIG. 20B). The pair of shafts 361a and 361b are configured to be inserted in the V-shaped hole of the plate 363a, so that a movement of the plate 363a (or equivalently, a movement of the rigid component 363) may induce a movement of the shafts 361a and 361b. When the rigid component 363 is moved, the induced movement in the shaft 361a, or 361b, may produce a rotation in the gripping device 259a around the axis of the shaft 358a, and a rotation in the gripping device 259b around the axis of the shaft 358b. The axes of the shafts 361a, 361b, 358a and 358b are configured to be horizontal, and mutually parallel. The axes of the hollow shaft 354a, the shaft 363b and the screw shaft 353, are configured to be vertical.

Figure 20D:
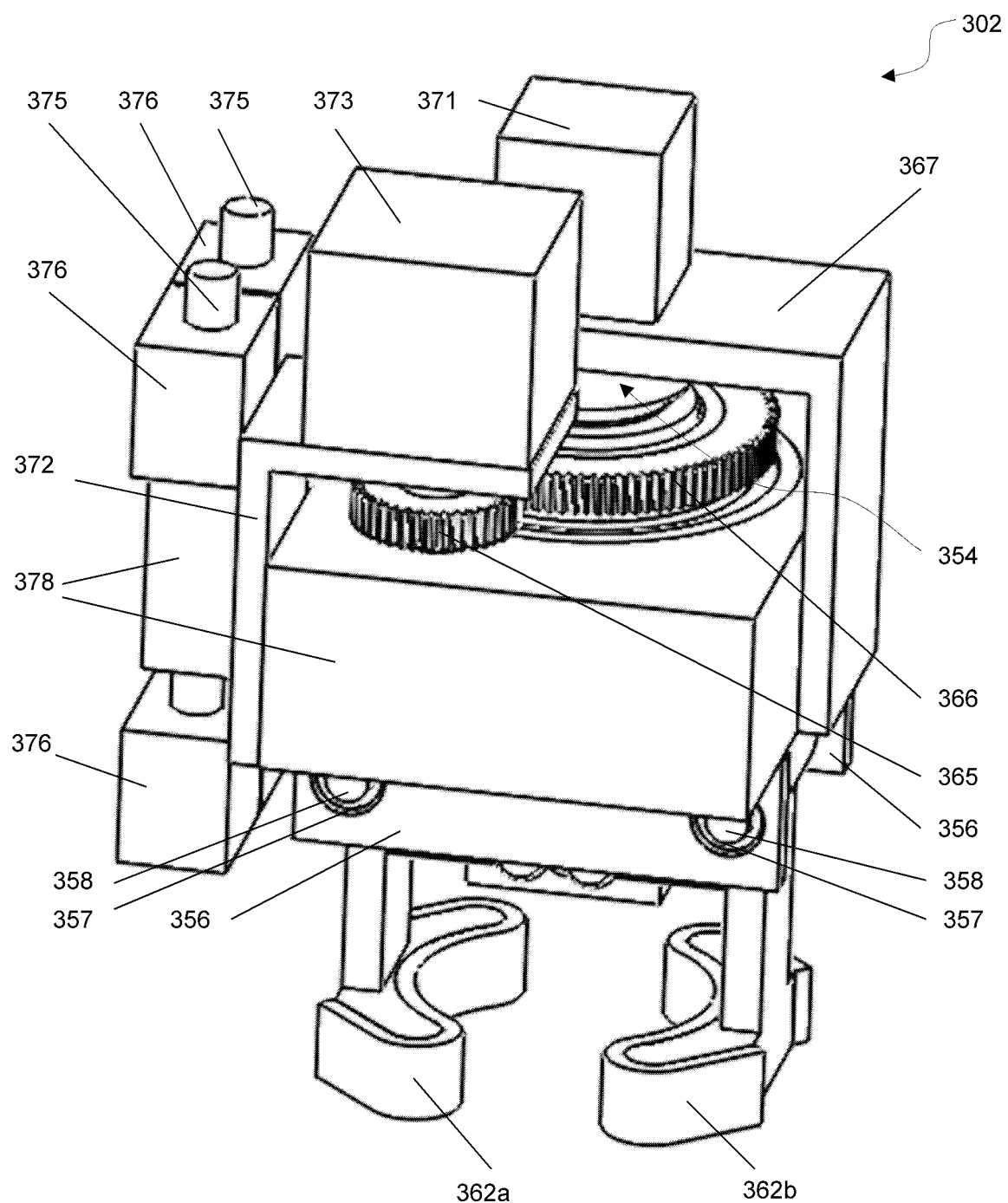
FIGS. 20D-20E show aerial views of the cap opening sub-mechanism.
Figure 20E:
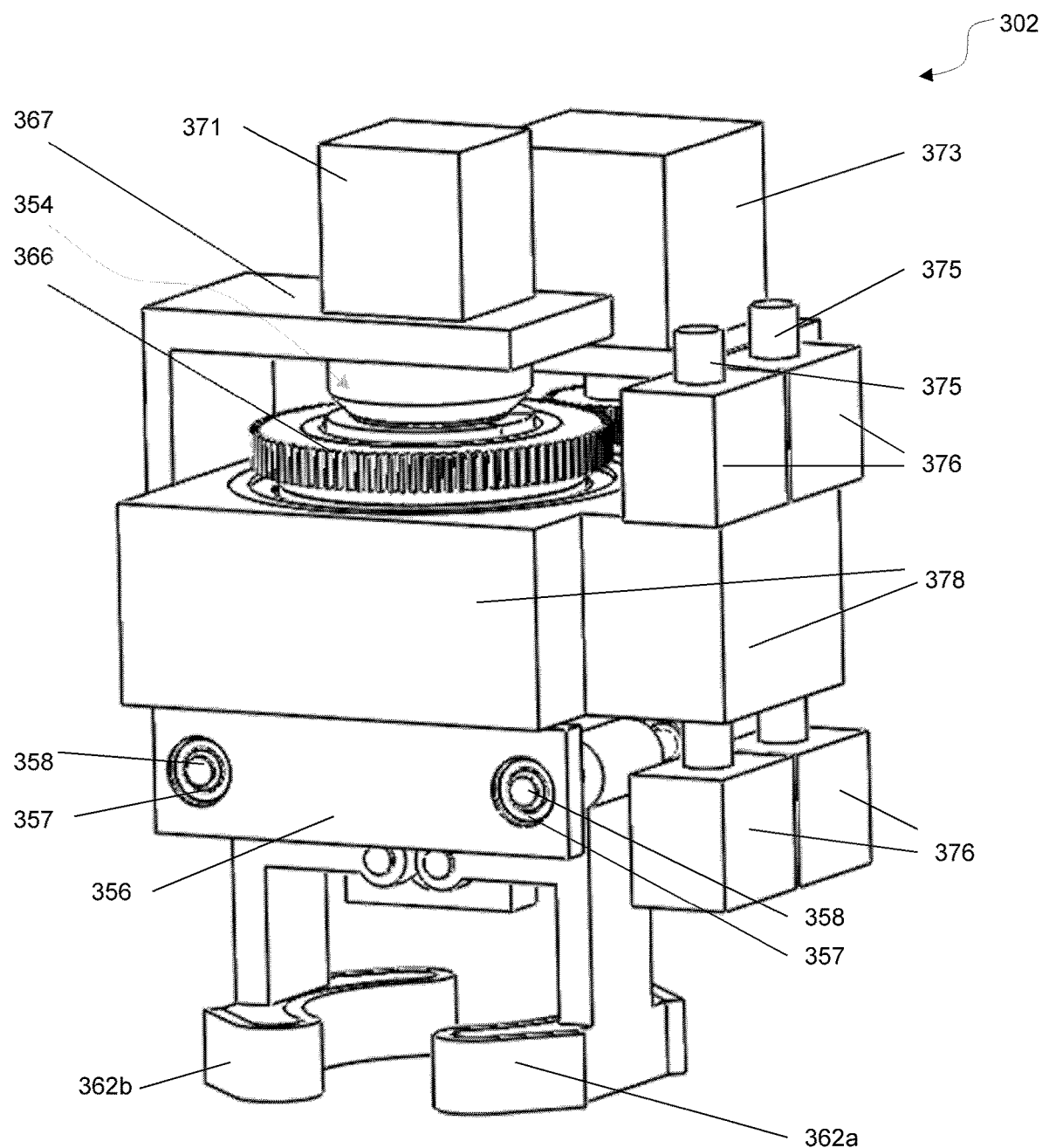

The cap opening sub-mechanism 302 also comprises a motor 371 comprising a shaft and a base component; a support frame 367 and a support component 378 comprising a bearing housing (see FIGS. 20C-20D). The base component of the motor 371 is fixedly connected with the support frame 367, and the support frame 367 is rigidly connected to the support component 378. The shaft of the motor 371 is configured to be connected to the screw shaft 353, so that the motor 371 may drive the rotation of the screw shaft 353. The axis of the shaft of the motor 371, the axis of the screw shaft 353, the axis of the hollow shaft 354a, the axis of the shaft 363b are configured to coincide with a vertical axis, referred to as the central axis of the cap opening sub-mechanism 302. When the motor 371 rotates the screw shaft 353, the rigid component 352 and hence the rigid component 363 may be moved linearly in the vertical direction, relative to the rigid component 354. The motion of the rigid component 363 relative to the rigid component 352 may be limited by some known techniques. The vertical motion of the rigid component 363 relative to the rigid component 354 induces motions of the shafts 361a and 361b, and then, rotation of the gripping device 259a, or 259b, around the axis of the shaft 358a, or respectively, 358b. In fact, the pair of the gripping devices 259a and 259b may be moved simultaneously towards the central axis, or away from the central axis, relative to the rigid component 354, as to grip or release a cap 112.

The cap opening sub-mechanism 302 also comprises a pair of gears 365 and 366, a support frame 372, a pair of shafts 375, four linear motion bearings 376 (see FIG. 20D). The pair of shafts 375 are configured to have vertical axes; and the shafts 375 are configured to be rigidly connected to the support component 378. The four linear motion bearings 376 are mounted on a support component 386 (see FIG. 24A). Thus, the support component 378 may slide linearly relative to the support component 386. The four linear motion bearings 376 may slide vertically on the shafts 375 (see FIG. 20D-20E). Two bearings 364 are configured to connect the bearing housing in the support component 378 with the hollow shaft 351a of the rigid component 351, so that the rigid component 351 is constrained to be rotated relative to the support component 378 (see FIG. 20C). The gear 366 is configured to rigidly connected to the hollow shaft 351a of the rigid component 351 so that the axis of the gear 366 is the same as the axis of the hollow shaft 351a (see FIG. 20D). On the other hand, the gear 365 is constrained to rotate relative to the support component 378, around the axis of the gear 365. Moreover, the gear 366 is engaged with the gear 365 and the axis of the gear 365 is also vertical. A motor 373 comprises a shaft and a base component, wherein the base component is fixedly connected to the support frame 372. The shaft of the motor 373 is connected to the gear 365, so that the motor 373 may drive the rotation of the gear 365, and hence the rotation of the gear 366 and the rigid component 351, relative to the support component 378. As the rigid components 356 are rigidly connected to the rigid component 351, the rigid components 356 are forced to be rotated relative to the support component 378, and so do the gripping devices 259a and 259b. The rotation of the gripping devices 259a and 259b may be configured to induce a simultaneous rotation of the plate 363a. However, the rigid components 352 and 354 are not rotated relative to the support component 378.

It should be noted that there may be some space between the rigid component 352 and the rigid component 351.

It should be noted that a spring may be configured to connect the support components 378 and 386, as to pull the support component 378 upward relative to the support component 386.

Figure 21A:
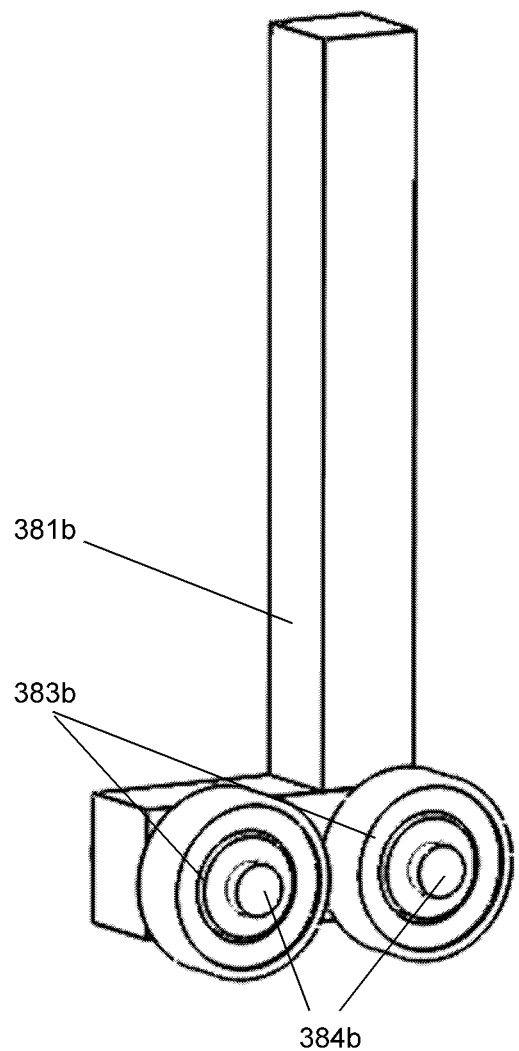
FIG. 21A-21B show aerial views of parts of a cap opening sub-mechanism.
Figure 21B:
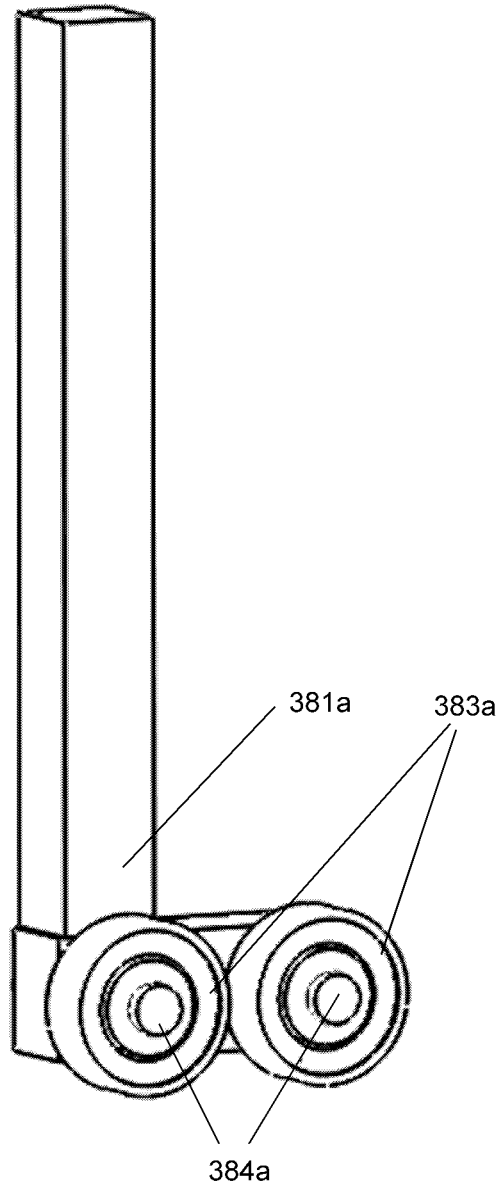
Figure 22:
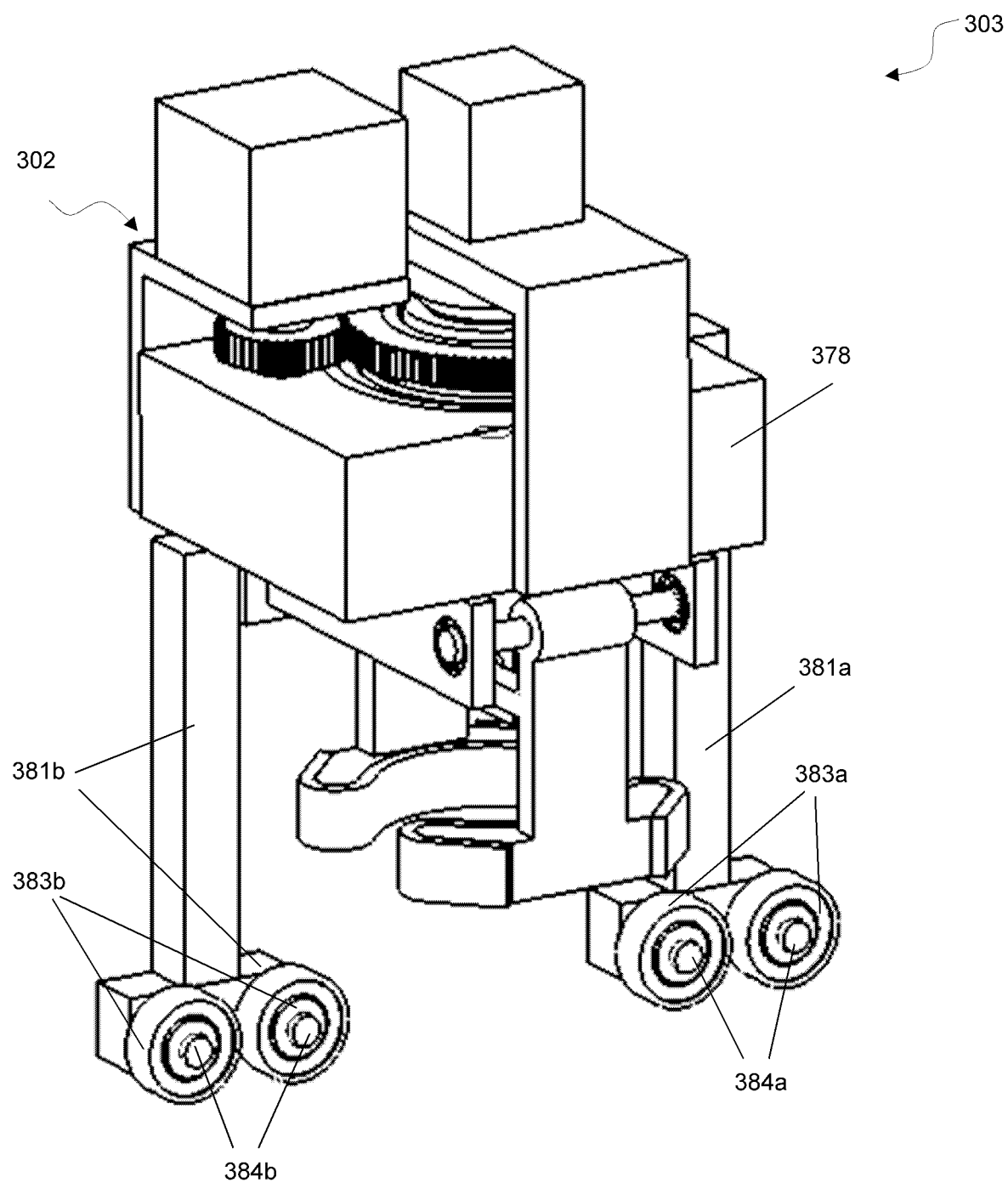
FIG. 22 shows an aerial view of the cap opening sub-mechanism.

In some embodiments, referring to FIGS. 21A-22, a cap opening sub-mechanism 303 comprises a cap opening sub-mechanism 302, two connectors 381a and 381b, a pair of wheels 383a and corresponding shafts 384a, a pair of wheels 383b and corresponding shafts 384b. Each wheel 383a is mounted on the corresponding shaft 384a, so that the wheel is constrained to rotate relative to the shaft 384a, around the axis of the wheel. Each wheel 383b is mounted on the corresponding shaft 384b, so that the wheel 383b is constrained to rotate relative to the shaft 384b. The axes of the shafts 384a and 384b are configured to be horizontal and mutually parallel. The shafts 384a, or 384b, are rigidly connected to the connector 381a, or respectively, 381b. The connectors 381a and 381b are configured to be rigidly connected to the support component 378 of the cap opening sub-mechanism 302.

It should be noted that the connector 381a and the shafts 384a may be made as a single part. Similarly, the connector 381b and the shafts 384b may be made as a single part.

Figure 23A:
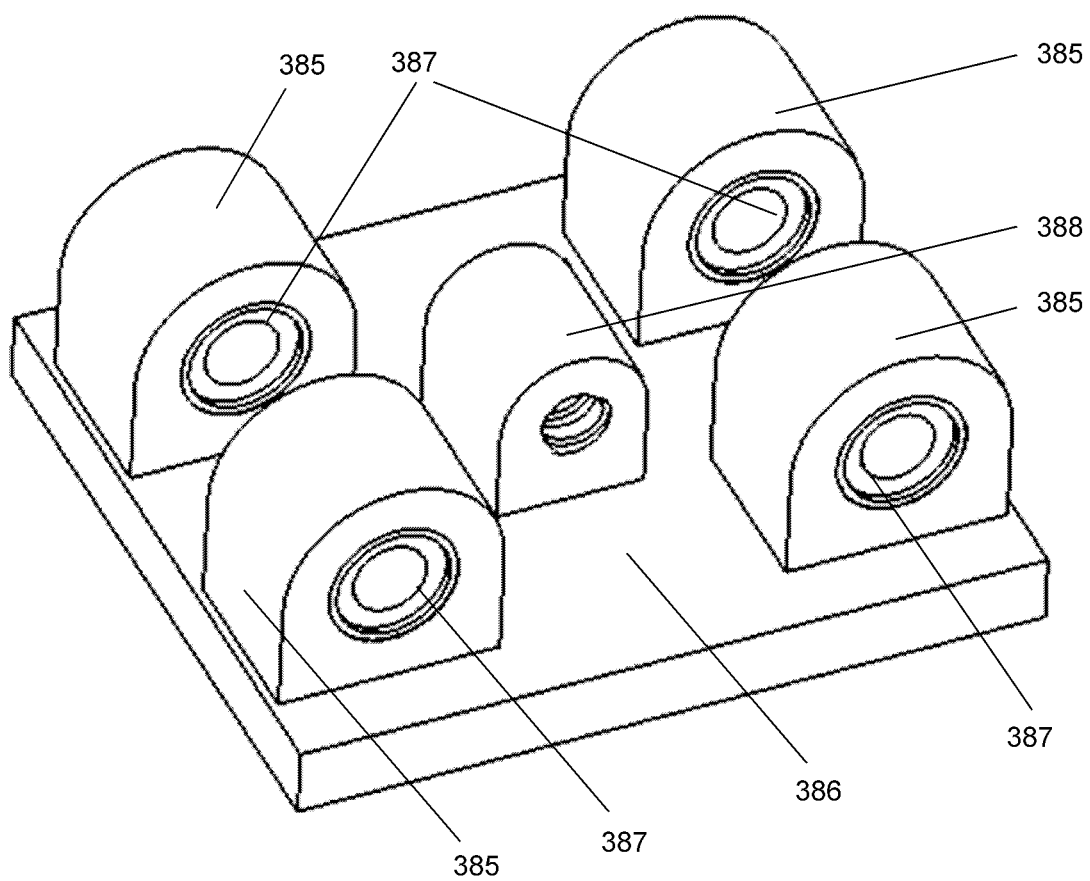
FIG. 23A shows an aerial view of parts of a lifting sub-mechanism
Figure 23B:
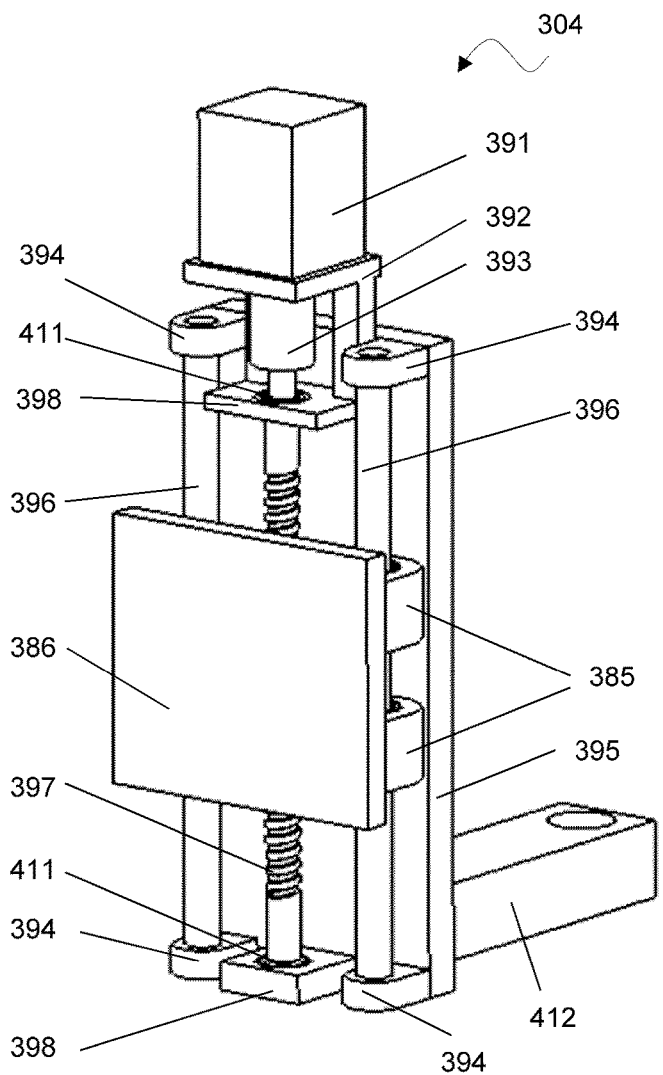
FIGS. 23B-23C show aerial views of the lifting sub-mechanism.
Figure 23C:
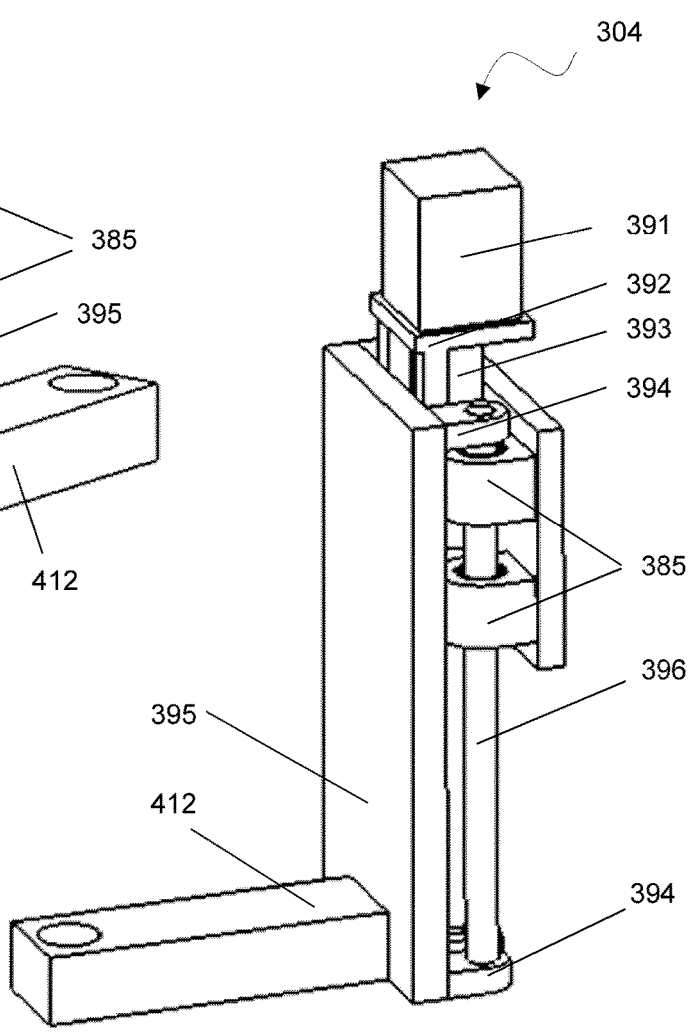

In some embodiments, referring to FIGS. 23A-23C, a vertical motion mechanism 304 comprises a support component 386, four linear motion bearings 387 and four corresponding bearing housings 385, and a screw nut 388. The four bearings housings 385 and the screw nut 388 are rigidly connected to the support component 386 (FIG. 23A). Each linear motion bearing 387 is mounted in a corresponding bearing housing 385. The axes of the linear motion bearings 387 and the axis of the screw nut 388 are configured to be vertical.

The vertical motion mechanism 304 also comprises a screw shaft 397, a support component 395, two shafts 396 with vertical axes, and two bearing housings 398 (see FIGS. 23B-23C). The bearing housings 398 are rigidly connected to the support component 395. A pair of ball or roller bearings 411 are configured to connect the bearing housings 398 with the screw shaft 397, so that the screw shaft 397 is constrained to rotate relative to the bearing housings 398 around the axis of the screw shaft 397. The axes of the shafts 396, and the axis of the screw shaft 397 are configured to be vertical. Each linear motion bearing 387 is configured to connect a corresponding bearing housing 385 with a shaft 396, so that the bearing housings 385 is constrained to slide linearly relative to the corresponding shaft 396. Thus, the support component 386 is constrained to move linearly in the vertical direction relative to the support component 395. The screw shaft 397 is engaged with the screw nut 388 so that a rotation of the screw shaft 397 induces a translation of the screw nut 388 hence that of the support component 386. A motor 391 comprises a shaft and a base component, wherein the base component is fixedly connected to a support frame 392, which is joined with the support component 395. The shaft of the motor 391 is connected to the screw shaft 397 by a coupling 393. Thus the motor 391 may drive the rotation of the screw shaft 397 relative to the support component 395, which may induce a vertical linear motion of the screw nut 388 and hence that of the support component 386, relative to the support component 395. Some connectors 394 are configured to rigidly connect the ends of the shafts 396 to the support component 395. The vertical motion mechanism 304 also comprises a connector 412 comprising a round hole. The connector 412 is configured to be rigidly connected to the support component 395.

Figure 24A:
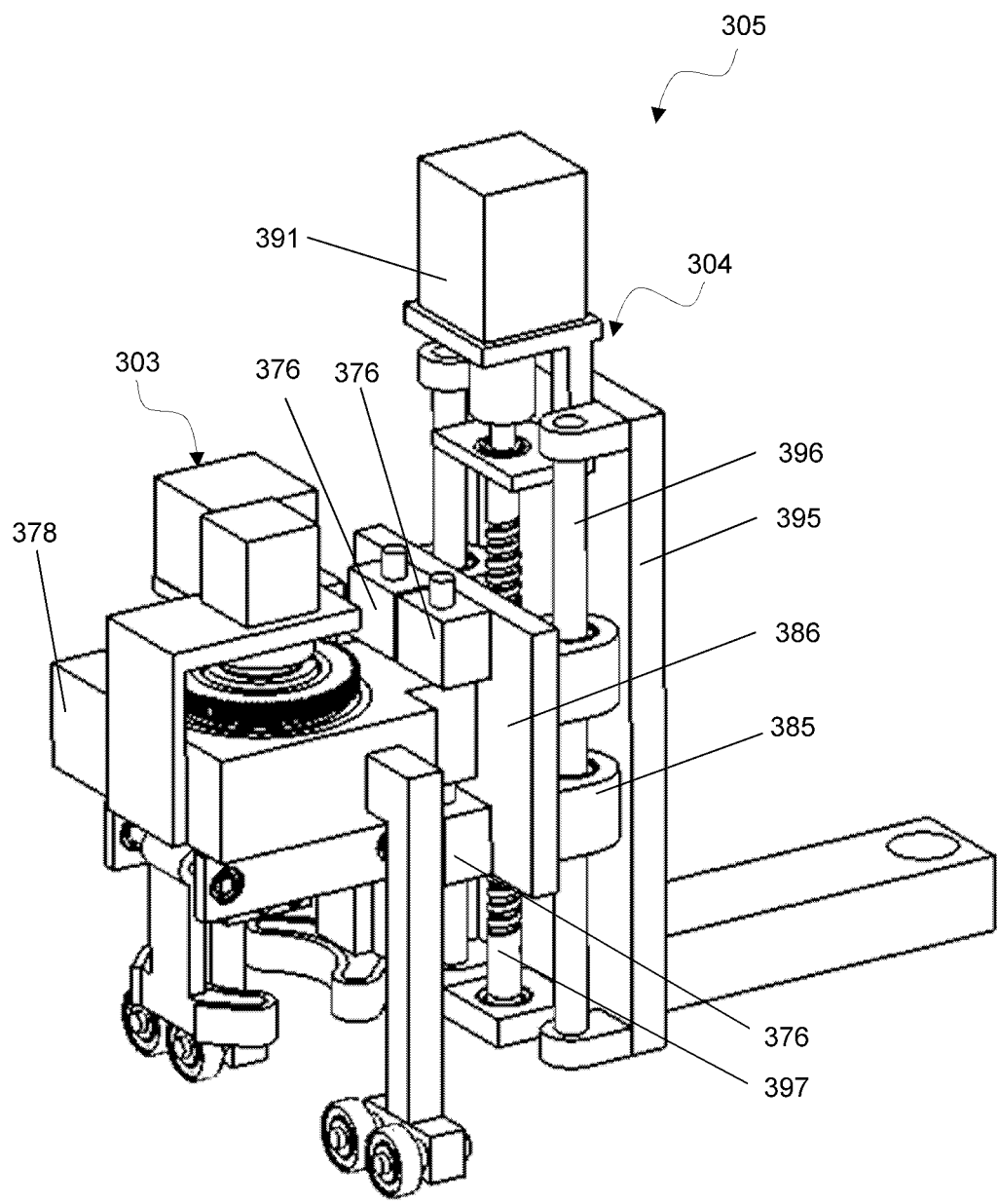
FIG. 24A shows an aerial view of a cap opening sub-mechanism.

In some embodiments, referring to FIG. 24A, a cap opening sub-mechanism 305 comprises a cap opening sub-mechanism 303 and a vertical motion mechanism 304. The support component 386 of the vertical motion mechanism 304 are configured to be rigidly connected to the base components of the linear motion bearings 376 of the cap opening sub-mechanism 303. Thus, the support component 378 of the cap opening sub-mechanism 303 is constrained to move linearly in the vertical direction, relative to the support component 386 of the vertical motion mechanism 304. Moreover, the support component 386 can be moved linearly in the vertical direction, relative to the support component 395, when the motor 391 rotates.

Figure 24B:
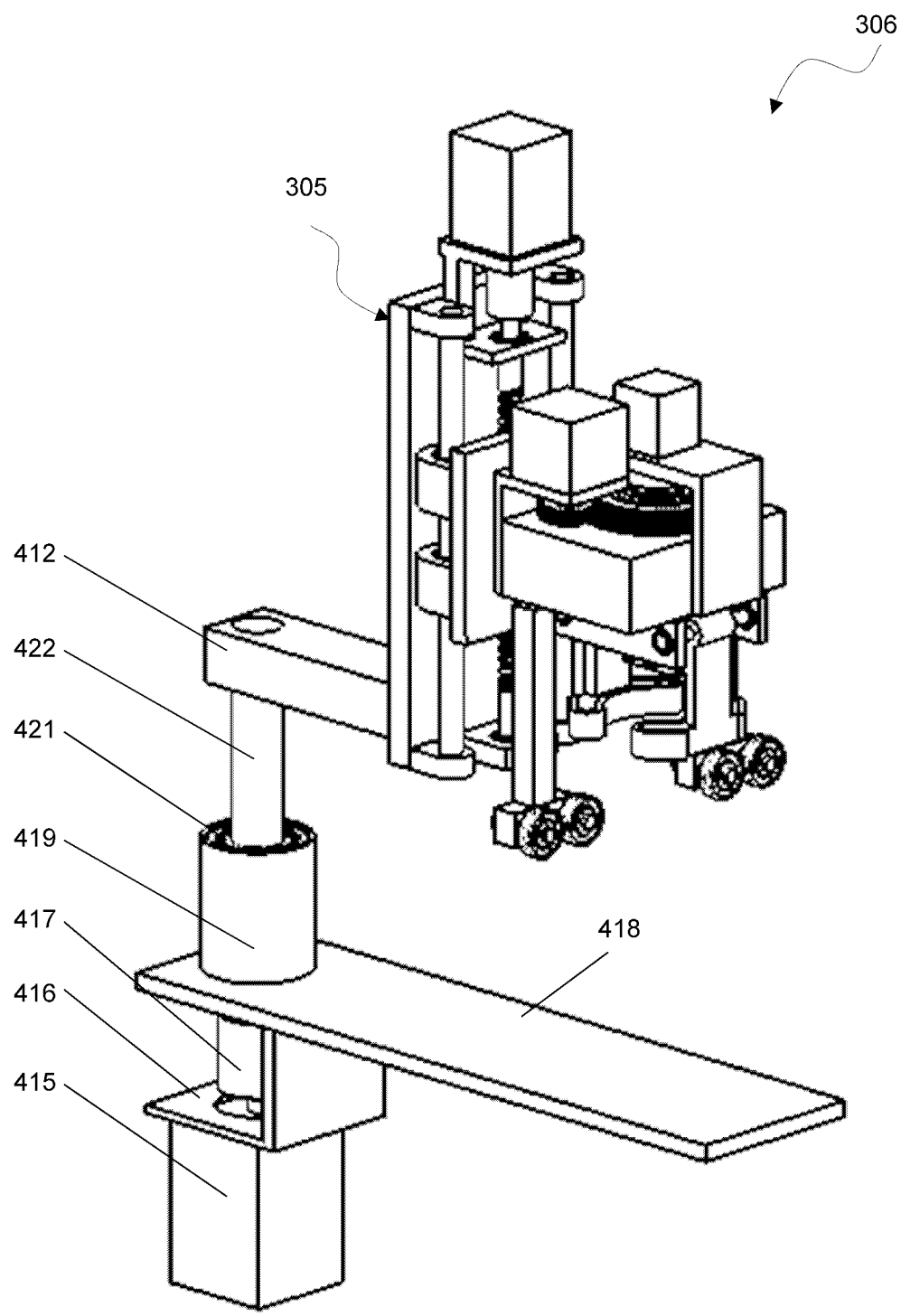
FIG. 24B shows an aerial view a cap opening sub-mechanism.

In some embodiments, referring to FIG. 24B, a cap opening sub-mechanism 306 comprises a cap opening sub-mechanism 305, a support component 418 in the shape of a plate, a shaft 422, a bearing housing 419, a motor 415 comprising a shaft and a base component, a frame 416, and a coupling 417. The bearing housing 419 is rigidly connected to the support component 418. A pair of bearings 421 are configured to connect the shaft 422 and the bearing housing 419, so that the shaft 422 is constrained to rotate relative to the bearing housing 419 around the axis of the shaft 422. The bearing housing 419 is rigidly connected with the support component 418. The connector 412 of the cap opening sub-mechanism 305 is configured to be rigidly connected to the shaft 422. Thus, the cap opening sub-mechanism 305 may be rotated relative to the support component 418 around the axis of the shaft 422. The base component of the motor 415 is mounted on the frame 416, and the frame 416 is configured to be rigidly connected to the support component 418. The shaft of the motor 415 is connected to the shaft 422 by a coupling 417, so that the motor 415 may drive the rotation of the shaft 422, and hence the rotation of the support component 395 of the cap opening sup-mechanism 305, relative to the support component 418.

In some embodiments, referring to FIGS. 25A-25D, a container gripping mechanism 307 comprises a pair of gripping devices 413a and 413b, and corresponding torsion springs 437 (see FIGS. 25A-25B), The gripping device 413a (or 413b) comprises a first stopper component 426a (or respectively 426b), a sleeve 427a (or respectively 427b) in the shape of a cylinder, a curved hole 414a (or respectively 414b), a connecting part 425a (or respectively 425b), a gripper 824a (or respectively 824b), and rubber (or silica gel, or similar other elastic part) 424a (or respectively 424b). A part of the surface of the gripper 824a or 824b is identical to a part of a cylindrical surface. The rubber 424a or 424b is attached to the gripper 824a, or respectively 824b. Each torsion spring 437 comprises extended components 437c and 437d, in addition to a spring component 437e.

Figure 25A:
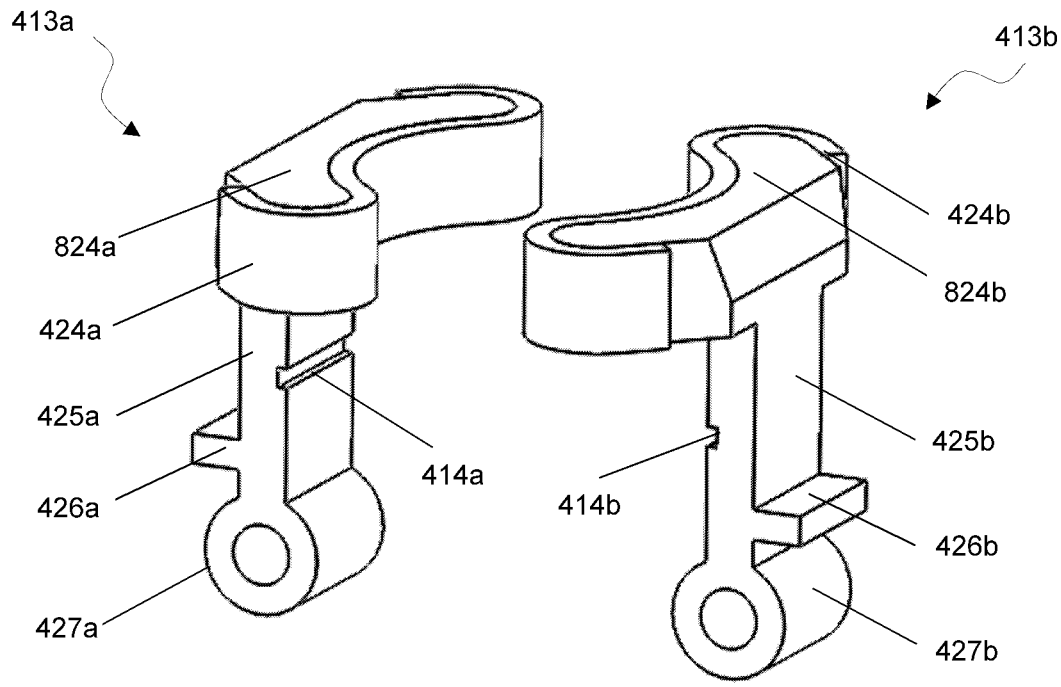
FIGS. 25A-25B show aerial views of parts of a container gripping mechanism.
Figure 25B:
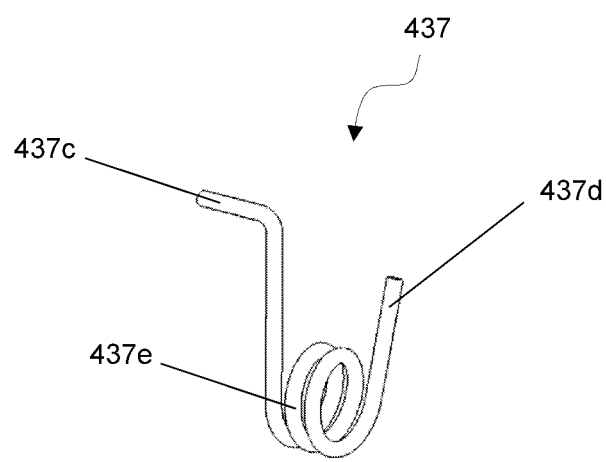
Figure 25C:
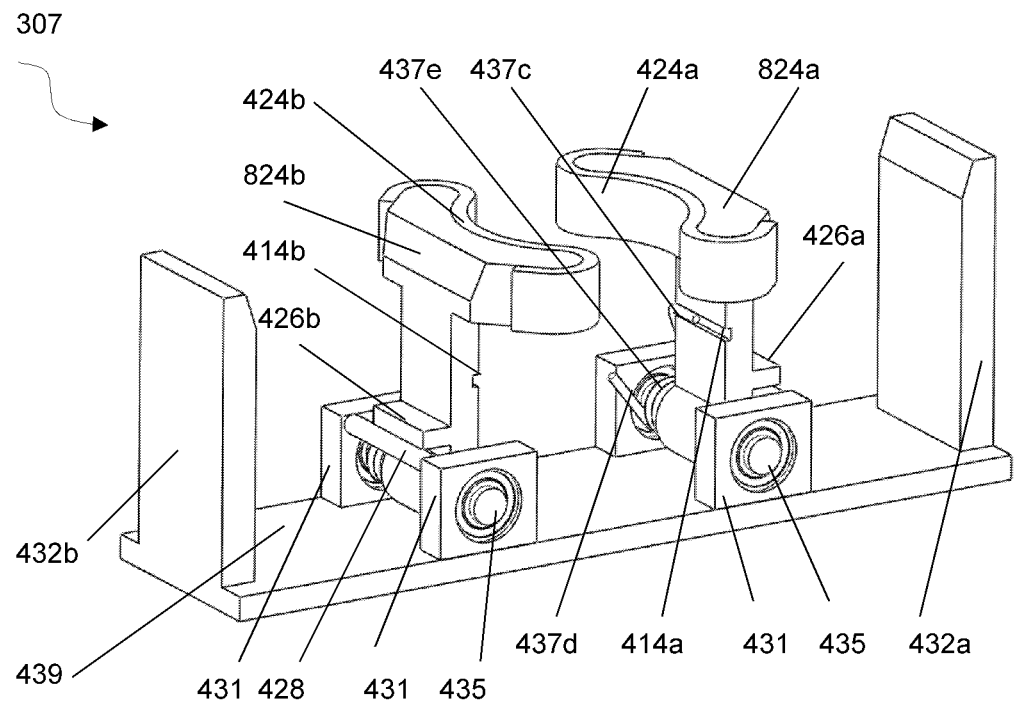
FIGS. 25C-25D show aerial views of the container fixing mechanism.
Figure 25D:
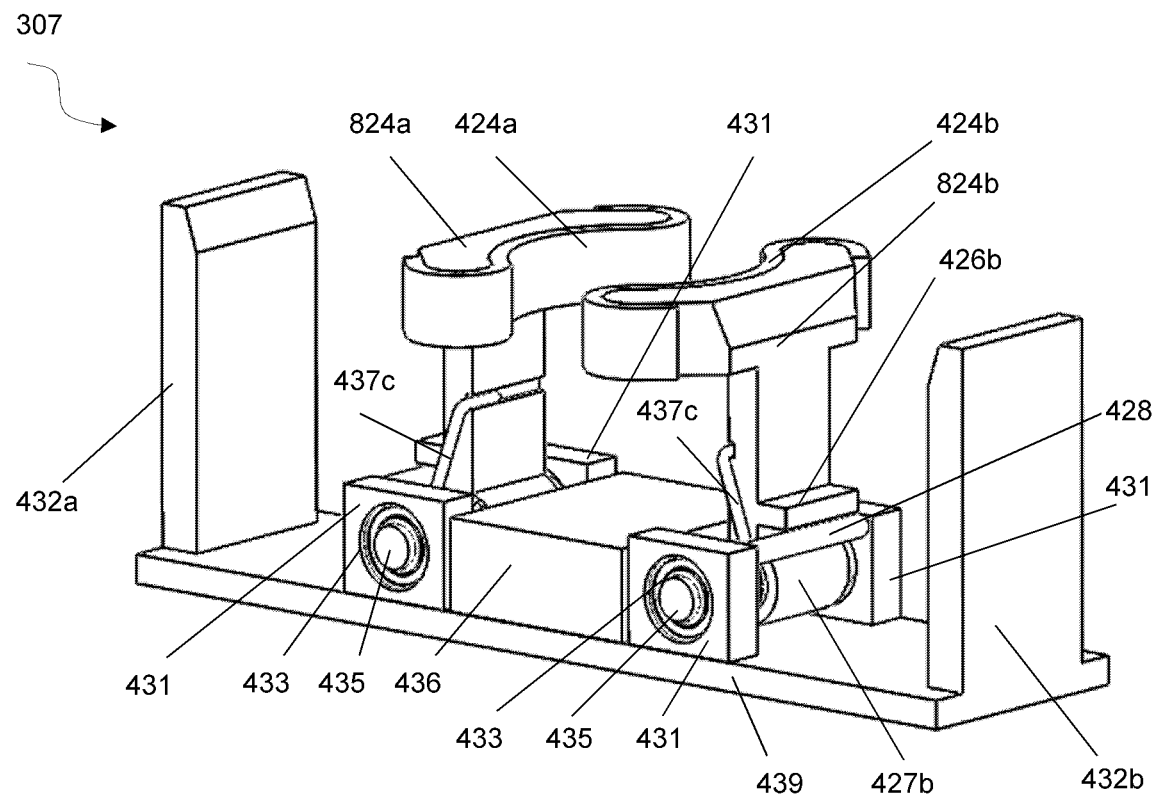

The container gripping mechanism 307 also comprises four bearing housings 431, two shafts 435, a support component 439, a platform 436, and a pair of mini walls 432a and 432b (see FIG. 25C-25D). The four bearing housings 431, and the platform 436 are configured to be rigidly connected to the support component 439. The axes of the four bearing housings 431 are configured to be parallel. The sleeve 427a of the gripping device 413a is rigidly connected to one of the shafts 435; and the sleeve 427b of the gripping device 413b is rigidly connected to the other one of the shafts 435. Each shaft 435 is configured to be connected to two bearing housings 431 by bearings 433, so that the shaft 435 is constrained to rotate relative to the bearing housings 431, around the axis of the shaft. Thus, the gripping device 413a or 413b may rotate around the axis of the corresponding bearing housings 431. The gripping devices 413a and 413b are configured to be symmetric around a central axis, as shown in FIGS. 25C-25D; and the gripping devices may be simultaneously rotated as to grip a container 111 tightly (or capped container 110) which is placed atop the platform 436 under the condition that the axis of the container 111 (or respectively, capped container 110) coincides with the central axis. Thus, the gripping devices 413a and 413b may be used to hold the said container 111 tightly. A torsion spring 437 may be configured to connect the surface of the platform 436 to the surface of the gripping device 413a or 413b, as to press the gripping device 413a or 413b to rotate away from the central axis, as to open up the space between the two gripping devices. The extended component 437c of each torsion spring 437 is positioned to stuck inside the curved hole 414a (or 414b) of the corresponding gripping device 413a (or 413b). The extended component 437d of each torsion springs 437 is pressed on a side surface of the platform 436. The container gripping mechanism 307 further comprises two second stopper components 428. Each second stopper component 428 is configured to be rigidly connected to two bearing housings 431 whose axes are the same. The first stopper component 426a (or 426b) of the gripping device 413a (or respectively, 413b) can touch the second stopper components 428 under the force of torsion springs 437, as to limit the rotation of the gripping device 413a (or 413b) away from the central axis. When the gripping devices 413a and 413b are rotated to the limiting positions (away from the central axis), a capped container 110 (or container 111) may be placed atop the platform 436, so that the axis of the capped container 110 (or container 111) coincides with the central axis.

We say that a container 111 (or a capped container 110) is centrally placed on the platform 436, if the (capped) container is placed atop the platform 436, and the axis of the (capped) container coincides with the central axis of the container gripping mechanism 307. The position for the container 111 (or capped container 110) will be referred to as the central position for the container 111 (or respectively capped container 110) in the gripping mechanism 307.

It should be noted that the support component 439 and the mini walls 432a and 432b may be made as a single part.

Figure 26:
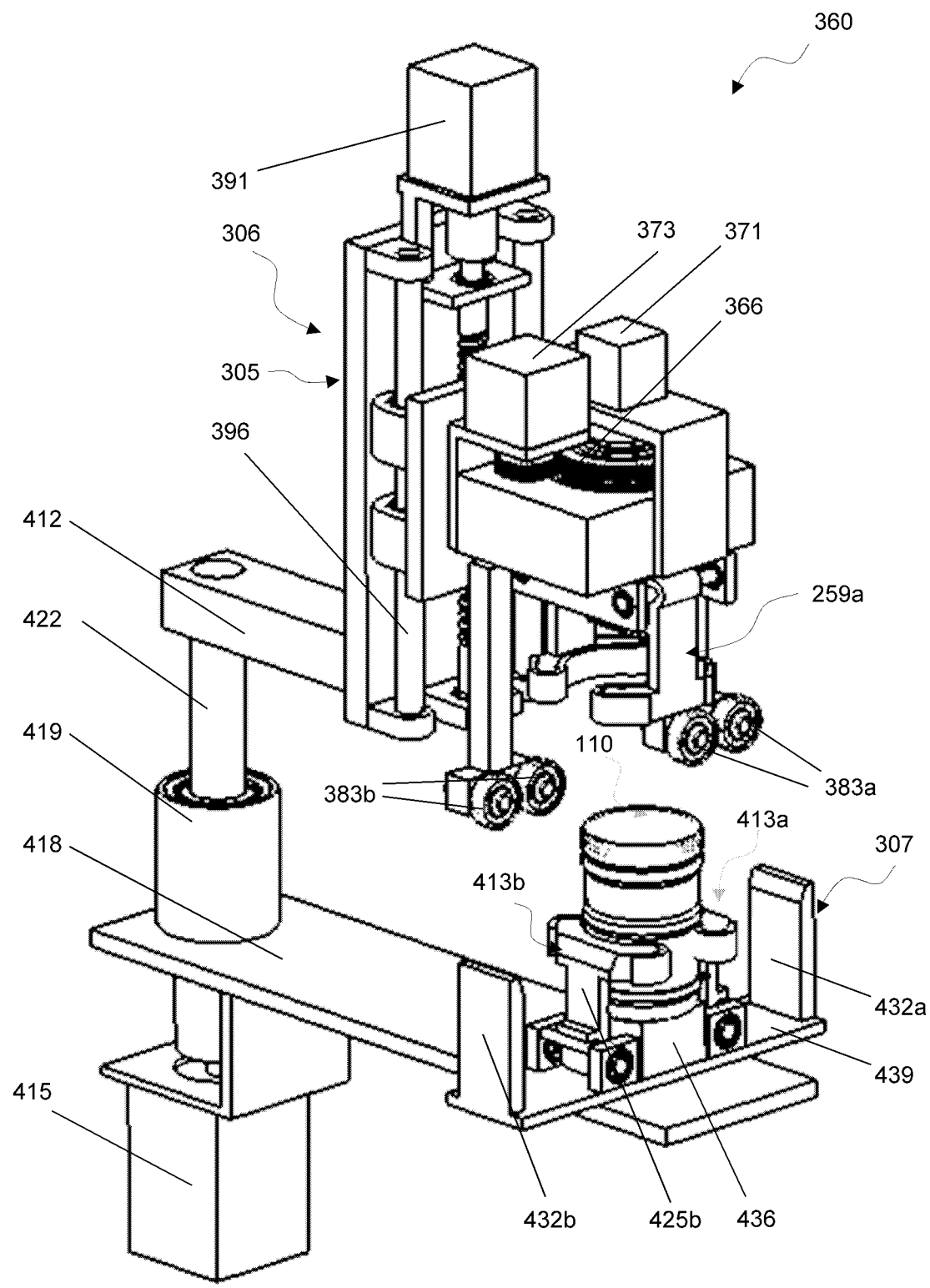
FIG. 26 shows an aerial view of a cap opening mechanism which comprises a cap opening sub-mechanism and a container fixing mechanism.

In some embodiments, referring to FIG. 26, a cap opening apparatus 360 comprises a cap opening sub-mechanism 306 and a container gripping mechanism 307. The support component 439 of the container gripping mechanism 307 is configured to be rigidly connected to the support component 418 of the cap opening sub-mechanism 306. The connector 412 of the cap opening sub-mechanism 305 (of the cap opening sub-mechanism 306) may be rotated to a first position so that the central axis of the cap opening sub-mechanism 302 (of the cap opening sub-mechanism 306) coincides with the central axis of the container gripping mechanism 307. The cap opening apparatus 360 may open a capped container 110 which is placed at the central position at the container gripping mechanism 307, roughly in six steps, as follows.

At step 1, the connector 412 of the cap opening sub-mechanism 305 is rotated to the first position, as described above.

At step 2, the support component 386 of the cap opening sub-mechanism 305 is moved down to a certain position relative to the support component 395, as driven by the motor 391, so that: (a) the gripping devices 259a and 259b of the cap opening sub-mechanism 303, if rotated towards the central axis, may grip (or grab) the cap of the capped container 110 (at this time, the gripping devices are positioned away from the central axis); (b) the wheels 383a are respectively pressed on a side surface of the connecting part 425a of the gripping device 413a, and on the mini wall 432a, as to press the gripping device 413a to rotate towards the central axis; (c) the wheels 383b are respectively pressed on a side surface of the connecting part 425b of the gripping device 413b, and on the mini wall 432b, as to press the gripping device 413b to rotate towards the central axis; (d) as the gripping devices 413a and 413b are both rotated toward the central axis, the container 110 is gripped and held tightly by the gripping devices 413a and 413b.

At step 3, the gripping devices 259a and 259b of the cap opening sub-mechanism 303 are rotated toward the central axis, as driven by the motor 371, as to grip and hold the cap 112 of the capped container 110 tightly.

At step 4, the support component 386 is moved upward relative to the support component 395 in the vertical motion mechanism 304 (of the cap opening sub-mechanism 305), as driven by the motor 391; at the same time, the gripped cap and gripping devices 259a and 259b, together with the rigid component 351 of the cap opening sub-mechanism 303, are rotated relative to the support component 378, as to unscrew and open the cap 112 from the container 111 in the capped container 110. During this time, the support component 378 is not rotated relative to the support components 418 and 439 (and thus the cap 112 is rotated relative to the container 111 as the container 111 is held tightly by the gripping devices 413a and 413b).

At step 5, together with the gripped cap, the support component 386 of the cap opening sub-mechanism 305 is moved up relative to the support component 395, as driven by the motor 391. During this step, the gripping device 413a (or 413b) are rotated away from the central axis being forced by the torsion springs 437.

At Step 6, the connector 412 of the cap opening sub-mechanism 305 is rotated from the first position to a second position, as driven by the motor 415. At this position, the gripped cap may be released by the griping devices 259a and 259b.

It should be noted that the motor 415 may be substituted by a motorized mechanism configured to drive a back-and-forth rotation of the shaft 422.

It should be noted that, in the cap opening apparatus 360, a spring may be installed as to pull the support component 378 vertically upward relative to the support component 386.

As explained, the cap opening apparatus 360 comprises a cap opening sub-mechanism 306 and a container gripping mechanism 307. The central position for an ingredient container 112 or capped ingredient container 110 at the container gripping mechanism 307 will be referred to as a central position for the ingredient container 112 or respectively 110 at the cap opening apparatus 360. The cap opening apparatus 360 can uncap a capped ingredient container 110 placed on the central position.

The support component, comprising the rigid components 351 and 356 which are rigidly connected to each other, will be referred to as a first support component of the cap opening sub-mechanism 306 (FIG. 20A); the support component 378, will be referred to as a second support component of the cap opening sub-mechanism 306 (FIGS. 20C-20D); the support component 386, will be referred to as a third support component of the cap opening sub-mechanism 306 (FIGS. 23A-23B, 24A); the support component 395, will be referred to as a fourth support component of the cap opening sub-mechanism 306 (FIGS. 23B-23C, 24A); the support component 418, will be referred to as a fifth support component of the cap opening sub-mechanism 306 (FIG. 24B).

It should be noted that the cap opening sub-mechanism 306 comprises:

(1) the central axis of the cap opening sub-mechanism 302 (of the cap opening sub-mechanism 306), also referred to as the central axis of the cap opening sub-mechanism 306;

(2) the gripping devices 259a and 259b each constrained to rotate around a respective horizontal axis;

(3) a first motorized mechanism configured to produce rotations of the gripping devices 259a and 259b relative to the first support component, so that the grippers may simultaneously move towards, or away from, the central axis, as to firmly grip or release a cap, the first motorized mechanism comprising the first support component, the motor 371, the rigid components 354, 352, the screw shaft 353, etc.;

(4) a second motorized mechanism configured to rotate the first support component (comprising 351 and 356) relative to the second support component 378, the second motorized mechanism comprising the second support component 378, the motor 373, the gears 365 and 366, etc. Said second motorized mechanism may be referred to as a first motion mechanism of the cap opening apparatus 360;

(5) a constraining mechanism configured to constrain the movement of the second support component 378 to a linear motion of limited range in the vertical direction, relative to the third support component 386, the constraining mechanism comprising the third support component 386, the linear motion bearings 376, the shafts 375, etc.;

(6) a vertical motion mechanism, to be referred to as a third motorized mechanism, configured to produce a linear motion in the vertical direction in the third support component 386, relative to the fourth support component 395, the vertical motion mechanism comprising the fourth support component 395, the linear motion bearings 387, the bearing housings 385, the shafts 396, the screw shaft 397, the screw nut 388, the motor 391, the coupling 393, etc.;

(7) a horizontal motion mechanism, referred to as a fourth motorized mechanism, configured to produce a rotation around a vertical rotational axis, in the fourth support component 395 relative to the fifth support component 418, the horizontal motion mechanism comprising the fourth support component 395, the shaft 422, the bearing housing 419, the bearings 421, the motor 415, the coupling 417, the frame 416, etc.

It should also be noted that the horizontal motion mechanism in the cap opening sub-mechanism 306, as described in the previous paragraph, may be substituted by a motion mechanism configured to produce a linear movement or a curved sliding or other type of movement in the fourth support component 395 relative to the fifth support component 418.

It should be noted that the container gripping mechanism 307 comprises:

(1) the central axis of the container fixing mechanism;

(2) the gripping device 413a, referred to as a first gripping device;

(3) the gripping device 413b, referred to as a second gripping device;

(4) a first constraining mechanism configured to constrain the gripping device 413a to rotate relative to a first horizontal axis, the first constraining mechanism comprising a shaft 435, a pair of bearings 433, a pair of bearing housings 431, etc.;

(5) a second constraining mechanism configured to constrain the gripping device 413b to rotate relative to a second horizontal axis, the second constraining mechanism comprising a shaft 435, a pair of bearings 433, a pair of bearing housings 431, etc.;

(6) stopper mechanisms to limit the rotations of the gripping devices 413a and 413b, the stopper mechanisms comprising the first stopper components 426a and 426b, the second stopper components 428 etc.

(7) the torsion springs 437 to force the rotations of the gripping devices 413a and 413b, as to press the gripping devices to move away from the central axis;

(8) the support component 439;

(9) the walls 432a and 432b which are rigidly connected with the support component 439;

(10) the platform 436, on which a container 111 or a capped container 110 may be placed, wherein the platform is rigidly connected with the support component 439.

It should be noted that the container gripping mechanism 307 is not powered by itself. It works together with the cap opening sub-mechanism 306.

Figure 27A:
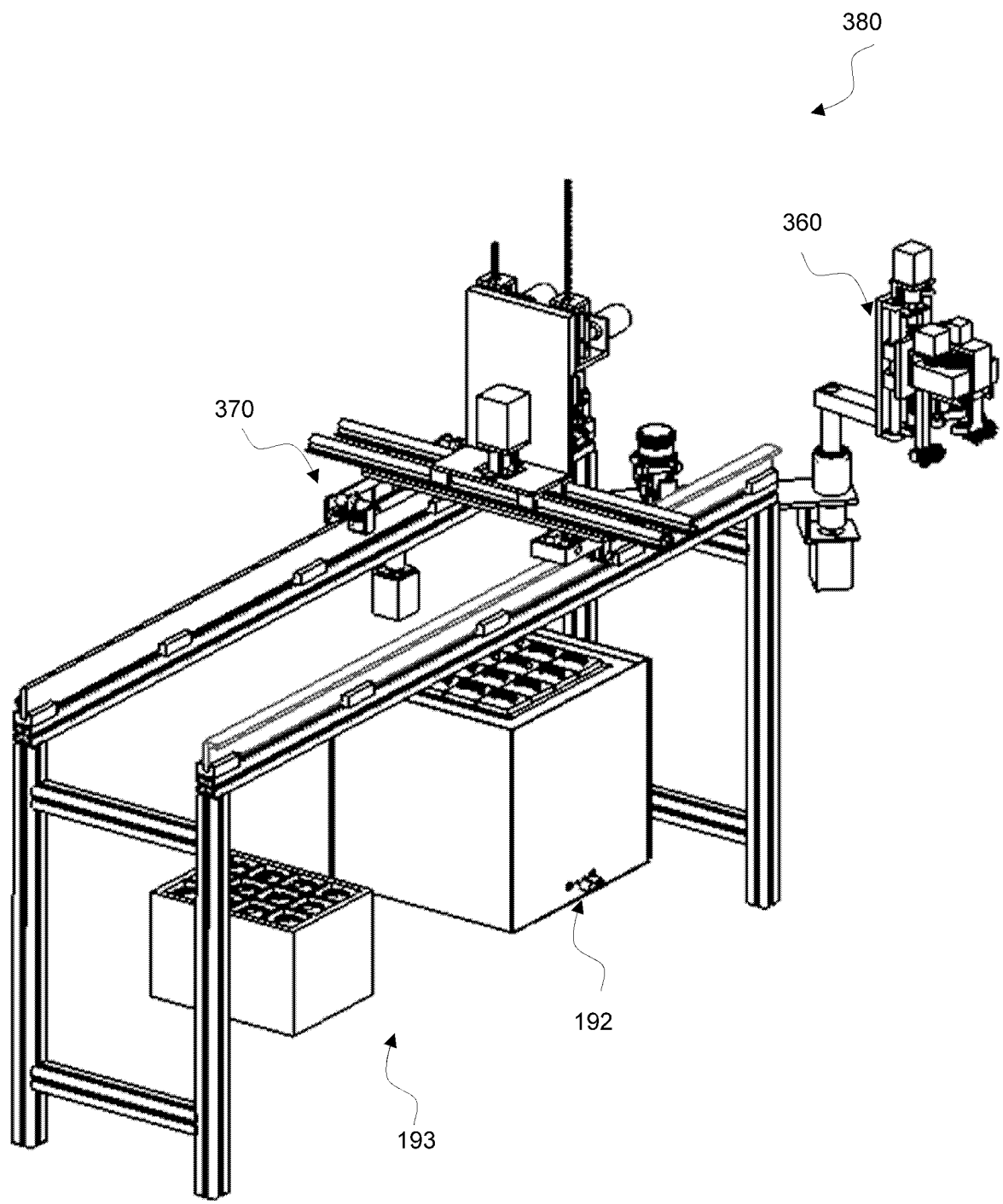
FIGS. 27A-27B show aerial views of a kitchen sub-system.
Figure 27B:
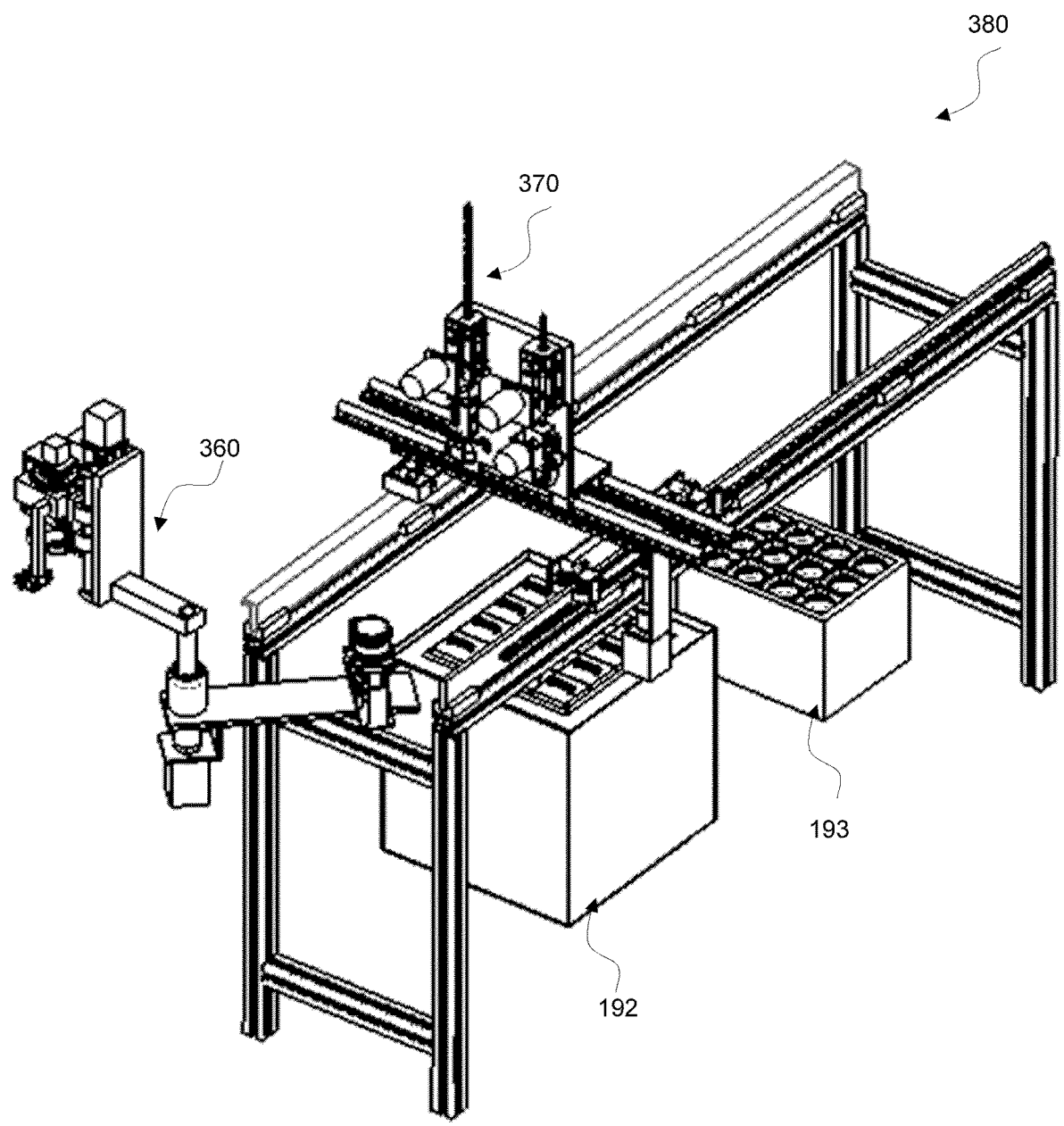
Figure 27C:
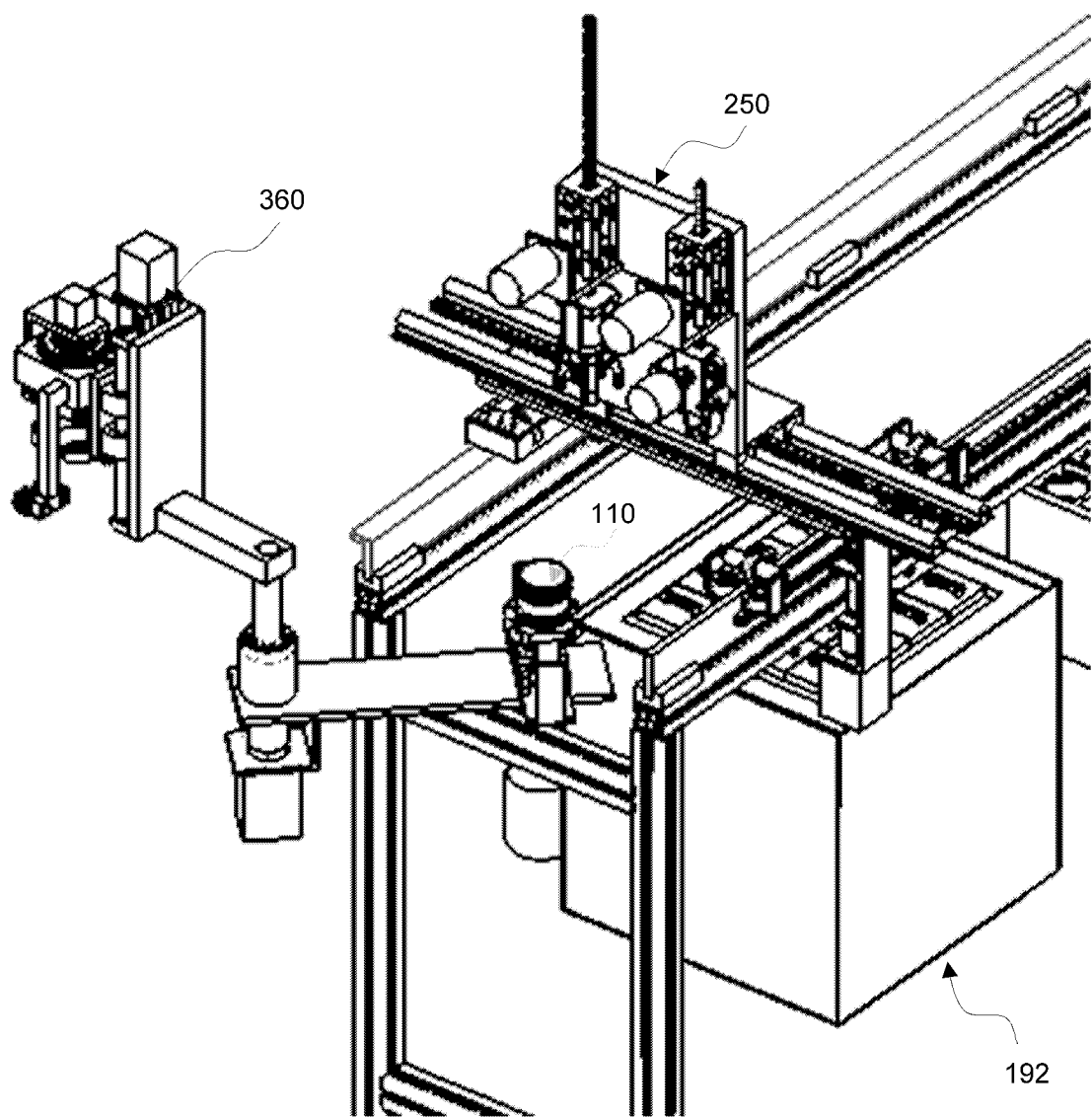
FIG. 27C shows an aerial view of parts of the kitchen sub-system.

In some embodiments, referring to FIGS. 27A-27C, a kitchen sub-system 380 comprises a storage and transfer system 370, and a cap opening apparatus 360. The support frame 301a in the storage and transfer system 370 and the support component 418 in the cap opening apparatus 360 are configured to be rigidly connected, so that their positions are fixed with respect to each other. The platform 436 of the gripping mechanism 307 of the cap opening apparatus 360 is configured to be positioned so that the transfer apparatus 340 may release a gripped capped container 110 at the central position of the cap opening apparatus 360. As explained before, the transfer apparatus 340 in the storage and transfer system 370 may transfer the highest positioned capped container 110 from any compartment of storage apparatus 192 to be placed at the central position of the cap opening apparatus 360. Once the capped container 110 is placed on the central position, the cap opening apparatus 360 can remove the cap from the capped container and move the cap away (and in some applications, the cap may be transferred by a further cap transfer apparatus to a transport box).

It should be noted that in the kitchen sub-system 380, the storage and transfer system 370 may be substituted by the storage and transfer system 550, wherein the support frame 505a of the storage and transfer system 550 and the support component 418 in the cap opening apparatus 360 are configured to be rigidly connected, so that their positions are fixed with respect to each other; wherein the platform 436 of the cap opening apparatus 360 is configured to be positioned so that the transfer apparatus 540 may release a gripped capped container 110 on the central position of the cap opening apparatus 360. The transfer apparatus 540 in the storage and transfer system 550 may transfer the highest positioned capped container 110 from any compartment of storage apparatus 192 to be placed atop the platform 436 of the cap opening apparatus 360. Once the capped container 110 is placed at the central position of the cap opening apparatus 360, the cap opening apparatus 360 may remove the cap from the capped container and move the cap away (and the cap may be transferred by a further cap transfer apparatus to a transport box).

Figure 28:
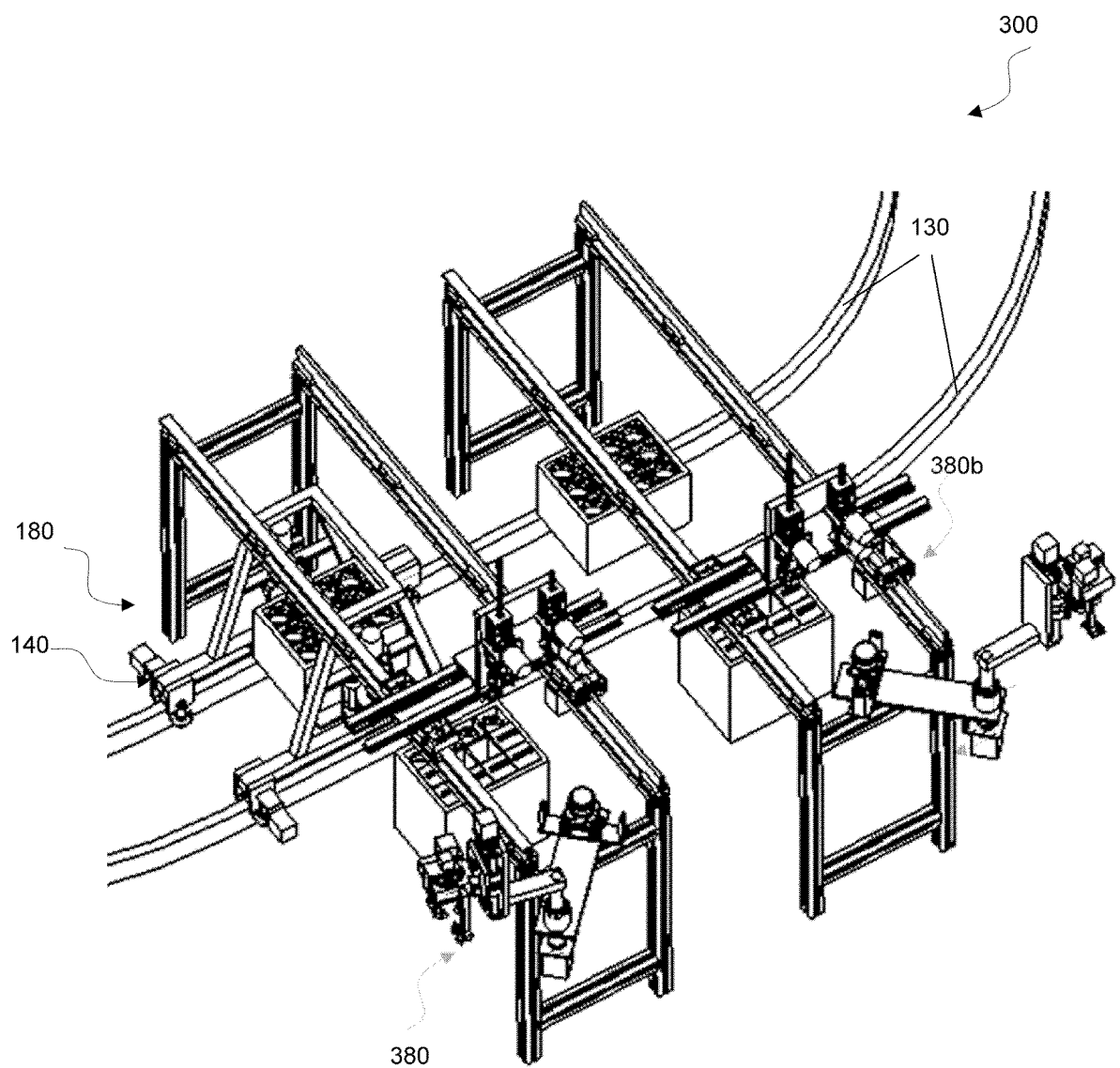
FIG. 28 shows an aerial view of a kitchen sub-system.

In some embodiments, referring to FIG. 28, a kitchen sub-system 300 comprises a kitchen sub-system 380, a kitchen sub-system 380b and a transportation apparatus 180; wherein the kitchen sub-system 380b is configured in the same way as the kitchen sub-system 380 except that: (1) the capped containers 110 are substituted by capped containers of a different size, hereby denoted by the symbol 110b; and (2) the transport boxes 193 and storage apparatus 192 are substituted by transport boxes and storage apparatus which are configured to hold capped containers 110b. (Please note that the symbol "110b" is solely used for the textual description here, and not appeared in figures.) The mini vehicles 140 of the transportation apparatus 180 are configured to also transfer a transport box of the kitchen sub-system 380b which can contain a plurality of capped containers 110b, from and to a location of the kitchen sub-systems 380b.

Figure 29A:
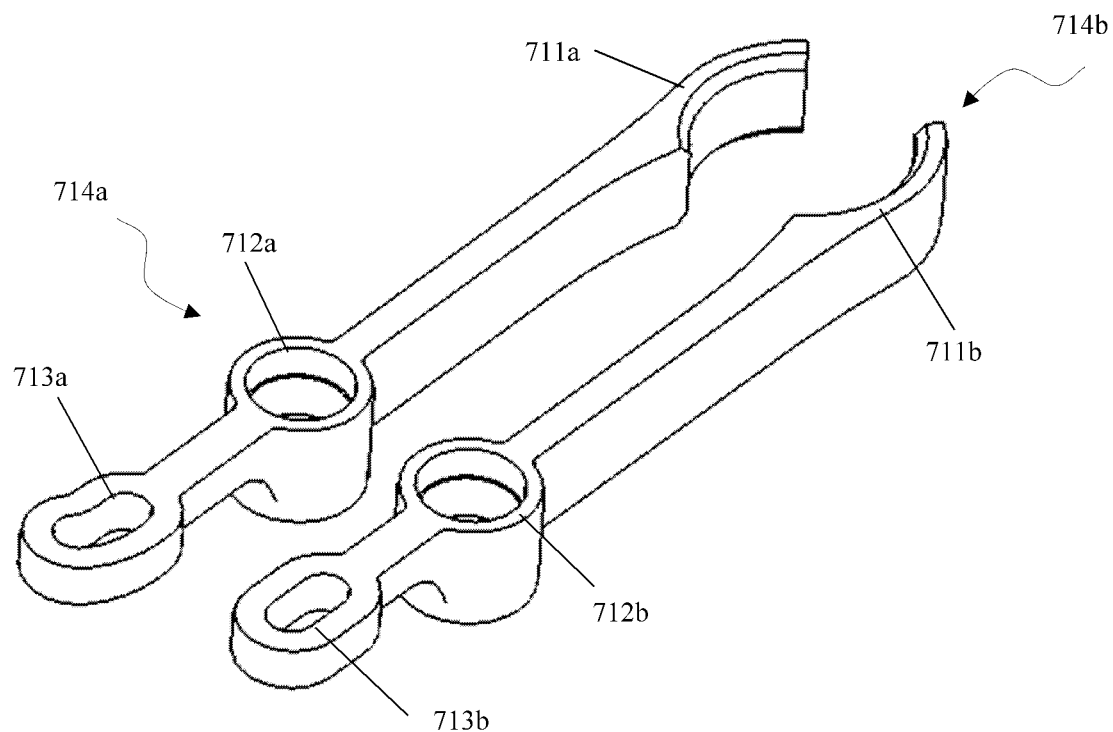
FIGS. 29A-29B show aerial views of parts of a gripping mechanism.
Figure 29B:
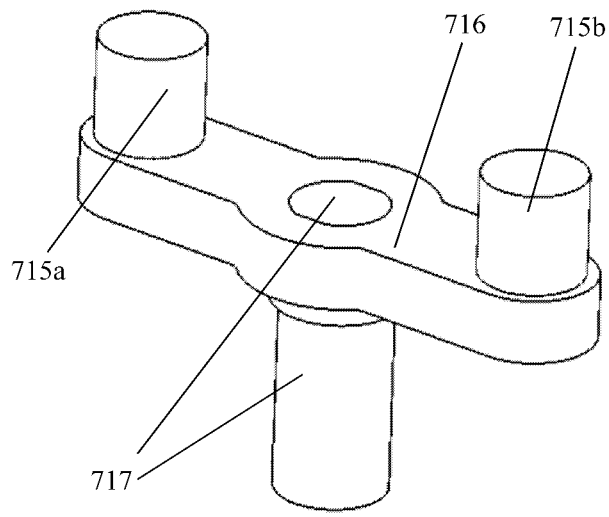
Figure 29C:
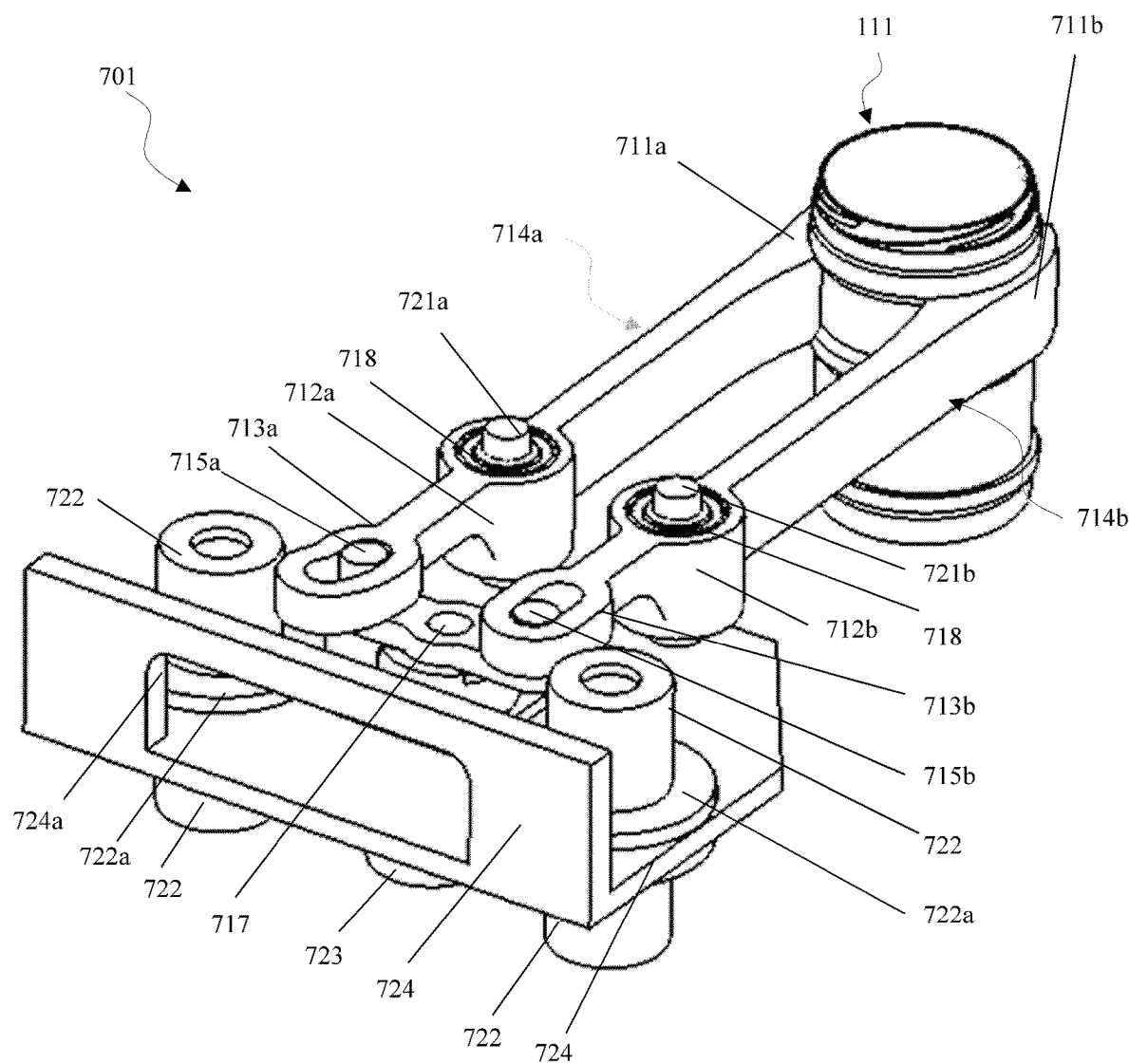
FIGS. 29C-29D show aerial views of the gripping mechanism.

In some embodiments, referring to FIGS. 29A-29C, a gripping mechanism 701 comprises a pair of gripping devices 714a and 714b, shafts 715a, 715b and 717, and a connector 716 configured to rigidly connect the shafts 715a, 715b and 717. The axes of the shafts 715a, 715b and 717 are configured to be vertical (see FIG. 29B). The gripping device 714a or 714b comprises a curved hole 713a or respectively 713b, a bearing housing 712a or respectively 712b, a gripper 711a or respectively 711b, wherein the gripper 711a or 711b comprises a part of a cylindrical surface (see FIG. 29A). The curved hole 713a and the gripper 711a are both rigidly connected to the bearing housing 712a; and the curved hole 713b and the gripper 711b are both rigidly connected to the bearing housing 712b. The gripping device 714a or 714b may comprise a rubber or silica gel or other elastic material which is attached to the cylindrical part of the gripper 711a or respectively 711b.

Figure 29D:
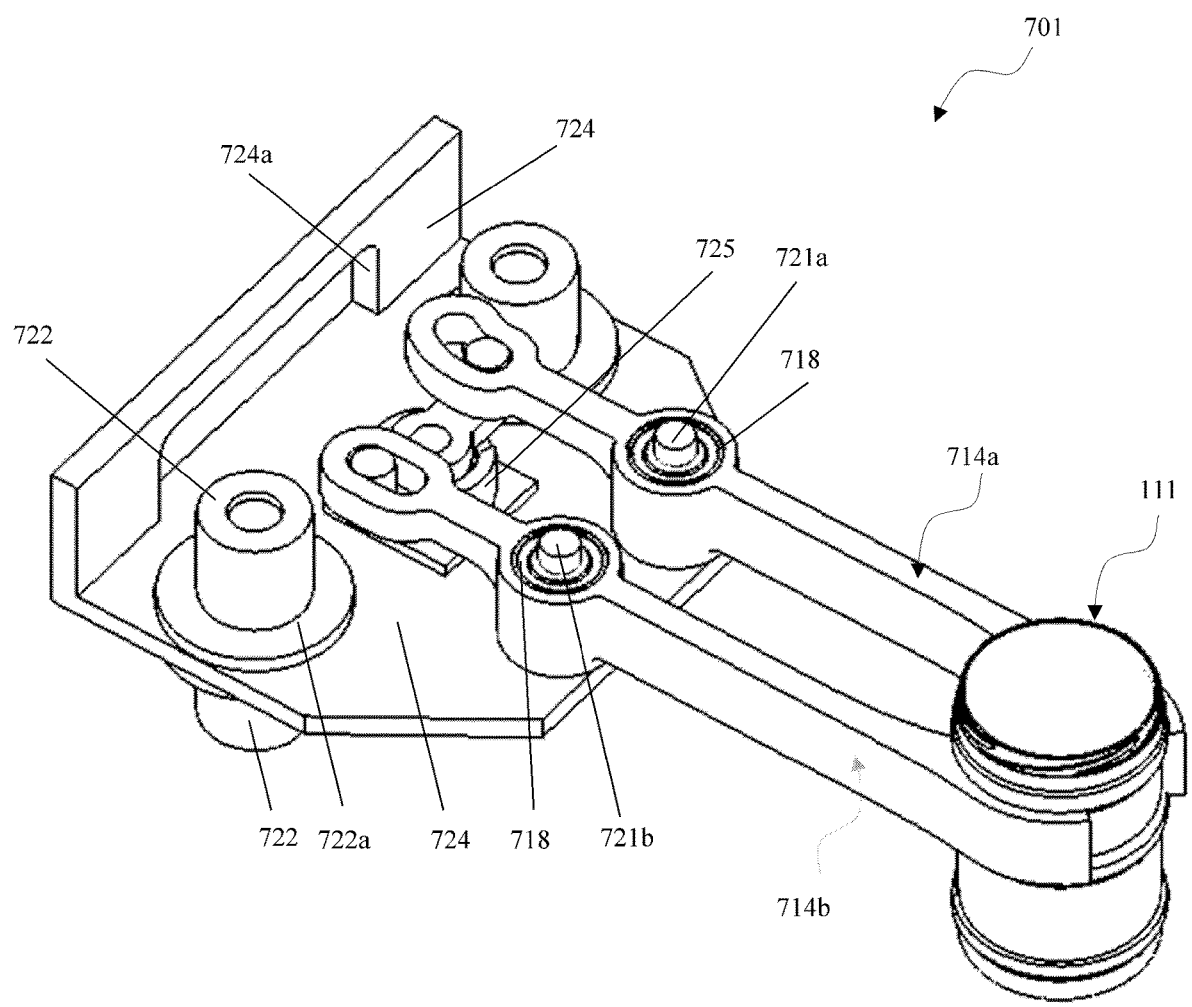

The gripping mechanism 701 also comprises: a pair of shafts 721a and 721b; a L-shaped support component 724 comprising a vertical plate and horizontal plate, with a slotted hole 724a on the vertical plate (see FIGS. 29C-29D), wherein the slotted hole comprises a top horizontal surface and a bottom horizontal surface. The gripping mechanism 701 further comprises a bearing housing 725 comprising a flange. The pair of shafts 721a and 721b and the flange of the bearing housing 725 are all rigidly connected to the horizontal plate of the support component 724; and the axes of the pair of the shafts 721a, 721b and the axis of the bearing housing 725 are configured to be vertical. A pair of bearings 718 and accessories are configured to connect the shaft 721a and the bearing housing 712a of the gripping device 714a, so that the shaft 721a is constrained to rotate relative to the bearing housing 714a, around the axis of the shaft 721a. Similarly, a pair of bearings 718 are configured to connect the shaft 721b and the bearing housing 712b of the gripping device 714b, so that the shaft 721b is constrained to rotate relative to the bearing housing 714b, around the axis of the shaft 721b. A pair of bearings and accessories (hidden in figures) are configured to connect the shaft 717 and the bearing housing 725, so that the shaft 717 is constrained to rotate relative to the bearing housing 725 around the axis of the shaft 717. The gripping mechanism 701 also comprises a motor 723 comprising a shaft and a base component, wherein the base of the motor is fixedly connected to the support component 724 (see FIG. 29C). The shaft of the motor 723 is connected to the shaft 717 so that the motor 723 can drive a rotation of the shaft 717 relative to the bearing housing 725, or equivalently, relative to the support component 724. When the shaft 717 is rotated by the motor 723, the connector 716 is also rotated relative to the bearing housing 725 around the axis of the shaft 717, and then the pair of shafts 715a and 715b are rotated around the axis of the shaft 717. The shaft 715a is configured to be inserted in the curved hole 713a of the gripping device 714a, so that a movement of the shaft 715a may induce a rotation in the gripping device 714a around the axis of the shaft 721a. Similarly, the shaft 715b is configured to be inserted in the curved hole 713b of the gripping device 714b, so that a movement of the shaft 715b may induce a rotation in the gripping device 714b, around the axis of the shaft 721b. As the gripping devices 714a and 714b are rotated in one direction, the grippers 711a and 711b may grip and hold an ingredient container 111; and the grippers 711a and 711b may be rotated in the other direction to release a gripped ingredient container 111. When an ingredient container 111 is gripped and held by the grippers 711a and 711b of the gripping mechanism 701, as shown in FIGS. 29C-29D, the axis of the ingredient container 111 is configured to be vertical, and hence parallel to the axes of the shafts 721a and 721b.

The gripping mechanism 701 also comprises four linear motion bearings 722 and four corresponding flange 722a. Each linear bearing 722 comprises an outer shell which is rigidly connected to the corresponding flange 722a. The flanges 722a are all configured to be rigidly connected to the horizontal plate of the support component 724; and the axes of two of the four linear motion bearings 722 are configured to be the same, and the axes of the other two of the four linear motion bearings are configured to be the same. The axes of the linear bearing housings are configured to be vertical.

Figure 30A:
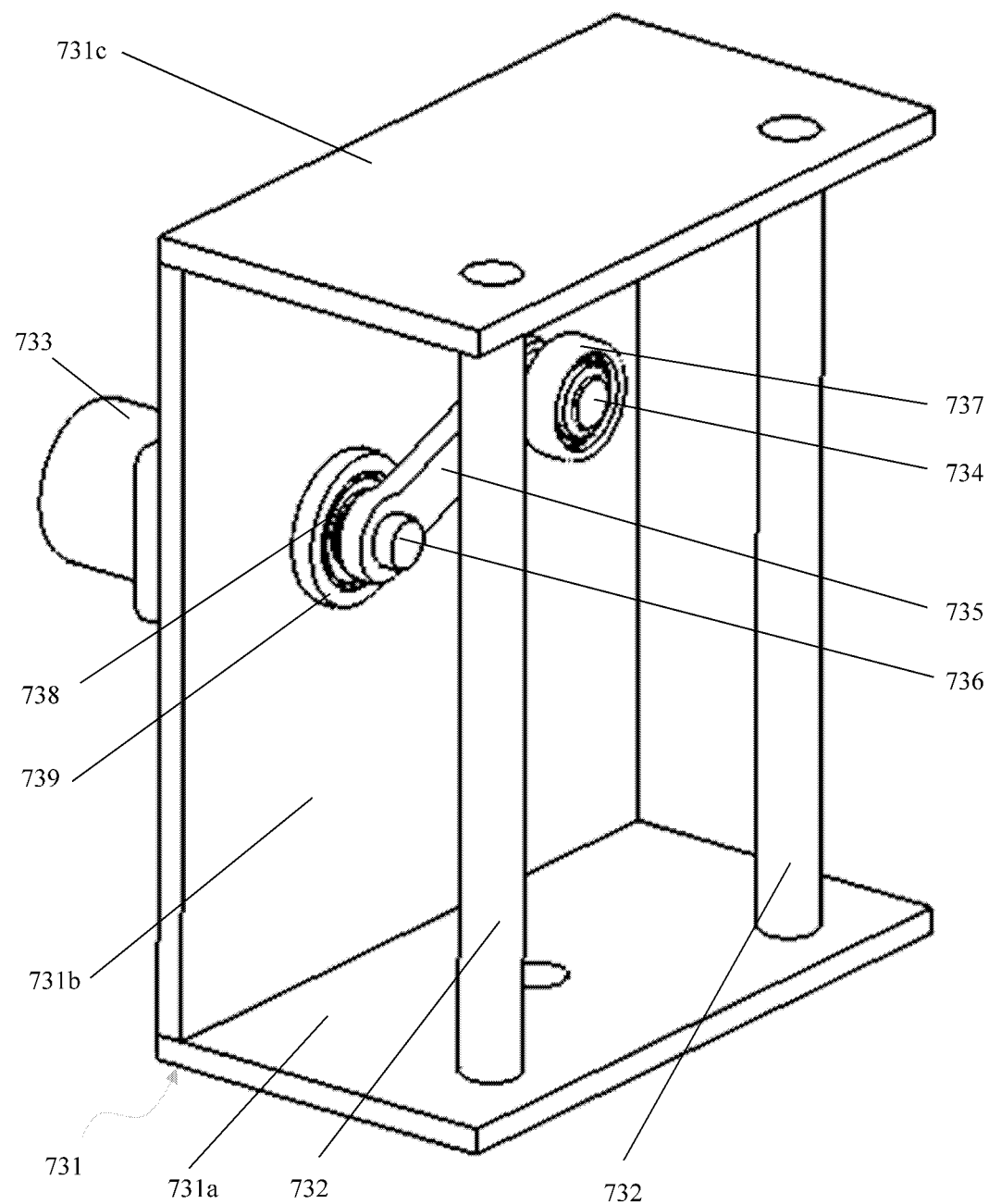
FIG. 30A shows an aerial view of parts of a transfer sub-apparatus.
Figure 30B:
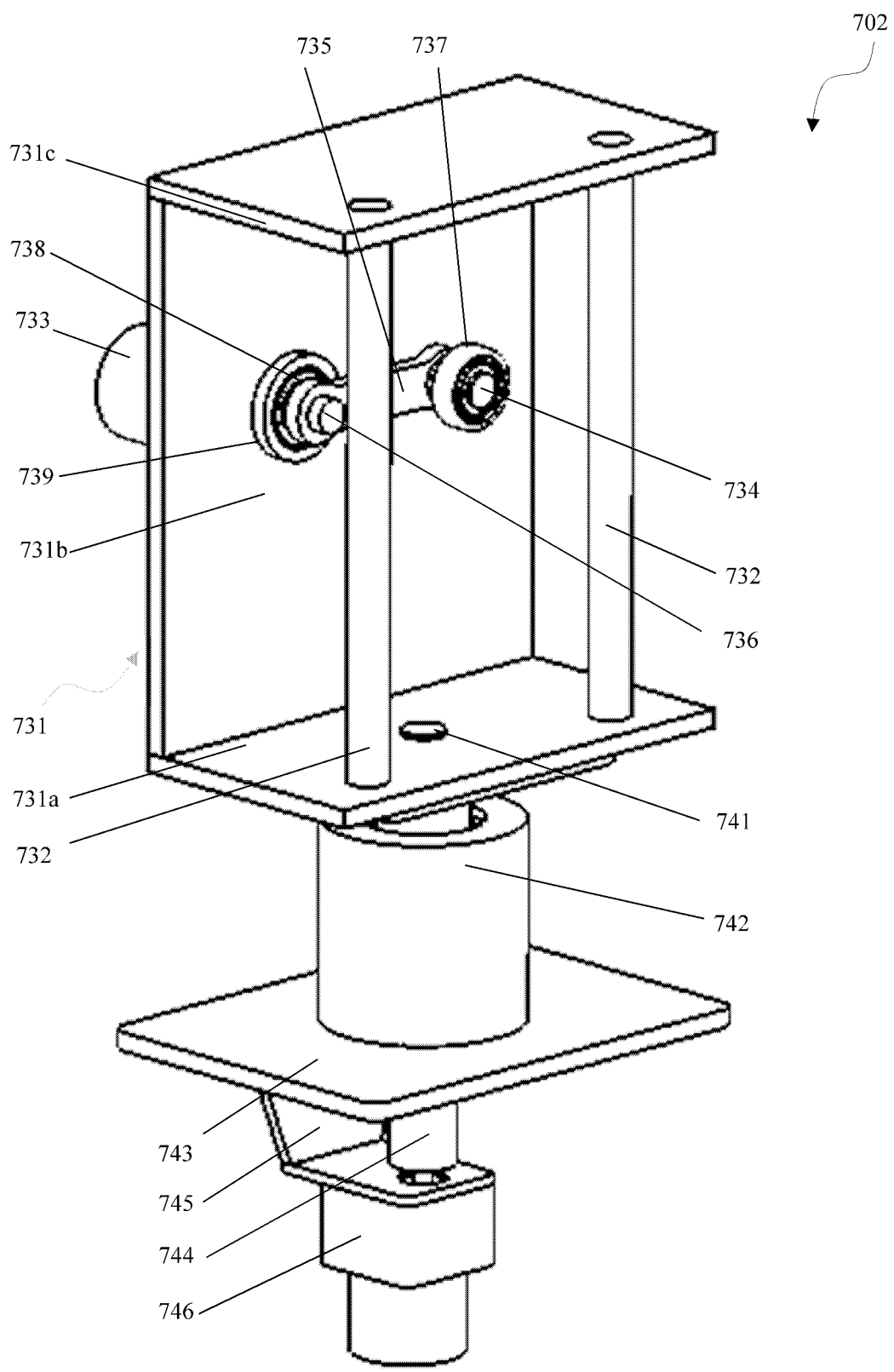
FIG. 30B shows an aerial view of the transfer sub-apparatus.

In some embodiments, referring to FIGS. 30A-30B, a transfer sub-apparatus 702 comprises: a pair of shafts 732; a support frame 731 comprising a vertical plate 731b and two horizontal plates 731a and 731c, wherein the vertical plate 731b is configured to be rigidly connected to the two horizontal plates 731a and 731c. Each shaft 732 is rigidly connected to the horizontal plates 731a and 731c, wherein the axes of the pair of shafts 732 are configured to be vertical (see FIGS. 30A-30B). The transfer sub-apparatus 702 further comprises: a bearing housing 739; two shafts 734 and 736; a connector 735 configured to fixedly connect the shaft 734 and 736; and a motor 733 comprising a shaft and a base component. The bearing housing 739 is configured to be rigidly connected to the vertical plate 731b of the support frame 731. A pair of bearings 738 and accessories are configured to connect the shaft 736 and the bearing housing 739, so that the shaft 736 is constrained to rotate to the bearing housing 739, around the axis of the shaft 736. The axes of the two shafts 734 and 736 are configured to be horizontal and parallel to each other. A wheel 737 is mounted on the shaft 734 and the wheel 737 is constrained to rotate freely relative to the shaft 734, around the axis of the wheel; wherein the axis of the wheel 737 coincides with the axis of the shaft 734. The base of the motor 733 is fixedly connected to the vertical plate 731b, and the shaft of the motor 733 is connected to the shaft 736, so that the motor 733 may produce a rotation of the shaft 736. When the shaft 736 is rotated by the motor 733, the connector 735, the shaft 734 and the axis of the wheel 737 are also rotate around the axis of the shaft 736.

The transfer sub-apparatus 702 also comprises a shaft 741 comprising a vertical axis; a bearing housing 742; a support component 743 in the shape of a plate; and a motor 746 comprising a shaft and a base component (see FIG. 30B). The bearing housing 742 is rigidly connected to the support component 743; and the axis of the bearing housing 742 is configured to be vertical. A pair of bearings and accessories (hidden in figure) are configured to connect the shaft 741 and the bearing housing 742, so that the shaft 741 is constrained to rotate relative to the bearing housing 742, around the axis of the shaft 741. The horizontal plate 731a of the support frame 731 of the transfer sub-apparatus 702 is configured to be rigidly connected to the shaft 741. Therefore, the support component 731 is constrained to rotate to the support component 743, around the axis of the shaft 741. The base of the motor 746 is fixedly connected to the support component 743 by a connection frame 745; and the shaft of the motor 746 is configured to connected to the shaft 741 by a coupling 744; and thus, the motor 746 may produce a rotation of the shaft 741, and hence a rotation of the support component 731.

Figure 31:
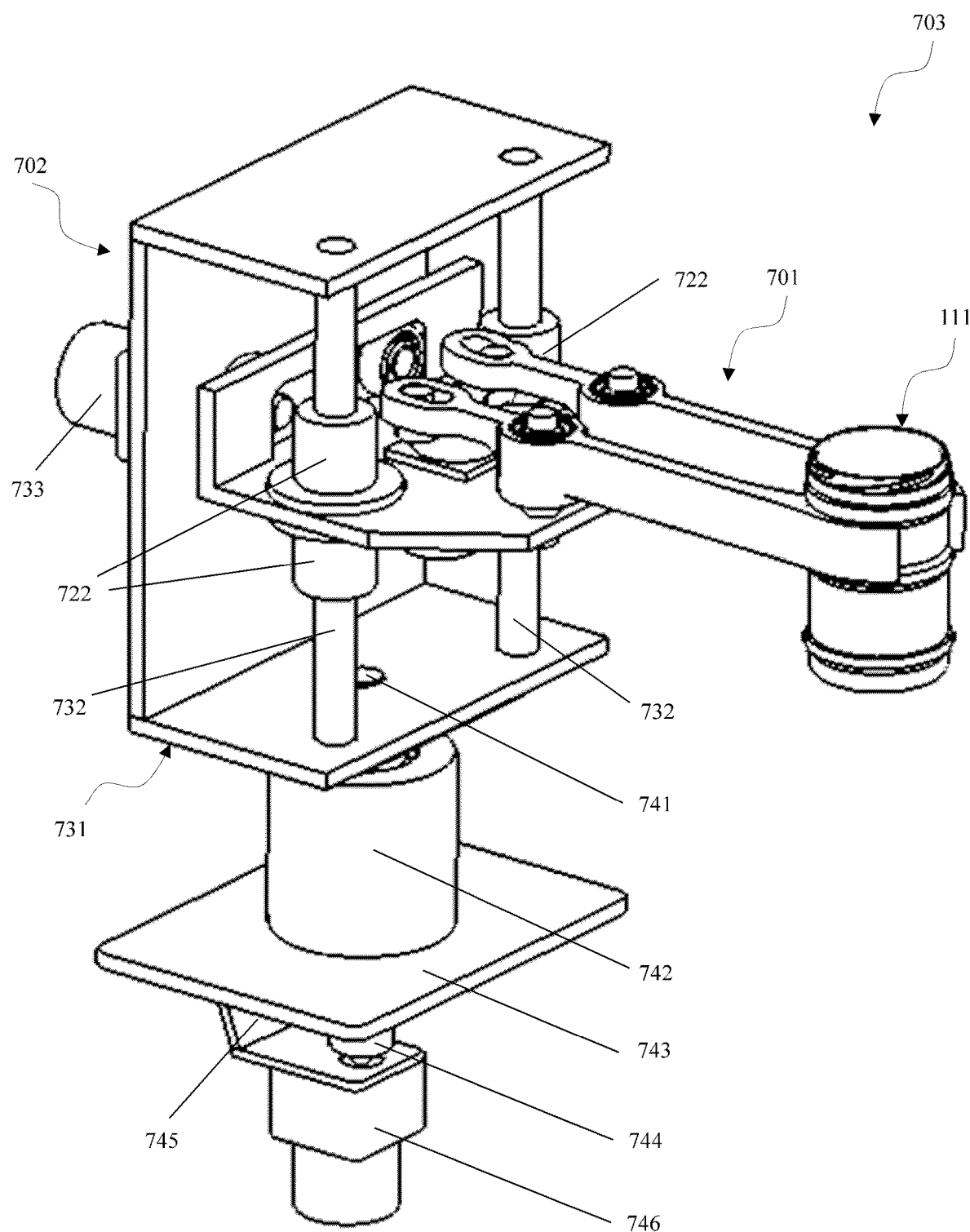
FIG. 31 shows an aerial view of a transfer apparatus.

In some embodiments, referring to FIG. 31, a transfer apparatus 703 comprises: a gripping mechanism 701 and a transfer sub-apparatus 702. Each linear motion bearing 722 of the gripping mechanism 701 is engaged with a shaft 732 of the transfer sub-mechanism 702 so the linear motion bearing 722 is constrained to slide vertically on the shaft 732 along the axis of the shaft 732. Since the support component 724 is rigidly connected with the flanges connected to the outer shells of the linear motion bearings 722, the support component 724 of the gripping mechanism 701 is constrained to slide vertically relative to the support frame 731. On the other hand, the wheel 737 of the transfer sub-mechanism is configured to be positioned between the top horizontal surface and the bottom horizontal surface of the slotted hole 724a of the gripping mechanism 701, so that the rotation of the shaft 734 around the axis of the shaft 736 may induce a vertical linear movement of the support component 724 of the gripping mechanism 701. The range of the vertical linear movement of the support component 724 can be equal to (or nearly equal to) two times the distance between the axes of the shafts 734 and 736. As explained before, the support frame 731 may be rotated relative to the support component 743 around the axis of the shaft 741, as driven by the motor 746, so that the support component 724 may be rotated relative to the support component 743 around the axis of the shaft 741 as well as the support frame 731.

It should be noted that the linear motion bearings 722 may be instituted by bearing bushes or copper bushes. Same applies to other linear motion bearings of the present patent application.

The support component 724 of the gripping mechanism 701 will be referred to as the first support component of the transfer apparatus 703. The support frame 731 will be referred to as a second support component of the transfer apparatus 703. The support component 743 will be referred to as a third support component of the transfer apparatus 703.

It should be noted that the transfer apparatus 703 comprises the following:

(1) the gripping mechanism 701 configured to grip and hold a container 111, wherein the gripping mechanism 701 comprises the support component 724, to be referred to as the support component of the gripping mechanism, or the first support component of the transfer apparatus. The gripping mechanism also comprises a pair of gripping devices which are configured to be rotated relative to the first support component by a motorized mechanism; and each gripping device comprise a gripper, wherein the grippers are configured to fit the ingredient container 111.

(2) a vertical motion mechanism, referred to as a first motorized mechanism, configured to produce a vertical linear motion in the first support component 724 relative to the second support component 731, wherein the vertical motion mechanism comprises the second support component 731, the motor 733, shafts 736 and 734, connector 735, bearing housing 739, bearings 738, slotted hole 724a, two parallel shafts 732, and four linear motion bearings 722, etc., and their connections to each other if any, and their connections to the other components of the transfer apparatus if any.

(3) a rotational motion mechanism, referred to as a second motorized mechanism, configured to produce a rotation of the second support component 731 relative to the third component 743, around a vertical axis (i.e., the axis of the shaft 741), wherein the second motorized mechanism comprises the third support component 743, the motor 746, connection frame 745, coupling 744, bearing housing 742, shaft 741, etc., and their connections with each other if any, and their connections to the other components of the transfer apparatus if any.

The distance between the axis of the shaft 741 and the axis of an ingredient container 111 is configured to be a constant, when the ingredient container 111 is gripped by the gripping mechanism 701 of the transfer apparatus, as in FIG. 31. The said constant is referred to as the radius of the transfer apparatus 703. The transfer apparatus 703 may be used to grip an ingredient container 111, when the axis of the ingredient container is positioned vertically, and the distance from the axis of the ingredient container to the axis of the shaft 741 is equal to the radius of the transfer apparatus 703, and when the height of the ingredient container is within a certain limit. The transfer apparatus 703 may grip an ingredient container 111, and may move it linearly in vertical direction, or horizontally by a rotation around the axis of the shaft 741, or by a combination of both, and then it may release the ingredient container 111 at a position which is different from the previous position.

We note that the second motorized mechanism of the transfer apparatus 703 may be substituted by a motorized mechanism configured to move the second support component relative to the third support component by a horizontal translation, or more generally, by a horizontal planar motion.

It should be noted that a computer may be used to control all the motors in the transfer apparatus 703, as to control the timing and speed of their produced motions.

Figure 32A:
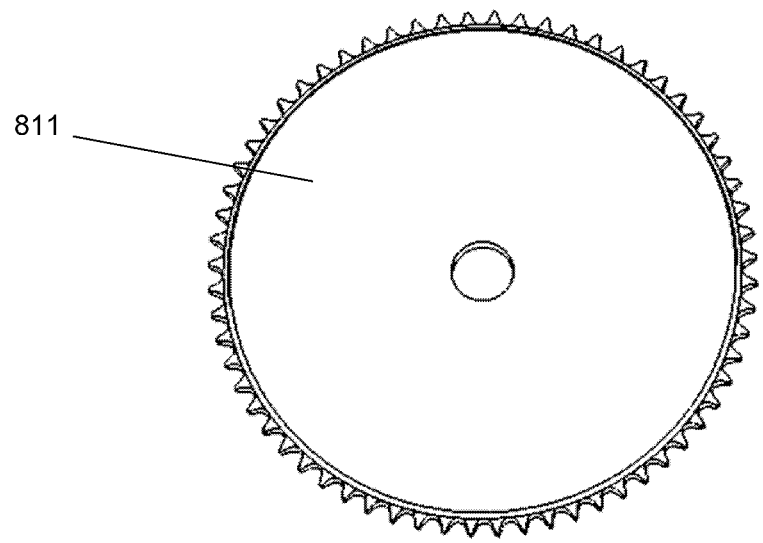
FIG. 32A shows an aerial view of a chain wheel.
Figure 32B:
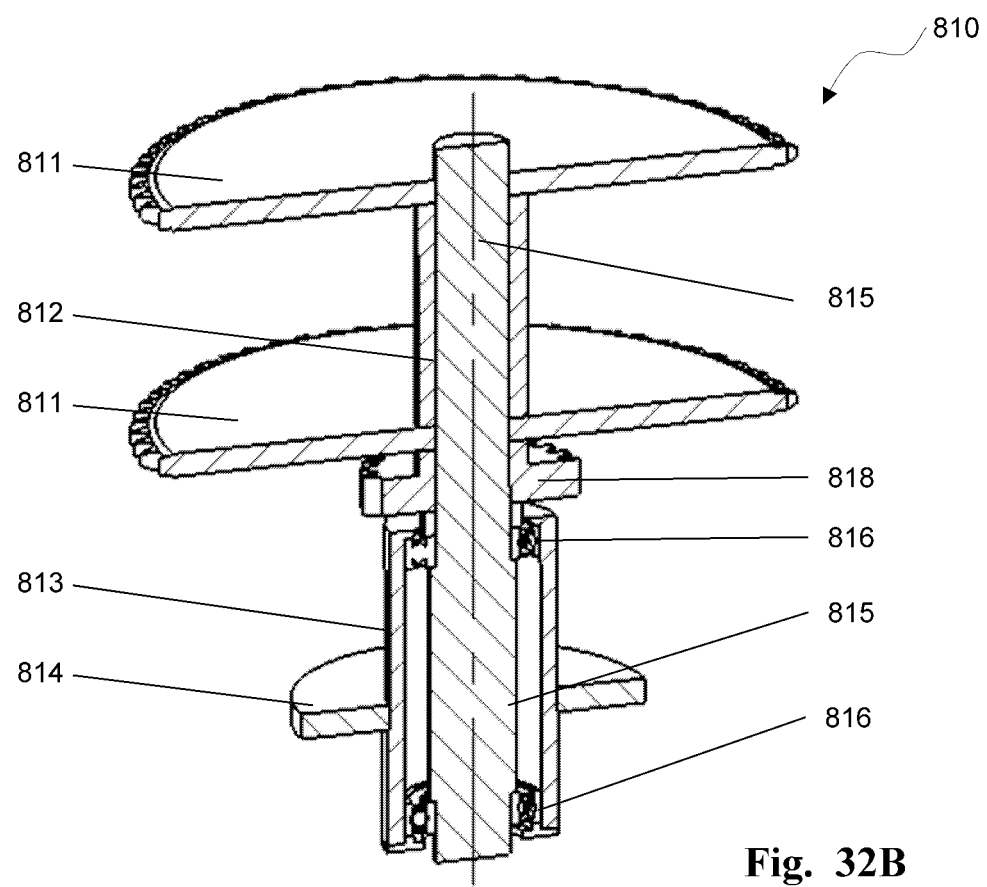
FIG. 32B shows a cut view of the chain wheel sub-mechanism.

In some embodiments, referring to FIGS. 32A-32B, a chain wheel sub-mechanism 810 comprises a bearing housing 813, a shaft 815, a ring-shaped support component 814 and a pair of bearings 816. The support component 814 is rigidly joined with the bearing housing 813. The pair of bearings 816 are configured to connect the shaft 815 and the bearing housing 813, so that the shaft 815 is constrained to rotate relative to the bearing housing 813 around the axis of the shaft 815. The chain wheel sub-mechanism 810 also comprises two chain wheels 811, a ring 812 of cylinder shape, and a gear 818. The two chain wheels 811 and the gear 818 are rigidly connected to the shaft 815. The axes of the two chain wheels 811, the axis of the gear 818 and the axis of the shaft 815 are configured to be coincide. When the gear 818 rotates, the shaft 815 and the two chain wheels 811 are also rotated around the axis of the shaft 815. The ring 812 is on the shaft 815 and is positioned between the two chain wheels 811.

Figure 33A:
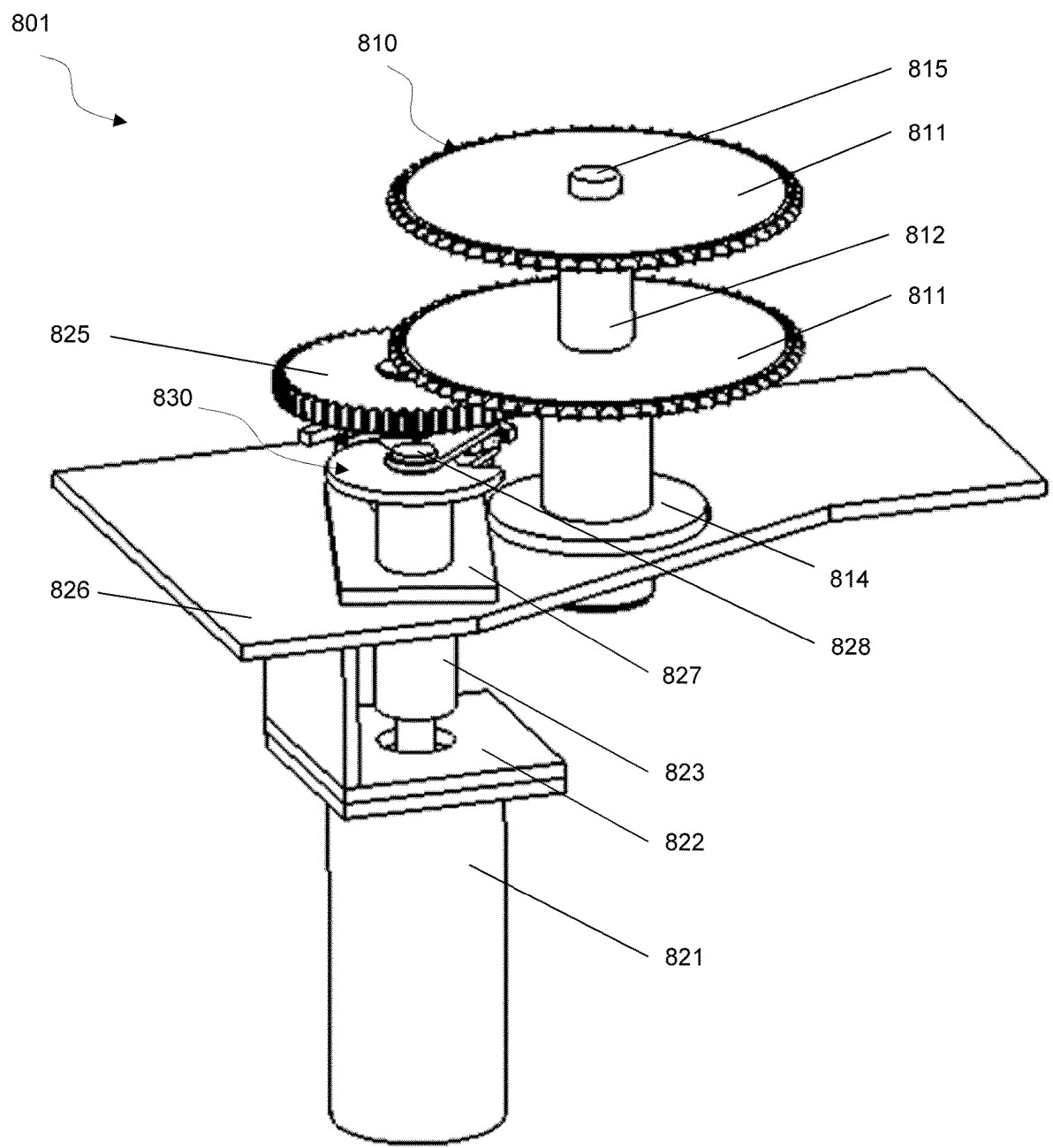
FIGS. 33A-33B show aerial views of a chain driving mechanism.
Figure 33B:
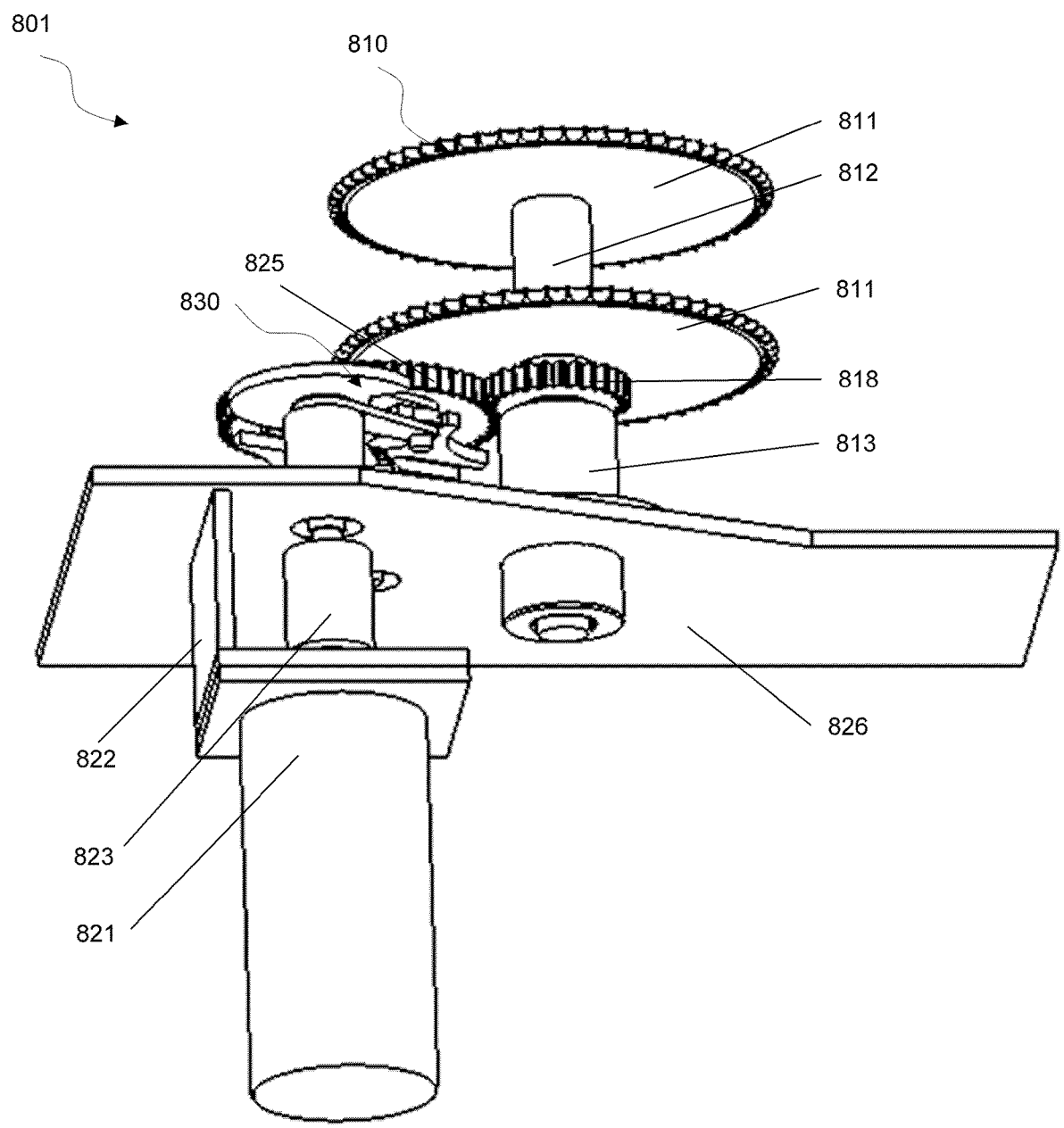

In some embodiments, referring to FIGS. 33A-33B, a chain driving mechanism 801 comprises a chain wheel sub-mechanism 810, a gear 825, a rigid component 826 in the shape of a plate, a Geneva mechanism 830 and a motor 821 comprising a shaft and a base component. The support component 814 of the chain wheel sub-mechanism 810 is rigidly connected to the rigid component 826. The support component 827 of the Geneva mechanism 830 is rigidly connected with the rigid component 826. The Geneva mechanism 830 is configured to produce an intermittent rotation of the gear 825 around a vertical axis; wherein the Genera mechanism 830 is driven by the motor 821 via a coupling 823. The gear 825 is configured to be engaged with the gear 818 of the chain wheel sub-mechanism 810. Thus, the intermittent rotation of the gear 825 induces an intermittent rotation of the gear 818, and that of the chain wheels 811, around the axis of the shaft 815. As the motor 821 rotates one round (360 degrees), the chain wheels 811 are rotated synchronously by a fixed angle. This may be called a period of the intermittent motion.

Figure 34:
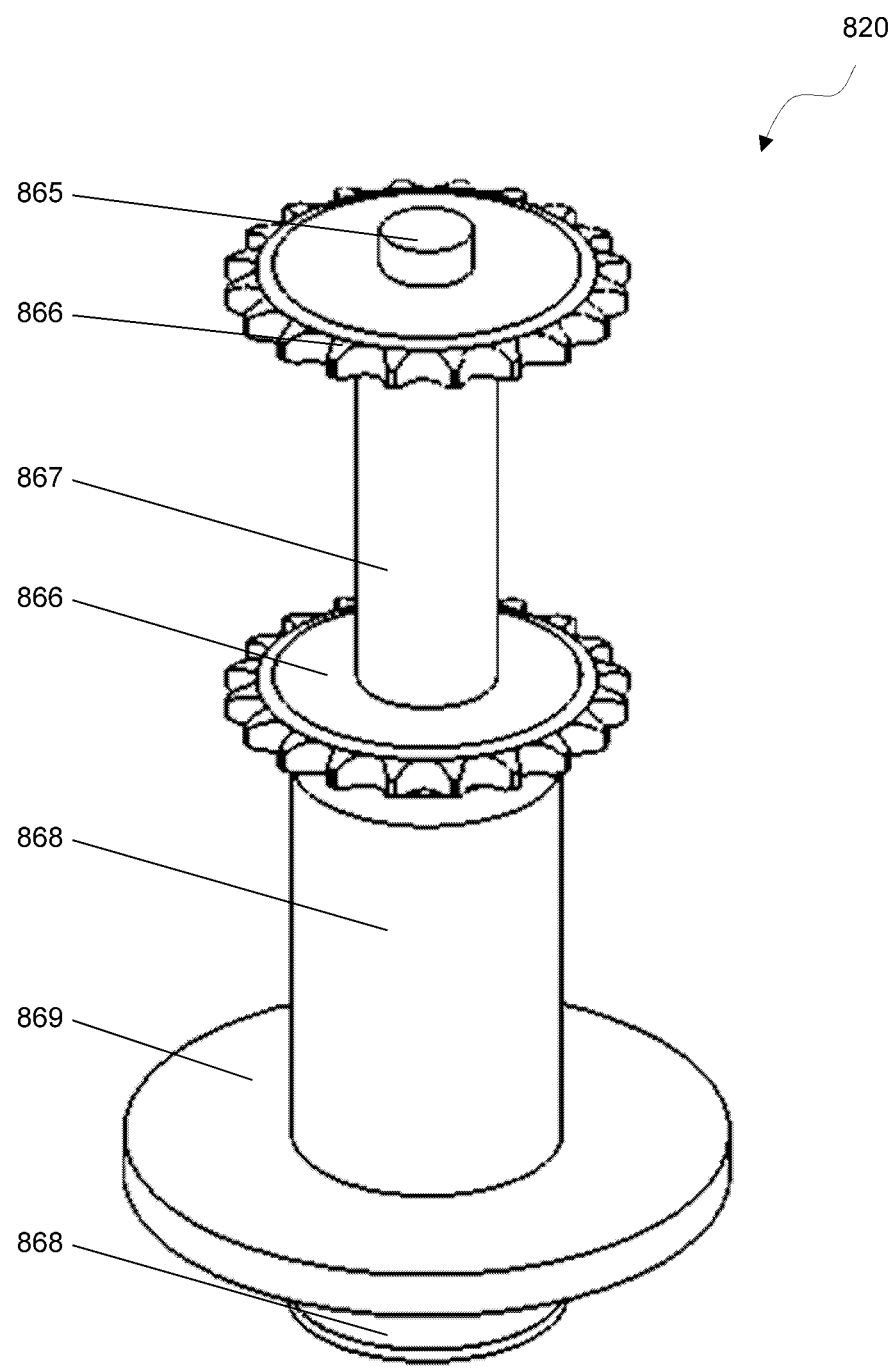
FIG. 34 shows an aerial view of a chain wheel sub-mechanism.

In some embodiments, referring to FIG. 34, a chain wheel sub-mechanism 820 comprises two chain wheels 866, a ring 867, a bearing housing 868, a ring-shaped rigid component 869 and a shaft 865. The rigid component 869 is rigidly joined with the bearing housing 868. A pair of bearings (hidden in Figure) are configured to connect the shaft 865 and the bearing housing 868, so that the shaft 865 is constrained to rotate relative to the bearing housing 868 around the axis of the shaft 865. The two chain wheels 866 are rigidly connected to the shaft 865. The axes of the two chain wheels 866 and the axis of the shaft 865 are configured to be coincide. A ring 867 is on the shaft 865 and is positioned between the two chain wheels 866.

The chain wheel sub-mechanism 820 is similar to the chain wheel sub-mechanism 810. However, the chain wheels 866 in the sub-mechanism 820 may be of smaller size compared with the chain wheels 811 in the sub-mechanism 810.

Figure 35:
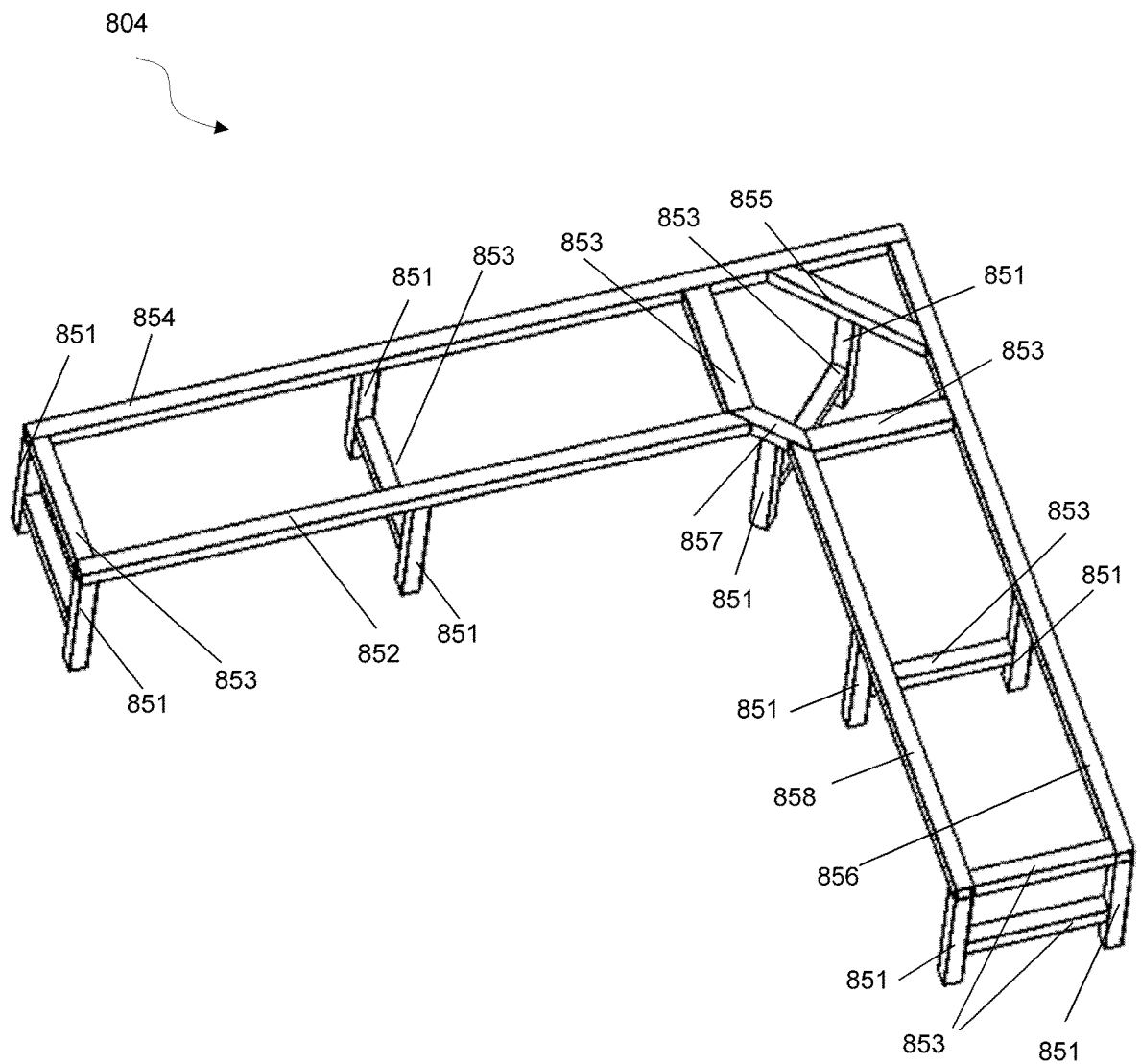
FIG. 35 shows an aerial view of a support frame.

In some embodiments, referring to FIG. 35, a support frame 804 comprises support beams 851, 852, 853, 854, 855, 856, 857, 858, which are rigidly connected.

It should be noted that that support beams in support frame 804 may comprise aluminum profiles in which case the support frame 804 may also comprise accessories configured to rigidly connect the aluminum profiles. Alternatively, the support beams in support frame 804 may comprise square steel tubes which are welded together. There are other ways of constructing the support frame 804 using known techniques.

Figure 36A:
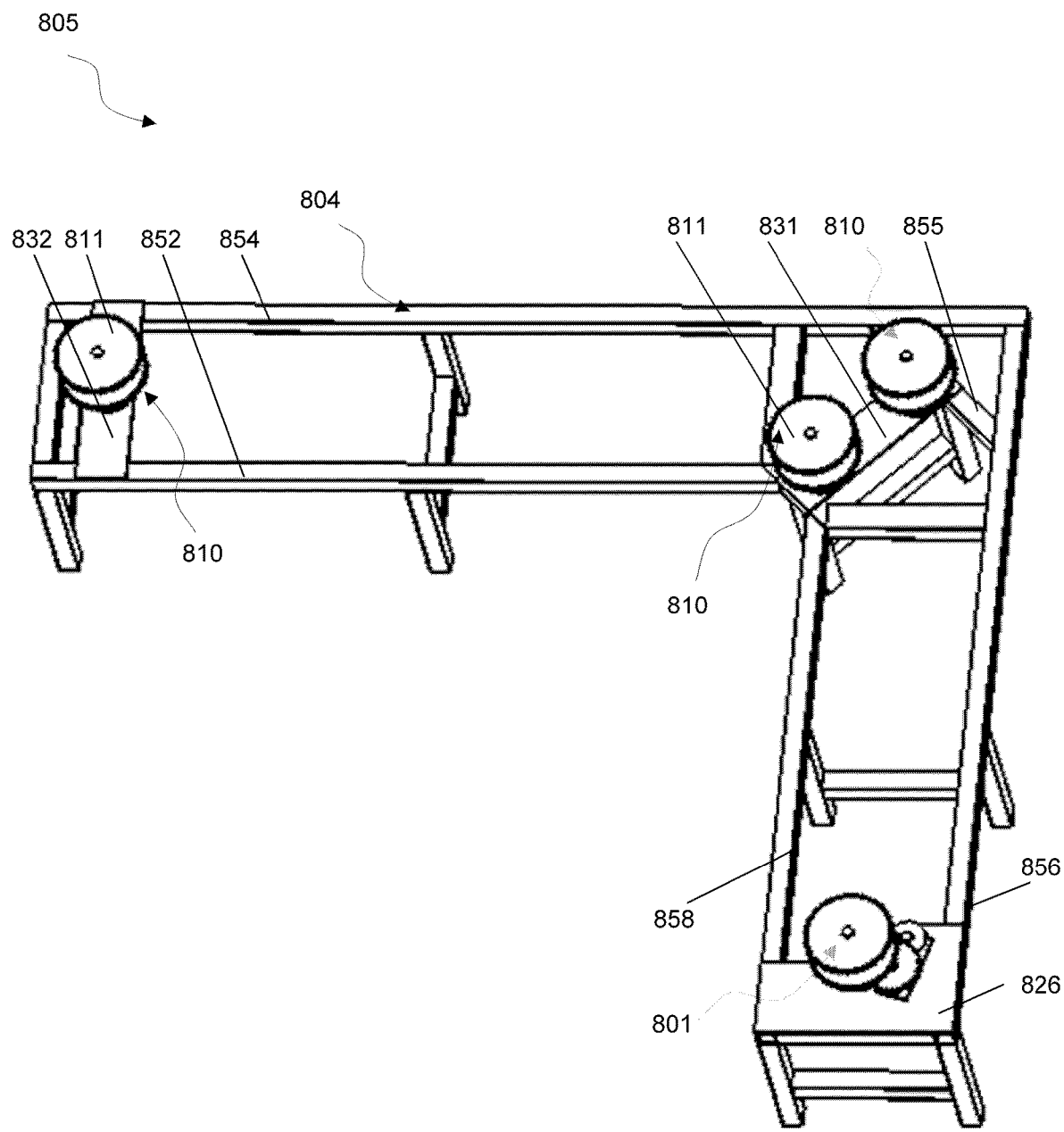
FIG. 36A shows an aerial view of a chain wheel mechanism.
Figure 36B:
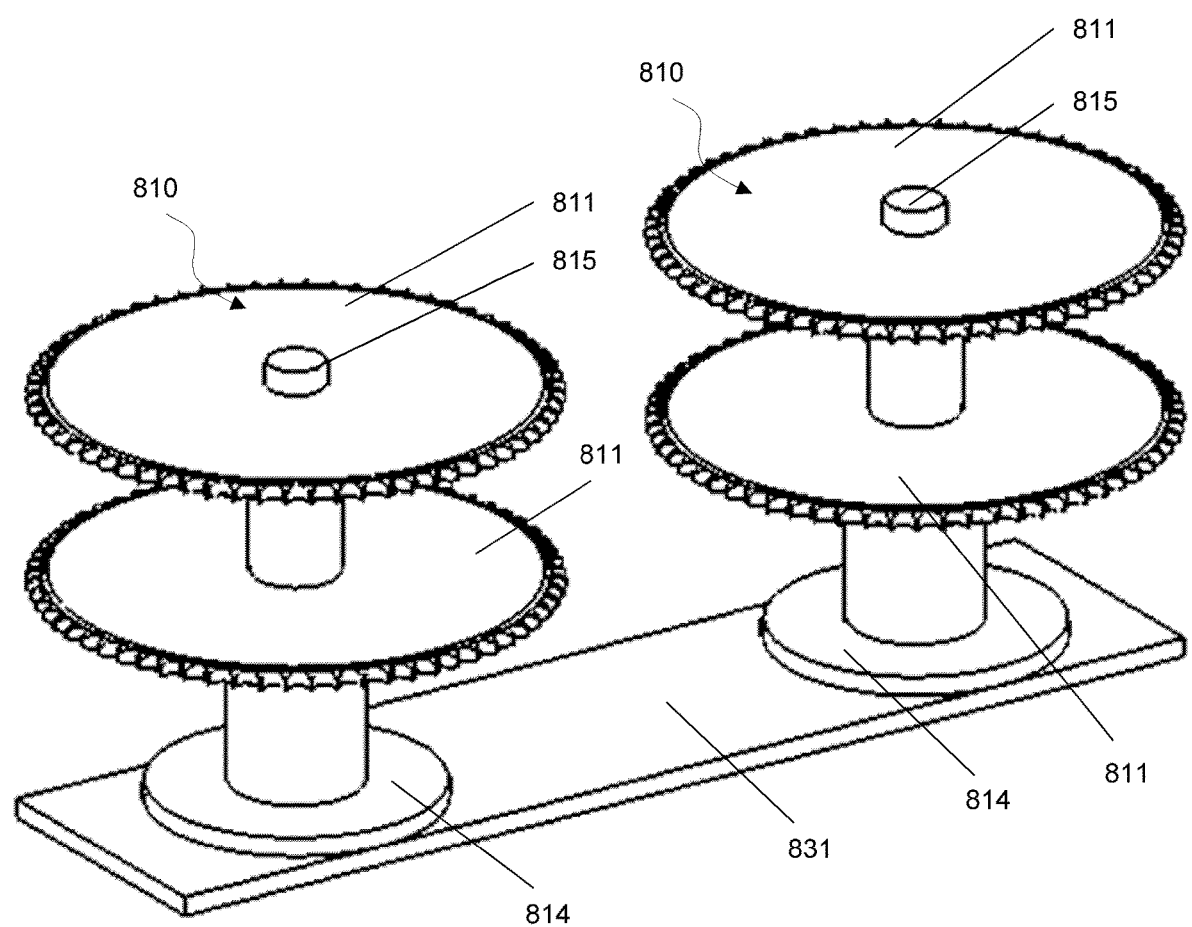
FIGS. 36B-36C show aerial views of parts of the chain wheel mechanism.
Figure 36C:
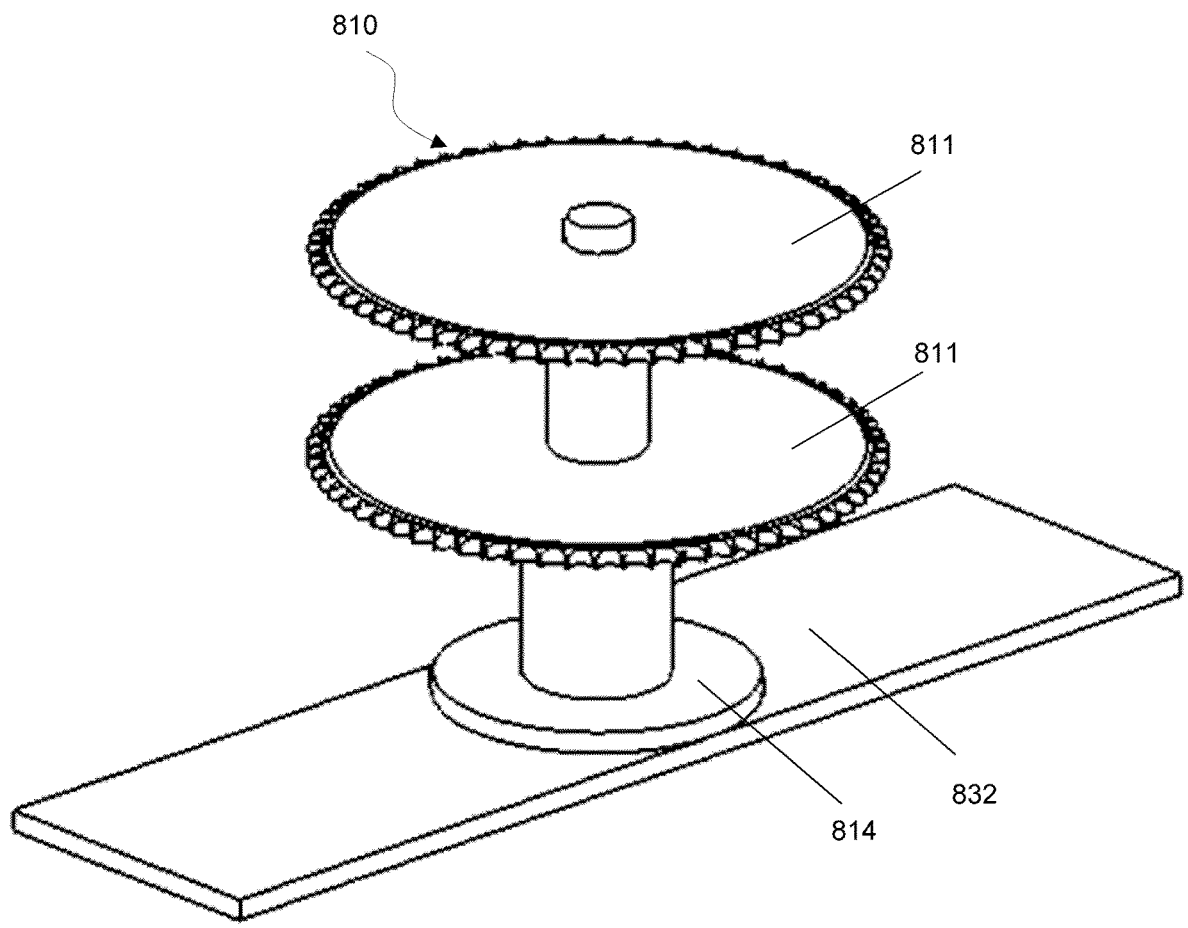

In some embodiments, referring to FIGS. 36A-36C, a chain wheel mechanism 805 comprises a support frame 804, a chain driving mechanism 801, three chain wheel sub-mechanisms 810, and some flat connecting components 831 and 832. The rigid component 826 of the chain wheel driving mechanism 801 is rigidly connected with the support frame 804. The connecting components 831 and 832 are also rigidly connected with the support frame 804. The connecting component 831 is rigidly connected with the components 814 of two chain wheel sub-mechanisms 810 (see FIG. 36B). The connecting component 832 is rigidly connected with the component 814 of one chain wheel sub-mechanism 810 (see FIG. 36C). The axis of the shaft 815 of the chain wheel sub-mechanism 801 is configured to be vertical, and the top surface of the flat rigid component 826 is configured to be horizontal. Similarly, the axes of the shafts 815 of the chain wheel sub-mechanisms 810 are configured to be vertical, and the top surface of the flat connecting components 831 and 832 are configured to be horizontal. The higher chain wheels 811 of the chain wheel sub-mechanisms 810, and that of the chain driving mechanism 801 are configured to be positioned at the same height. Similarly, the lower chain wheels 811 of the chain wheel sub-mechanisms 810, and that of the chain driving mechanism 801 are configured to be positioned at the same height.

Figure 37A:
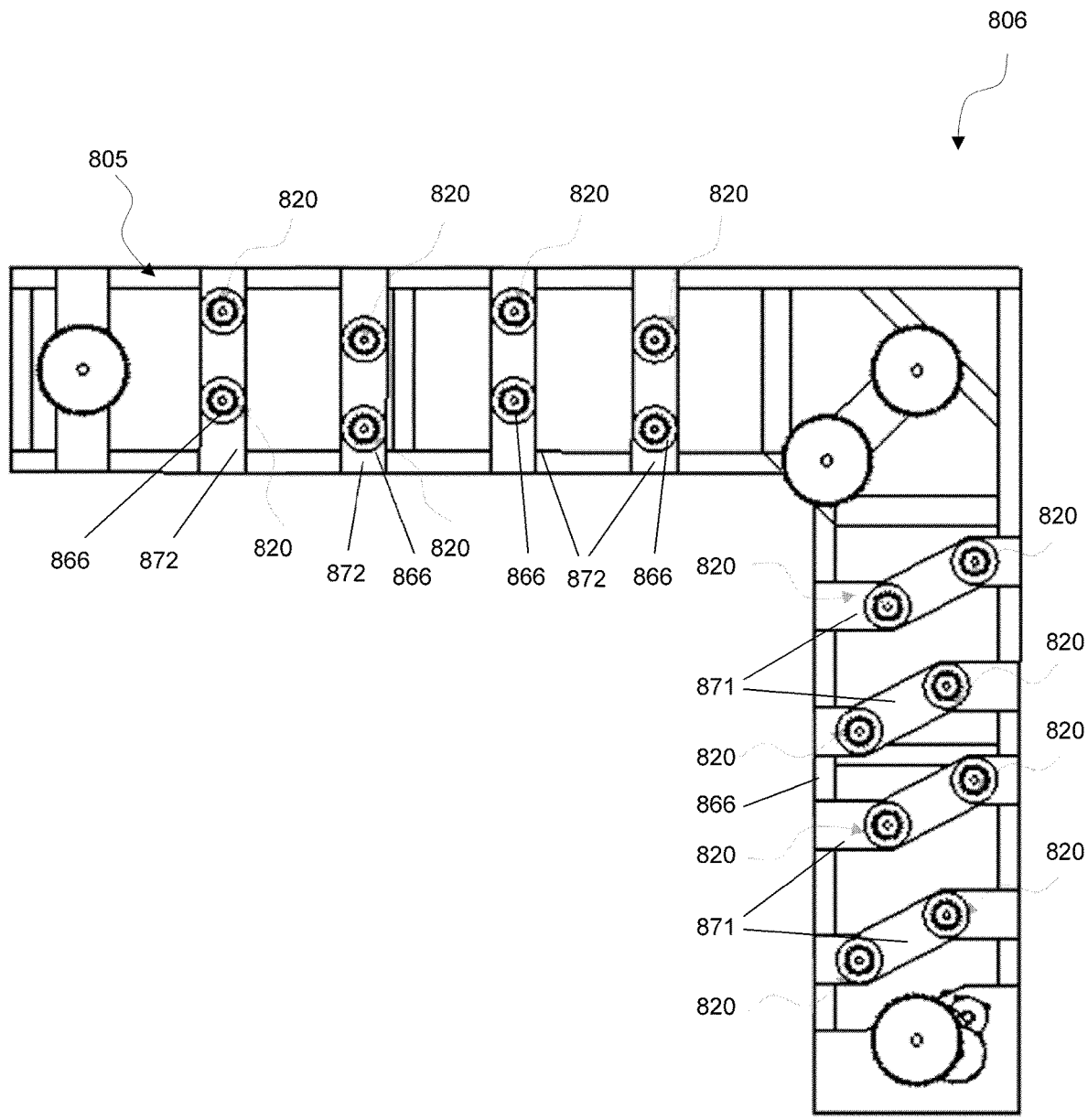
FIG. 37A shows an aerial view of a chain wheel mechanism
Figure 37B:
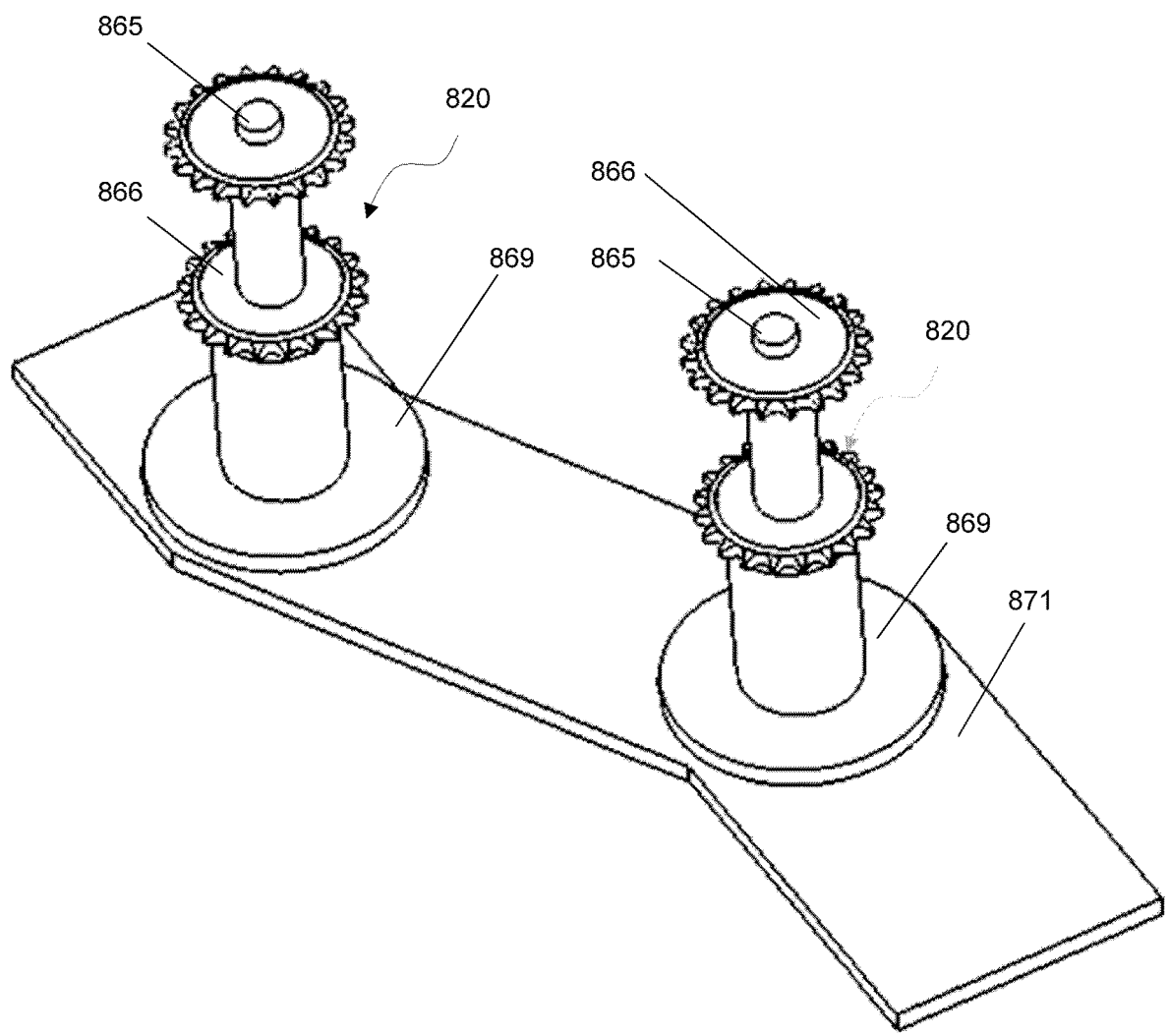
FIGS. 37B-37C show aerial views of parts of the chain wheel mechanism.
Figure 37C:
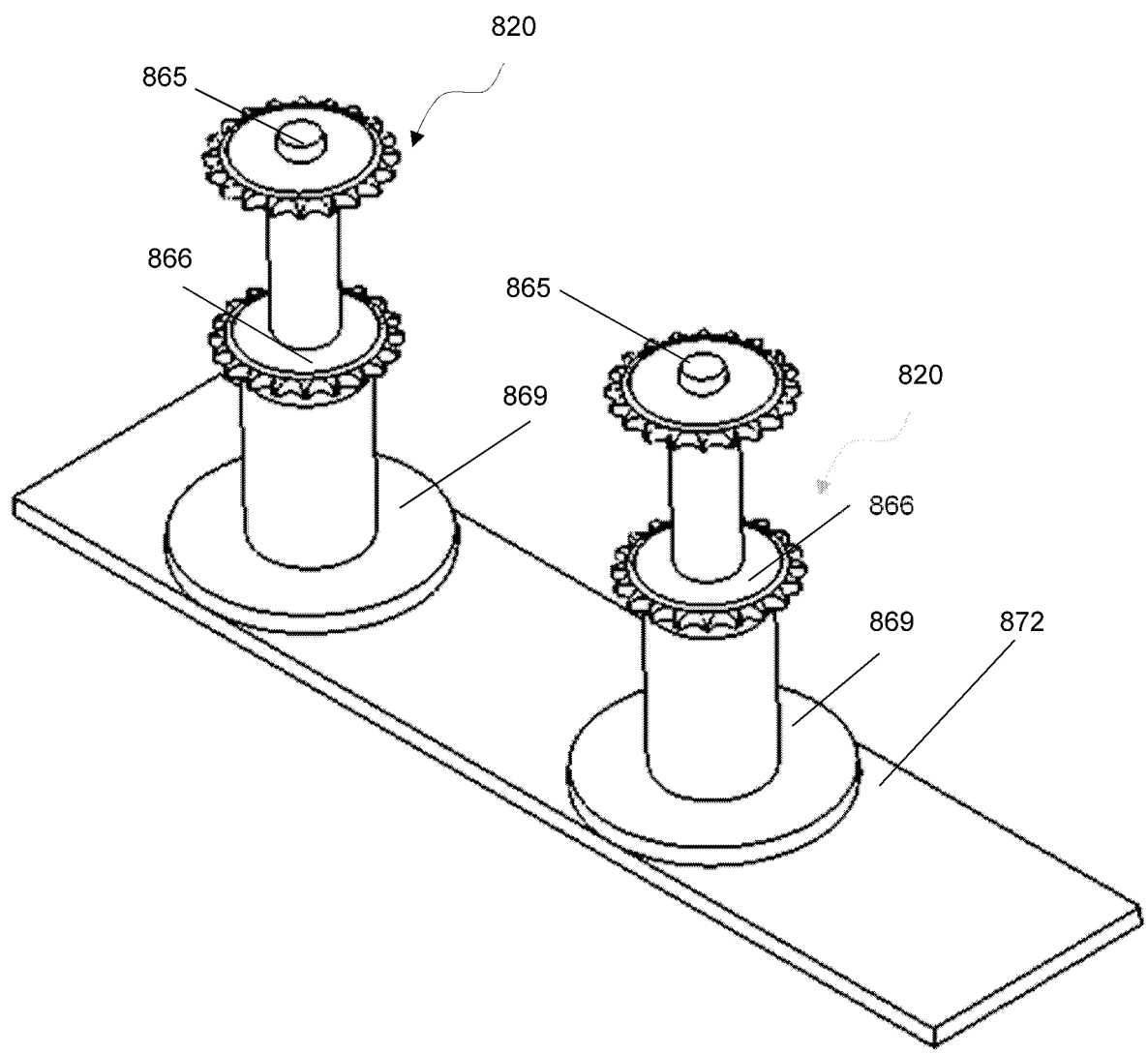
Figure 38A:
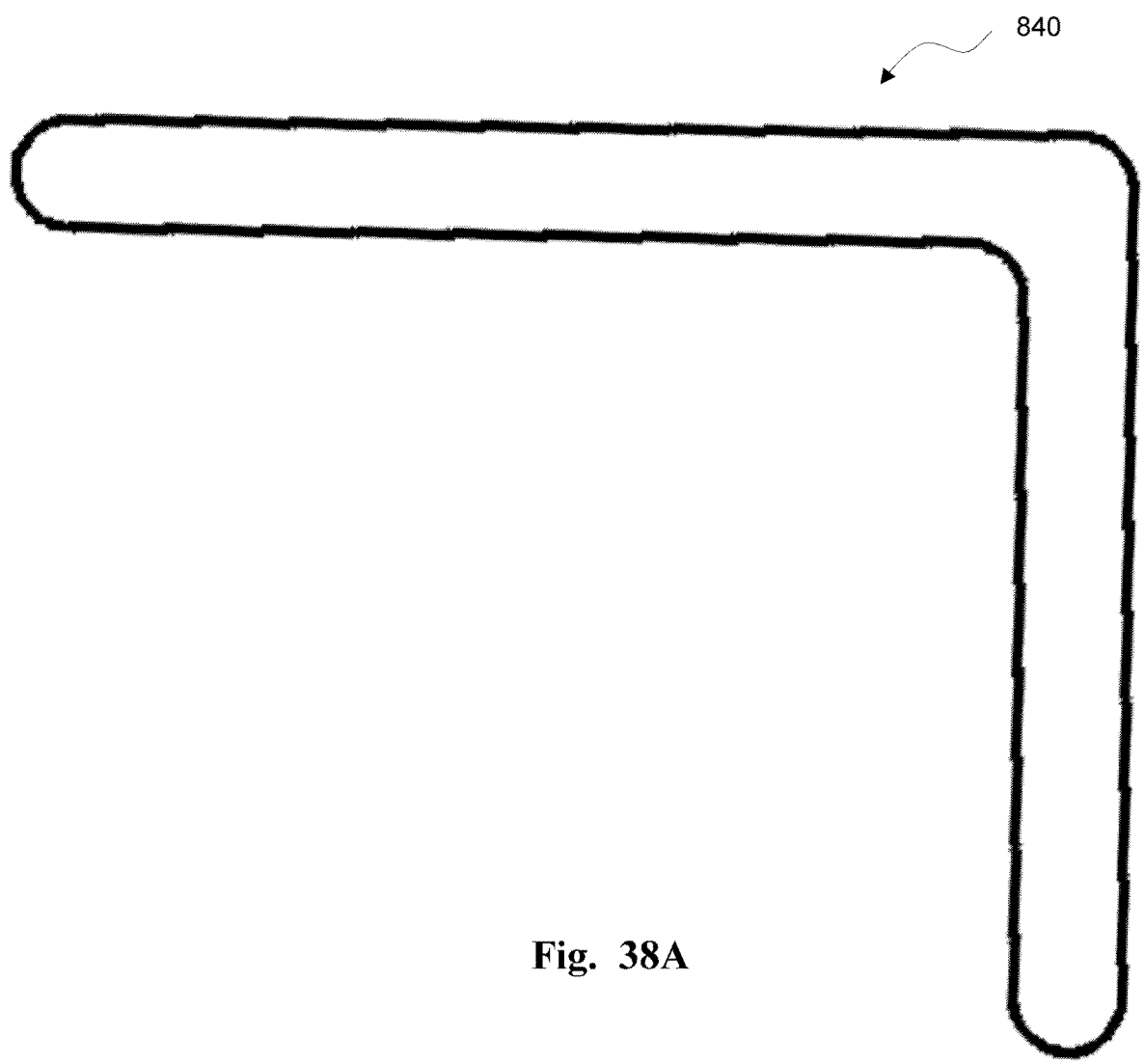
FIG. 38A shows an aerial view of a chain.
Figure 38B:
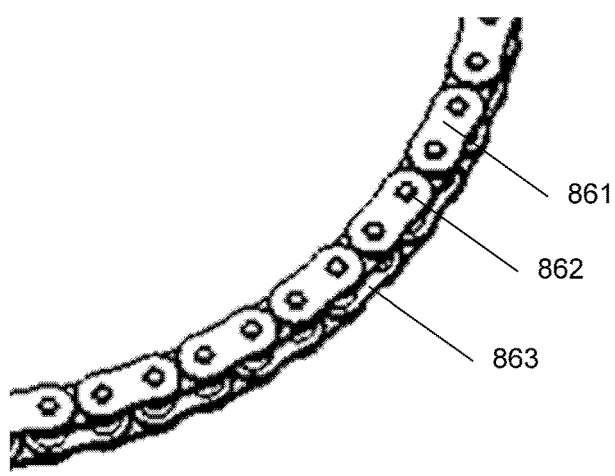
FIG. 38B shows an aerial view of parts of the chain.
Figure 38C:
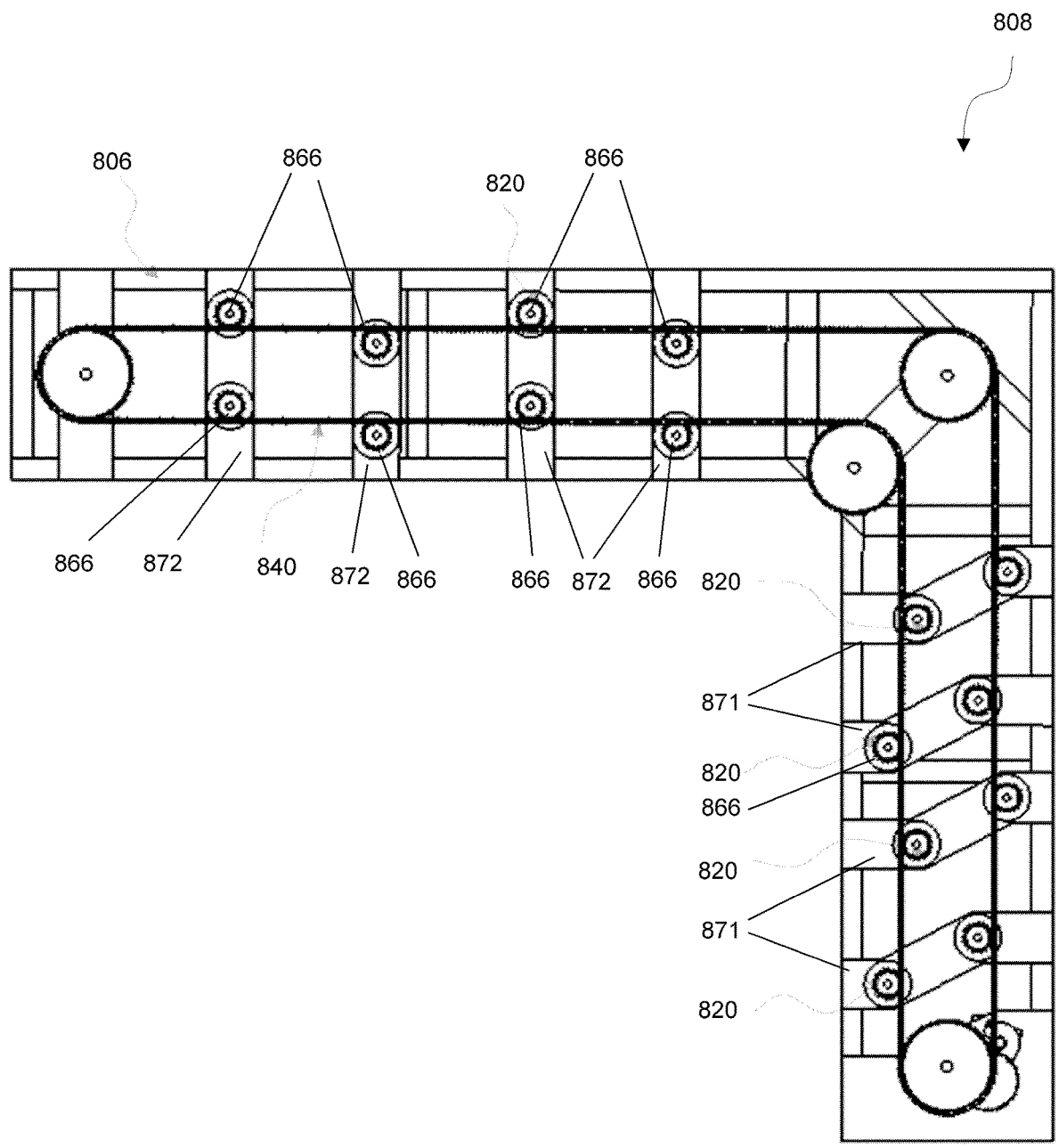
FIG. 38C shows an aerial view of a chain apparatus.
Figure 38D:
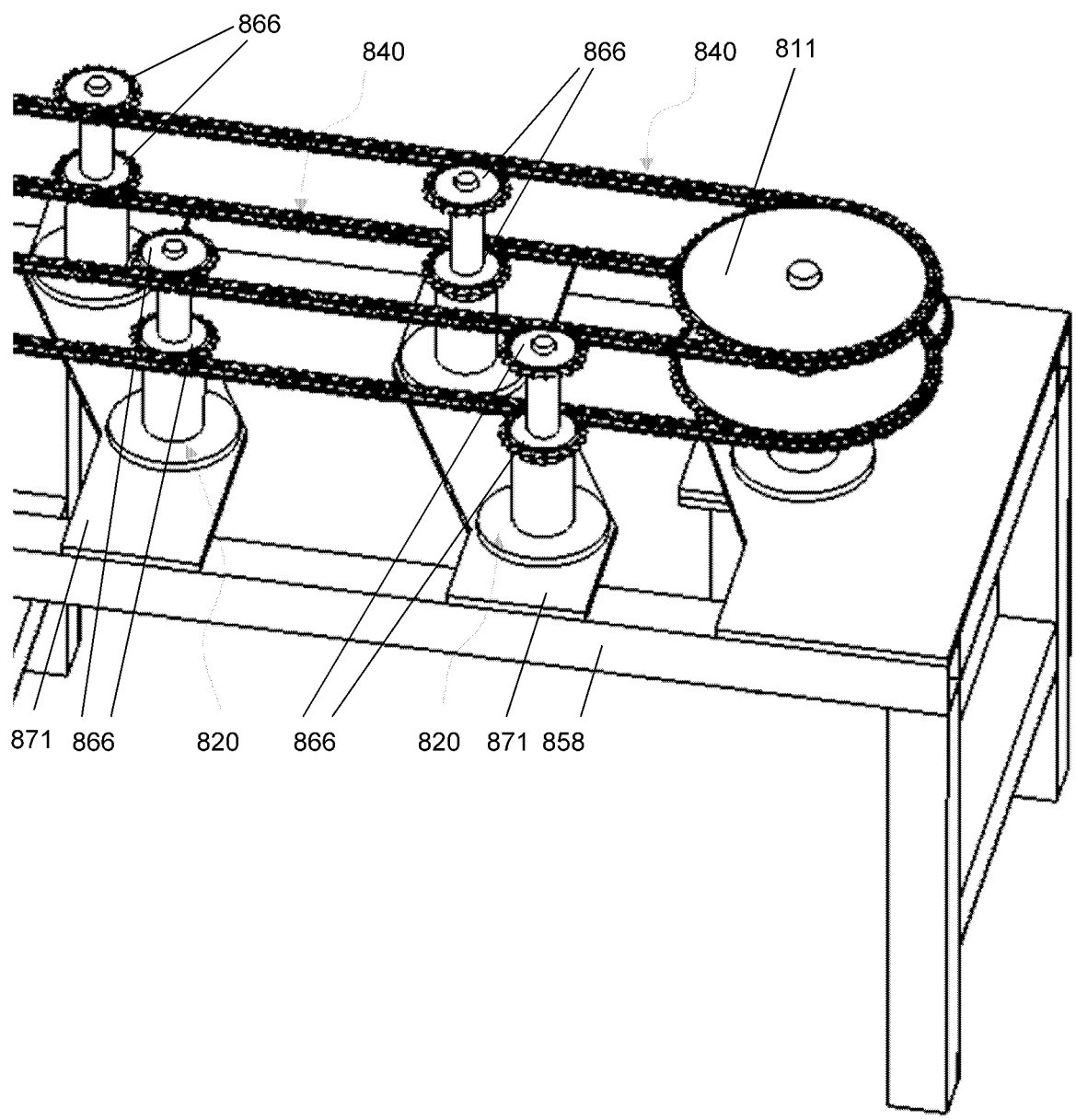
FIGS. 38D-38E show aerial views of parts of the chain apparatus.
Figure 38E:
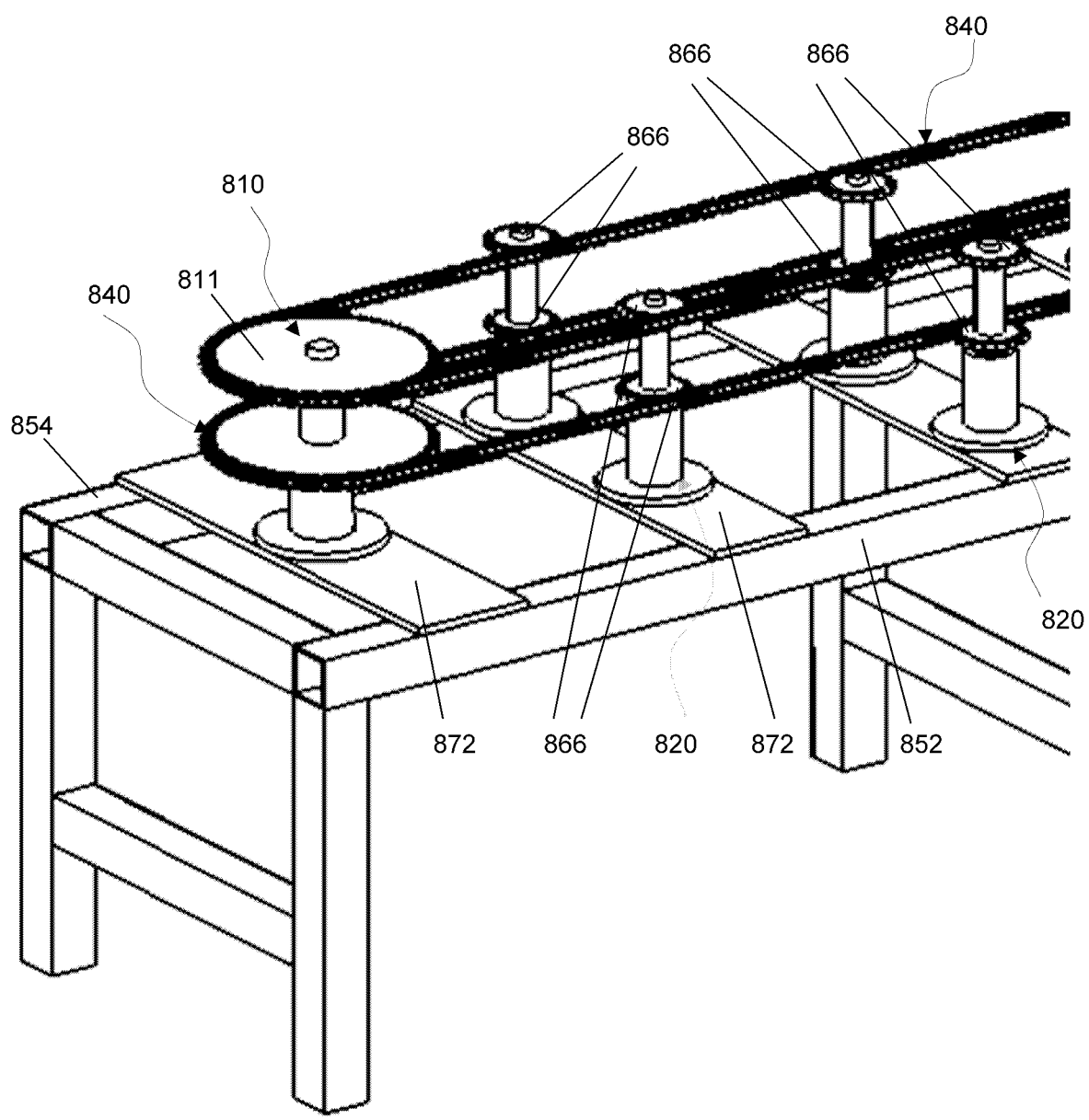

In some embodiments, referring to FIGS. 37A-37C, a chain wheel mechanism 806 comprises a chain wheel mechanism 805, a plurality of chain wheel sub-mechanisms 820, and a plurality of flat connecting components 871 and 872. The connecting components 871 and 872 are rigidly connected with the support frame 804 in the chain wheel mechanism 805. The rigid component 869 of each chain wheel sub-mechanism 820 is configured to be rigidly connected with a connecting component 871 or 872 (see FIGS. 37B-37C). The axes of the shafts 865 of the chain wheel sub-mechanisms 820 are configured to be vertical, and the top surface of the flat connecting components 871 and 872 are configured to be horizontal. The upper chain wheels 866 of all the chain wheel sub-mechanisms 820 are configured to be positioned at the same height as the upper chain wheels 811 of the chain wheel mechanism 805. Similarly, the lower chain wheels 866 of all the chain wheel sub-mechanisms 820 are configured to be positioned at the same height as the lower chain wheels 811 in the chain wheel mechanism 805.

In some embodiments, referring to FIGS. 38A-38E, a chain apparatus 808 comprises a chain wheel mechanism 806, and a pair of roller chains 840 which are configured to be parallel to each other. One of the roller chains 840 is configured to be positioned above the other. The upper roller chain 840 is configured to be engaged with the upper chain wheels 811 and 865 in the chain wheel mechanism 806. Similarly, the lower roller chain 840 is configured to be engaged with the lower chain wheels 811 and 865 in the chain wheel mechanism 806 (see FIGS. 38D-38E). The pair of roller chains 840 are configured to be moved intermittent and synchronously by the chain driving mechanism 801 of the chain wheel mechanism 806. The pair of roller chains 840 are configured to be moved cyclically (see FIG. 38C). The distance traveled in any one period of an intermittent movement is the same.

It should be noted that a pair of tension chain wheels may be added to the chain apparatus 808, as to stretch the roller chains 840, using known techniques.

Figure 39A:
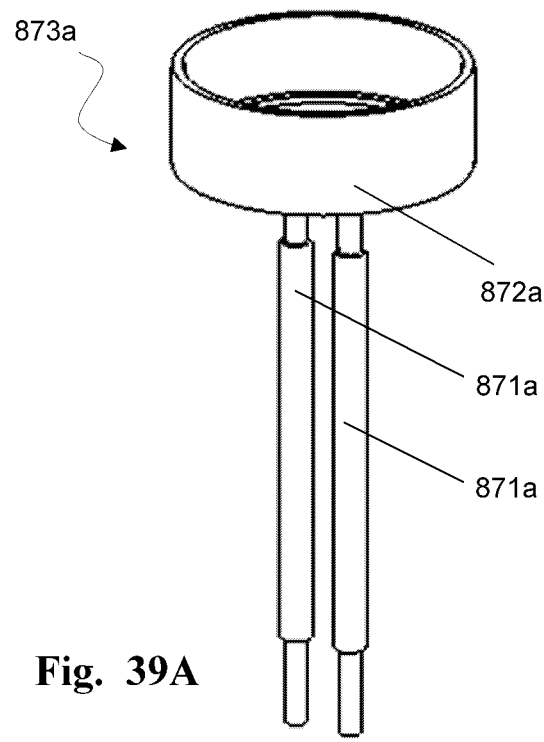
FIG. 39A shows an aerial view of a container holder mechanism.

In some embodiments, referring to FIG. 39A, a container holder mechanism 873a comprises a container holder 872a and two shafts 871a. The container holder 872a comprises a disk-shaped bottom and a cylindrical wall which are rigidly connected. The disk-shaped bottom of the container holder 872a is configured to be placed horizontally. The axis of the cylindrical wall may be called the axis of container holder 872a, or the axis of the container holder mechanism 873a. The shafts 871a are rigidly connected to the bottom of the container holder 872a. The axes of the two shafts 871a and the axis of the container holder 872a are configured to be vertical. The container holder 872a is configured to hold an ingredient container 111.

Figure 39B:
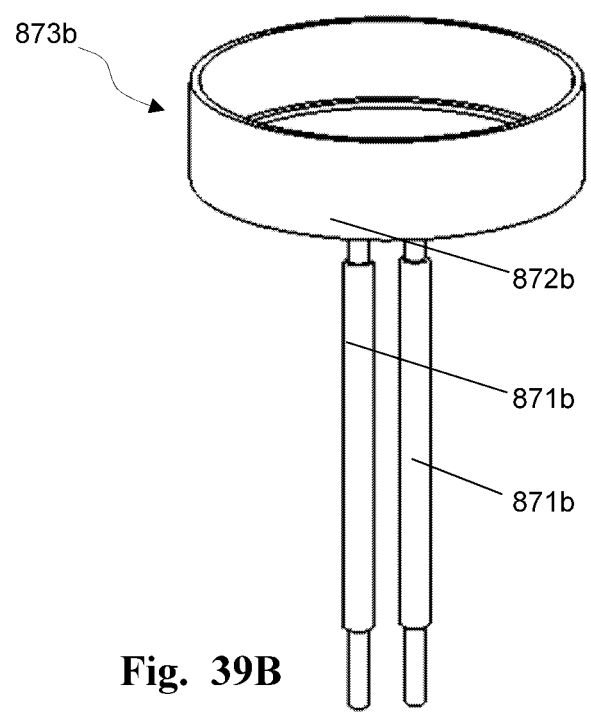
FIGS. 39B-39C each shows an aerial view of a container holder mechanism of a different size.
Figure 39C:
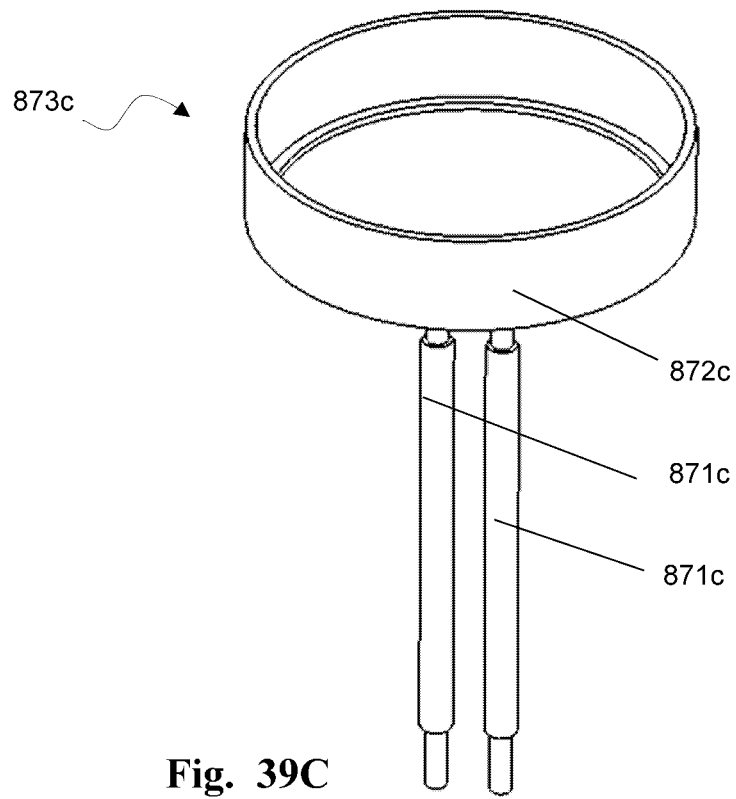

Similarly, referring to FIGS. 39B-39C, a container holder mechanism 873b (or 873c) comprises a container holder 872b (or respectively, 872c) and two shafts 871a (or respectively, 871c). The container holder 872b (or 872c) comprises a disk-shaped bottom and a cylindrical wall which are rigidly connected. The disk-shaped bottom of the container holder 872b (or 872c) is configured to be placed horizontally. The axis of the cylindrical wall may be called the axis of container holder 872b (or 872c), or the axis of the container holder mechanism 873b (or 873c). The shafts 871b (or 871c) are rigidly connected to the bottom of the container holder 872b (or respectively 872c). The axes of the two shafts 871b (or 871c) and the axis of the container holder 872b (or respectively 872c) are configured to be vertical.

It should be noted that the container holder mechanisms 873a, 873b and 873c have similar structures. In fact, the shafts 871a, 871b and 871c may be configured to be identical in shape. However, the container holders 872a, 872b and 872c may have different sizes.

Figures 39D, 39E:
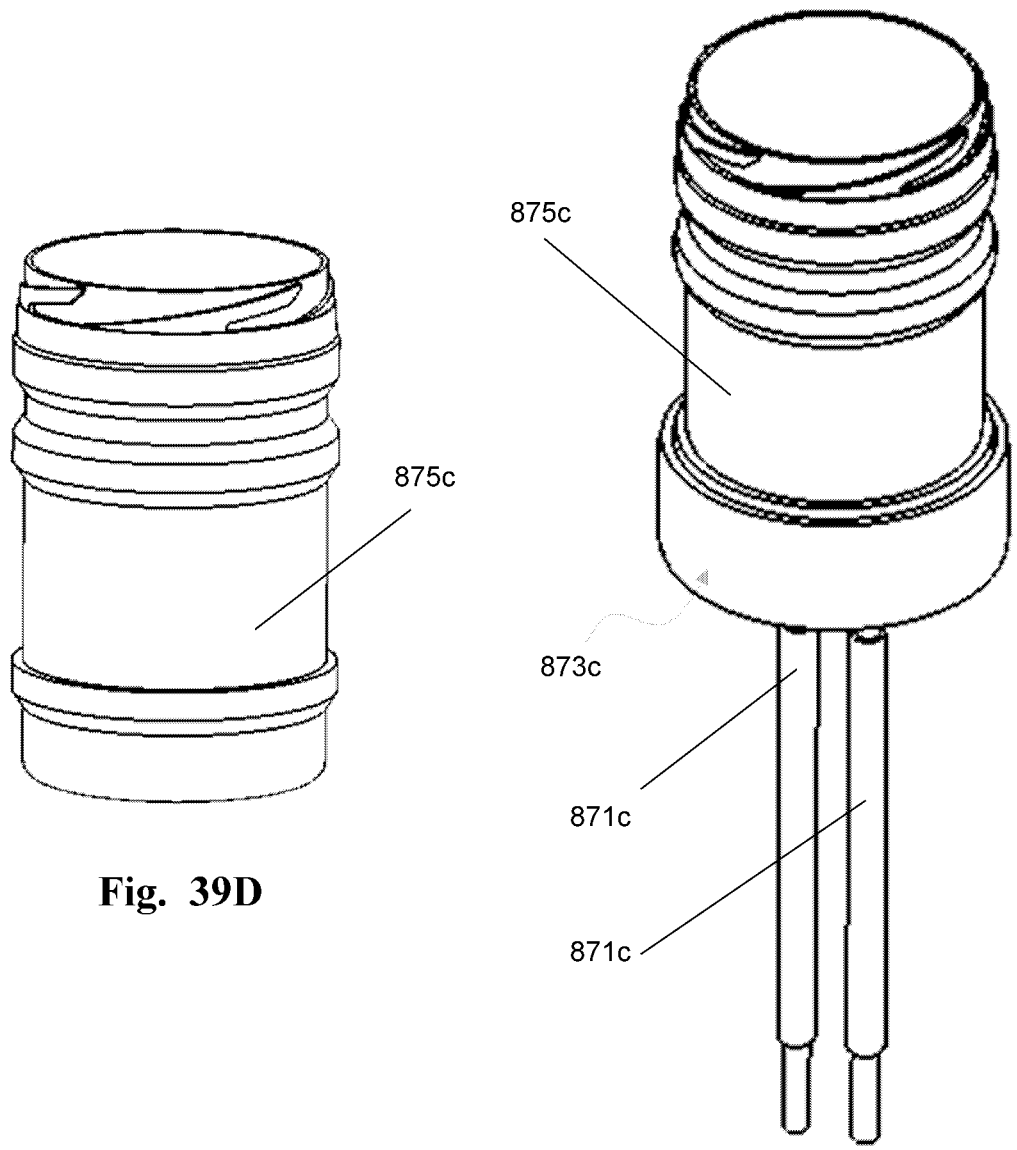
FIG. 39D shows an aerial view of a container.
FIG. 39E shows an aerial view of a container holder mechanism which holds the container.

It should be noted that the container holder 872c may hold a cylinder-shaped or round-shaped container 875c of a matching diametrical size (see FIGS. 39D-39E). Similarly, the container holder 872b may hold a cylinder-shaped or round-shaped container 875b of a matching diametrical size.

Figure 40A:
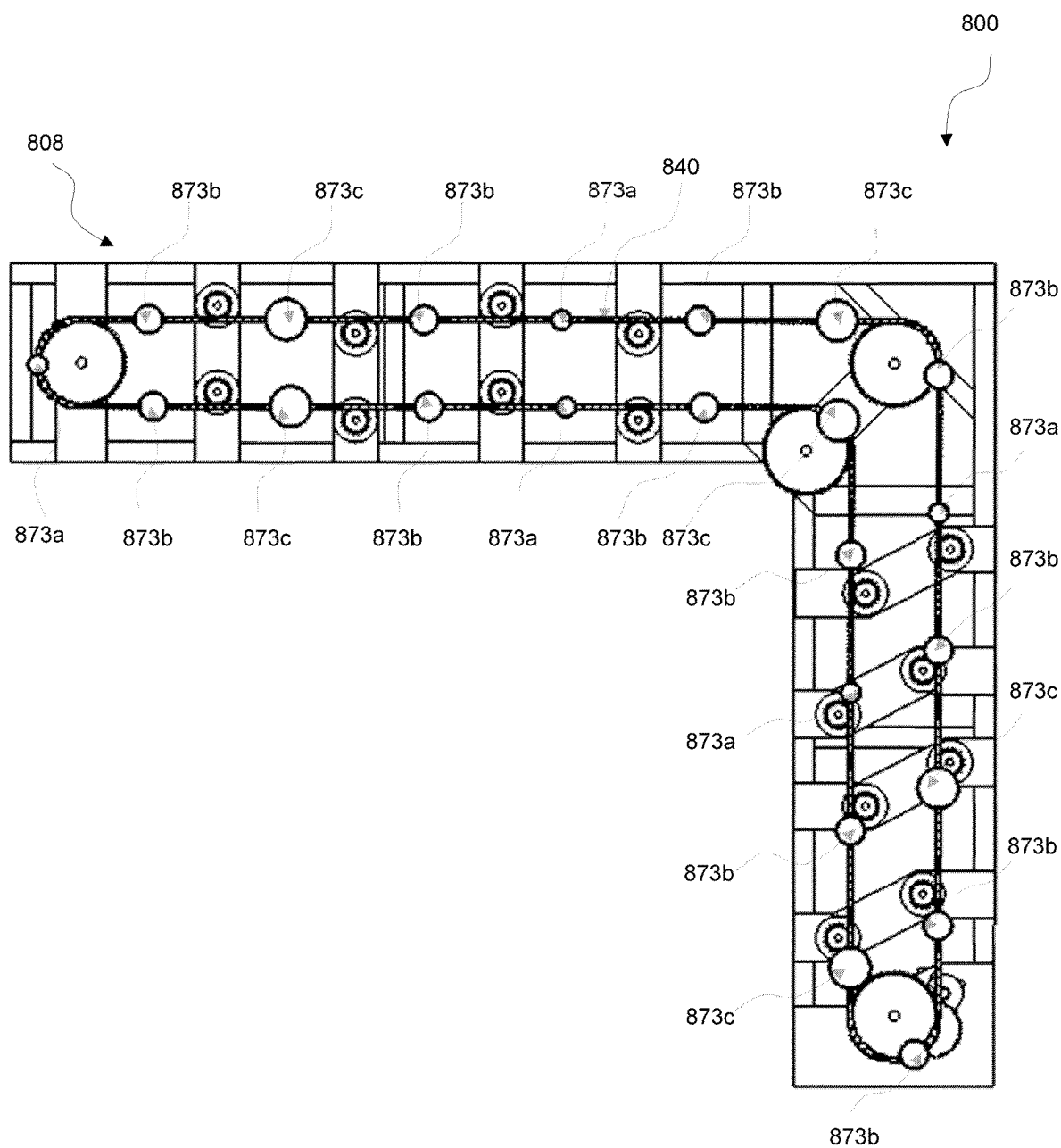
FIG. 40A shows a plane view of a cyclic transport apparatus.
Figure 40B:
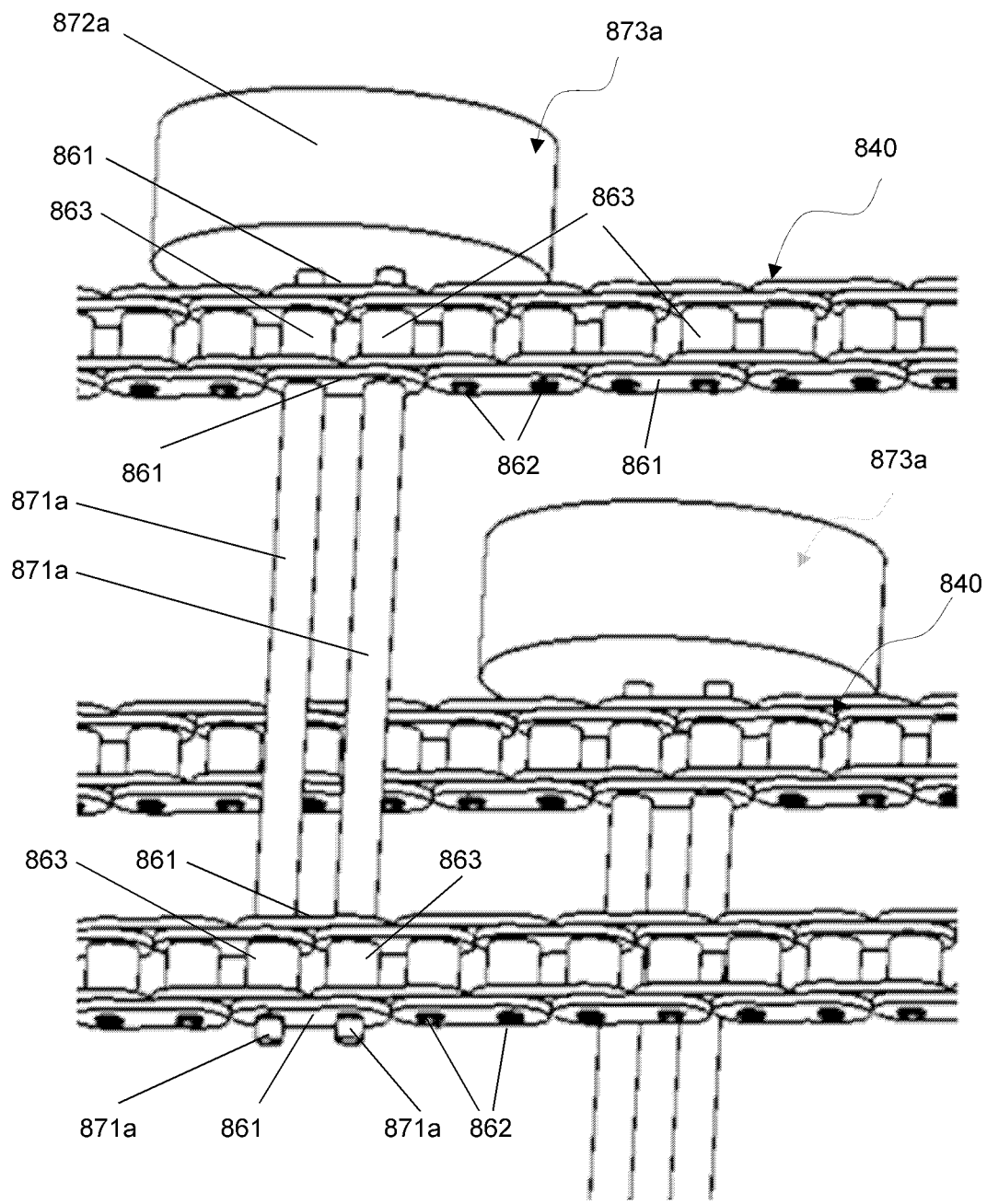
FIG. 40B shows an aerial view of parts of the cyclic transport apparatus.

In some embodiments, referring to FIGS. 40A-40B, a cyclic transport apparatus 800 comprises a chain apparatus 808, and a plurality of container holder mechanisms 873a, 873b, or 873c. Each container holder mechanism 873a, 873b or 873c is configured to attached to the pair of roller chains 840 as follows. Each shaft 871a (or 871b, 871c) in each container holder mechanism 873a (or respectively 873b, 873c) substitutes a pin in the upper roller chain 840 and a pin in the lower roller chain 840 (see FIG. 40B). In other words, each shaft 871 (or 871b, 871c) is inserted into two inner plates, two outer plates 861, a bushing, and a roller 863, of the upper roller chain 840; and similarly, each shaft 871 (or 871b, 871c) is inserted into two outer plates 861, two inner plates, a bushing, and a roller 863 of the lower roller chain 840. In particular, the radius of the shaft 871a (or 871b, 871c) in the middle section is configured to be identical to the radius of a pin in the roller chain 840. The distance between the axis of a container holder mechanism (873a, or 873b, or 873c) and the axis of a neighboring container holder mechanism is the same as the distance traveled in one period of an intermittent movement of the roller chains 840 as produced by the chain driving mechanism 801.

Figure 41A:
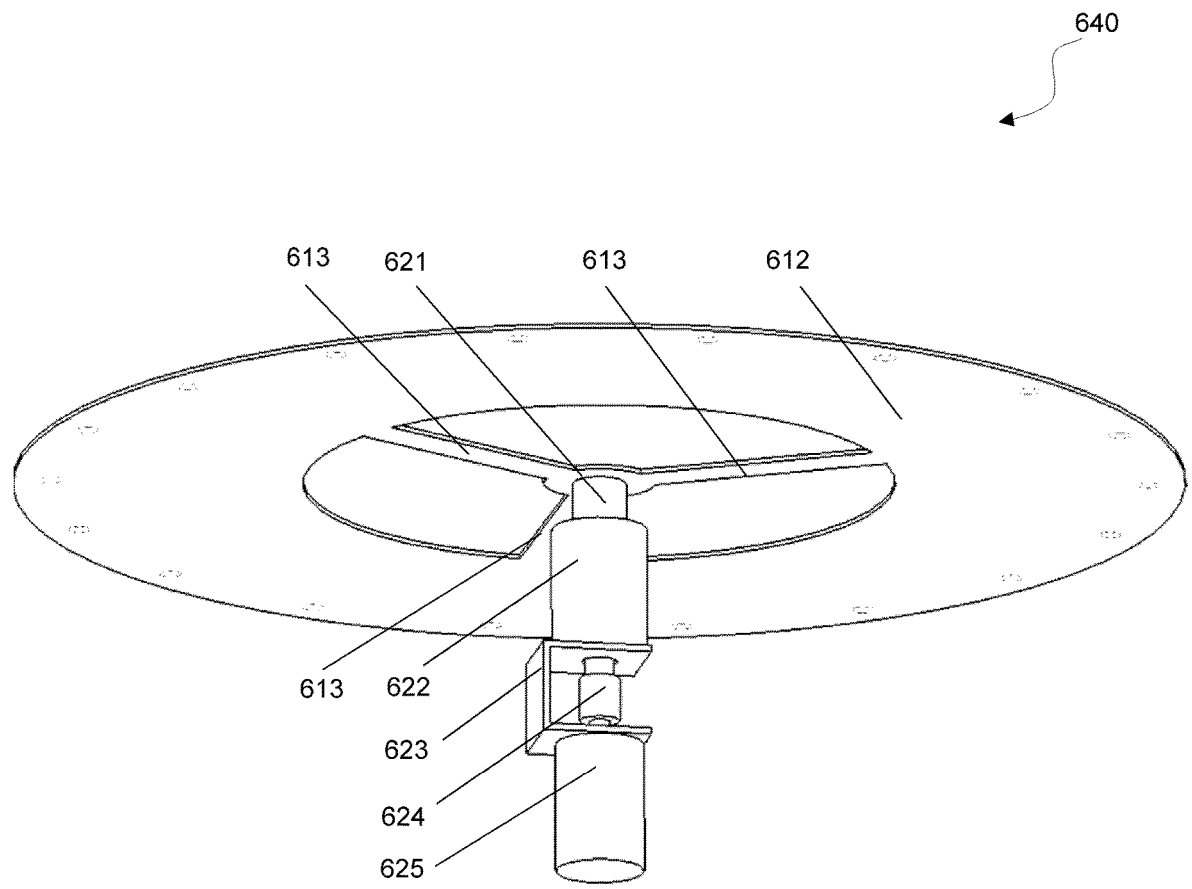
FIGS. 41A-41B show aerial views of a cyclic transport apparatus.
Figure 41B:
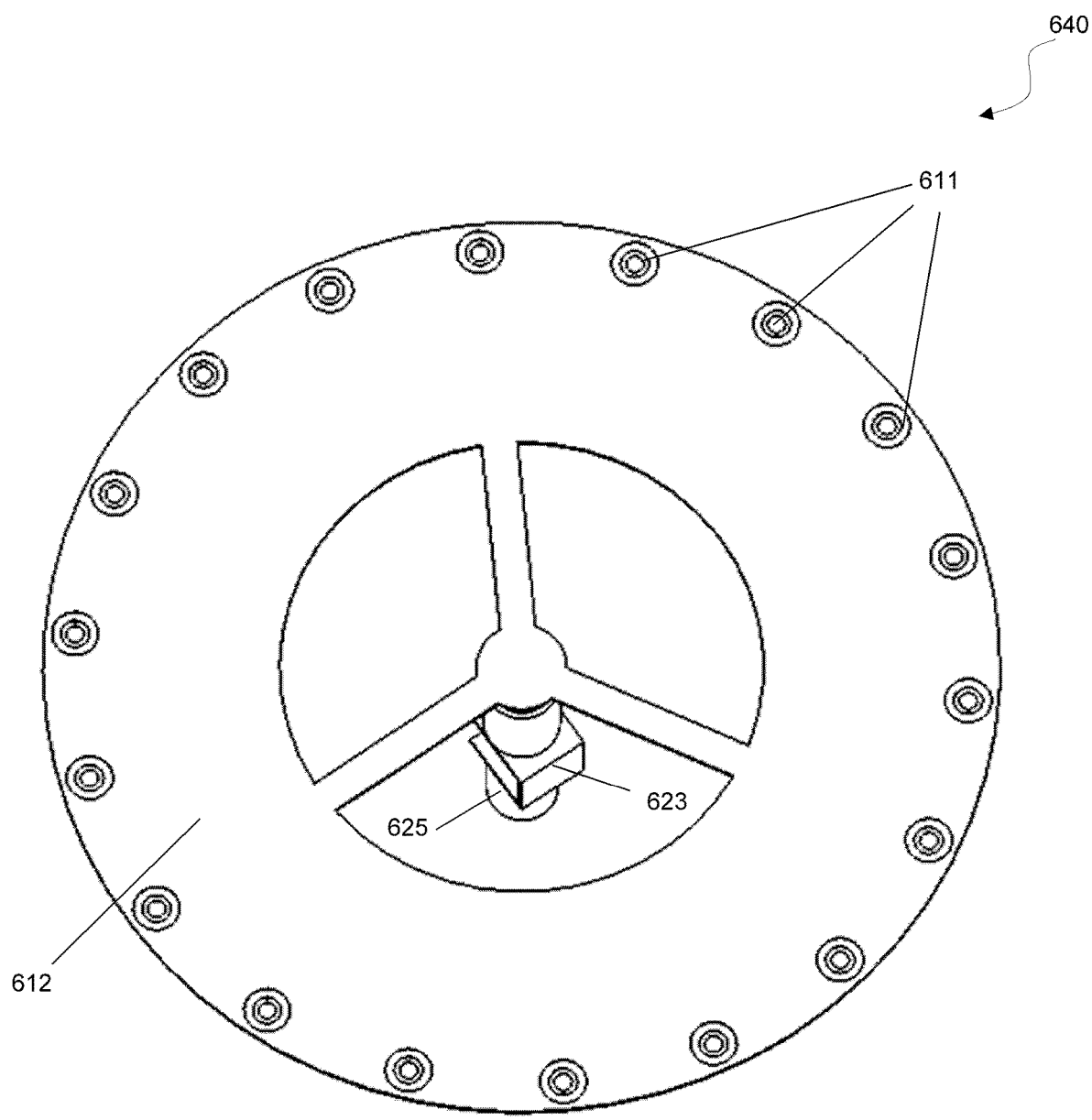

In some embodiments, referring to FIGS. 41A-41B, a cyclic transport apparatus 640 comprises a turntable 612 comprising a rotational axis, a shaft 621, a bearing housing 622, a motor 625 comprising a shaft and a base component, a coupling 624, and a connection frame 623. The turntable 612 is configured to be rigidly connected to the shaft 621 via some connectors 613 so that the axis of the turntable 612 is identical to the axis of the shaft 621 (see FIG. 41A). A pair of bearings and accessories (hidden in figures) are configured to connect the shaft 621 and the bearing housing 622, so that the shaft 621 (and hence the turntable 612) may be rotated relative to the bearing housing 622, around the axis of the shaft 621. The base of the motor 625 is fixedly connected to the bearing housing 622 by the connection frame 623. The shaft of the motor 625 is fixedly connected to the shaft 621 by a coupling 624. The cyclic transport apparatus 640 further comprises a plurality of container holders 611, arranged in a circular loop centered around the axis of the turntable, which are all fixedly attached to the turntable 612 (see FIG. 41B). Each container holder 611 may hold an ingredient container (such as container 111 or 107). The motor 625 is configured to produce an intermittent rotation in the shaft of the motor, and hence an intermittent rotation of the shaft 621 and the turntable 612. Thus, the plurality of container holders 611 may be rotated around the axis of the shaft 621. The degree of each intermittent rotation is configured to be 360/N, where N may be the number of container holders on the turntable 612. In particular, N is an integer which is bigger than or equal to 2.

It should be noted that a computer may be configured to dynamically control the timing and angle of the rotation of the motor 625 in the cyclic transport apparatus 640, and thus the position and the rotation of the turntable 612 may be dynamically controlled by the computer.

It should be noted that the motor 625 in the cyclic transport apparatus 640 may be further configured so that the rotation of the container holders 611 is an intermittent cyclic rotation of the container holders 611.

It should also be noted that the motor 625 (and the connection of the base and shaft of the motor 625 with the bearing housing 622 and respectively the shaft 621) may be substituted by a motorized mechanism comprising: a Geneva mechanism comprising an input shaft, an output shaft, and a support component, wherein a continuous rotation of the input shaft relative to the support component is configured to produce an intermittent rotation of the output shaft relative to the support component; and a motor configured to drive the motion of the input shaft of the Geneva mechanism, wherein the base of the motor is configured to be fixedly connected with the support component of the Geneva mechanism; wherein the output shaft of the Geneva mechanism is configured to be connected with the shaft 621, and the support component of the Geneva mechanism is configured to be rigidly connected with the bearing housing 622. In this case, the motorized mechanism may produce an intermittent rotation of the turntable. The motorized mechanism needs to be further configured so that the intermittent rotation of the container holders 611 is cyclic.

Figure 42A:
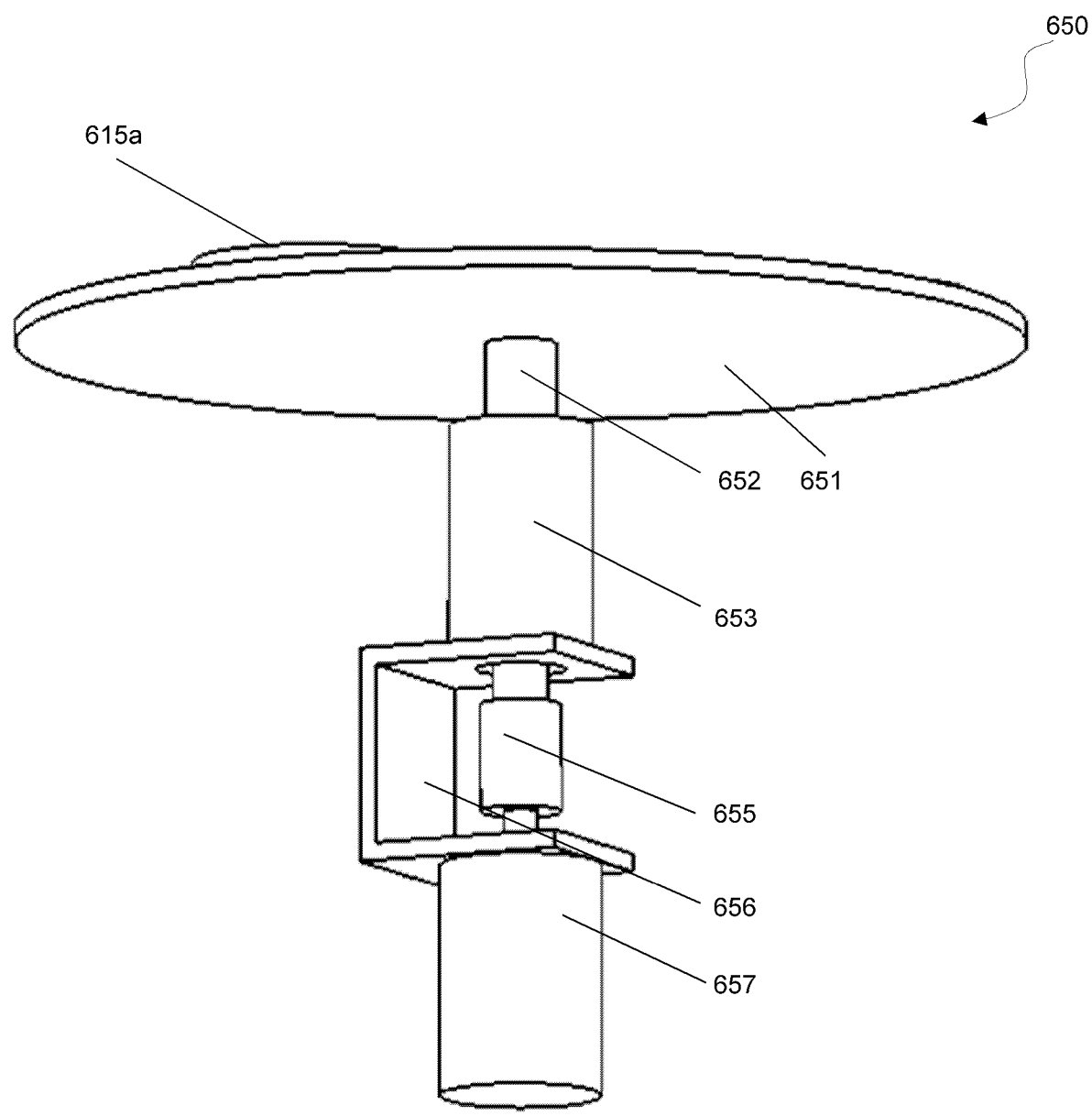
FIGS. 42A-42B show aerial views of a cyclic transport apparatus.
Figure 42B:
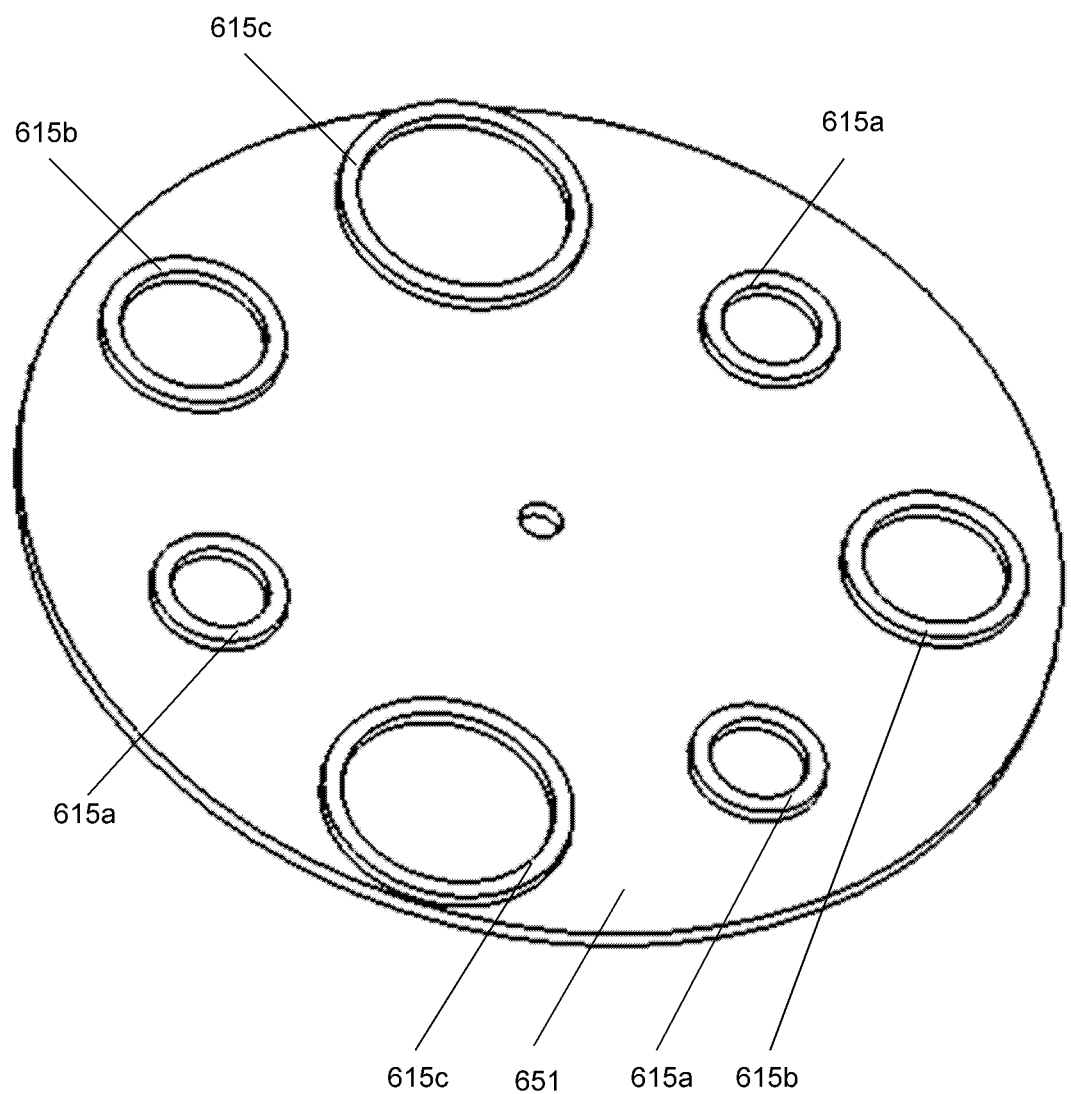

In some embodiments, referring to FIGS. 42A-42B, a cyclic transport apparatus 650 comprises a turntable 651 comprising a rotational axis, a shaft 652, a bearing housing 653, a motor 657 comprising a shaft and a base component, a connection frame 656 and a plurality of holding cups 615a, 615b and 615c, wherein each holding cup 615a, 615b or 615c comprises an axis. Each holding cup, 615a, 615b or 615c, is configured to hold an ingredient container of a specific diametrical size; and the axes of the holding cups 615a, 615b or 615c are configured to be evenly positioned on a cylindrical surface centered at the axis of the turntable 651. In particular, the axes of all the holding cups 615a, 615b or 615c are parallel to the axis of the turntable. The turntable 651 is configured to be rigidly connected to the shaft 652, so that the axis of the turntable is the same as the axis of the shaft 652. A pair of bearings and accessories (hidden in Figure) are configured to connect the shaft 652 and the bearing housing 653, so that the shaft 652 is constrained to rotate relative to the bearing housing 653, around the axis of the shaft 652. The base of the motor 657 is fixedly connected to the bearing housing 653 by the connection frame 656. The shaft of the motor 657 is connected to the shaft 652 by a coupling 655. The motor 657 is configured to drive an intermittent rotation of the shaft 652, and hence an intermittent rotation of the turntable 651, wherein each intermittent rotation is 360/N, where N is the number of the holding cups 615a, 615b and 615c on the turntable 651. Therefore, the holding cups may be cyclically rotated around the axis of the shaft 652.

The holding cups 615a, 615b and 615c are also referred to as container holders. It should be noted that the holding cups 615a, 615b and 615c in the cyclic transport apparatus 650 may be substituted by other types of container holders.

It should also be noted that the container holders 611 of the cyclic transport apparatus 640 may be substituted by the holding cups 615a, 615b and 615c.

It should be noted that a computer may be configured to dynamically control the timing and angle of the rotation of the motor 657 in the cyclic transport apparatus 650, and thus the position and the rotation of the turntable 651 may be dynamically controlled by the computer.

It should be noted that the motor 657 in the cyclic transport apparatus 650 may be further configured so that the rotation of the holding cups is an intermittent cyclic rotation of the container holders.

It should also be noted that the motor 657 (and the connection of the base and shaft of the motor 657 with the bearing housing 653 and respectively the shaft 652) may be substituted by a motorized mechanism comprising: a Geneva mechanism comprising an input shaft, an output shaft, and a support component, wherein a continuous rotation of the input shaft relative to the support component is configured to produce an intermittent rotation of the output shaft relative to the support component; and a motor configured to drive the motion of the input shaft of the Geneva mechanism, wherein the base of the motor is configured to be fixedly connected with the support component of the Geneva mechanism; wherein the output shaft of the Geneva mechanism is configured to be connected with the shaft 652, and the support component of the Geneva mechanism is configured to be rigidly connected with the bearing housing 653. In this case, the motorized mechanism may produce an intermittent rotation of the turntable. The motorized mechanism may be further configured so that the intermittent rotation of the container holders 651 is cyclic.

It should be noted that the axis of the shaft 621 in the cyclic transport apparatus 640 and the axis of the shaft 652 in the cyclic transport apparatus 650 may be configured to be vertical.

It should be noted that the bearing housing 622 in the cyclic transport apparatus 640 or the bearing housing 653 in the cyclic transport apparatus 650 may be configured to be rigidly connected with a support component, or with the ground, by known techniques.

In some embodiments, referring to FIGS. 43A-43D, a gripping mechanism 901 comprises a pair of gripping devices 916a and 916b, shafts 917a, 917b, 918a, 918b and 921, and a connector 917 configured to rigidly connect the shafts 917a, 917b, 918a, 918b and 921. The axes of the shafts 918a, 918b and 921 are configured to be parallel to each other; and the shafts 917a and 917b are both perpendicular to the axis of the shaft 921 (see FIG. 43B). The shaft 921 is rigidly connected with a rigid component 922. The gripping device 916a (or 916b) comprises a curved hole 915a (or respectively 915b), a bearing housing 914a (or respectively 914b), a gripper 913a (or respectively 913b) (see FIG. 43A). The surface of the gripper 913a or 913b comprises a part of a cylindrical surface. The curved hole 915a and the gripper 913a are both rigidly connected to the bearing housing 914a; and the curved hole 915b and the gripper 913b are both rigidly connected to the bearing housing 914b. The gripping device 916a (or 916b) also comprises a rubber (or silica gel) 912a (or respectively 912b) which is attached to the gripper 913a (or respectively 913b).

Figure 43A:
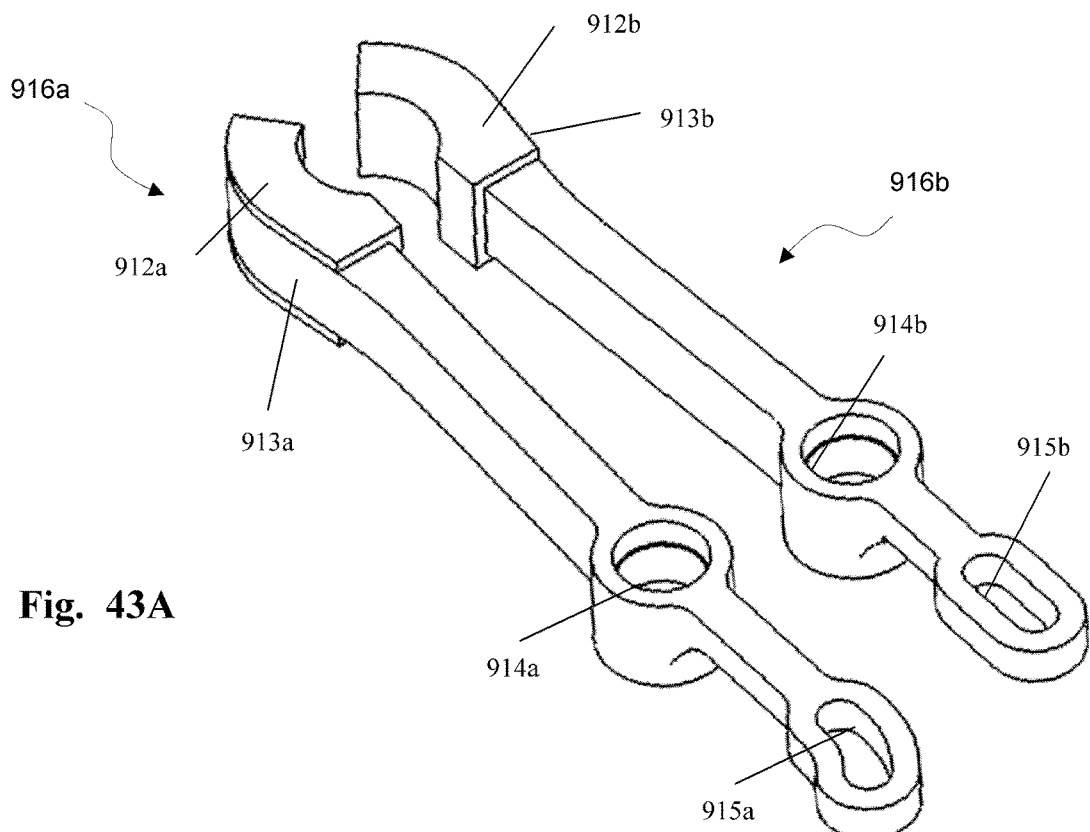
FIG. 43A shows an aerial view of a pair of gripping devices.
Figure 43B:
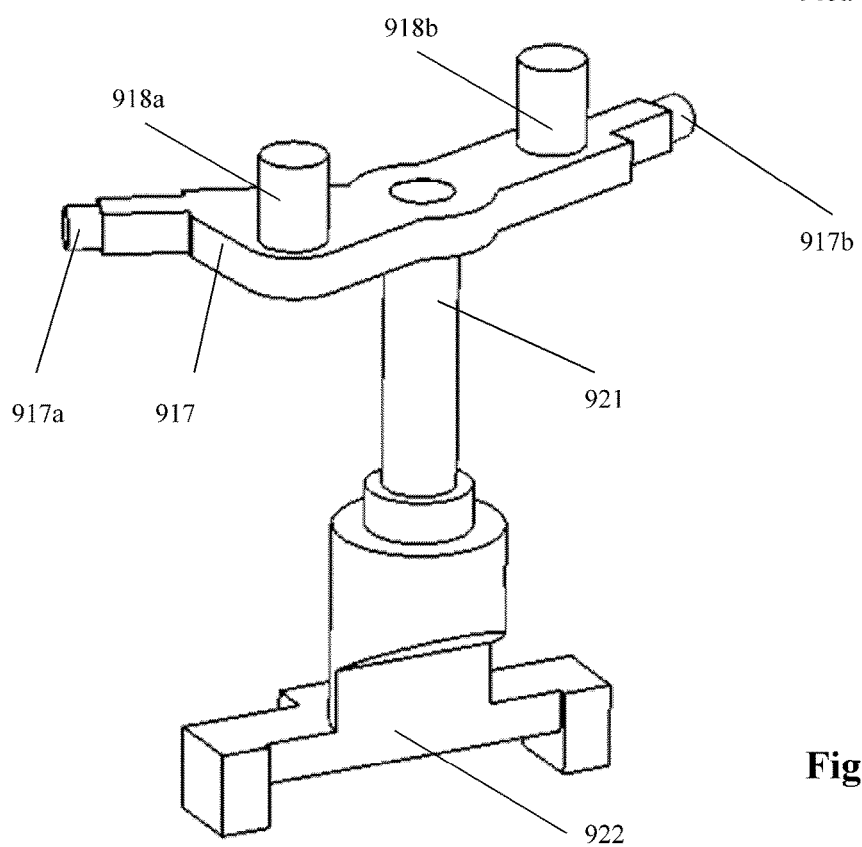
FIGS. 43B-43C show aerial views of parts of a clipping mechanism.
Figure 43C:
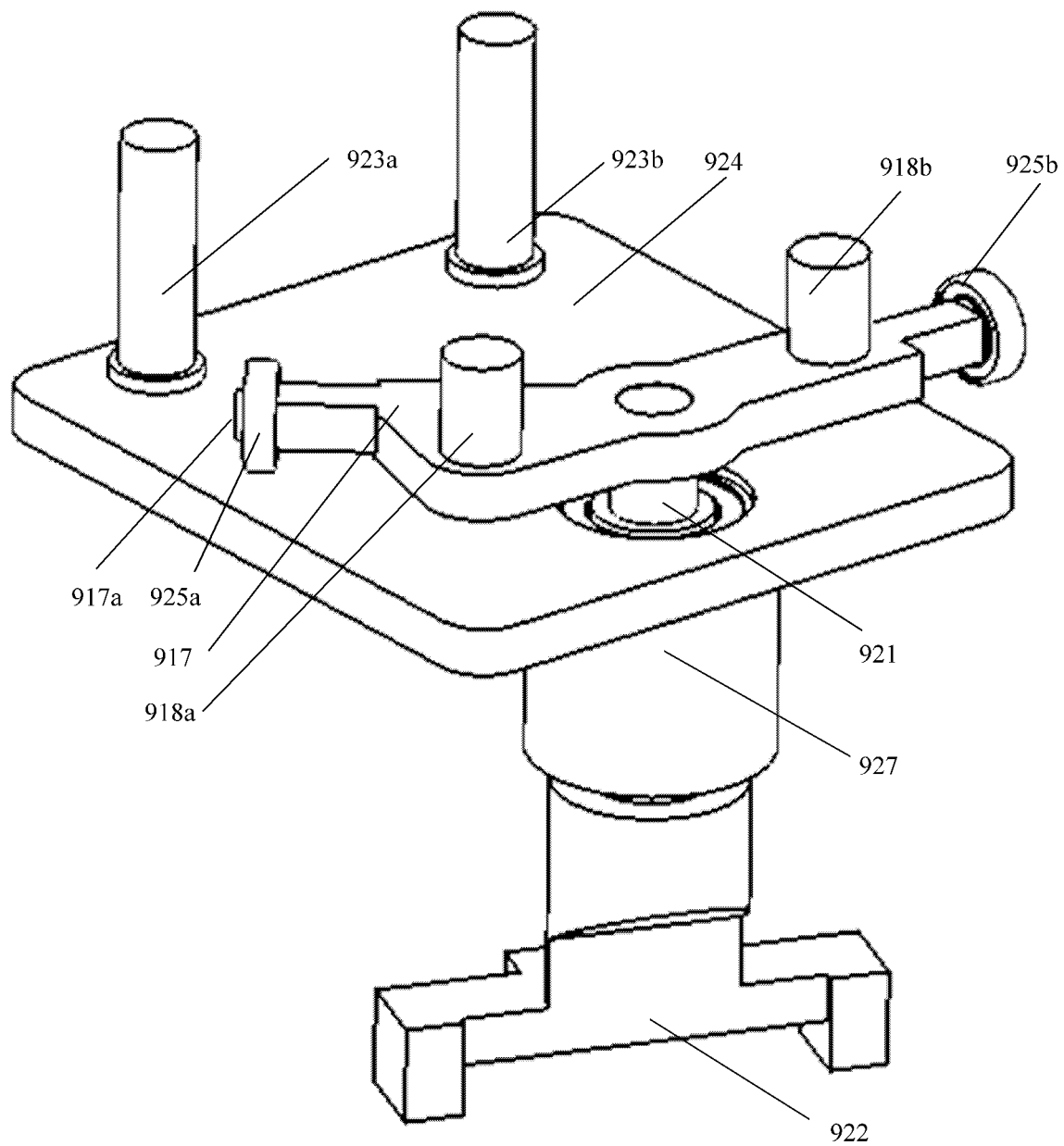
Figure 43D:
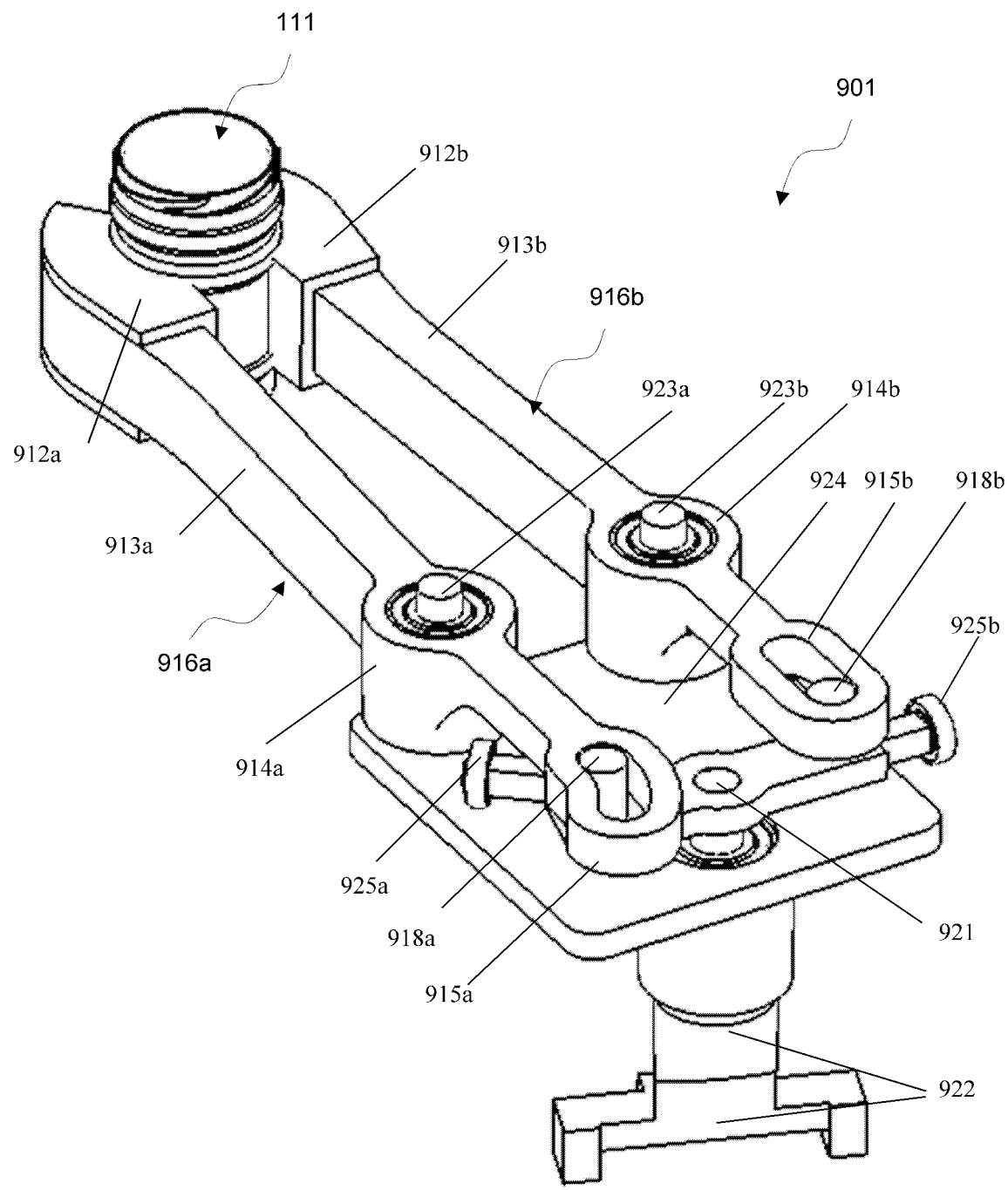
FIG. 43D shows an aerial view of the clipping mechanism.

The gripping mechanism 901 also comprises a pair of shafts 923a and 923b, a support component 924 in the shape of a plate, a bearing housing 927, and two wheels 925a and 925b (see FIG. 43C). The pair of shafts 923a and 923b are rigidly connected to the support component 924. The bearing housing 927 is also rigidly connected to the support component 924. A pair of bearings are configured to connect the shaft 921 and the bearing housing 927, so that the shaft 921 is constrained to rotate relative to the bearing housing 927 around the axis of the shaft 921. When the shaft 921 is rotated, the rigid component 922 and the connector 917 are also rotated relative to the bearing housing 927 around the axis of the shaft 921, and then the pair of shafts 918a and 918b are rotated around the axis of the shaft 921. The axes of the shafts 923a, 923b and 921 are configured to be mutually parallel. The wheels 925a (or 925b) is mounted on the shaft 917a (or 917b), so that the wheel is constrained to rotate relative to the shaft around the axis of the shaft. A pair of bearings are configured to connect the shaft 923a (or 923b) and the bearing housing 914a (or respectively 914b) of the gripping device 916a (or respectively 916b), so that the gripping device 916a (or respectively 916b) is constrained to rotate relative to the shaft 923a (or respectively 923b), around the axis of the shaft 923a (or respectively 923b) (see FIG. 43D). The shafts 918a (or 918b) is configured to be inserted in the curved hole 915a (or respectively 915b) in the gripping devices 916a (or respectively 916b), so that a movement of the shaft 918a (or 918b) may induce a rotation in the gripping device 916a (or respectively 916b) around the axis of the shaft 923a (or respectively 923b). As the gripping devices 916a and 916b are rotated, the grippers (and the corresponding elastic coating) may grip or release a container 111.

In some embodiments, referring to FIGS. 44A-44D, a rotational motion mechanism 902 comprises: a support component 941; a pair of gears 937 and 938; shafts 942, 943 and 945; bearing housings 931, 933, 935 and 946; connectors 946a, 932, 934 and 936; a cam 939; and a plate 947 with three round holes. The connectors 932, 934 and 936 are configured to rigidly connect the bearing housings 931, 933 and 935 and the support component 941 (see FIGS. 44A-44B). The plate 947 is rigidly connected to the connectors 932, 934 and 936, and to the bearing housings 931, 933 and 935. (The plate 947 is not absolutely needed; its purpose is to reinforce the rigidity.) A pair of bearings (hidden in Figure) are configured to connect the shaft 942 and the bearing housing 935, so that the shaft 942 is constrained to rotate relative to the bearing housing 935 around the axis of the shaft 942. Similarly, A pair of bearings are configured to connect the shaft 943 and the bearing housing 933, so that the shaft 943 is constrained to rotate relative to the bearing housing 933 around the axis of the shaft 943. A pair of bearings are configured to connect the shaft 945 and the bearing housing 946, so that the shaft 945 is constrained to rotate relative to the bearing housing 946, around the axis of the shaft 945. The axes of the shafts 942, 943 and 945 are configured to be horizontal and mutually parallel. The connector 946a is configured to be rigidly joined with the bearing housing 946, and to be rigidly connected to the shaft 943. The cam 939 is configured to be rigidly connected to the bearing housing 935, and to the connectors 934 and 936. The outer profile of the cam 939 comprises a circular arc and a straight arc (see FIG. 44B). The gear 938 is configured to be rigidly connected to and concentric with the shaft 943; and the gear 937 is configured to be rigidly connected to and concentric with the shaft 942 (see FIG. 44A). The gears 937 and 938 are configured to be engaged with each other. The rotational motion mechanism 902 also includes a cam 954, comprised of a plate with a curved hole (see FIG. 44C). The rotational motion mechanism 902 further comprises a shaft 953, a motor 951 comprising a shaft and a base component, and a connecting frame 952 (see FIG. 44D). A pair of bearings are configured to connect the shaft 953 and the bearing housing 931 so that the shaft 953 is constrained to rotate relative to the bearing housing 931 around axis of the shaft 953. The cam 954 is rigidly connected to the shaft 953. The base component of the motor 951 is mounted on the connecting frame 952, and the connecting frame 952 is rigidly connected to the plate 947 and hence to the support component 941. The shaft of the motor 951 is connected to and concentric with the shaft 953, so that the motor 951 may drive the rotation of the shaft 953. As the cam 954 is rigidly connected to the shaft 953, the motor may drive the rotation of the cam 954 around the axis of the shaft 953. The shaft 945 is configured to be inserted into the curved hole of the cam 954, so that a rotation of the cam may produce a movement of the shaft 945, which in turn may produce a movement of the bearing housing 946 and the connector 946a and thus a (rotational) movements of the shaft 943, the gear 938, and of the gear 937 (also see FIG. 44A). Thus, the motor 951 may produce a rotation of the shaft 943.

It should be noted that the curved hole in the cam 954 is modelled on a "modeling curve" comprised of a union of a middle curve and two ending curves, wherein the ending curves are arcs of two circles centered at the axis of the shaft 953. The shaft 945 (as a wheel) is constrained by the edges in the curved hole in the cam 954, by touching between the shaft 945 and the edges in the curved hole. When the shaft 945 touches the part of the edges corresponding to the ending curves, the shaft 945 may be static when the cam is rotated. The modeling curve is configured to have continuously varying tangents (i.e. no sharp turns on the curve); and a smooth rotation of the cam 954 produces a motion in the shaft 945 with limited acceleration.

It should be noted that the width of the curved hole in the cam may be configured to be equal to or slightly larger than the diameter of the shaft 945. The shaft 945 may be considered as a wheel, as it is rotatable around its axis, relative to the bearing housing 946, or equivalently, relative to the connector 946a.

It should be noted that the rotation of the cam 954 may be limited, as the curved hole of the cam 954 constrains (and is constrained by) the shaft 945.

Figure 45A:
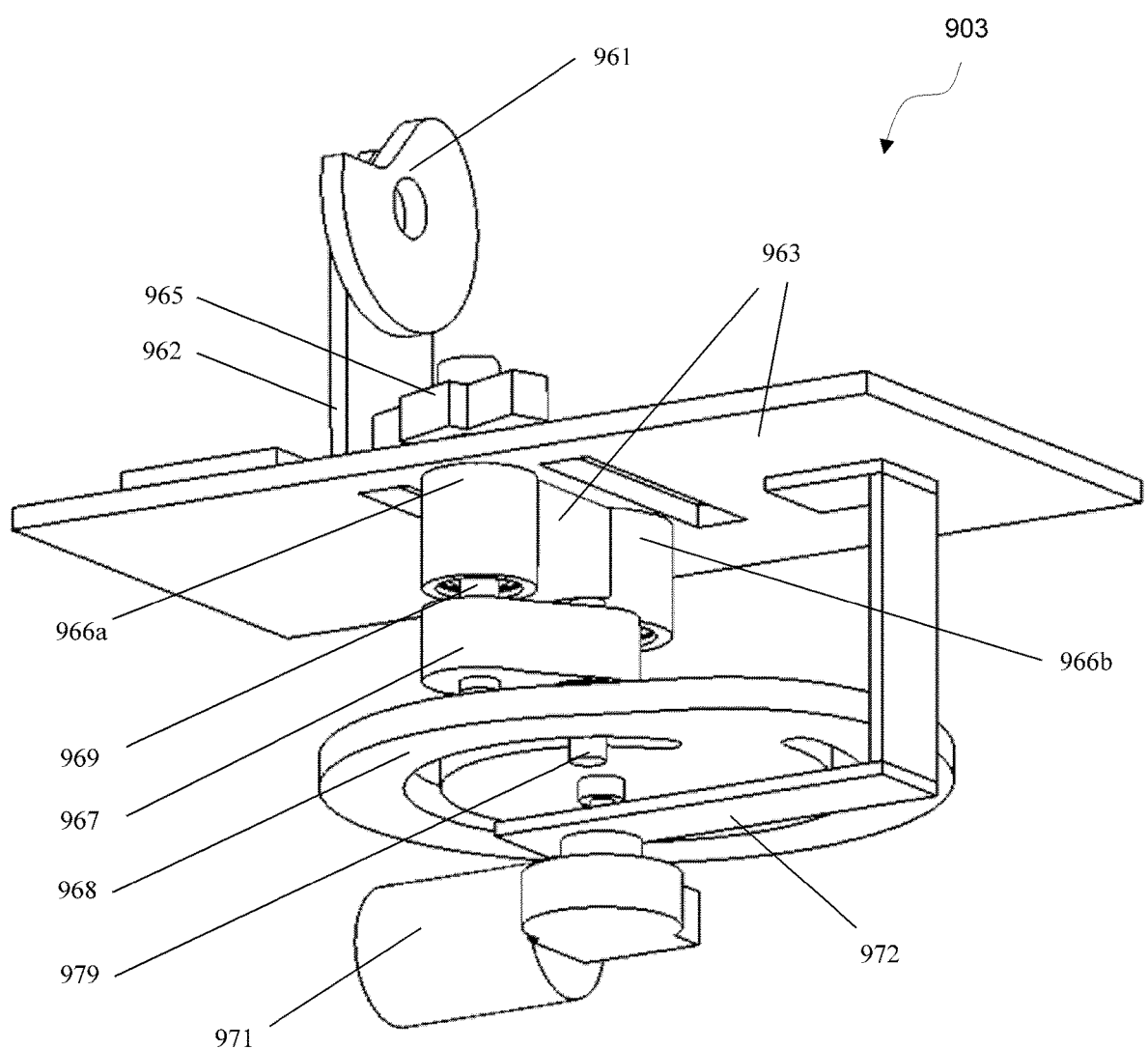
FIGS. 45A-45B show aerial views of a second rotational mechanism, with a vertical rotational axis.
Figure 45B:
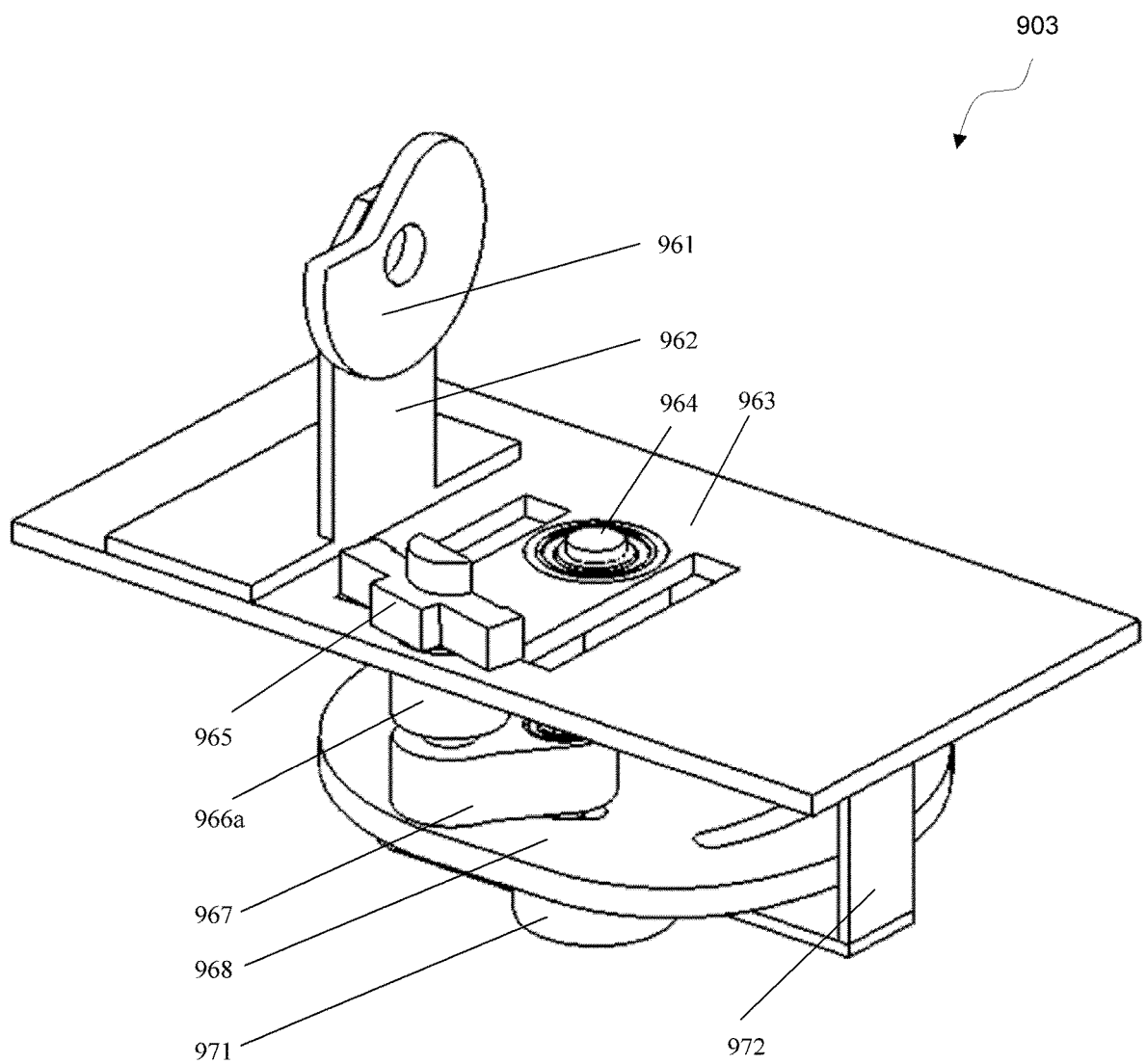

In some embodiments, referring to FIGS. 45A-45B, a second rotational motion mechanism 903 comprises: a support component 963; three shafts 964, 969 and 979; a rigid component 965; a cam 968 comprising a curved hole; a connector 967 and a bearing housings 966a and 966b. The bearing housings 966a and 966b are configured to be rigidly connected with the support component 963. The shaft 969, the rigid component 965, the connector 967 are configured to be rigidly connected. The axes of the shafts 969, 979 and 964 are configured to be mutually parallel. A pair of bearings (hidden in figure) are configured to connect the shaft 969 and the bearing housing 966a, so that the shaft 969 is constrained to rotate relative to the bearing housing 966a, around the axis of the shaft 969. Another pair of bearings are configured to connected the shaft 964 and the bearing housing 966b, so that the shaft 964 is constrained to rotate relative to the bearing housing 966b, around axis of the shaft 964. The curved hole of the cam 968 is configured to constrain the shaft 979. The cam 968 is rigidly connected to the shaft 964. The connector 967 comprises a bearing housing whose axis is configured to be parallel to the axis of the shaft 969. A pair of bearing are configured to connect the shaft 979 and the bearing housing of the connector 967, so that the said shaft is constrained to rotate relative to the said bearing housing, around the axis of the shaft.

The second rotational motion mechanism 903 also comprises a connector 962 and a cam 961, and a connector 962 configured to rigidly connect the cam to the support component 963. The cam 961 is similarly configured as the cam 939. In particular, the outer profile of the cam comprises a circular arc and a straight arc.

The second rotational motion mechanism 903 also comprises a motor 971 comprising a shaft and a base component, a frame 972, wherein the base component of the motor 971 is fixedly connected to the support component 963 by the frame 972. The shaft of the motor 971 is configured to be connected to and concentric with the shaft 964, so that the motor 971 may drive the rotation of the shaft 964, hence the rotation of the cam 968, around the axis of the shaft 964. As the curved hole of the cam 968 constrains the shaft 979, the rotation of the cam 968 produces a motion of the shaft 979, i.e., a rotation around the axis of the shaft 969, hence that a rotation of the shaft 969. As the shaft 969 rotates, the rigid component 965 also rotates with it, around the axis of the shaft 969. In conclusion, the motor 971 may drive a rotation of the rigid component 965 around the axis of the shaft 969.

It should be noted that the curved hole in the cam 968 is modelled on a "modeling curve" comprised of a union of a middle curve and two ending curves, wherein the ending curves are arcs of two circles centered at the axis of the shaft 964. The shaft 979 (as a wheel) is constrained by the edges in the curved hole in the cam 968, by touching between the shaft 979 and the edges in the curved hole. When the shaft 979 touches the part of the edges corresponding to the ending curves, the shaft 979 may be static when the cam is rotated. The modeling curve is configured to have continuously varying tangents (i.e. no sharp turns on the curve); and a smooth rotation of the cam 968 produces a motion in the shaft 979 with limited acceleration.

It should also be noted that the width of the curved hole in the cam 968 may be configured to be equal to or slightly larger than the diameter of the shaft 979. The shaft 979 may be considered as a wheel, as it is rotatable around its axis, relative to the connector 967.

It should be noted that the rotation of the cam 968 may be limited, as the curved hole of the cam 968 constrains (and is constrained by) the shaft 979.

Figure 46A:
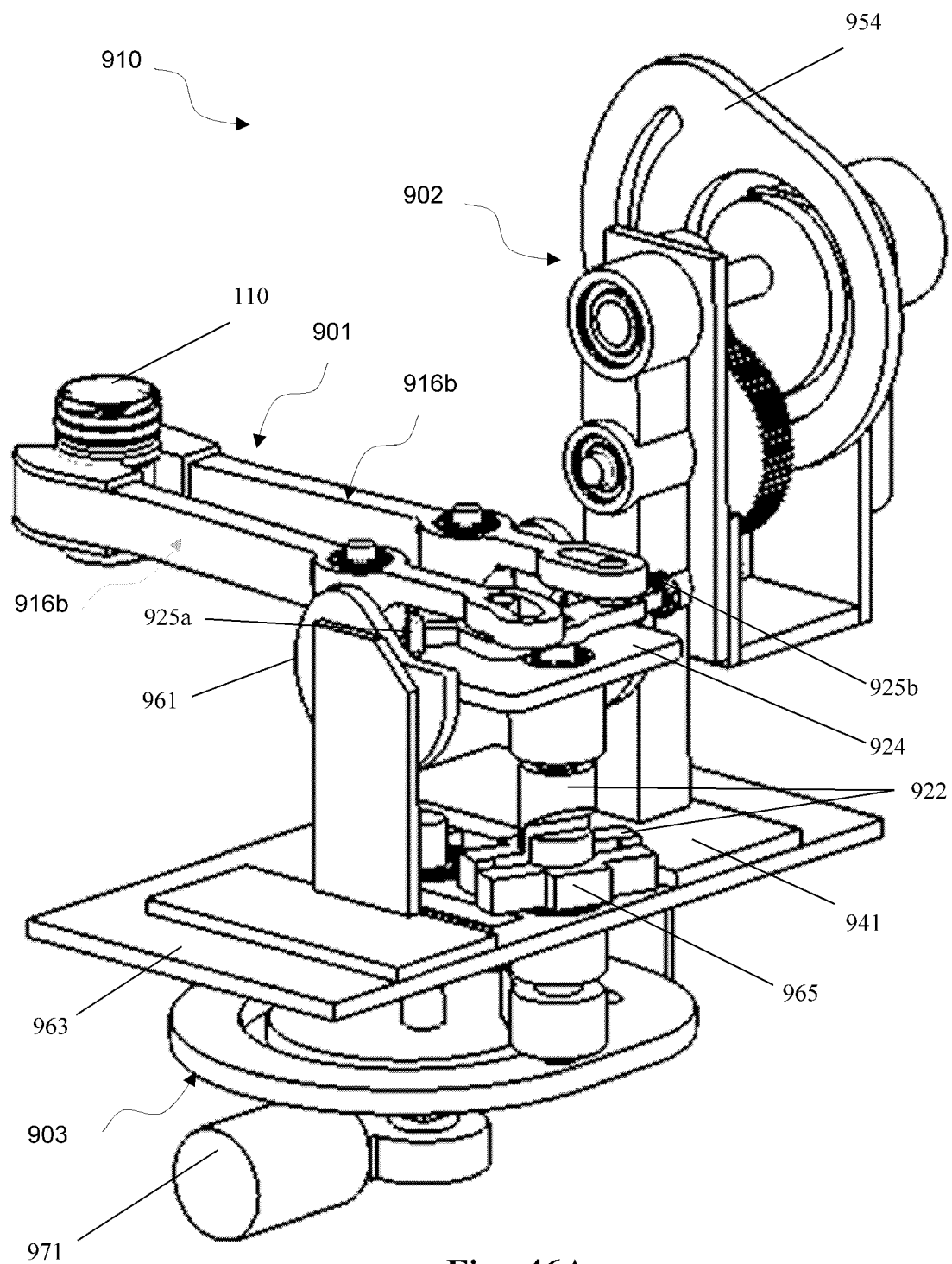
FIGS. 46A-46C show aerial views of an unloading apparatus configured to unload food ingredients from an ingredient container.
Figure 46B:
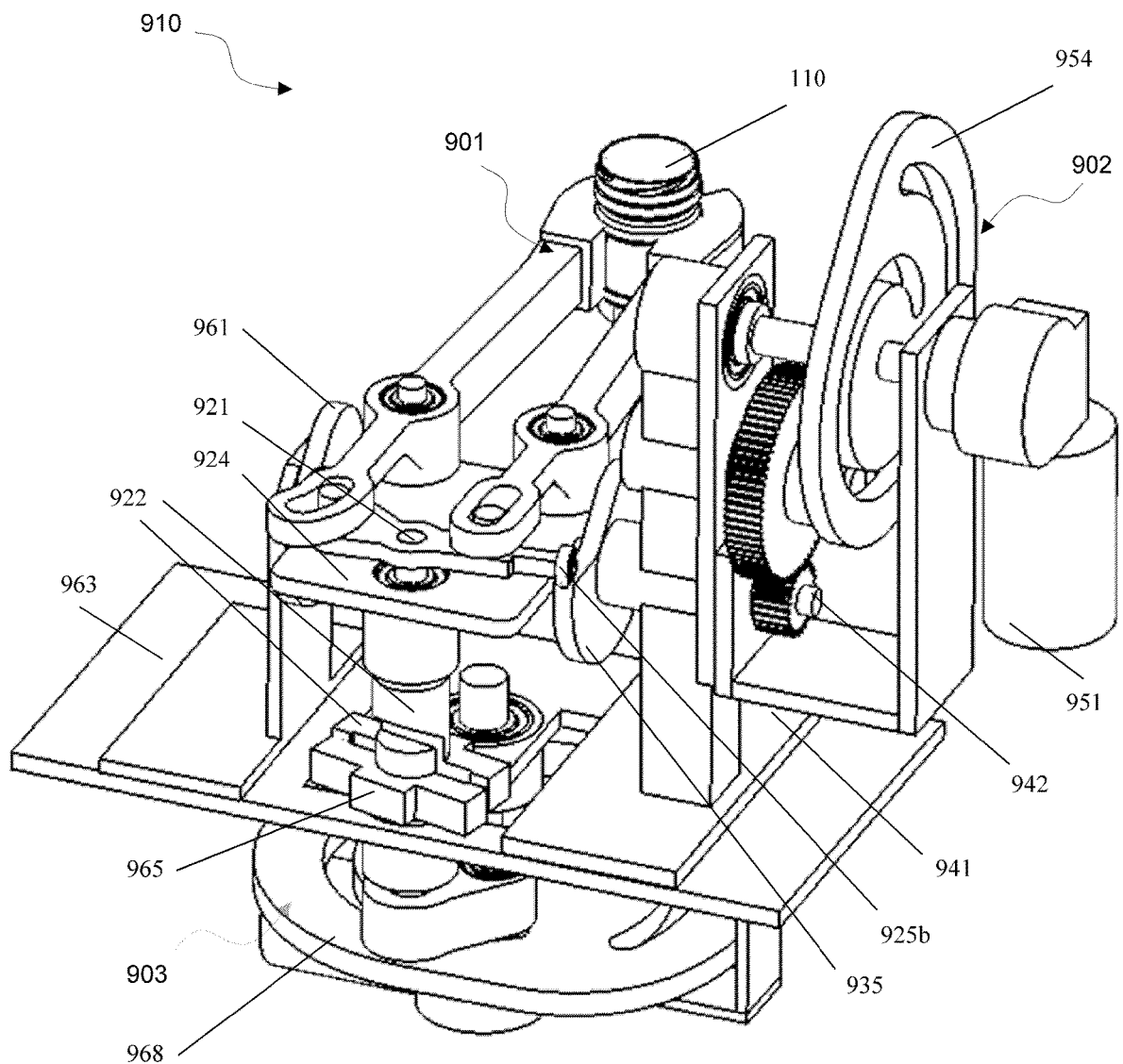
Figure 46C:
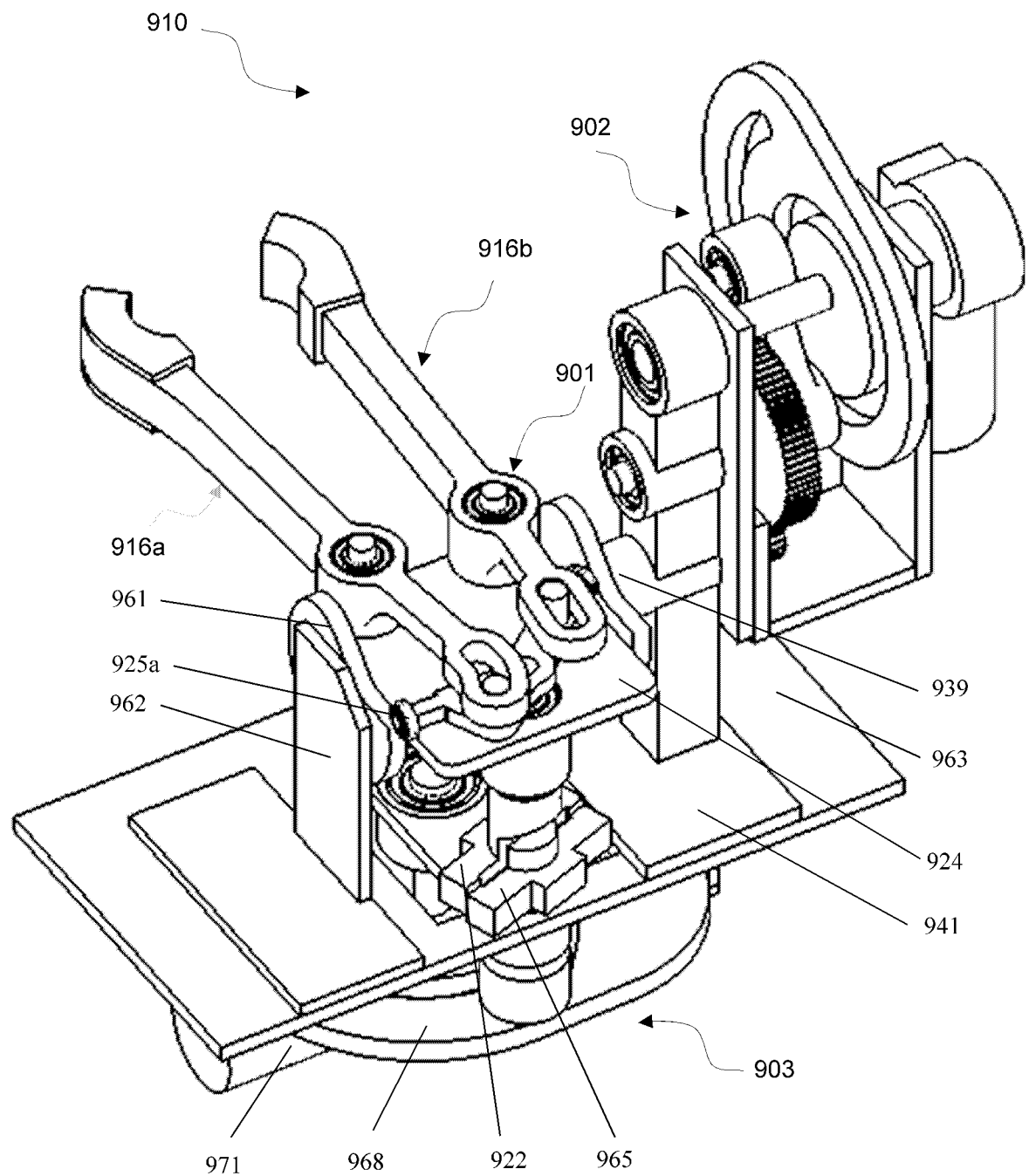

In some embodiments, referring to FIGS. 46A-46C, an unloading apparatus 910 comprises a gripping mechanism 901, a rotational motion mechanism 902 and a second rotational motion mechanism 903. The support component 941 of the rotational motion mechanism 902 is rigidly connected to the support component 963 of the second rotational motion mechanism 903. The shaft 942 of the rotational motion mechanism 902 is configured to be rigidly connected to the support component 924 in the gripping mechanism 901. When the motor 951 drives a rotation of the cam 954, the rotational motion mechanism 902 may produce a rotation of the support component 924 of the gripping mechanism 901, relative to the support component 941 (or equivalently, relative to the support component 963), around the axis of the shaft 942.

The shaft 945 (of the rotational motion mechanism 902) may be static, when the edges of the curved hole of the cam 954, corresponding the two circular ends, touch the shaft 945. As the motor 951 rotates the cam 954, the shaft 942 is configured to rotate by an angle of a certain degree; where the said angle is configured to be equal to a first pre-assigned angle which is usually between 90 to 180 degrees, e.g., 135 degrees or 170 degrees, etc. When the cam 954 is rotated to one of the ending positions, the axes of the shafts 923a and 923b are configured to parallel to the axis of the shaft 969 (of the second rotational motion mechanism 903), as shown in FIGS. 46A-46B, and the axis of the shaft 969 of the second rotational mechanism 903 and the axis of the shaft 921 of the gripping mechanism 901 are configured to coincide. In summary, the rotational mechanism 902 may drive a rotation of the support component 924 of the gripping mechanism 901 around the axis of the shaft 942, where the maximum angular range of the rotation is equal to the first pre-assigned angle.

The rigid component 965 (of the second rotational motion mechanism 903) may be static, when the edges of the curved hole of the cam 968, corresponding the two circular ends, touch the shaft 979. As the motor 971 rotates the cam 968 from one end to the other, the rigid component 965 is configured to rotate by an angle; wherein the said angle is configured to a second pre-assigned angle which is strictly less than 90 degrees, e.g., 21 degrees or 24 degrees, etc. When the cam 954 is at the position as shown in FIGS. 46A-46B, the rotation of the rigid component 965 is configured to induce a rotation of the rigid component 922 (and hence of the connector 917 which is rigidly connected with the component 922) of the gripping mechanism 901. The axes of these rotational motions are respectively the axes of the shafts 969 and 921 which coincide with each other (based on the previous paragraph).

When the cam 954 is at the position as shown in FIGS. 46A-46B, the rotation of the rigid component 922 and hence of the connector 917 (around the axis of the shaft 942), as produced by the second rotational motion mechanism 903, induces a rotation of pair of gripping devices 916a and 916b in the gripping mechanism 901, as to grip or release a container 110 which may contain food or food ingredients. If a container 110 is thus gripped, the axis of the gripped container 110 may be configured to be parallel to the axis of the shafts 923a, 923b and 921 (of the gripping mechanism 901). Although this is not a strict requirement, the axis of the shaft 969 may be configured to be vertical or nearly vertical, when the griping mechanism 901 is in the process to grip a container 110. After the container 110 is gripped, as shown in FIG. 46B, the rotational motion mechanism 902 may drive a rotation of the support component 924 of the gripping mechanism. During this period, the rigid components 965 and 922 may be disengaged, and the wheel 925b may be configured to be rolling on the outer edge of the cam 935, as to prevent a rotation of the connector 917 relative to the support component 924. Thus, gripping devices 916a and 916b are relatively still with respect to the support component 924, and hence the container 110 is kept gripped by the gripping devices 916a and 916b. Therefore, the container 110 and the gripping devices are rotated by the same angular degree as the support component 924, around the axis of the shaft 942. In particular, the food or food ingredients contained in the container 110 may be unloaded as the container 110 is turned by over 90 degrees. (Optionally, the angular degrees in the rotation may be at least 135, or even 170.) After the unloading of food or food ingredients contained in the container 110, the gripping mechanism 901 may be returned to the original position, when the rotational mechanism 902 rotates the support component 924 backward.

When the cam 954 is at the position as shown in FIGS. 46A-46B, and when the rigid component 922 and hence of the connector 917 are rotated to the other end, as to induce the pair of gripping devices 916a and 916b to rotate, as to release a container 110, as seen in FIG. 46C, the rotational mechanism 902 may also rotate the support component 924 of the gripping mechanism 901, as to move away the grippers of the gripping devices 916a and 916b. During this period, the wheel 925a may touch the outer edge of the cam 961, as to be constrained by the cam, as to prevent a movement of the connector 917 and hence of the rigid component 922. After a time (as needed), the gripping mechanism 901 may be returned to the original position, when the rotational mechanism 902 rotates the support component 924 backward.

The support component 924 will be referred to as a first support component of the unloading apparatus 910. The support component 963 will be referred to as a second support component of the unloading apparatus 910.

It should be noted that the unloading apparatus 910 comprises:

(1) The first support component 924;

(2) the pair of gripping devices 916a and 916b, each of which is rotatable relative to the first support component, wherein the axes of rotations of the said gripping devices relative to the first support component are configured to be mutually parallel;

(3) a first motorized mechanism configured to rotate the first support component 924 relative to the second support component 963, around the (horizontal) axis of the shaft 942, the first motorized mechanism comprising the second support component 963, the rotational motion mechanism 902, the connection of the shaft 942 and the support component 924, the connection of the component 941 and the support component 963;

(4) a second motorized mechanism configured to rotate the gripping devices 916a and 916b relative to the first support component 924, when the axes of rotations of the gripping devices 916a and 916b relative to the first support component is positioned vertically; wherein the second motorized mechanism comprises the second rotational motion mechanism 903 (see FIG. 45A), the component 922, the shaft 921, the connection of the shaft 921 with the support component 924 which constrains the motion of the shaft 921 to a rotation relative to the support component 924, the components 917, 918a and 918b (see FIG. 43C), and their connections with each other and with components of other parts of the unloading apparatus;

(5) a retaining mechanism configured to limit the rotation of the gripping device 916a and 916b relative to the first support component 924, when the first motorized mechanism is actively moving the first support component 924 relative to the second support component 963, the retaining mechanism comprising: the cams 961 and 939, and their connections to the second support component 963; the wheels 925a and 925b, and their connections to the component 917.

Figure 47A:
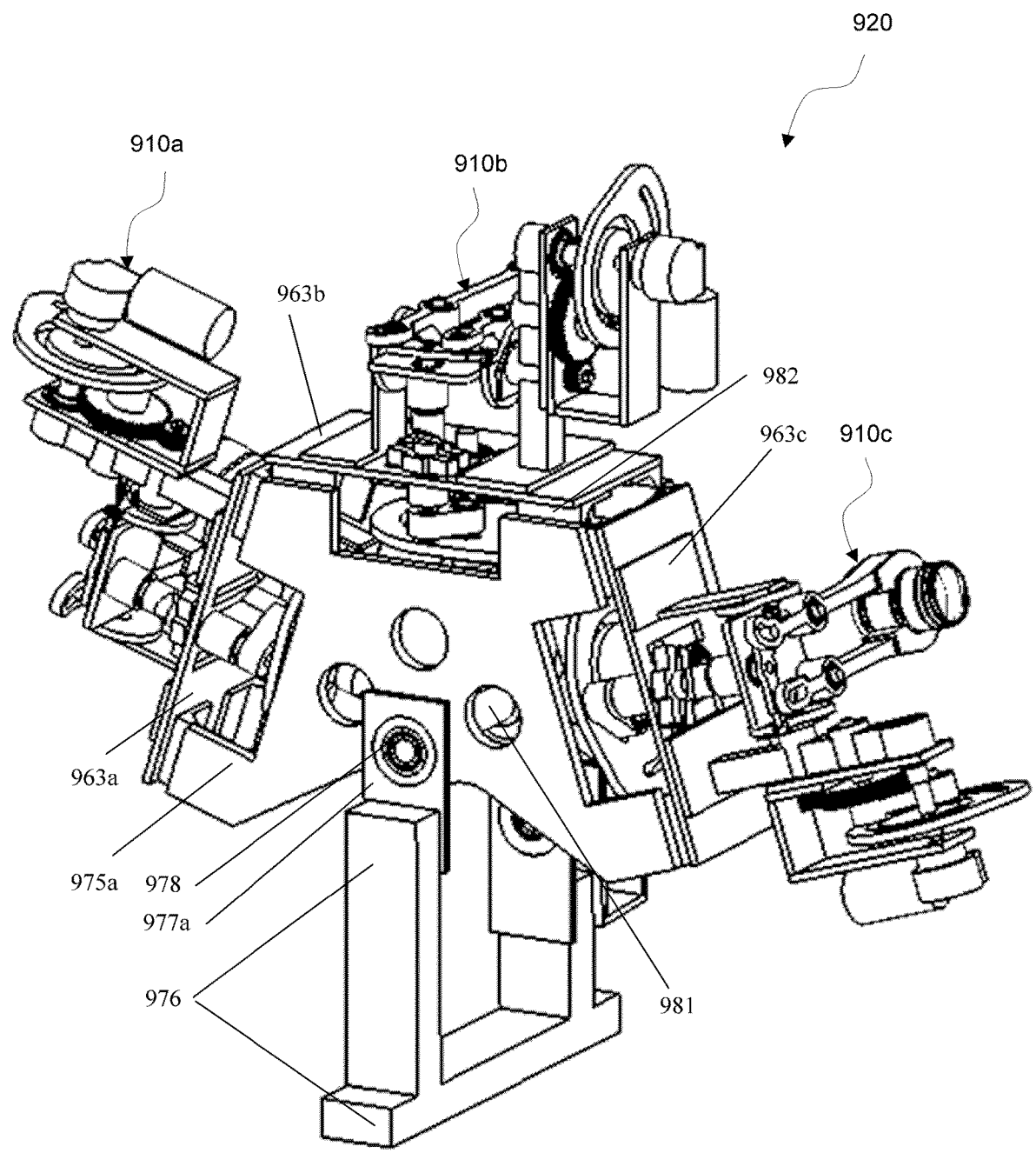
FIGS. 47A-47B show aerial views of a combination unloading apparatus, configured to unload food ingredients from an ingredient container which can be of one of a plurality of different sizes.
Figure 47B:
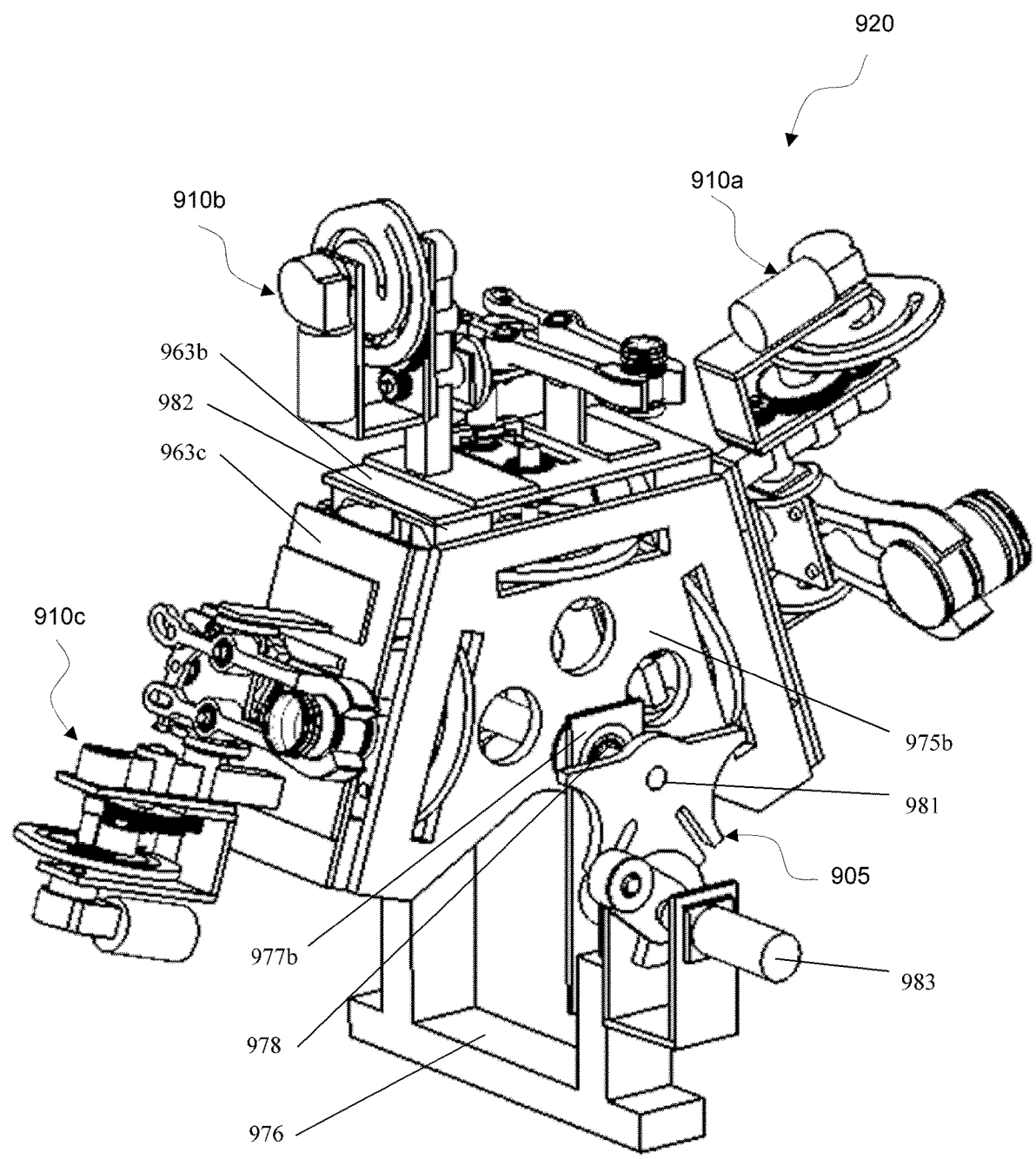
Figure 47C:
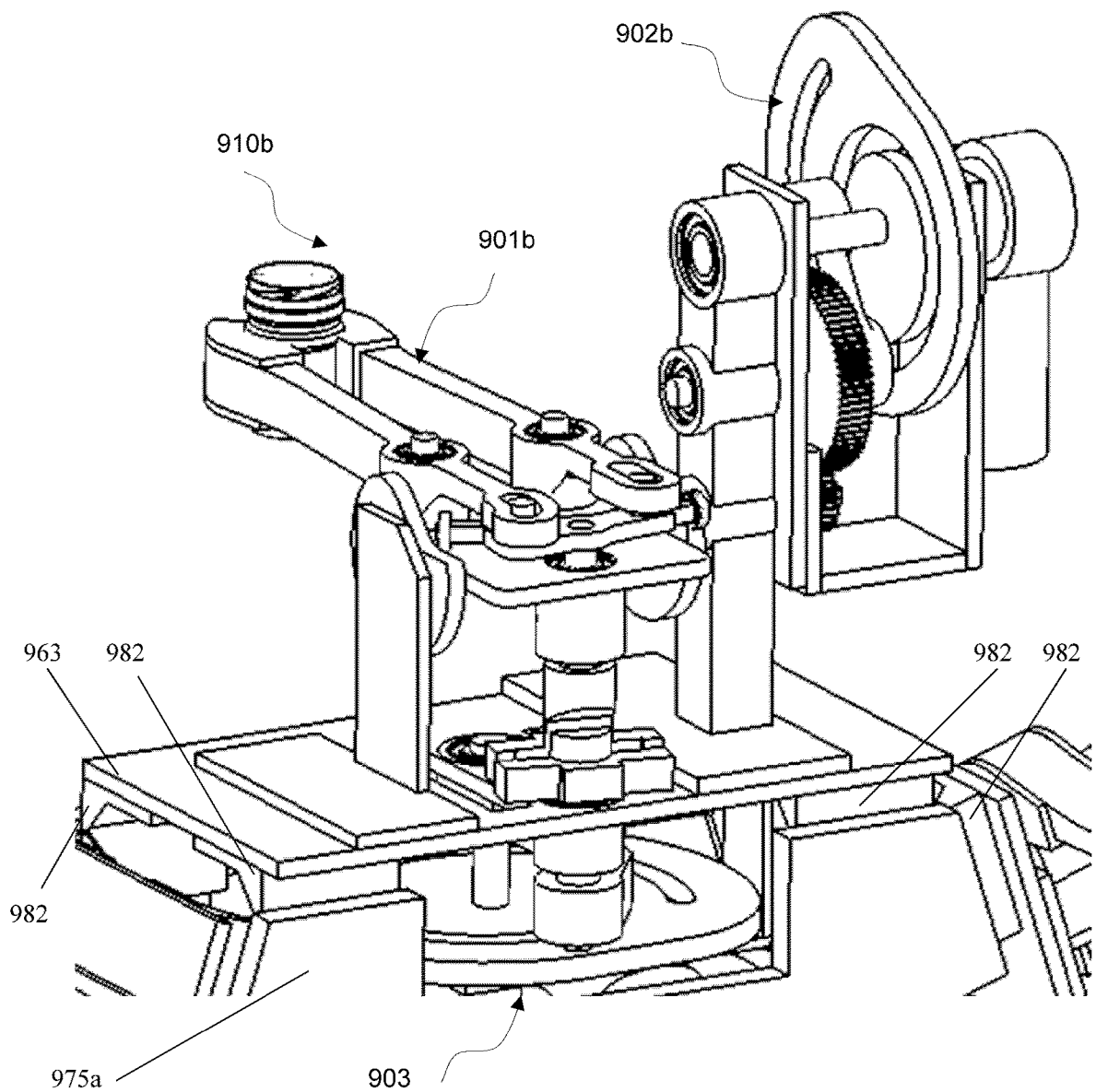
FIG. 47C shows an aerial view of parts of the combination unloading apparatus.

In some embodiments, referring to FIGS. 47A-47C, a combination unloading apparatus 920 comprises three unloading apparatuses 910a, 910b and 910c, wherein each of the unloading apparatuses is built the same way as the unloading apparatuses 910, except that the lengths or sizes of the various components may be different. In particular, the gripping mechanism in any of the unloading apparatuses 910a, 910b and 910c may be configured to grip a container which is similar as the container 110 in geometrical shape, of a specific size (esp. diametrical size of the cylinder shape). Thus, a different unloading apparatus may be configured to unload a container of food or food ingredients, of a different size.

The combination unloading apparatus 920 further comprises a support component 976, bearing housings 977a and 977b, and a shaft 981. The bearing housings 977a and 977b are configured to be rigidly connected to the support component 976. Some connectors 975a, 975b, 982, are configured to rigidly connect the support components 963a, 963b and 963c to the shaft 981, wherein the support component 963a, 963b, or 963c is the support component of the unloading apparatus 910a, 910b or respectively 910c, which is the analog of the support component 963 in the unloading apparatus 910. A bearing 978 is configured to connect the shaft 981 and the bearing housing 977a, and another bearing 978 is configured to connect the shaft 981 and the bearing housing 977b, such that the shaft 981 is constrained to rotate relative to the bearing housings 977a and 977b, around the axis of the shaft 981. The combination unloading apparatus 920 also comprises a motor 983 comprising a shaft and a base component, a Geneva mechanism 905 comprising some rotating shafts and other sub-components, and some accessories (see FIG. 47B). The motion of the shafts in the Geneva mechanism 905 is configured to be driven by the motor 983. The combination of the Geneva mechanism 905 and the motor 983 and accessories are configured to produce an intermittent rotation of the shaft 981, and hence of the rigidly connected support components 963a, 963b and 963c of the three unloading apparatuses 910a, 910b and 910c. As shown in the figure, the angle of each intermittent rotation is ⅕ of 360 degrees. A computer may be used to control the motor. Sensors linked to the computer may be used to monitor the rotation of the motor 983, as to stop the motor at desired moment, etc.

The combination unloading apparatus 920 may be used to unload food or food ingredients from containers of various sizes, one at a time. The Geneva mechanism 905 and the motor 983 and accessories are used to move a specific unloading apparatus of the three unloading apparatuses to the top position, so that the specific unloading apparatus may be used to grip a container of matching size, and unload the food or food ingredients from the container. See FIG. 47C, where the unloading apparatus 910b is moved to the top position.

Figure 48A:
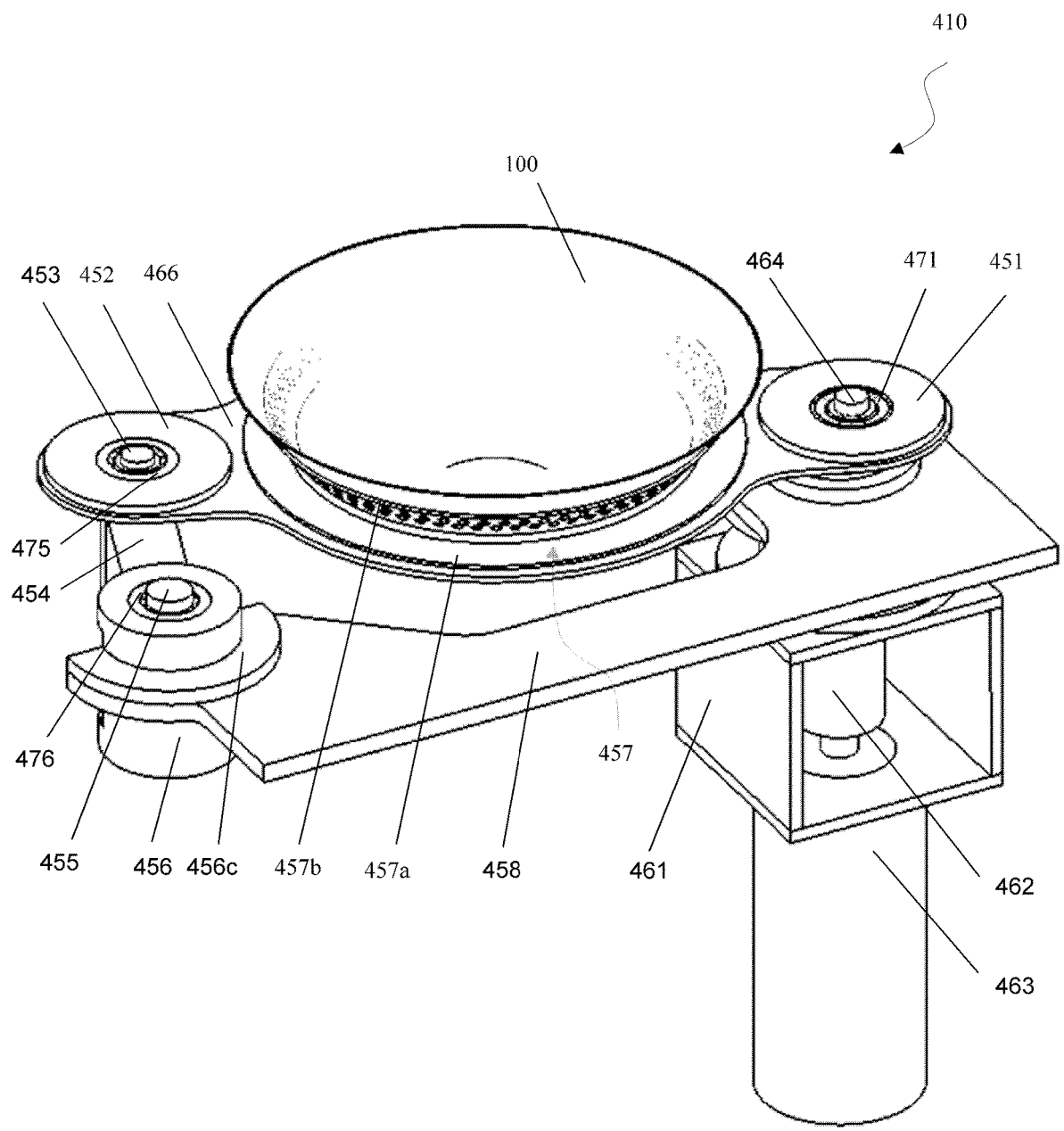
FIGS. 48A-48B show aerial views of a stirring mechanism which comprises a cooking container.
Figure 48B:
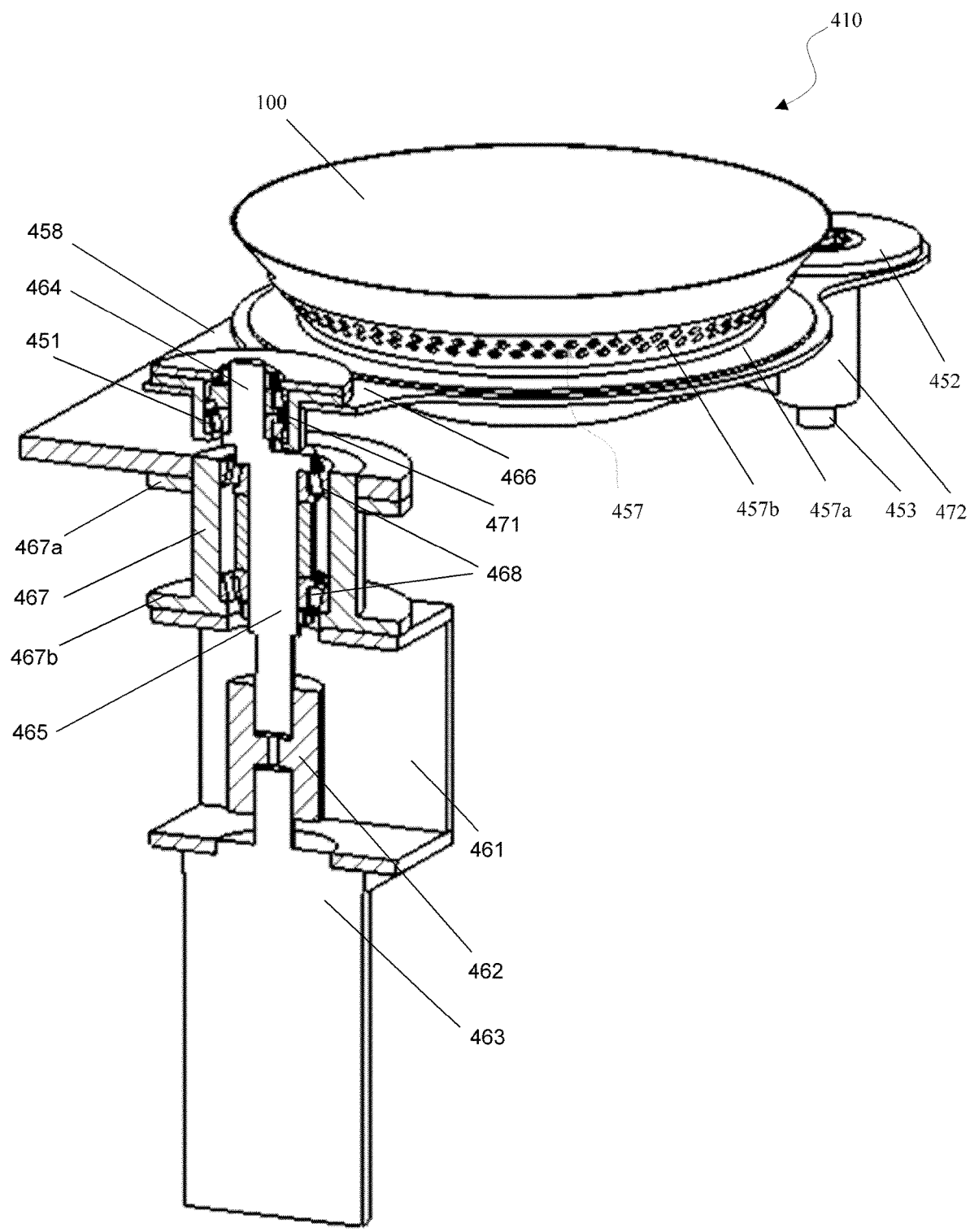

In some embodiments, referring to FIGS. 48A-48B, a stirring mechanism 410 comprises a cooking container 100, a flat plate 466, two bearing housings 451 and 452, a connecting component 457 comprised of a deformed metal sheet, including a flat part 457a, and a curved part 457b. The curved part 457b has some oval shaped holes removed. The flat part 457a and the curved part 457b may be both ring-shaped, although this is not a requirement. The flat part 457a of the connecting component 457 is configured to be rigidly connected with a ring-shaped area of the flat plate 466 and the curved part 457b of the connecting component 457 is configured to be rigidly connected with the cooking container 100. Thus, the cooking container is configured to be rigidly connected to the flat plate 466. The bearing housing 451 and 452 are rigidly connected to the flat plate 466 wherein the axes of the bearing housing 451 and 452 and the axis of the cooking container 100 are configured to be mutually parallel.

The stirring mechanism 410 also comprises a support component 458 in the shape of a plate, two shafts 453 and 455 which are rigidly connected to a connector 454, a bearing housing 456 comprising a half circular plate (the half circular plate not show in figures). The bearing housing 456 also comprises a half-circular plate 456c wherein the half-circular 456c is configured to be rigidly connected to the support component 458. A pair of bearings 476 are configured to connected the shaft 455 with the bearing housing 456, so that the shaft 455 is constrained to rotated relative to the bearing housing 456 (or equivalently relative to the support component 458) around the axis of the shaft 456, hence that the connector 454 and the shaft 453 a rotation around the axis of the shaft 455 relative to the support component 458.

The stirring mechanism 410 further comprises: a bearing housing 467; two flanges 467a and 467b which are rigidly extended from the bearing housing 467; a shaft 465, referred to as a main shaft; and a shaft 464, referred to as an eccentric shaft (see FIG. 48B). The main shaft 465 and the eccentric shaft 464 are rigidly connected to each other. The flange 467a is configured to be rigidly connected with the support component 458; and hence the bearing housing 467 is rigidly connected with the support component 458. A pair of bearings 468 (and accessories) are configured to connect the shaft 465 and the bearing housing 467, so that the shaft 465 is constrained to rotate relative to the bearing housing 467 around the axis of the shaft 465. Thus, the eccentric shaft 464 is constrained to rotate around the axis of the main shaft 465, relative to the bearing housing 467, and hence relative to the support component 458. In other words, the eccentric shaft 464 is constrained to make an eccentric rotation, where the axis of the rotation is not identical to the axis of the eccentric shaft.

The axes of the shafts 455, 453, 465 and 464 are configured to be parallel to each other, and the distance between the axis of the main shaft 465 and the axis of the eccentric shaft 464 is configured to be strictly less than the distance between the axis of the shaft 453 and the axis of the shaft 455. The distance between the axes of the shafts 465 and 464 is relatively small, usually not exceeding tens of millimeters. Although this is not a strict requirement.

The stirring mechanism 410 further comprises a motor 463 comprising a shaft and a base component, a connecting frame 461, a coupling 462. The base component of the motor 463 is fixedly connected to the support component 458 via the connecting frame 461. The shaft of the motor 463 is fixedly connected to the shaft 465 by the coupling 462. Thus, the motor 463 may drive the rotation of the main shaft 465, and hence the eccentric rotation of the eccentric shaft 464, around the axis of the main shaft 465. The stirring mechanism 410 further comprises: a pair of bearings 471 (and accessories) configured to connect the shaft 464 and the bearing housing 451, so that the shaft 464 is constrained to be rotated relative to the bearing housing 451 around the axis of the shaft 464; another pair of bearings 475 (and accessories) configured to connect the shaft 453 and the bearing housing 452, so that the shaft 453 is constrained to be rotated relative to bearing housing 452 around the axis of the shaft 453 (see FIG. 48A). When the shaft 465 is rotated around the axis of the shaft 465 by the motor 463, the shaft 464 makes an eccentric rotation around the axis of the shaft 465. This produces a cyclic, planar movement in the holder 466 and hence in the cooking container 100, if ignoring elastic and other deformations. The movement in the cooking container can stir, mix and distribute the food or food ingredients contained in the cooking container 100.

It should be noted that a computer may be configured to dynamically control the timing and/or speed of the motor 463 in the stirring mechanism 410; where the speed of the motor may be different in different times per recipe.

Figure 44A:
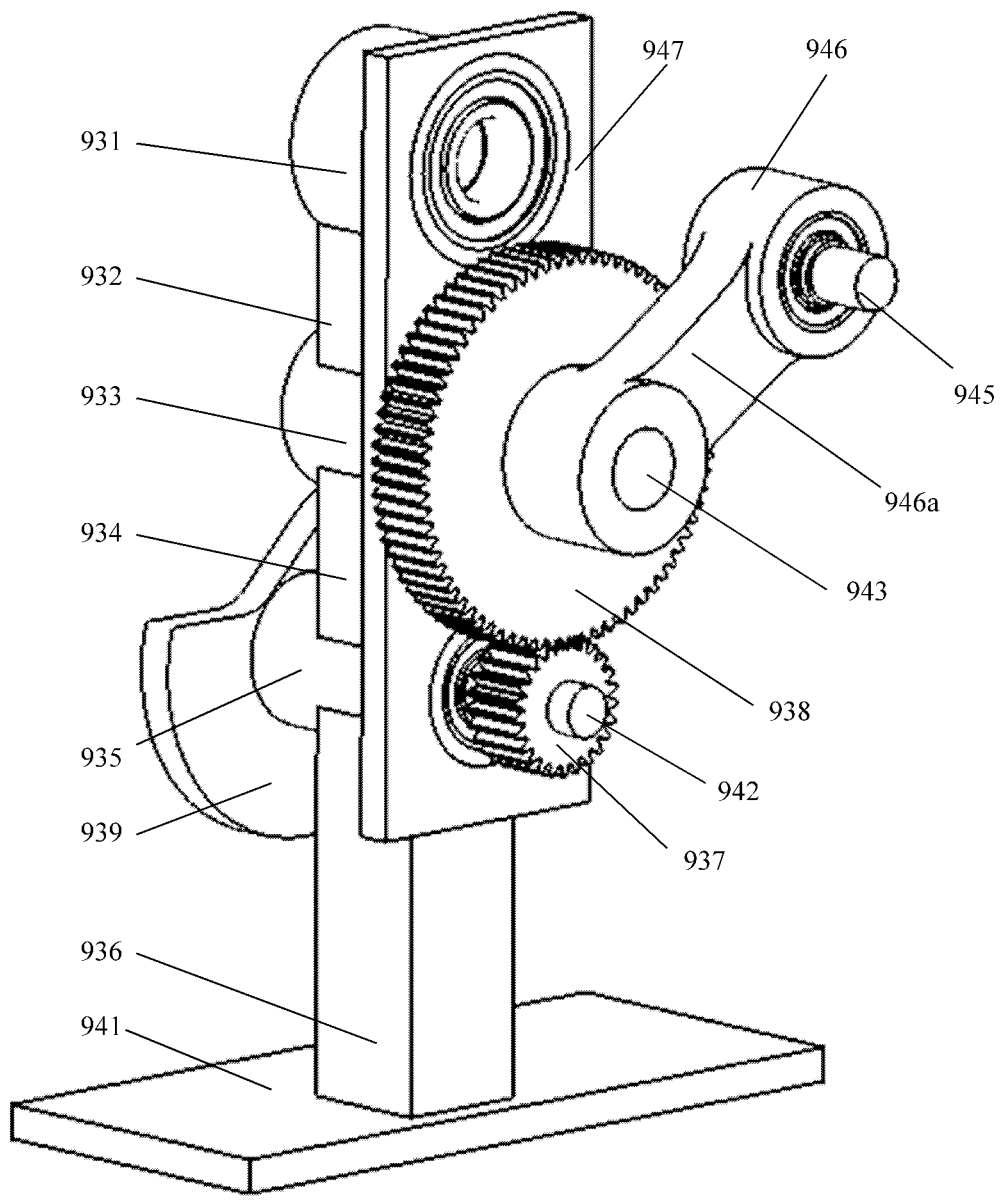
FIGS. 44A-44B show aerial views of parts of a rotational motion mechanism, with a horizontal rotational axis.
Figure 44B:
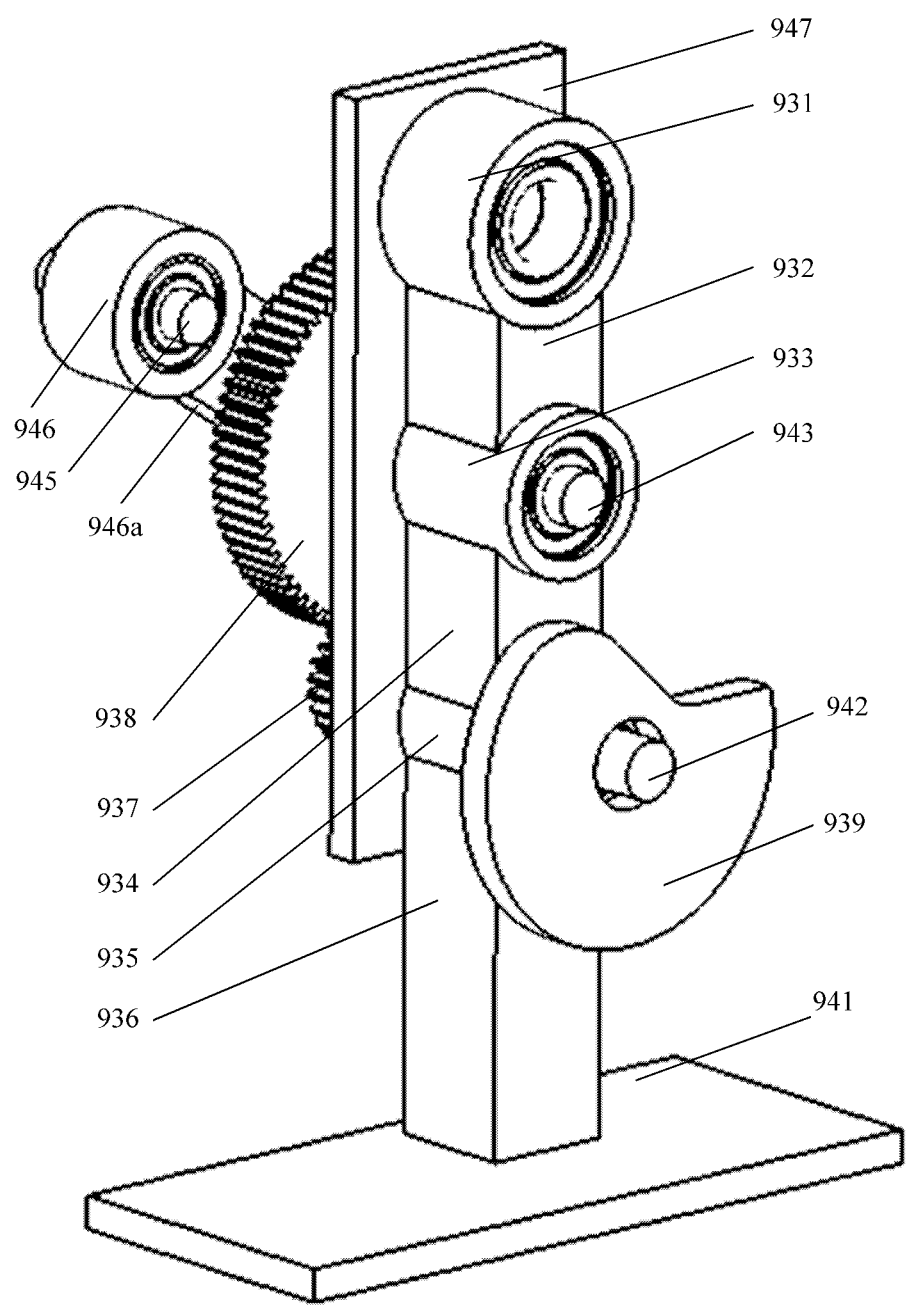
Figure 44C:
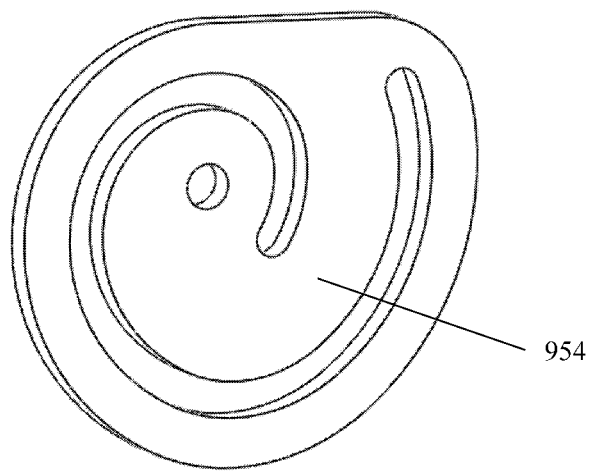
FIG. 44C shows aerial view of a cam.
Figure 44D:
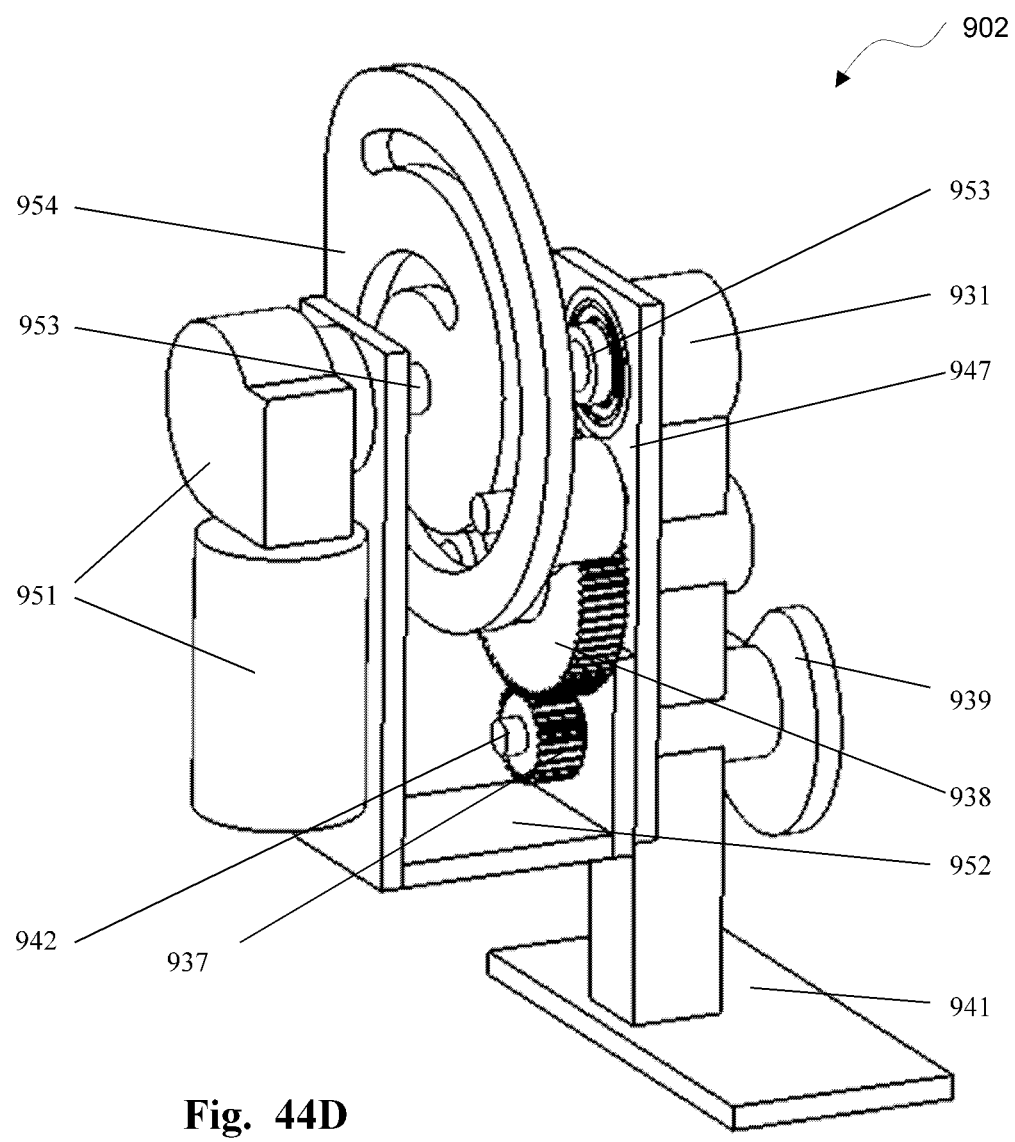
FIG. 44D shows an aerial view of the rotational motion mechanism.
Figure 48C:
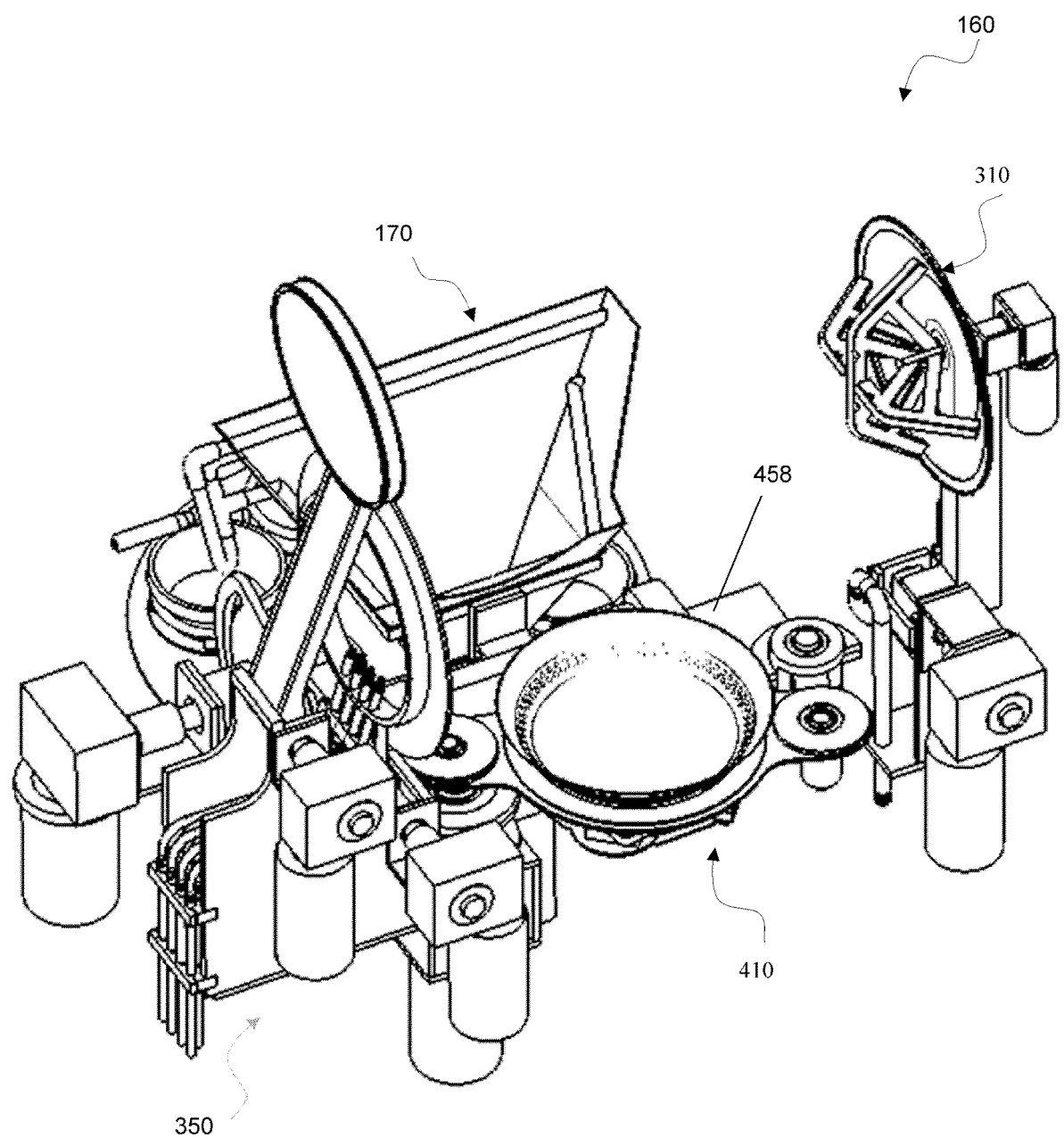
FIG. 48C shows a schematic view of a cooking container.

In some embodiments, referring to FIG. 48C, a cooking system 160 comprises: a stirring mechanism 410 comprising a cooking container 100 configured to hold food or food ingredients during cooking wherein the stirring mechanism 410 configured to produce a motion in the cooking container 100 as to stir, mix or distribute the food or food ingredients contained in the cooking container; a cleaning apparatus 310 configured to clean the cooking container 100 after a food is cooked; a lid apparatus 350 configured to limit passage of air from and towards the cooking container 100, or to limit the food or food ingredients from jumping out from the cooking container 100 during a cooking process; a receiving apparatus 170 comprising a plurality of containers configured to receive cooked food from the cooking container 100; and an unloading mechanism configured to unload cooking food to a container of the receiving apparatus; etc. The cooking system 160 comprises a support component, and the cooking container 100 comprises an axis. The details of the cooking system 160 are presented in the U.S. Provisional Patent Application, Ser. No. 62/480,334, Filed Mar. 31, 2017, by the same inventor, the content of which is incorporated herein by reference in its entirety. FIG. 44B of the present patent application is the same as FIG. 11 in the cited Provisional Patent Application; the cooking system 160, the cooking container 100, the clearing apparatus 310, the lid apparatus 350 and the receiving apparatus 170 of the present patent application are same as the cooking system 160, the cooking container 100, the clearing apparatus 310, the lid apparatus 350 and the receiving apparatus 170 in the cited Provisional Patent Application.

It should be noted the cooking apparatus in the cooking system 160 may be substituted by other types of cooking apparatuses. In particular, the cooking container 100 and the stirring mechanism in the cooking system 160 may be substituted by other types of cooking containers and stirring mechanisms. Same can be said on the lid apparatus, unloading mechanism, cleaning apparatuses of the cooking system 160.

Various types of cooking apparatuses, lid apparatuses, cleaning apparatuses, unloading mechanisms, transfer apparatuses are presented in the U.S. patent application Ser. Nos. 13/607,712, 13/892,254, 14/918,608, by the same inventor, the contents of which are incorporated herein by reference in their entireties.

In some embodiments, referring to FIGS. 49A-49E, a gripping mechanism 701x comprises a pair of gripping devices 751a and 751b, a pair of rigid component 771a and 771b. The gripping device 751a or 751b comprises a bearing housing 752a or respectively 752b, a sleeve 753a or respectively 753b, a gripper 754a or respectively 754b, wherein the sleeve 753a or 753b comprises a vertical axis, wherein the surface of the gripper 754a or 754b comprises a plurality of partial cylindrical surfaces with vertical axes (see FIG. 49A). The gripping device 751a or 751b may also comprise a rubber or silica gel or other elastic material which is attached to the surface of the gripper 754a or respectively 754b. The rigid component 771a (or 771b) comprises a shaft 772a (or respectively 772a) and an eccentric shaft 773a (or respectively 773b), wherein the axes of the shaft 772a (or 772b) and the eccentric shaft 773a (or respectively 773b) are configured to be vertical (see FIGS. 49B-49C). The gripping mechanism 701x also comprises: a L-shaped support component 755 (similarly constructed as the L-shaped component 724 of the gripping mechanism 701) comprising a vertical plate and horizontal plate, with a slotted hole 755a on the vertical plate; shafts 756a and 756b with vertical axes (see FIGS. 49D-49E). The shafts 756a and 756b are rigidly connected to the horizontal plate of the support component 755. A pair of bearings 756c and accessories are configured to connect the shaft 756a and the bearing housing 752a of the gripping device 751a, so that the gripping device 751a is constrained to rotate relative to the shaft 756a (or equivalently, relative to the support component 755) around the axis of the shaft 756a. Similarly, a pair of bearings 756d and accessories are configured to connect the shaft 756b and the bearing housing 752b of the gripping device 751b, so that the gripping device 751b is constrained to rotate relative to the shaft 756b (or equivalently, relative to the support component 755) around the axis of the shaft 756b.

The gripping device 751a and 751b are configured to be mirror images of each other about a vertical plane, and the shafts 756a and 756b are also configured to be mirror images of each other about the same vertical plane.

Figure 49A:
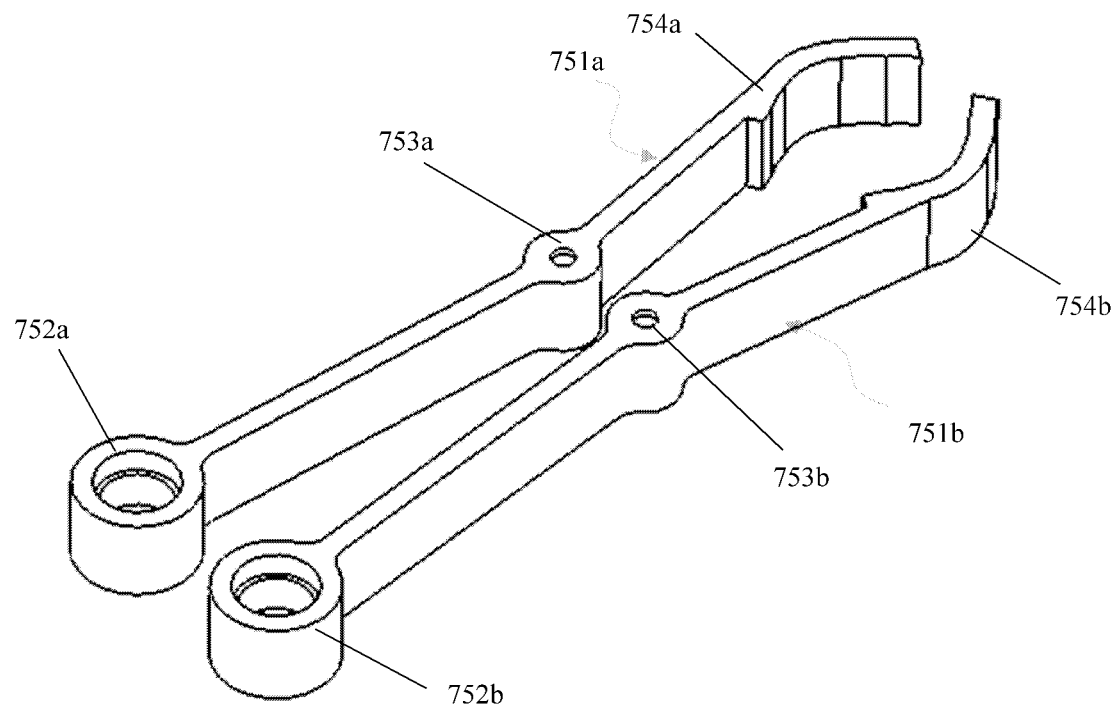
FIG. 49A shows a pair of gripping devices.
Figure 49B:
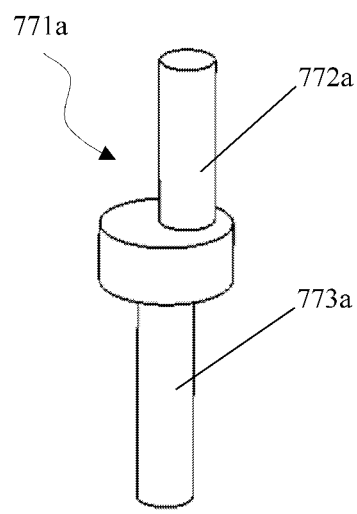
FIGS. 49B-49C show aerial views of parts of a gripping mechanism.
Figure 49C:
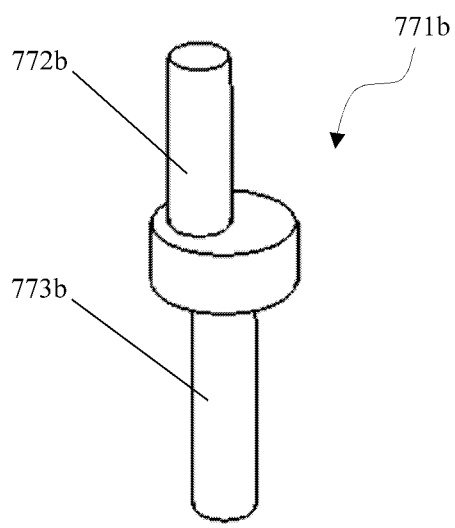
Figure 49D:
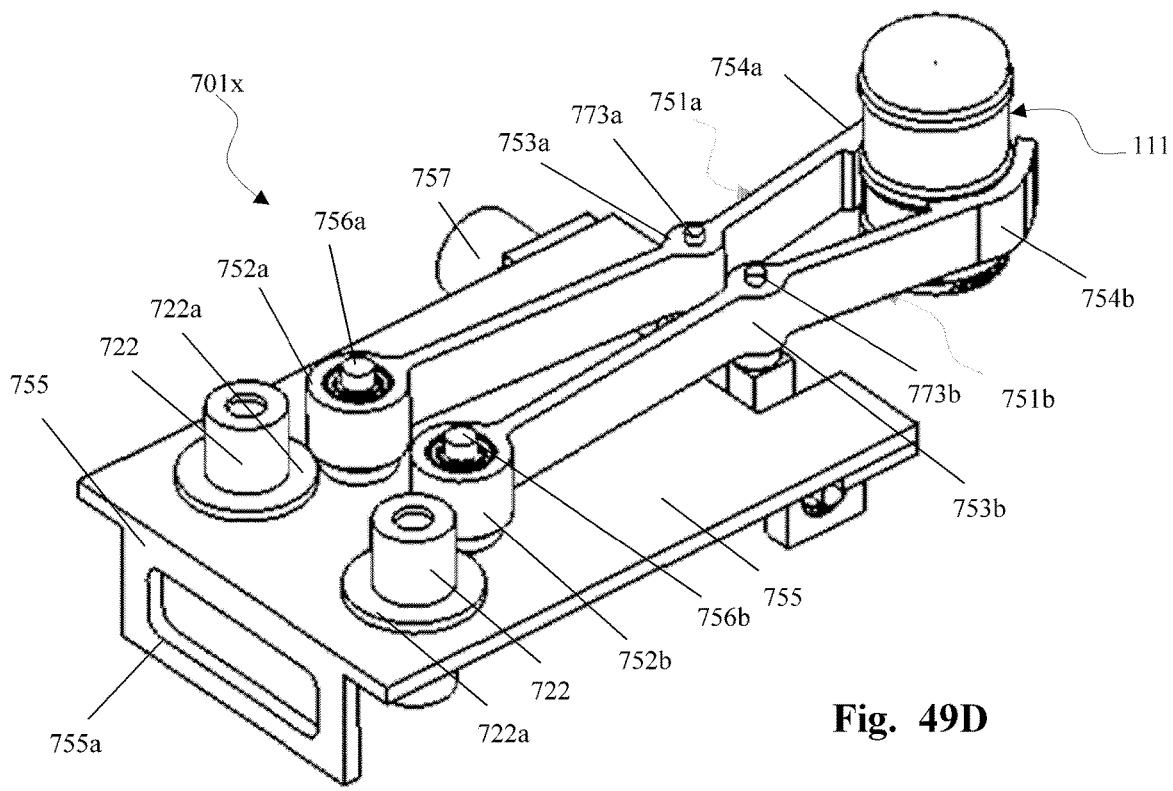
FIGS. 49D-49E show aerial views of the gripping mechanism.
Figure 49E:
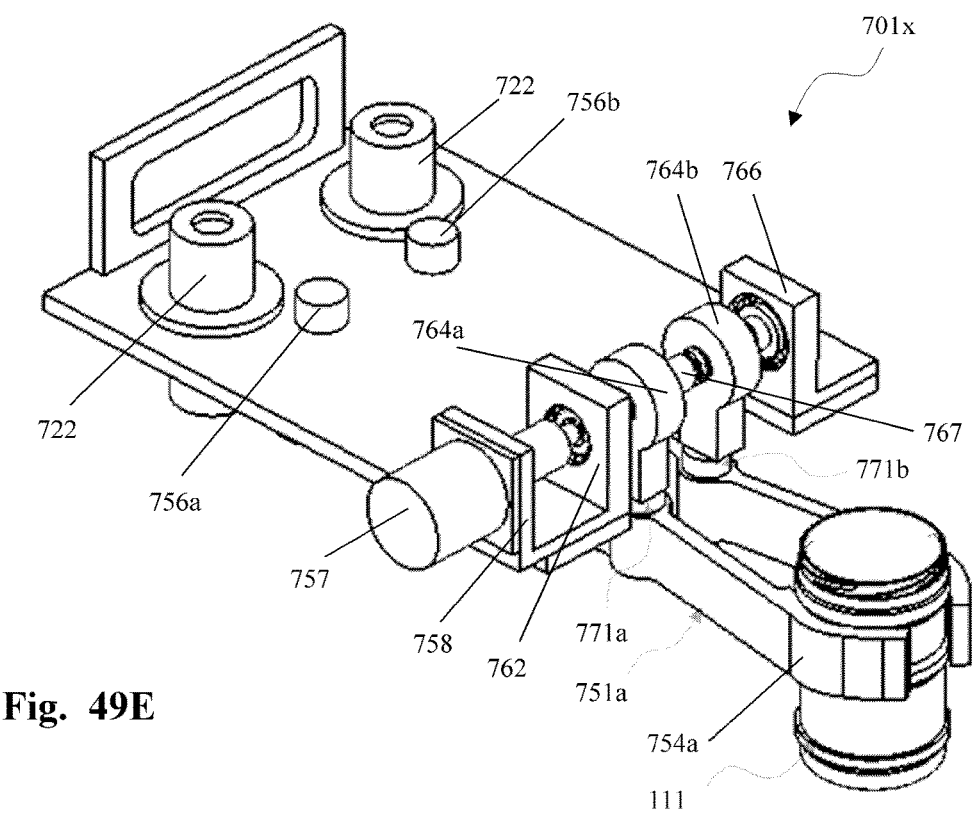

As shown in FIGS. 49D-49E, the gripping mechanism 701x also comprises two bearing housings 762 and 766, a screw shaft 767 comprising a horizontal axis, a pair of screw nuts 764a and 764b each of which comprises a cylindrical hole, and a motor 757 comprising a shaft and a base component. The screw shaft 767 comprises smooth round sections and two screw sections, one right-handed and the other left-handed. One of the screw nuts 764a and 764b is right-handed, and the other is left-handed. The shaft 772a (or 772b) of the rigid component 771a (or respectively 771b) is inserted into (and is engaged with) the cylindrical hole of the nut 764a (or respectively 764b), so that the shaft 772a (or 772b) is constrained to rotate relative to the nut 764a (or respectively 764b). Similarly, the eccentric shaft 773a (or 773b) of the rigid component 771a (or respectively 771b) is inserted into (and engaged with) the sleeve 753a (or respectively 753b) of the gripping device 751a (or respectively 751b), so that the eccentric shaft 773a (or 773b) is constrained to rotate relative to the nut gripping device 751a (or respectively 751b). The bearing housings 762 and 764 are both rigidly connected to the horizontal plate of the support component 755, and the axes of the bearing housings 762 and 764 are configured to be the same. A ball or roller bearing is configured to connect the bearing housing 762 with a smooth round section of the screw shaft 767, and another ball or roller bearing is configured to connect the bearing housing 766 with another smooth round section of the screw shaft 767, so that the screw shaft 767 is constrained to rotate relative to the bearing housings 762 and 766 (or equivalently, relative to the support component 755) around the axis of the screw shaft 767. The screw shaft 767 is configured to be engaged with the screw nuts 764a and 764b. Thus, when the screw shaft 767 rotates, the screw nuts 764a and 764b are configured to simultaneously move in opposite directions, by the same speed. The motion of the nuts 764a and 764b may induces a motion of the rigid components 771a and 771b. The motion of the rigid components 771a (or 771b) induces a rotation of the gripping device 751a (or respectively 751b) relative to the support component 755, around the axis of the shaft 756a (or respectively 756b). It should be noted that the gripping devices 751a and 751b are rotated simultaneously in opposite directions. As the gripping devices 751a and 751b are rotated to a first angle, the grippers 754a and 754b of the gripping devices may tightly grip a container 111 of a first diametrical size. As the gripping devices 751a and 751b are rotated to a second angle, the grippers 754a and 754b of the gripping devices are configured to tightly grip a container of a second diametrical size. As the gripping devices 751a and 751b are rotated to a third angle, the grippers 754a and 754b of the gripping devices are configured to tightly grip a container of a third diametrical size.

The base component of the motor 757 is configured to be rigidly or fixedly connected to the bearing housing 762, and the shaft of the motor 757 is fixedly connected to and concentric with the screw shaft 767. Thus, the motor 757 may drive a rotation of the screw shaft 767 around the axis of the screw shaft 767. As a result, the rotation produced by the motor 757 on the screw shaft 767 may induce simultaneous rotations of the grippers 751a and 751b in opposite directions as to grip or release an ingredient container of various size.

The gripping mechanism 701 also comprises two pairs of linear motion bearings 722 and the corresponding flanges 722a. The flanges 722a are all configured to be rigidly connected to the horizontal plate of the support component 755; and the axes of each pair of linear motion bearings 722 are configured to be same and vertical.

It should be noted that the screw threads of the screw nuts 764a and 764b are configured to be of opposite helical directions, while the screw shaft 767 is configured to comprise two corresponding screw threads with opposite helical directions.

Figure 49F:
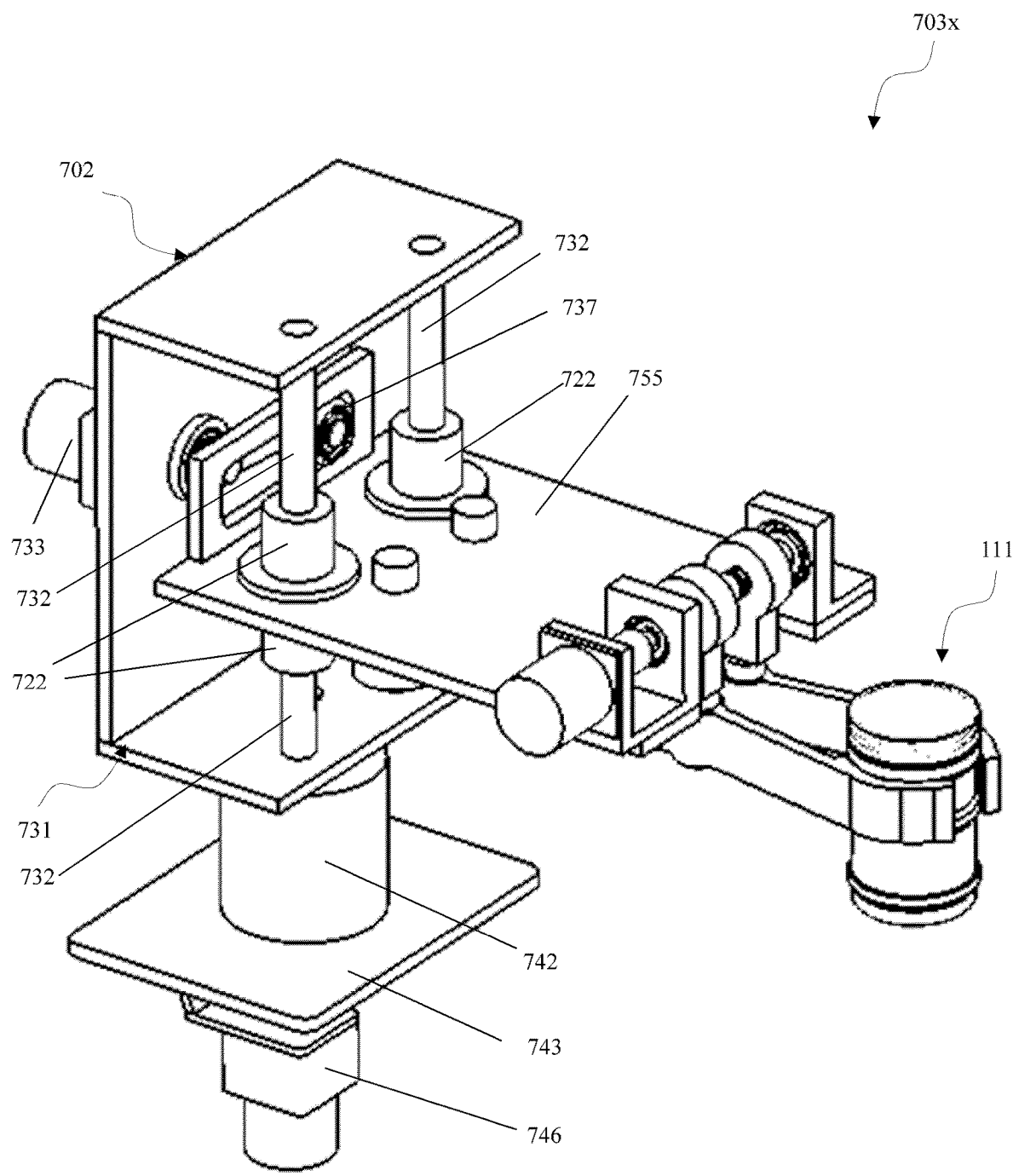
FIG. 49F shows an aerial view of a transfer apparatus.

In some embodiments, referring to FIG. 49F, a transfer apparatus 703x comprises: a gripping mechanism 701x and a transfer sub-apparatus 702. Each linear motion bearing 722 of the gripping mechanism 701x is engaged with a shaft 732 of the transfer sub-mechanism 702 so the linear motion bearings 722 may slide vertically on the corresponding shaft 732. Since the support component 755 is rigidly connected with the flanges connected to the outer shells of the linear motion bearings 722, the support component 755 of the gripping mechanism 701x is constrained to slide vertically relative to the support frame 731. On the other hand, the wheel 737 of the transfer sub-mechanism is configured to be positioned between the top horizontal surface and the bottom horizontal surface of the slotted hole 755a of the gripping mechanism 701x, so that the rotation of the shaft 734 around the axis of the shaft 736 may induce a vertical linear movement of the support component 755 of the gripping mechanism 701x. The range of the vertical linear movement of the support component 755 can be equal to (or nearly equal to) two times the distance between the axes of the shafts 734 and 736. As explained before, the support frame 731 may be rotated relative to the support component 743 around the axis of the shaft 741, as driven by the motor 746, so that the support component 755 may be rotated relative to the support component 743 around the axis of the shaft 741 as well as the support frame 731. It should be noted that the linear motion bearings 722 may be instituted by bearing bushes or copper bushes.

The support component 755 of the gripping mechanism will be referred to as the first support component of the transfer apparatus 703x. The support component 731 will be referred to as a second support component of the transfer apparatus 703. The support component 743 will be referred to as a third support component of the transfer apparatus 703x.

It should be noted the transfer apparatus 703x is similarly configured as the transfer apparatus 703, and comprises the following:

(1) a gripping mechanism 701x comprising the support component 755, a pair of gripping devices 751a and 751b, and a motorized mechanism configured to rotate the gripping devices, wherein each gripping device comprise a gripper 754a or respectively 754b, wherein the grippers 751a and 751b are configured to fit ingredient containers of several diametrical sizes, wherein the gripping devices may be rotated to different angular positions to grip containers of different diametrical sizes;

(2) a vertical motion mechanism, referred to as a first motorized mechanism, configured to produce a vertical linear motion in the first support component 755 relative to the second support component 731, wherein the vertical motion mechanism comprises: the second support component 731; the motor 733, shafts 736 and 734, connector 735, bearing housing 739, bearings 738, slotted hole 755a, linear motion bearings 722, etc.;

(5) a rotational motion mechanism, referred to as a second motorized mechanism, configured to produce a rotation of the second support component 731 relative to the third component 743, around a vertical axis, wherein the second motorized mechanism comprises: the third support component 743, the motor 746, connection frame 745, coupling 744, bearing housing 742, shaft 741, etc.

Figure 50:
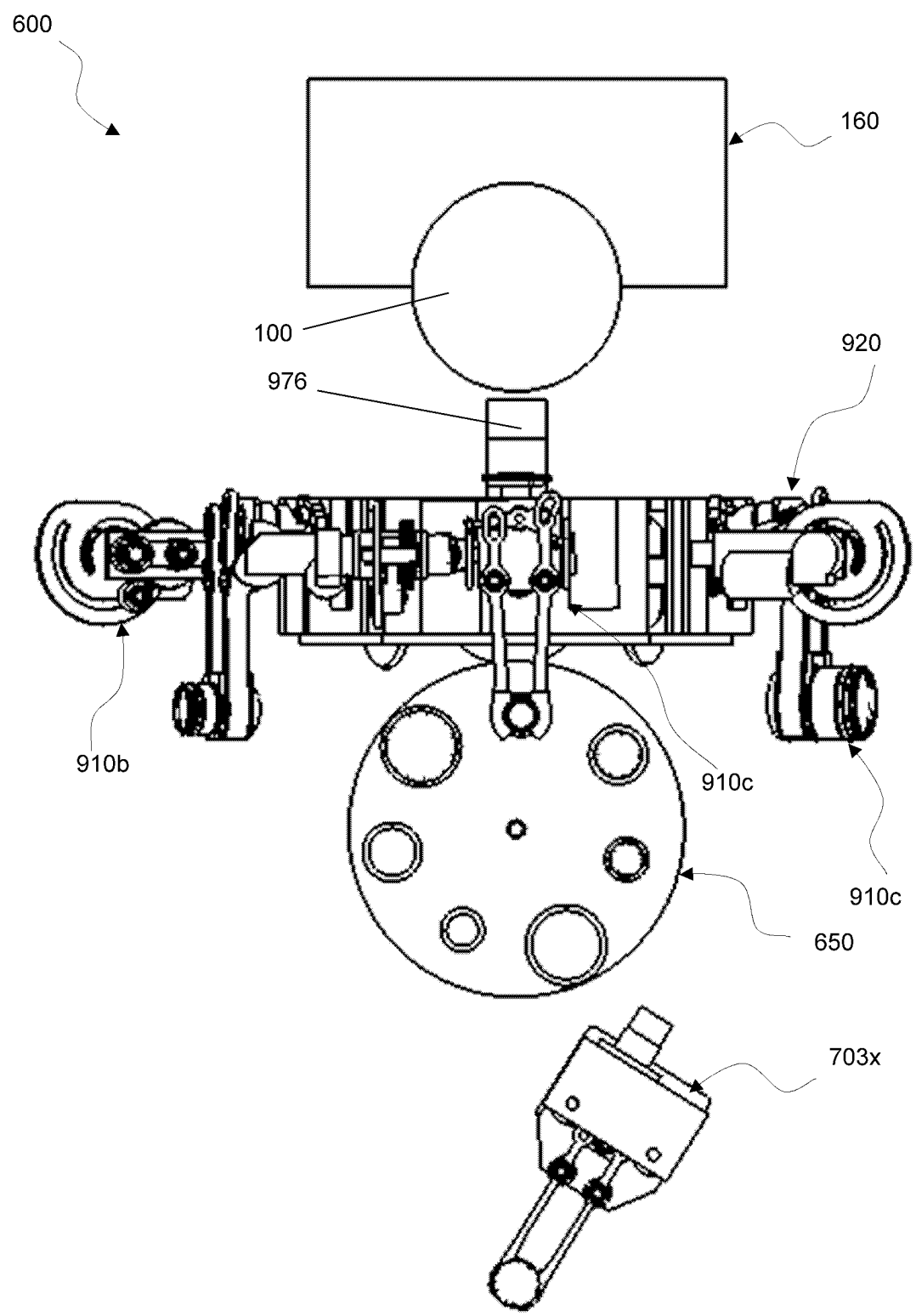
FIG. 50 shows a schematic view of a kitchen sub-system.

In some embodiments, referring to FIG. 50, a kitchen sub-system 600 comprises a cooking system 160, a combination unloading apparatus 920, a cyclic transport apparatus 650, and a transfer apparatus 703x configured to transfer containers of several different diametrical sizes, one at a time.

As explained, the combination unloading apparatus 920 may position the gripping mechanism of an unloading apparatus 910a or 910b or 910c as to grip an ingredient container that is positioned on a holding cup of the cyclic transport apparatus 650; wherein the relative position of the bearing housing 653 of the cyclic transport apparatus 650 and the support component 976 of the combination unloading apparatus 920 are configured to be properly fixed. Then the ingredient container is turned and the food ingredients held in the ingredient container are unloaded into the cooking container 100 of the cooking system 160 when the axis of the cooking container 100 is positioned vertically; wherein the relative position of the support component of the cooking system 160 and the support component 976 of the combination unloading apparatus 920 are configured to be properly fixed for this. The emptied ingredient container is then rotated back and released to the same holding cup on the cyclic transport apparatus 650. The transfer apparatus 703x is configured to move an ingredient container to or from a holding cup of the cyclic transport apparatus 650; wherein the relative position of the support component of the transfer apparatus 703x and the bearing housing 653 of the cyclic transport apparatus 650 is configured to be properly fixed.

It should be noted that the transfer apparatus 703x is configured to move an ingredient container from a holding cup of the cyclic transport apparatus 650 to a container holder of another cyclic transfer apparatus, such as the cyclic transfer apparatus 800.

Figure 51:
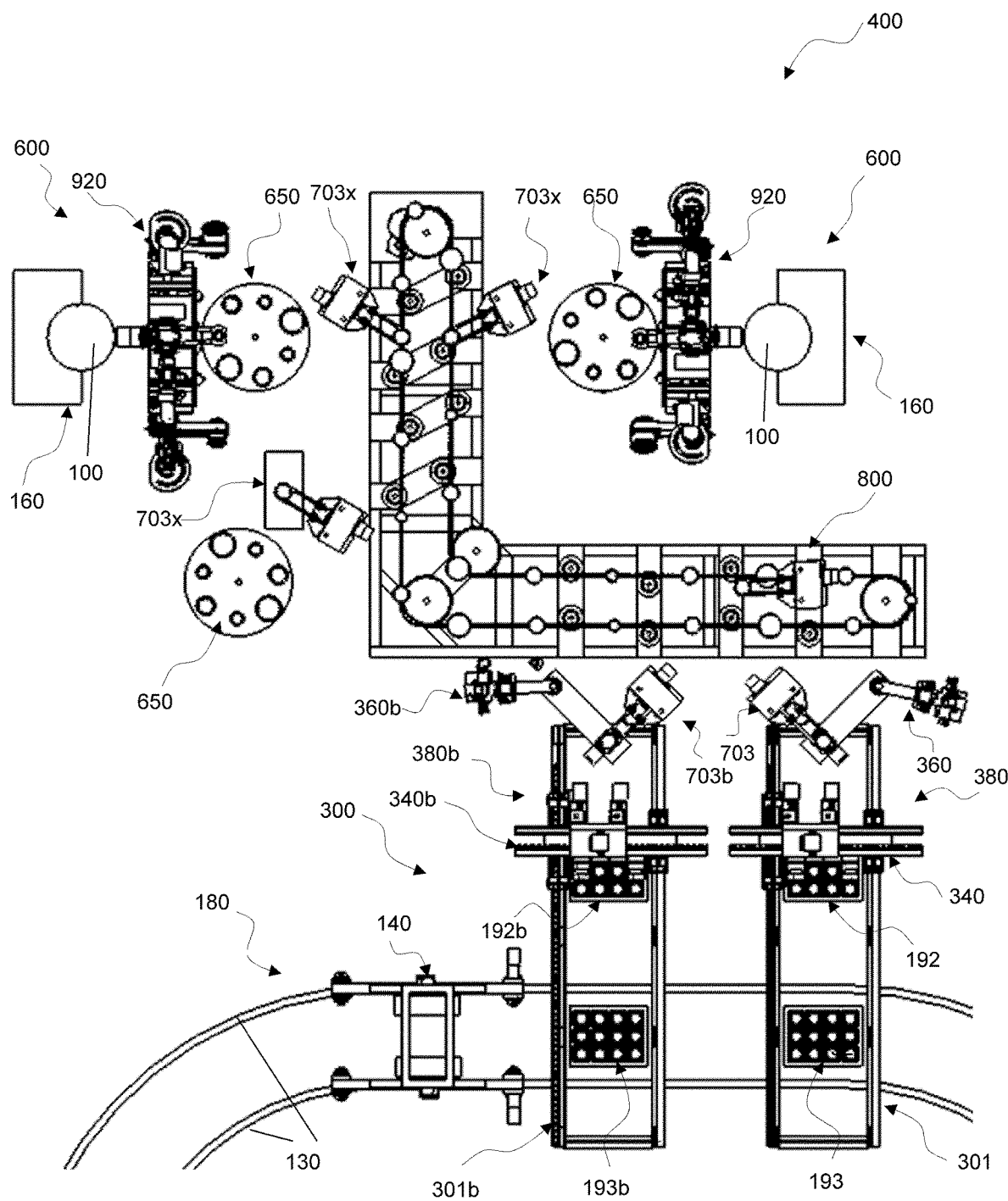
FIG. 51 shows a schematic view of a kitchen system.

In some embodiments, referring to FIG. 51, a kitchen system 400 comprises a kitchen sub-system 300, a cyclic transport apparatus 800, and a plurality of kitchen sub-systems 600. As explained, the kitchen sub-system 300 comprises kitchen sub-systems 380 and 380b, and a transportation apparatus 180. As explained, the kitchen sub-system 380 comprises: a plurality of ingredient containers 111 and corresponding caps 112; a storage apparatus 192; a transfer apparatus 340; a cap opening mechanism 360; etc. As explained, the kitchen sub-system 380b is similarly configured as the kitchen sub-system 380. A capped ingredient container in the kitchen sub-system 380b is denoted by the symbol, 110b, as explained before. Similarly, an ingredient container (without a cap) in the kitchen sub-system 380b will be denoted by 111b; and a cap in the kitchen sub-system 380b will be denoted by 112b. The storage apparatus of the kitchen sub-system will be denoted by 192b; the transfer apparatus of the kitchen sub-system 380b will be denoted by 340b; the cap opening apparatus in the kitchen sub-system 380b will be denoted by 360b, and the container fixing mechanism of the cap opening apparatus 360b will be denoted by 307b.

Each holding cup 615a of the cyclic transport apparatus 650 may hold an ingredient container 111; and each container holder 872a of the cyclic transport apparatus 800 may hold an ingredient container 111. Similarly, each holding cup 615b of the cyclic transport apparatus 650 is configured to hold an ingredient container 111b; and each container holder 872b of the cyclic transport apparatus 800 may hold an ingredient container 111b.

The kitchen system 400 also comprises a transfer apparatus 703, and a transfer apparatus 703b which is identically configured as the transfer apparatus 703 except size. The transfer apparatus 703 is configured to transfer an ingredient container 111 from the central position on the platform 436 of the container gripping mechanism 307 of the cap opening apparatus 360, to a certain position on a container holder 872a of the cyclic transport apparatus 800; wherein the relative position of the platform 436 and the support component 743 of the transfer apparatus 703 is configured to be properly fixed, and the relative position of the support frame 804 of the cyclic transport apparatus 800 and the support component of the transfer apparatus 703 is configured to be properly fixed. Similarly, the transfer apparatus 703b is configured to transfer an ingredient container 111b from a similar position of the cap opening apparatus 360b, to a certain position on a container holder 872b of the cyclic transport apparatus 800.

The transfer apparatus 703x of a kitchen sub-system 600 is configured to move an ingredient container 111 or 111b between a container holder 872a or respectively 872b of the cyclic transport apparatus 800 and a holding cup 615a or respectively 615b of the cyclic transport apparatus 650 of the kitchen sub-system 600; wherein relative position of the support component 804 of the cyclic transfer apparatus 800 and the support component of the cyclic transport apparatus 703x is configured to be properly fixed. The kitchen system 400 further comprises an additional transfer apparatus 703x and an additional cyclic transport apparatus 650, which are not parts of the kitchen sub-system 600, wherein the transfer apparatus 703x is configured to transfer an emptied ingredient container 111 or 111b from the position on a container holder 872a or respectively 872b of the cyclic transport apparatus 800 to the position on a holding cup 615a or respectively 615b of the cyclic transport apparatus 650.

The kitchen system 400 may transfer an ingredient container 111 or capped ingredient container 110 by the following steps. (The kitchen system 400 may also transfer an ingredient container 111b or a capped container 110b by similar steps.)

Step 1, the capped ingredient container 110 containing food ingredients is put in a transport box 193, together with a plurality of other capped ingredient containers (usually of the same diametrical size), and the transport box 193 is moved to a loading position on the train track 130 of the transportation apparatus 180.

Step 2, a mini vehicle 140 of the transportation apparatus 180 may transfer the transport box 193 to an unloading location in the automated transfer apparatus 380, so that the transfer apparatus 340 may successively grip the capped ingredient containers from the transport box 193 and move them to the storage apparatus 192 of the kitchen sub-system 380. Then, the transport box 193 is moved away from the unloading location, by the mini vehicle 140. At this point, the capped ingredient container 110 is stored in the storage apparatus 192.

Step 3, when the food ingredients held in the capped ingredient container 110 is needed for making a dish at a designated cooking system 160, the transfer apparatus 340 grips the capped ingredient container 110 and move it to be placed on the platform 436 of the container gripping mechanism 307 of the cap opening apparatus 360.

Step 4, the cap opening apparatus 360 removes the cap 112 from the ingredient container 111 of the capped containers 110. Then the cap 112 is moved away by some cap transfer apparatus (not yet presented in this application) to a designated location, but the ingredient container is still positioned on the platform 436.

Step 5, the transfer apparatus 703 grips the container 111 and moves it to be positioned on a container holder of the cyclic transport apparatus 800; while the container holders of the cyclic transport apparatus 800 are not moved by the mechanized mechanism of the apparatus 800.

Step 6, the mechanized mechanism of the cyclic transport apparatus 800 moves the ingredient container 111 (together with the container holders and the chains of the cyclic transport apparatus 800) to a loading/unloading location next to the kitchen sub-system 600 which comprises the designated cooking system 160.

Step 7, the transfer apparatus 703x of the kitchen sub-system 600 grips the ingredient container 111 and moves it to be positioned on a holding cup of the cyclic transport apparatus 650 of the kitchen sub-system 600.

Step 8, the said holding cup, together with the ingredient container 111, are rotated to a position which is accessible by a gripping mechanism of an unloading apparatus in the combination unloading apparatus 920 of the kitchen sub-system 600.

Step 9, one of the unloading apparatuses of the combination unloading apparatus 920 grips the ingredient container 111, and turns it, as to unload the food ingredients in the ingredient container 111 into the cooking container 100 of the designated cooking system 160. Then the emptied ingredient container 111 is turned back, and moved to be positioned on the holding cup of the cyclic transport apparatus 650 of the kitchen sub-system 600. During this step, the holding cups of the cyclic transport apparatus 650 are not moved.

Step 10, the emptied ingredient container 111 is then rotated by the cyclic transport apparatus 650, to be gripped by the transfer apparatus 703.

Step 11, the emptied ingredient container 111 is moved to be positioned on a container holder of the cyclic transport apparatus 800.

Step 12, the emptied ingredient container 111 is moved with the chains of the cyclic transport apparatus 800 to another unloading location, where the emptied ingredient container 111 is moved by the "additional" transfer apparatus 703x to a holding cup 615a of the "additional" cyclic transport apparatus 650, wherein the said transfer apparatus 703x and the said cyclic transport apparatus 650 are not parts of the kitchen sub-system 600.

Then the emptied container 111 and the cap are put together and stored in a same box, or in separate boxes.

The transfer apparatus 340 of the kitchen system 400 may be referred to as a first transfer apparatus of the kitchen system 400. The transfer apparatus 703 or 703b may be referred to as a second transfer apparatus of the kitchen system 400. The cyclic transport apparatus 800 may be referred to as a third transfer apparatus of the kitchen system 400. The transfer apparatus 703x of a kitchen sub-system 600 may be referred to as a fourth transfer apparatus of the kitchen system 400. The "additional" transfer apparatus 703x, which is not a part of any kitchen sub-system 600, may be referred to as an emptied container transfer apparatus.

It should be noted that the kitchen system 400 comprises an ingredient dispensing system configured to dispense food ingredients in an uncapped ingredient container to the cooking containers 100, said ingredient dispensing system comprising: the transfer apparatuses 703 and 703b, the cyclic transport apparatus 800, transfer apparatuses 703x, the cyclic transport apparatuses 650, and the combination unloading apparatuses 920. The ingredient dispensing system firstly transfers an uncapped ingredient container from the cap opening apparatuses 360 and 360b to one of the cyclic transport apparatuses 650, and then the corresponding combination unloading apparatus 920 may grab and hold the ingredient container, and dispense the food ingredients of the ingredient container to the corresponding cooking container 100.

Figure 52:
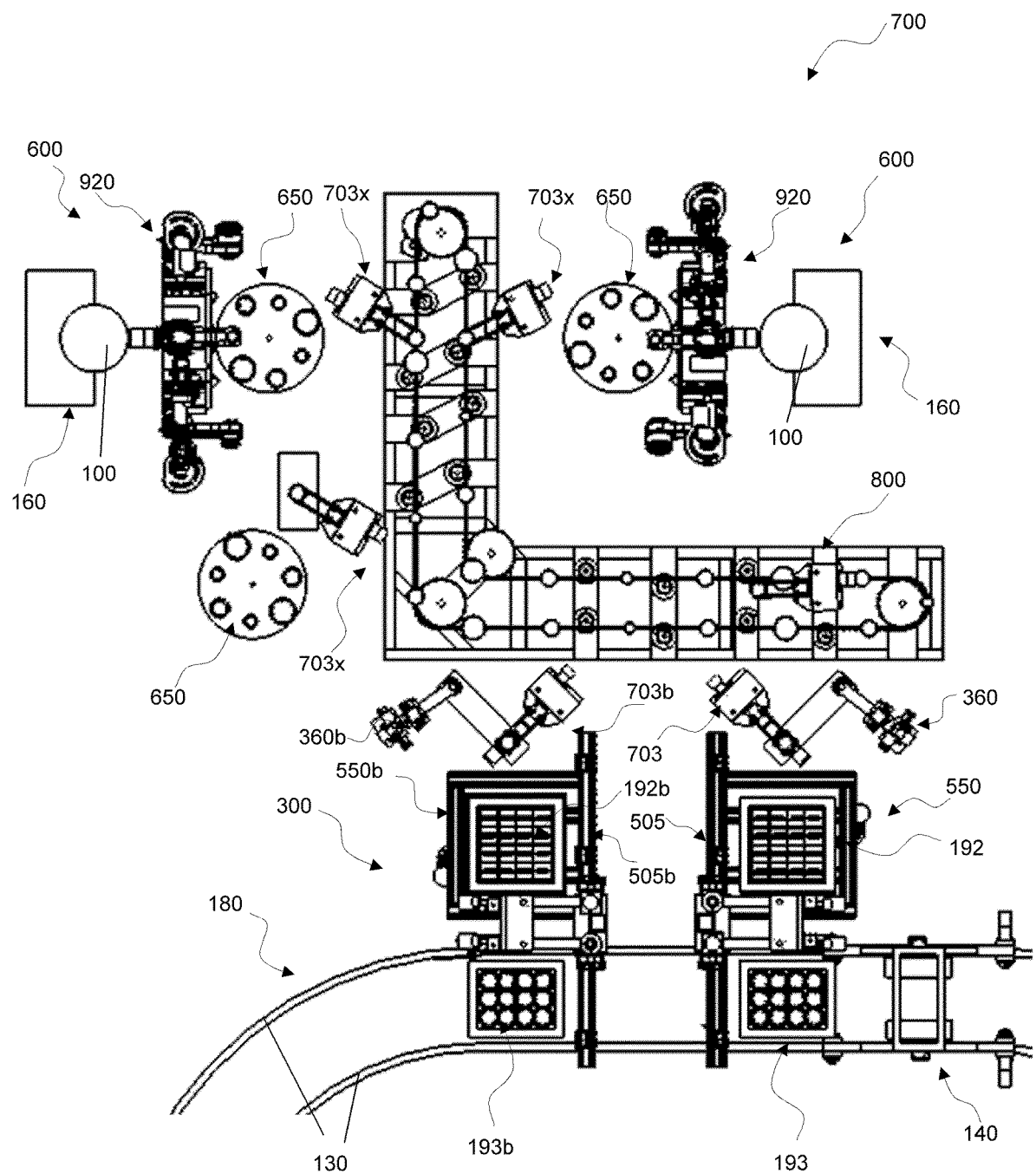
FIG. 52 shows a schematic view of a kitchen system.

In some embodiments, referring to FIG. 52, a kitchen system 700 is configured the same way as a kitchen system 400, except that the kitchen sub-systems 380 and 380b (in the kitchen sub-system 300 of the kitchen system 400) are replaced by the kitchen sub-systems 550 and respectively 550b, wherein the kitchen sub-system 550b is similarly configured as the kitchen sub-system 550 except sizes of its parts. In fact, the kitchen sub-system 550b comprises: a plurality of ingredient containers 110b; a storage apparatus 192b comprising a grid of storage compartments configured to store the ingredient containers 110b, wherein the storage apparatus 192b is similarly configured as the storage apparatus 192; a transfer apparatus 540b which is similarly configured as the transfer apparatus 540; a cap opening apparatus 360b which is similarly configured as the cap opening apparatus 360.

Thus, the kitchen system 700 comprises: a cyclic transport apparatus 800; a plurality of kitchen sub-system 600, a kitchen sub-system 300, wherein the sub-system 300 comprises kitchen sub-system 550 and 550b, and a transportation apparatus 180. As explained, the kitchen sub-system 550 comprises: a plurality of ingredient containers 111 and corresponding caps 112; a storage apparatus 192; a transfer apparatus 540; a cap opening mechanism 360; a transfer apparatus 703. As explained, the kitchen sub-system 550b comprises: a plurality of ingredient containers 111b and corresponding caps 112b; a storage apparatus 192b; a transfer apparatus 540b; a cap opening mechanism 360b; a transfer apparatus 703b.

Each holding cup 615a of the cyclic transport apparatus 650 of the kitchen system 700 may hold an ingredient container 111; and each container holder 872a of the cyclic transport apparatus 800 of the kitchen system 700 may hold an ingredient container 111. Similarly, each holding cup 615b of the cyclic transport apparatus 650 is configured to hold an ingredient container 111b; and each container holder 872b of the cyclic transport apparatus 800 may hold an ingredient container 111b.

The kitchen system 700 also comprises a transfer apparatus 703, and a transfer apparatus 703b which is identically configured as the transfer apparatus 703 except size. The transfer apparatus 703 is configured to transfer an ingredient container 111 from the central position on the platform 436 of the container gripping mechanism 307 of the cap opening apparatus 360, to a certain position on a container holder 872a of the cyclic transport apparatus 800; wherein the relative position of the platform 436 and the support component 743 of the transfer apparatus 703 is configured to be properly fixed, and the relative position of the support frame 804 of the cyclic transport apparatus 800 and the support component of the transfer apparatus 703 is configured to be properly fixed. Similarly, the transfer apparatus 703b is configured to transfer an ingredient container 111b from a similar position of the cap opening apparatus 360b, to a certain position on a container holder 872b of the cyclic transport apparatus 800.

The transfer apparatus 703x of a kitchen sub-system 600 of the kitchen system 700 is configured to move an ingredient container 111 or 111b between a container holder 872a or respectively 872b of the cyclic transport apparatus 800 and a holding cup 615a or respectively 615b of the cyclic transport apparatus 650 of the kitchen sub-system 600; wherein relative position of the support component 804 of the cyclic transfer apparatus 800 and the support component of the cyclic transport apparatus 703x is configured to be properly fixed. The kitchen system 700 further comprises an additional transfer apparatus 703x and an additional cyclic transport apparatus 650, which are not parts of the kitchen sub-system 600, wherein the transfer apparatus 703x is configured to transfer an emptied ingredient container 111 or 111b from the position on a container holder 872a or respectively 872b of the cyclic transport apparatus 800 to the position on a holding cup 615a or respectively 615b of the cyclic transport apparatus 650.

The kitchen system 700 may transfer an ingredient container 111 or capped ingredient container 110 by the following steps. (The kitchen system 700 may also transfer an ingredient container 111b or a capped container 110b by similar steps.)

Step 1, the capped ingredient container 110 containing food ingredients is put in a transport box 193, together with a plurality of other capped ingredient containers (usually of the same diametrical size), and the transport box 193 is moved to a loading position on the train track 130 of the transportation apparatus 180.

Step 2, a mini vehicle 140 of the transportation apparatus 180 may transfer the transport box 193 to an unloading location in the automated transfer apparatus 550, so that the transfer apparatus 540 may successively grip the capped ingredient containers from the transport box 193 and move them to the storage apparatus 192 of the kitchen sub-system 550. Then, the transport box 193 is moved away from the unloading location, by the mini vehicle 140. At this point, the capped ingredient container 110 is stored in the storage apparatus 192.

Step 3, when the food ingredients held in the capped ingredient container 110 is needed for making a dish at a designated cooking system 160, the transfer apparatus 540 grips the capped ingredient container 110 and move it to be placed on the platform 436 of the container gripping mechanism 307 of the cap opening apparatus 360.

Step 4, the cap opening apparatus 360 removes the cap 112 from the ingredient container 111 of the capped containers 110. Then the cap 112 is moved away by some cap transfer apparatus (not yet presented in this application) to a designated location, but the ingredient container is still positioned on the platform 436.

Step 5, the transfer apparatus 703 grips the container 111 and moves it to be positioned on a container holder of the cyclic transport apparatus 800; while the container holders of the cyclic transport apparatus 800 are not moved by the mechanized mechanism of the apparatus 800.

Step 6, the mechanized mechanism of the cyclic transport apparatus 800 moves the ingredient container 111 (together with the container holders and the chains of the cyclic transport apparatus 800) to a loading/unloading location next to the kitchen sub-system 600 which comprises the designated cooking system 160.

Step 7, the transfer apparatus 703 of the kitchen sub-system 600 grips the ingredient container 111 and moves it to be positioned on a holding cup of the cyclic transport apparatus 650 of the kitchen sub-system 600.

Step 8, the said holding cup, together with the ingredient container 111, are rotated to a position which is accessible by a gripping mechanism of an unloading apparatus in the combination unloading apparatus 920 of the kitchen sub-system 600.

Step 9, one of the unloading apparatuses of the combination unloading apparatus 920 grips the ingredient container 111, and turns it, as to unload the food ingredients in the ingredient container 111 into the cooking container 100 of the designated cooking system 160. Then the emptied ingredient container 111 is turned back, and moved to be positioned on the holding cup of the cyclic transport apparatus 650 of the kitchen sub-system 600. During this step, the holding cups of the cyclic transport apparatus 650 are not moved.

Step 10, the emptied ingredient container 111 is then rotated by the cyclic transport apparatus 650, to be gripped by the transfer apparatus 703x.

Step 11, the emptied ingredient container 111 is moved to be positioned on a container holder of the cyclic transport apparatus 800.

Step 12, the emptied ingredient container 111 is moved with the chains of the cyclic transport apparatus 800 to another unloading location, where the emptied ingredient container 111 is moved by the "additional" transfer apparatus 703x to a holding cup 615a of the "additional" cyclic transport apparatus 650, wherein the said transfer apparatus 703x and the said cyclic transport apparatus 650 are not parts of the kitchen sub-system 600.

Then the emptied container 111 and the cap are put together and stored in a same box, or in separate boxes.

The transfer apparatus 540 of the kitchen system 700 may be referred to as a first transfer apparatus of the kitchen system 700. The transfer apparatus 703 or 703b may be referred to as a second transfer apparatus of the kitchen system 700. The cyclic transfer apparatus 800 may be referred to as a third transfer apparatus of the kitchen system 700. The transfer apparatus 703x of a kitchen sub-system 600 may be referred to as a fourth transfer apparatus of the kitchen system 700. The "additional" transfer apparatus 703x, which is not a part of any kitchen sub-system 600, may be referred to as an emptied container transfer apparatus.

Figure 53:
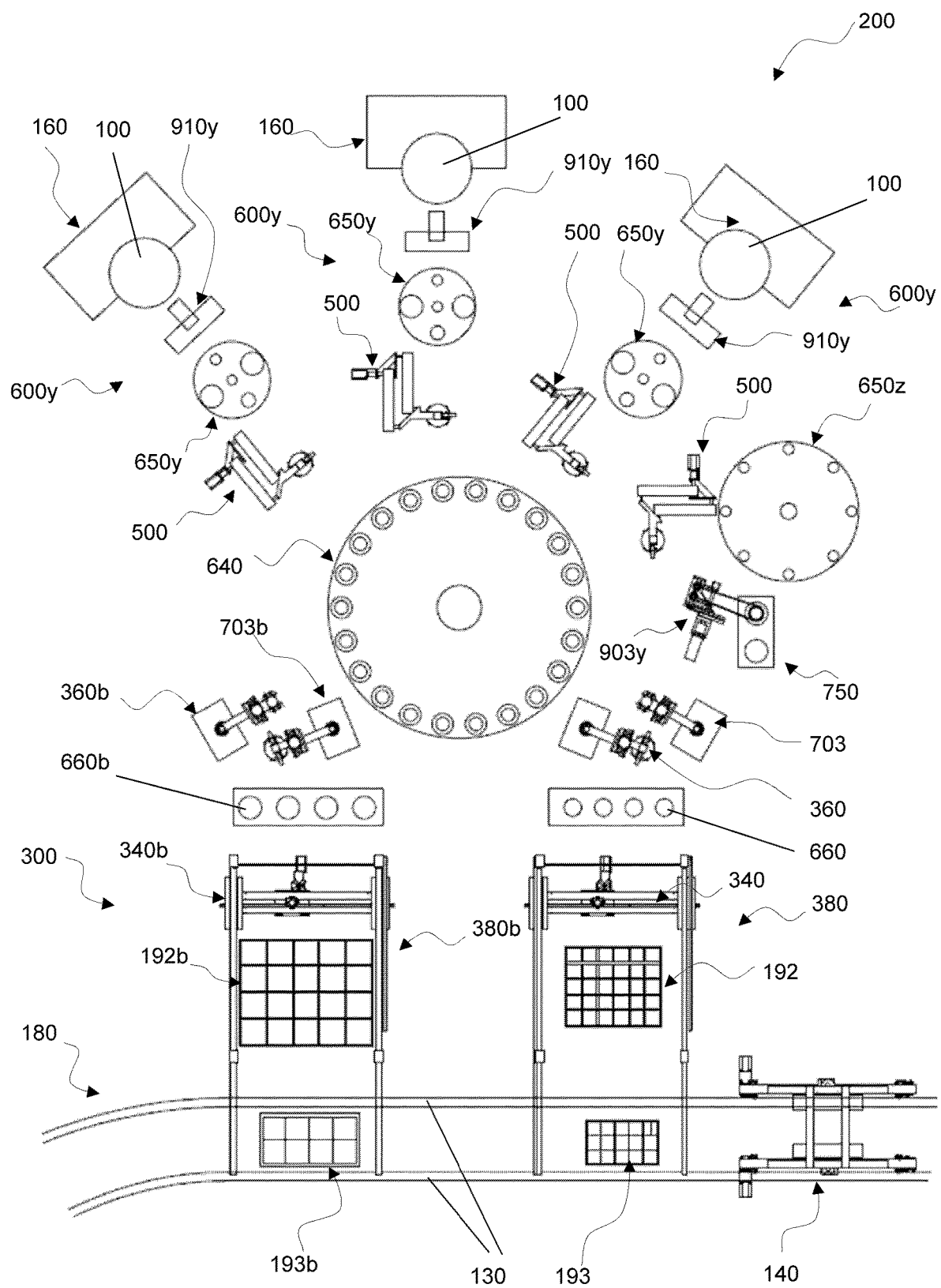
FIG. 53 shows a schematic view of a kitchen system.

In some embodiments, referring to FIG. 53, a kitchen system 200 comprises a kitchen sub-system 300, a cyclic transport apparatus 640. The kitchen system 200 also comprises a plurality of kitchen sub-system 600y, wherein each kitchen sub-system 600y comprises: a cooking system 160; an unloading apparatus 910y which is similarly configured as an unloading apparatus 910; a cyclic transport apparatus 650y which is similarly configured as a cyclic transport apparatus 650; and a transfer apparatus 500 configured to transfer an ingredient container 111 or 111b from a position on a container holder of the cyclic transport apparatus 640 to a position on a container holder of the said cyclic transport apparatus 650y; wherein the unloading apparatus 910y is configured to grip an ingredient container 111 or 111b which is positioned on a container holder of the said cyclic transport apparatus 650y, and turn the said ingredient container as to unload food ingredients from the said ingredient container into the cooking container 100 of the said cooking system 160.

Some of the holding cups of the cyclic transport apparatus 650y are configured to hold ingredient containers 111; and some of the container holders of the cyclic transport apparatus 640 are configured to hold ingredient containers 111. Similarly, some of the holding cups of the cyclic transport apparatus 650y are configured to hold ingredient containers 111b; and some of the container holders of the cyclic transport apparatus 640 are configured to hold ingredient containers 111b. The configurations of relative positions of the above discussed apparatuses are similarly made as in the kitchen system 400.

The kitchen system 200 also comprises a transfer apparatus 703, and a transfer apparatus 703b, as in a kitchen system 400. The transfer apparatus 703 is configured to transfer an ingredient container 111 from the central position on the platform 436 of the container gripping mechanism 307 of the cap opening apparatus 360, to a certain position on a container holder of the cyclic transport apparatus 640; wherein the relative position of the platform 436 and the support component 743 of the transfer apparatus 703 is configured to be properly fixed, and the relative position of the bearing housing 622 of the cyclic transport apparatus 640 and the support component of the transfer apparatus 703 is configured to be properly fixed. Similarly, the transfer apparatus 703b is configured to transfer an ingredient container 111b from a similar position of the cap opening apparatus 360b, to a certain position on a container holder 872b of the cyclic transport apparatus 800.

The kitchen system 200 also comprises a cap transfer apparatus 660 configured to move a cap 112 to a cap gathering location, and a cap transfer apparatus 660b configured to move a cap 112b to the said cap gathering location. The cap transfer apparatus 660 or 660b comprises a plurality of cap holders each configured to hold a cap 111 or respectively 111b, and a motorized mechanism configured to (cyclically or otherwise) move the said cap holders. The cap opening apparatus 360, after grip and remove a cap 112 from a capped container 110, may move the cap 112 to a position on a cap holder of the cap transfer apparatus 660. Similarly, the cap opening apparatus 360b, after grip and remove a cap 112b from a capped container 110b, may move the cap 112b to a position on a cap holder of the cap transfer apparatus 660b.

The kitchen system 200 also comprises a cleaning apparatus 750 configured to clean an ingredient container 111 or 111b, wherein the cleaning apparatus 750 comprises an container turning apparatus 910z comprising: a gripping mechanism comprising a support component, clipping devices comprising clippers, and a motorized mechanism to rotate the clipping devices relative to the support component as to grip or release an ingredient container; a rotational motion mechanism configured to rotate the support component of the gripping mechanism between a horizontal end position and an oblique end position, wherein the rotational axis of the rotational motion mechanism is configured to be horizontal; wherein the angle rotated by the rotational motion mechanism, between the horizontal end position and the oblique end position, is configured to be a constant, between 90 to 180 degrees. The axis of a container 111 or 111b gripped by the gripping mechanism is configured to be positioned vertically, when the support component of the gripping mechanism is rotated to the horizontal end position. The container turning apparatus 910z is further configured to grip an emptied ingredient container 111 or 111b in a position on a container holder of the cyclic transport apparatus 640, when the support component of the gripping mechanism is rotated to the horizontal end position. The container turning apparatus 910z may be configured similarly as an unloading apparatus 910.

The cleaning apparatus 750 also comprises a water spraying system to spray cleaning water on the interior of the ingredient container gripped by the gripping mechanism when the support component is rotated to the oblique end position.

Examples of automated cooking apparatuses are disclosed in the U.S. patent application Ser. No. 13/607,712, filed by the same inventor, the content of which is incorporated herein by reference in its entirety.

Examples of various mechanisms and apparatuses in automated cooking systems or kitchen systems are disclosed in the U.S. patent application Ser. Nos. 13/770,081, 13/892,254, 14/918,608 and Ser. No. 15/157,319, filed by the same inventor, the contents of which are incorporated herein by reference in their entireties.

A kitchen system may comprise a transfer apparatus comprising a chain, a plurality of container holders attached to the chain, and a plurality of sprockets configured to be engaged with the chain, wherein the sprockets may be configured to have vertical rotational axes.

A kitchen system may comprise a transfer apparatus comprising: a plurality of container holders; a pair of chains; and a plurality of pairs of sprockets; wherein each container holder is attached to the pair of chains; wherein one of the pair of chains is configured to be positioned above the other; wherein each pair of sprockets are configured to have a same vertical rotational axis; wherein each sprocket is engaged with one of the chains. The pair of chains may be moved synchronously, the movement driven by a same motor. The pair of chains may be of the same length. Each pair of sprockets may be of the same radius, and may be rigidly connected to a same shaft wherein the axis of the shaft coincides with the rotational axis of each of the sprockets.

In some applications, the surface of a container may comprise one or more parts of cylindrical surface; and the axis of the cylindrical surface is called the axis of the container. Similarly, the surface of a cap may also comprise a part of cylindrical surface; and the axis of the cylindrical surface is called the axis of the cap. When the cap is closed on a container, the axis of a container may be configured to coincide with the axis of the cap. In this case, an automated opening apparatus may comprise: (1) a first grabbing mechanism configured to grab a container wherein the first grabbing mechanism comprise a support component; (2) a first motion mechanism configured to move the support component of the first grabbing mechanism; (3) a second grabbing mechanism configured to grab a cap wherein the second grabbing mechanism comprise a support component; (4) a rotational motion mechanism configured to rotate the support component of the second grabbing mechanism; wherein the rotational motion mechanism comprises a support component; wherein the rotational motion mechanism is configured to produce a rotation around the axis of a cap when the grabbing mechanism grabs the cap; (5) a second motion mechanism configured to move the support component of the rotational motion mechanism.

It should be noted that a cap opening apparatus described in the above paragraph may be used to put a cap on a container.

In some embodiments, a kitchen system comprises: a menu comprising one or more recipes of culinary dishes; a plurality of containers configured to store food ingredients; a plurality of closures configured to close the containers described above; a loading system configured to load a container with one or more food ingredients; wherein the food ingredients loaded in a container are configured to be used for cooking a single culinary dish in accordance to a recipe; a capping apparatus configured to place a closure on a container loaded with food ingredients; a cooking system comprising an automated cooking system comprising a cooking container configured to hold food or food ingredients for cooking, and optionally an automated stirring mechanism configured to stir or mix the food or food ingredients held in the cooking container, and optionally a heating device configured to produce heat on the food or food ingredients held in the cooking container, a first storage apparatus configured to store a plurality of containers loaded with food ingredients, one or more transfer apparatus configured to move a container; an automated opening apparatus configured to open a closure from a container, an automated unloading apparatus configured to dispense the food ingredients contained in an opened container into the cooking container of a cooking apparatus. A computer configured to store a recipe from the menu and to control the above described automated apparatus.

A stirring mechanism of a cooking apparatus may also be referred to as a stirring motion mechanism.

In the above discussed kitchen systems, an unloading apparatus may be configured to dispense all the food ingredients in an opened container at once. An unloading apparatus may be also called an ingredient dispensing apparatus.

In the above discussed kitchen systems, a transfer apparatus may comprise: (1) a grabbing mechanism configured to grab a container, wherein the grabbing mechanism comprises a support component; (2) a motion mechanism configured to move the support component of the grabbing mechanism.

In the above discussed kitchen systems, a transfer apparatus may comprise a planar four-bar linkage mechanism. A motion mechanism may alternatively comprise: a vertical motion mechanism configured to move the support component of grabbing mechanism wherein the vertical motion mechanism comprises a support component; a first horizontal motion mechanism configured to move the support component of the vertical motion mechanism in a planar motion; wherein the direction of the planar motion is configured to be parallel to a horizontal plane; wherein the first horizontal motion mechanism comprises a support component; a second horizontal motion mechanism configured to produce a planar motion in the support component of the first horizontal motion mechanism wherein the direction of the planar motion is parallel to a horizontal plane.

In the above discussed kitchen systems, a transfer apparatus may comprise: one or more container holders; a support component configured to be connected to the one or more container holders; a motion mechanism configured to move the support component. The motion mechanism described above may comprise a track and a slider moving on a track. The motion mechanism may alternatively comprise a rotational motion mechanism wherein the axis of rotational motion mechanism is configured to be vertical. The motion mechanism may alternatively comprise a mini vehicle.

In the above discussed kitchen systems, a transfer apparatus may comprise: a plurality of container holders configured to form a loop; and a motion mechanism configured to move the loop of container holders cyclically and intermittently.

In the above discussed kitchen systems, an unloading apparatus may comprise: a first grabbing mechanism configured to grab a container wherein the first grabbing mechanism comprise a support component; a rotational motion mechanism configured to move the support component of the first grabbing mechanism by a rotation around a horizontal axis.

A kitchen system may further comprise: a storage container configured to hold food ingredients; a plurality of transport containers; a dispensing apparatus configured to dispense food ingredients from the storage container into a transport container which is located in a dispensing location; a transfer apparatus configured to move a transport container from the dispensing location to the unloading location of an unloading apparatus of the kitchen system; wherein the dispensing apparatus may comprise one or more of the following: a weight scales, a transportation belt, a tunnel, a funnel, a gripping device, a robotic arm, a gripping device, or a grabbing device.

A kitchen system may comprise a capping apparatus configured to put a cap on an ingredient container; wherein the capping apparatus may comprise: a first grabbing mechanism configured to grab a container wherein the first grabbing mechanism comprise a support component; a first motion mechanism configured to move the support component of the first grabbing mechanism; a second grabbing mechanism configured to grab a cap wherein the second grabbing mechanism comprise a support component; a rotational motion mechanism configured to rotate the support component of the second grabbing mechanism, wherein the rotational motion mechanism comprises a support component, wherein the rotational motion mechanism is configured to produce a rotation around the axis of a cap when the grabbing mechanism grabs the cap; a second motion mechanism configured to move the support component of the rotational motion mechanism.

A kitchen system may comprise a capping apparatus comprising a mechanism configured to vacuum the air from a container loaded with food ingredients. The capping apparatus further comprises a mechanism configured to insert a gas into a container loaded with food ingredients.

A grabbing mechanism discussed above may be a gripping mechanism, or other types of motorized mechanism configured to grab or release a container or a cap.

It should be noted that a motor in the present patent application may be a regular AC or DC motor, a steppe motor, or servo motor, or inverter motor, or variable speed motor, or other types of motor, possibly further comprising speed reducers. The rotation of a motor, or of a shaft, may be further monitored by sensors, including encoders and/or proximity sensors. A computer may be configured to control all motors discussed above.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A support component described in the present patent application can be any type of rigid component. A support component may be moved or fixed relative to the ground. A rigid component may comprise one or more of the following: a bar, a tube, a beam, a plate, a board, a frame, a structure, a bearing housing, a shaft. A rigid component can be made by metal such as steel or aluminum, or by other materials, or by a combination of different types of materials.

Most common bearings are ball bearings and roller bearings. However, a bearing in the present patent application can be of any type.

Only a few examples and implementations are described. Other implementations, variations, modifications and enhancements to the described examples and implementations may be made without deviating from the spirit of the present invention. For example, the term cooking container is used to generally refer to a device for containing or holding food ingredients during cooking. For the present patent application, a cooking container can be a wok, a pot, a pan, a cookware, a bowl, a container, a board, a rack, a net, etc. The cooking also is not limited to any particular ethnic styles. The cooking may include but is not limited to: frying (including stir frying), steaming, boiling, roasting, baking, smoking, microwaving, etc. The cooking apparatus may or may not use a heater.

What is claimed is:

1. A kitchen system, comprising:
   a plurality of ingredient containers, each configured to hold food ingredients;
   a plurality of caps, each configured to cap a said ingredient container, wherein each pair consisting of a said ingredient container and a said cap which caps the ingredient container is referred to as a capped ingredient container;
   a storage apparatus configured to store a plurality of said capped ingredient containers;
   a cap opening apparatus configured to remove the cap from a said capped ingredient container by producing a relative motion between the cap and the ingredient container (of the capped ingredient container), said cap opening apparatus comprising:
      a cap gripping mechanism comprising a first rigid component and one or more gripping devices, said cap gripping mechanism being configured to grip said cap;
      a first motion mechanism (as part of the cap opening apparatus) comprising a second rigid component and a motor, said first motion mechanism being configured to produce a relative motion between the first rigid component and the second rigid component; and
      a second motion mechanism comprising a third rigid component and a motor;
   a cooking system comprising a cooking container configured to hold food or food ingredients; and
   a first transfer system configured to move a said capped ingredient container from the storage apparatus to the cap opening apparatus, said first transfer system comprising a transfer apparatus, wherein said transfer apparatus comprises:
      a gripping mechanism comprising a first rigid component and one or more gripping devices, said gripping mechanism being configured to grip said capped ingredient container (wherein the gripping mechanism of the transfer apparatus is implicitly different from the cap gripping mechanism of the cap opening apparatus);
      a first motion mechanism comprising a second rigid component and a motor, said first motion mechanism being configured to produce a motion of the first rigid component relative to the second rigid component (wherein the first motion mechanism of the transfer apparatus is implicitly different from the first or second motion mechanism of the cap opening apparatus); and
      a second motion mechanism comprising a third rigid component and a motor, said second motion mechanism being configured to produce a motion of the second rigid component relative to the third rigid component (wherein the second motion mechanism of the transfer apparatus is implicitly different from the first or second motion mechanism of the cap opening apparatus).

2. The kitchen system of claim 1, wherein the storage apparatus comprises a plurality of compartments, each configured to store a plurality of said capped ingredient containers.

3. The kitchen system of claim 1, wherein the storage apparatus further comprises a heat insulation member and a refrigeration apparatus.

4. The kitchen system of claim 3, wherein the refrigeration apparatus comprises one or more temperature sensors, and a heat insulation member.

5. The kitchen system of claim 1, wherein a said location of the cap opening apparatus for positioning a said ingredient container is configured to be fixed relative to the third rigid component of the second motion mechanism of the cap opening apparatus.

6. The kitchen system of claim 1, wherein the first motion mechanism of the cap opening apparatus is configured to produce a linear motion of the first rigid component of the cap opening apparatus in a vertical direction, wherein the second motion mechanism of the cap opening apparatus is configured to produce a horizontal planar motion of the second rigid component of the cap opening apparatus.

7. The kitchen system of claim 1, wherein the cap opening apparatus further comprises a container gripping mechanism comprising one or more gripping devices, said container gripping mechanism being configured to grip said ingredient container (wherein the container gripping mechanism of the cap opening apparatus is implicitly different from the gripping mechanism of the transfer apparatus or the cap gripping mechanism of the cap opening apparatus).

8. The kitchen system of claim 1, wherein the transfer apparatus of the first transfer system comprises a third motion mechanism configured to produce a motion of the third rigid component of the transfer apparatus, said third motion mechanism comprising a motor.

9. The kitchen system of claim 8, wherein the first motion mechanism of the transfer apparatus of the first transfer system is configured to produce a linear motion of the first rigid component relative to the second rigid component in a vertical direction, wherein the second motion mechanism of the transfer apparatus of the first transfer system is configured to produce a horizontal planar motion of the second rigid component relative to the third rigid component, wherein the third motion mechanism of the transfer apparatus of the first transfer system is configured to produce a horizontal planar motion of the third rigid component.

10. The kitchen system of claim 1, further comprising a second transfer system configured to transfer a said (uncapped) ingredient container.

11. The kitchen system of claim 10, wherein the second transfer system further comprises a cyclic transfer apparatus comprising:
   a cycle of container holders, each comprising a solid configured to position a said ingredient container; and
   a motion mechanism configured to simultaneously move the cycle of container holders, said motion mechanism comprising a motor.

12. The kitchen system of claim 11, wherein the cyclic transfer apparatus comprises a pair of chains.

13. The kitchen system of claim 11, wherein the motion mechanism of the cyclic transfer apparatus is configured to produce an intermittent rotation of 360/N degrees around a vertical axis, wherein N is configured to be an integer bigger than or equal to 2.

14. The kitchen system of claim 11, wherein the second transfer system further comprises a transfer apparatus configured to move a said ingredient container from the cap opening apparatus to a said container holder of the cyclic transfer apparatus (wherein the transfer apparatus of the second transfer system is implicitly different from the transfer apparatus of the first transfer system), said transfer apparatus comprising:
   a container gripping mechanism configured to grip said ingredient container, said container gripping mechanism comprising a first rigid component and one or more griping devices (wherein the container gripping mechanism of the second transfer apparatus is implicitly different from the gripping mechanism of the first transfer system or of the cap opening apparatus); and
a motion mechanism configured to move the first rigid component of the gripping mechanism, said motion mechanism comprising a motor (wherein the motion mechanism of the second transfer system is implicitly different from the first or second motion mechanism of the first transfer system or of the cap opening apparatus).

15. The kitchen system of claim 10, wherein the second transfer system comprises a transfer apparatus comprising:
a gripping mechanism comprising a first rigid component, said gripping mechanism being configured to grip and hold a said ingredient container;
a first motion mechanism comprising a second rigid component and a motor, said first motion mechanism being configured to produce a motion of the first rigid component relative to the second rigid component; and
a second motion mechanism comprising a third rigid component and a motor, said second motion mechanism being configured to produce a motion of the second rigid component relative to the third rigid component.

16. The kitchen system of claim 1, wherein the cooking system further comprises an unloading apparatus configured to grip and move a said ingredient container as to dispense the food ingredients contained in the ingredient container to the cooking container of the cooking system, wherein the unloading apparatus comprises a motor; said unloading apparatus comprising:
a gripping mechanism configured to grip said ingredient container, said gripping mechanism comprising a first rigid component and one or more griping devices (wherein the gripping mechanism of the unloading apparatus is implicitly different from the gripping mechanism of the transfer apparatus or of the cap opening apparatus); and
a motion mechanism configured to produce a motion of the first rigid component of the gripping mechanism, said motion mechanism comprising a motor (wherein the motion mechanism of the unloading apparatus is implicitly different from the first or second motion mechanism of the first transfer system or of the cap opening apparatus).

17. The kitchen system of claim 1, wherein one or more of the gripping mechanisms comprise a sucker gripper, a vacuum gripper, a vacuum chuck, a pneumatic gripper, a mechanical gripper, a magnetic gripper.

18. The kitchen system of claim 1, wherein the cap gripping mechanisms of the cap opening apparatus or the gripping mechanism of the transfer apparatus comprises a motion mechanism configured to rotate the clipping devices, wherein said motion mechanism comprises a motor.

19. The kitchen system of claim 1, wherein the cooking system comprises a stirring motion mechanism comprising a support component and a motor, wherein the stirring motion mechanism is configured to produce a motion of the cooking container relative to said support component as to stir, mix or distribute the food or food ingredients held in the cooking container.

20. The kitchen system of claim 19, wherein the cooking system comprises a lid apparatus comprising:
a blocking device; and
a motion mechanism configured to move the blocking device between a first position and a second position, said motion mechanism comprising a motor (wherein the motion mechanism of the lid apparatus is implicitly different from the first or second motion mechanism of the first transfer system or of the cap opening apparatus);
wherein said blocking device, when positioned at the first position, is configured to help trap the food or food ingredients in the cooking container during time periods when the cooking container is moved by the stirring motion mechanism.

21. The kitchen system of claim 1, wherein the cooking system further comprises:
one or more receiving containers, each configured to hold a cooked food;
a cooking container unloading mechanism configured to unload a cooked food from the cooking container to a receiving container, said cooking container unloading mechanism comprising a motor.

22. The kitchen system of claim 21, wherein the cooking system further comprises a second transfer apparatus configured to grip and move a receiving container, wherein the second transfer apparatus comprises:
a gripping mechanism configured to grip a said receiving container, said gripping mechanism comprising a first rigid component and one or more griping devices (wherein the gripping mechanism of the second transfer apparatus is implicitly different from the gripping mechanism of the transfer apparatus of the first transfer system or of the cap opening apparatus); and
a motion mechanism configured to produce a motion of the first rigid component of the gripping mechanism, said motion mechanism comprising a motor (wherein the motion mechanism of the second transfer apparatus is implicitly different from the first or second motion mechanism of the first transfer system or of the cap opening apparatus).

23. The kitchen system of claim 21, wherein the cooking container unloading apparatus of the cooking system comprises a funnel and a cleaning mechanism configured to spray liquid on the funnel as to clean the funnel.

24. The kitchen system of claim 1, wherein the cooking system further comprises a cyclic transport apparatus comprising:
a plurality of container holders each configured to position or hold a said ingredient container;
a motion mechanism configured to cyclically move the plurality of container holders, said motion mechanism comprising a motor (wherein the motion mechanism of the cyclic transport apparatus is implicitly different from the first or second motion mechanism of the first transfer system or of the cap opening apparatus).

25. The kitchen system of claim 1, further comprising:
one or more transport boxes, each configured to store a plurality of said capped ingredient containers; and
a transportation apparatus configured to move a transport box, said transportation apparatus comprising one or more mini vehicles, each configured to transport a said transport box.

26. The kitchen system of claim 25, wherein the transportation apparatus comprises a linear or curved track, wherein the mini vehicles of the transportation apparatus are configured to move along the linear or curved track.

27. A kitchen system, comprising:
a plurality of ingredient containers, each configured to hold food ingredients;

a plurality of caps, each configured to cap a said ingredient container, wherein each pair consisting of a said ingredient container and a said cap which caps the ingredient container is referred to as a capped ingredient container;

a storage apparatus configured to store a plurality of said capped ingredient containers, said storage apparatus comprising a heat insulation member and a refrigeration apparatus;

a cooking system comprising a cooking container, said cooking container being configured to hold food or food ingredients; and a first transfer system configured to move a said capped ingredient container to or from the storage apparatus, said first transfer system comprising a transfer apparatus, wherein said transfer apparatus comprises:

a gripping mechanism comprising a first rigid component and one or more gripping devices, said gripping mechanism being configured to grip said capped ingredient container;

a first motion mechanism comprising a second rigid component and a motor, said first motion mechanism being configured to produce a motion of the first rigid component relative to the second rigid component;

a second motion mechanism comprising a third rigid component and a motor, said second motion mechanism being configured to produce a motion of the second rigid component of the first motion mechanism relative to the third rigid component; and a third motion mechanism comprising a fourth rigid component and a motor, said third motion mechanism being configured to produce a motion of the third rigid component relative to the fourth rigid component.

28. The kitchen system of claim 27, wherein the cooking system further comprises a motion mechanism comprising a motor, wherein said motion mechanism is configured to move the cooking container.

29. A kitchen system comprising:

a plurality of ingredient containers, each configured to hold food ingredients;

a plurality of caps, each configured to cap a said ingredient container, wherein each pair consisting of a said ingredient container and a said cap which caps the ingredient container is referred to as a capped ingredient container;

a storage apparatus configured to store a plurality of said capped ingredient containers, said storage apparatus comprising a heat insulation member and a refrigeration apparatus;

a cap opening apparatus configured to produce a relative motion between the cap and the ingredient container of a said capped ingredient container as to remove said cap from said ingredient container, said cap opening apparatus comprising:

a cap gripping mechanism comprising a first rigid component and one or more gripping devices, said cap gripping mechanism being configured to grip said cap;

a first motion mechanism comprising a second rigid component and a motor, said first motion mechanism being configured to produce a relative motion between the first rigid component and the second rigid component;

a second motion mechanism comprising a third rigid component and a motor; and a container gripping mechanism comprising one or more gripping devices, said container gripping mechanism being configured to grip said ingredient container when said cap is being removed from said ingredient container;

a cooking system comprising a cooking container, said cooking container being configured to hold food or food ingredients; and an ingredient dispensing apparatus configured to grip and move a said (uncapped) ingredient container as to dispense the food ingredients contained in the ingredient container into the cooking container of the cooking system, said ingredient dispensing apparatus comprising:

a container gripping mechanism configured to grip said ingredient container, said container gripping mechanism comprising a first rigid component and one or more griping devices (wherein the container gripping mechanism of the ingredient dispensing apparatus is implicitly different from the cap gripping mechanism of the cap opening apparatus); and a motion mechanism configured to produce a motion of the first rigid component of the container gripping mechanism, said motion mechanism comprising a motor (wherein the motion mechanism of the ingredient dispensing apparatus is implicitly different from the first or second motion mechanism of the cap opening apparatus).

30. The kitchen system of claim 29, wherein the cooking system further comprises a motion mechanism comprising a motor, wherein said motion mechanism is configured to move the cooking container (wherein the motion mechanism of the cooking system is implicitly different from the first or second motion mechanism of the cap opening apparatus or the motion mechanism of the ingredient dispensing apparatus).

* * * * *